US012596584B2

(12) United States Patent
Kundu et al.

(10) Patent No.: US 12,596,584 B2
(45) Date of Patent: Apr. 7, 2026

(54) APPLICATION PROGRAMING INTERFACE TO INDICATE CONCURRENT WIRELESS CELL CAPABILITY

(71) Applicant: NVIDIA Corporation, Santa Clara, CA (US)

(72) Inventors: Lopamudra Kundu, Sunnyvale, CA (US); Timothy James Martin, San Marcos, CA (US); Harsha Deepak Banuli Nanje Gowda, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 637 days.

(21) Appl. No.: 17/684,307

(22) Filed: Mar. 1, 2022

(65) Prior Publication Data

US 2023/0281053 A1     Sep. 7, 2023

(51) Int. Cl.
*G06F 9/46* (2006.01)
*G06F 9/50* (2006.01)
*G06F 9/52* (2006.01)

(52) U.S. Cl.
CPC ............ *G06F 9/505* (2013.01); *G06F 9/5083* (2013.01); *G06F 9/52* (2013.01)

(58) Field of Classification Search
CPC .......... G06F 9/505; G06F 9/5083; G06F 9/52; G06F 9/5044; G06F 9/541; G06F 9/48;
(Continued)

(56) References Cited

U.S. PATENT DOCUMENTS 5,838,671 A * 11/1998 Ishikawa ............... H04W 72/00
370/335
5,983,274 A     11/1999 Hyder et al.
(Continued)

FOREIGN PATENT DOCUMENTS

CN     108353306 A     7/2018
CN     110574431 A     12/2019
(Continued)

OTHER PUBLICATIONS

Dr. John E. Smee, Five wireless inventions that define 5G NR—the global 5G standard, Dec. 17, 2017, Qualcomm.com (Year: 2017).*
(Continued)

*Primary Examiner* — April Y Blair
*Assistant Examiner* — Zhi Chen
(74) *Attorney, Agent, or Firm* — Davis Wright Tremaine LLP

(57) ABSTRACT

Apparatuses, systems, and techniques to perform one or more APIs. In at least one embodiment, a processor is to perform an API to indicate a number of 5G-NR cells that are able to be performed concurrently by one or more processors; a processor is to perform an API to indicate whether one or more processors are able to perform a first number of 5G-NR cells concurrently; a processor comprising one or more circuits is to perform an API to indicate whether one or more resources of one or more processors are allocated to perform 5G-NR cells; and/or a processor comprises one or more circuits to perform an API to indicate one or more techniques to be used by one or more processors in performing one or more 5G-NR cells.

29 Claims, 62 Drawing Sheets

(58) Field of Classification Search
CPC ....... H04L 67/61; H04L 67/63; H04L 69/323; H04L 69/324; H04W 24/02; H04W 4/40; H04W 28/0236; H04W 28/0861; H04W 28/0242; H04W 84/042; H04W 80/12; H04W 80/04

See application file for complete search history.

(56) References Cited

U.S. PATENT DOCUMENTS

| | | | |
|---|---|---|---|
| 6,976,054 | B1 | 12/2005 | Lavian et al. |
| 7,920,569 | B1 | 4/2011 | Kasturi et al. |
| 8,561,038 | B1 | 10/2013 | Sams |
| 8,812,733 | B1 | 8/2014 | Black et al. |
| 10,171,423 | B1* | 1/2019 | Woodberg ........... H04L 63/1408 |
| 10,326,675 | B2 | 6/2019 | Raleigh et al. |
| 10,452,522 | B1* | 10/2019 | Arguelles ............ G06F 11/3684 |
| 10,645,099 | B1 | 5/2020 | Ciubotariu |
| 10,736,040 | B1* | 8/2020 | Chen ..................... H04W 76/18 |
| 11,089,076 | B1* | 8/2021 | Thario ................... H04L 65/612 |
| 11,153,762 | B1 | 10/2021 | Routt |
| 2002/0191543 | A1 | 12/2002 | Buskirk et al. |
| 2004/0103221 | A1 | 5/2004 | Rosu et al. |
| 2004/0154028 | A1 | 8/2004 | Wang et al. |
| 2005/0097245 | A1 | 5/2005 | Lym et al. |
| 2005/0265370 | A1 | 12/2005 | Fuente et al. |
| 2005/0271086 | A1* | 12/2005 | Macaluso .............. H04B 3/542 370/480 |
| 2006/0077923 | A1* | 4/2006 | Niwano ................ H04W 72/20 370/328 |
| 2007/0183418 | A1 | 8/2007 | Riddoch et al. |
| 2010/0144365 | A1* | 6/2010 | Pan .................... H04W 28/0861 455/453 |
| 2012/0076189 | A1* | 3/2012 | Luschi ................. H04B 17/327 375/224 |
| 2013/0029708 | A1 | 1/2013 | Fox et al. |
| 2013/0074151 | A1 | 3/2013 | Lin et al. |
| 2014/0086177 | A1 | 3/2014 | Adjakple et al. |
| 2014/0099119 | A1 | 4/2014 | Wei et al. |
| 2014/0169343 | A1* | 6/2014 | Skov ....................... H04L 5/003 370/336 |
| 2014/0310370 | A1 | 10/2014 | Hendel et al. |
| 2015/0006318 | A1 | 1/2015 | Thaker et al. |
| 2015/0067175 | A1 | 3/2015 | Asaduzzaman et al. |
| 2016/0205686 | A1* | 7/2016 | Kim ...................... H04L 5/0048 370/329 |
| 2016/0314029 | A1 | 10/2016 | Gupta et al. |
| 2017/0026312 | A1* | 1/2017 | Hrischuk ............ H04L 67/1097 |
| 2017/0171882 | A1* | 6/2017 | Sundararajan .... H04W 72/1268 |
| 2017/0223712 | A1 | 8/2017 | Stephens et al. |
| 2018/0027062 | A1* | 1/2018 | Bernat ..................... G06F 8/65 |
| 2018/0150257 | A1* | 5/2018 | Griffith ................. G06F 3/0626 |
| 2018/0159965 | A1 | 6/2018 | Francini et al. |
| 2019/0114197 | A1 | 4/2019 | Gong |
| 2019/0140967 | A1 | 5/2019 | Deval et al. |
| 2019/0313359 | A1* | 10/2019 | Lee ....................... H04W 76/14 |
| 2019/0349426 | A1 | 11/2019 | Smith et al. |
| 2020/0137745 | A1 | 4/2020 | Bachu et al. |
| 2020/0145337 | A1 | 5/2020 | Keating et al. |
| 2020/0218684 | A1 | 7/2020 | Sen et al. |
| 2020/0236038 | A1* | 7/2020 | Liu .......................... H04L 47/76 |
| 2020/0305211 | A1 | 9/2020 | Foti et al. |
| 2020/0358721 | A1 | 11/2020 | Rimmer et al. |
| 2020/0364223 | A1 | 11/2020 | Pal et al. |
| 2020/0374017 | A1* | 11/2020 | Dou ....................... H04L 5/0053 |
| 2021/0076299 | A1 | 3/2021 | Chunduri et al. |
| 2021/0117249 | A1 | 4/2021 | Doshi et al. |
| 2021/0120506 | A1 | 4/2021 | Takeda et al. |
| 2021/0144517 | A1 | 5/2021 | Guim Bernat et al. |
| 2021/0149578 | A1 | 5/2021 | Xu et al. |
| 2021/0168584 | A1 | 6/2021 | Li et al. |
| 2021/0184795 | A1 | 6/2021 | Ibars Casas et al. |
| 2021/0211887 | A1 | 7/2021 | Jones |
| 2021/0286752 | A1 | 9/2021 | Modukuri et al. |
| 2021/0314744 | A1* | 10/2021 | Files ..................... H04W 4/026 |
| 2021/0320850 | A1 | 10/2021 | Young |
| 2021/0328736 | A1 | 10/2021 | Aijaz |
| 2021/0360714 | A1 | 11/2021 | Zhang et al. |
| 2021/0385252 | A1 | 12/2021 | Lebin et al. |
| 2021/0390004 | A1 | 12/2021 | Kundu et al. |
| 2021/0397360 | A1* | 12/2021 | Vankamamidi ....... G06F 9/4881 |
| 2021/0410016 | A1 | 12/2021 | Kwok et al. |
| 2022/0030531 | A1 | 1/2022 | Kim et al. |
| 2022/0075731 | A1 | 3/2022 | Dong et al. |
| 2022/0086218 | A1 | 3/2022 | Sabella et al. |
| 2022/0151022 | A1 | 5/2022 | Chikkur Dattatraya et al. |
| 2022/0173886 | A1 | 6/2022 | Sardesai et al. |
| 2022/0272151 | A1* | 8/2022 | Umanesan .......... H04L 67/1012 |
| 2022/0276914 | A1 | 9/2022 | Kundu et al. |
| 2023/0044165 | A1 | 2/2023 | Roy et al. |
| 2023/0074288 | A1 | 3/2023 | Filippou et al. |
| 2023/0109752 | A1 | 4/2023 | Levit-Gurevich |
| 2023/0171168 | A1 | 6/2023 | Kedalagudde et al. |
| 2023/0180022 | A1* | 6/2023 | Cepeda ................. H04W 4/027 455/456.1 |
| 2023/0232367 | A1* | 7/2023 | Abedini ................ H04W 68/02 370/329 |
| 2023/0422095 | A1 | 12/2023 | Eker et al. |
| 2024/0193021 | A1 | 6/2024 | Pateromichelakis et al. |
| 2024/0202033 | A1 | 6/2024 | Yokono et al. |
| 2024/0314229 | A1 | 9/2024 | Condoluci et al. |

FOREIGN PATENT DOCUMENTS

| | | | | |
|---|---|---|---|---|
| CN | 111527769 | A | | 8/2020 |
| CN | 112997469 | A | | 6/2021 |
| CN | 113132422 | A * | 7/2021 | ......... H04L 12/1407 |
| CN | 113424586 | A | | 9/2021 |
| CN | 113678510 | A | | 9/2021 |
| CN | 113994599 | A | | 1/2022 |
| WO | 2020172611 | A1 | | 8/2020 |
| WO | 2021087526 | A1 | | 5/2021 |

OTHER PUBLICATIONS

International Search Report and Written Opinion for Application No. PCT/CN2022/081192, mailed Nov. 25, 2022, filed Mar. 16, 2022, 8 pages.

5G Americas White Paper, "Transition Toward Open & Interoperable Networks," Retrieved from https://www.5gamericas.org/wp-content/uploads/2020/11/InDesign-Transition-Toward-Open-Interoperable-Networks-2020.pdf, Nov. 2020. 57 pages.

Brown et al., "New Transport Network Architectures for 5G Ran," Retrieved from https://www.fujitsu.com/us/Images/New-Transport-Network-Architectures-for-5G-RAN.pdf, Sep. 18, 2018, 11 pages.

IEEE, "IEEE Standard 754-2008 (Revision of IEEE Standard 754-1985): IEEE Standard for Floating-Point Arithmetic," Aug. 29, 2008, 70 pages.

Peterson et al. "5G Mobile Networks: A Systems Approach, Chapter 5: Advanced Capabilities," Retrieved from https://5g.systemsapproach.org/disaggregate.html, 2020, 9 pages.

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Stanley et al., "Why Open RAN Needs Flexible Hardware Acceleration," Retrieved from https://www.lightreading.com/open-ran/why-open-ran-needs-flexible-hardware-acceleration/a/d-id/769984#:~:text=Hardware%, Jun. 4, 2021, 8 pages.

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

Kaltenberger et al., "OpenAirInterface: Democratizing Innovation in the 5G Era," Computer Networks, vol. 176, 2020, 11 pages.

(56) References Cited

OTHER PUBLICATIONS

Welzl et al., "Transport Services: A Modern API for an Adaptive Internet Transport Layer," IEEE Communications Magazine, 59(4): 2021, 7 pages.

Yun et al., "An Integrated Transport Solution to Big Data Movement in High-performance Networks," IEEE 23rd International Conference on Network Protocols, 2015, 3 pages.

Office Action for Chinese Application No. 202310187966.X, mailed Jan. 10, 2026 20 pages.

Office Action for Chinese Application No. 202310188122.7, mailed Jan. 13, 2026, 15 pages.

Office Action for Chinese Application No. 202310188938.X, mailed Jan. 21, 2026, 20 pages.

Office Action for Chinese Application No. 202310194890.3, mailed Jan. 21, 2026, 15 pages.

Office Action for Chinese Application No. 202310201242.6, mailed Jan. 14, 2026, 18 pages.

* cited by examiner

300

Call an API to determine a number of cells that can be support concurrently by resources
310

Receive response including a maximum number of cells that can be concurrently supported
315

Schedule based on maximum number of cells that can be concurrently supported
320

A

End

400

Call an API to map cell workloads to resources
410

Map cell workloads to resources
415

Mapping successful?
420

Yes

No

End

Figure 22:
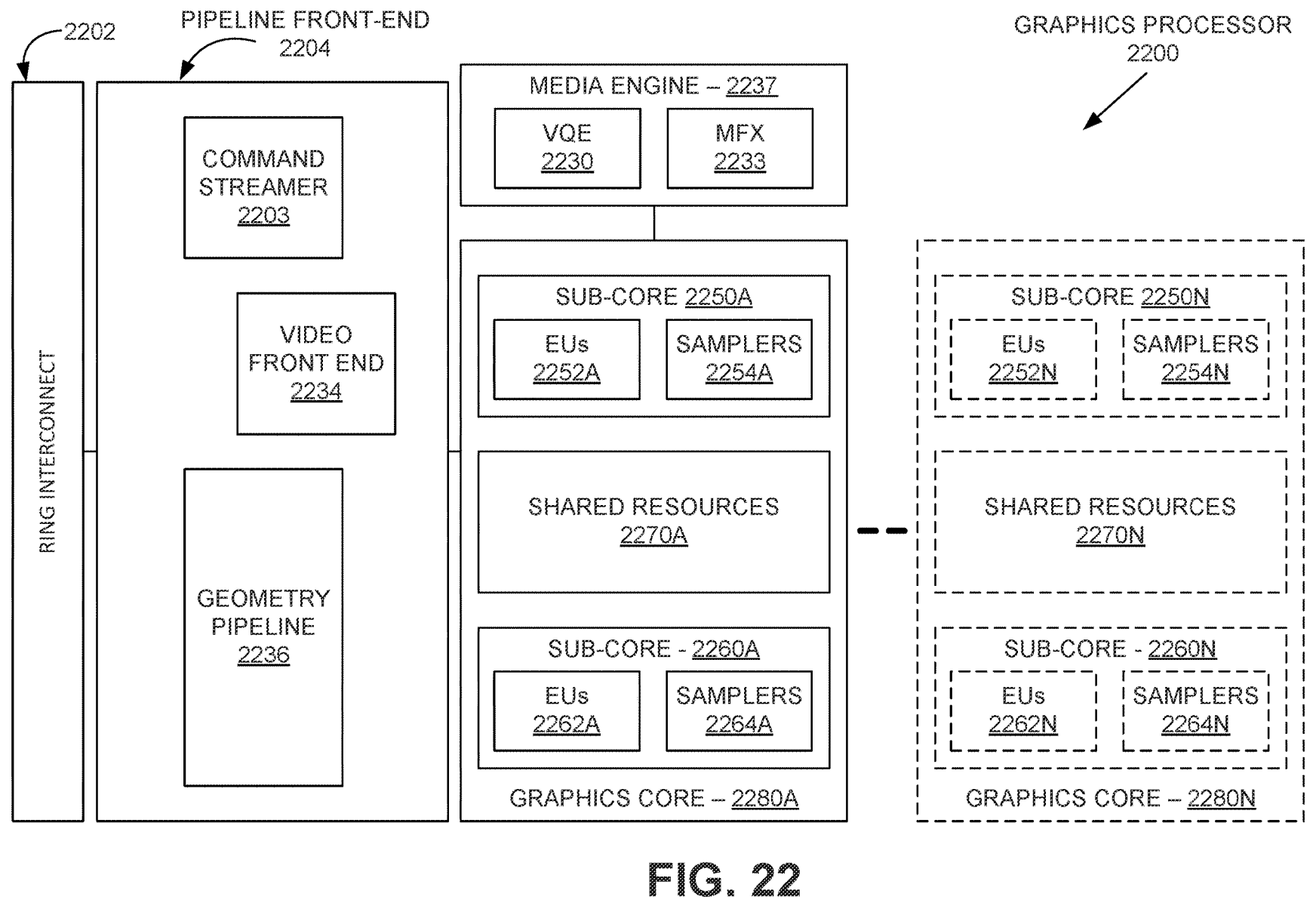

GRAPHICS PROCESSOR 2200

GRAPHICS CORE – 2280N

SUB-CORE 2250N
- EUs 2252N
- SAMPLERS 2254N

SHARED RESOURCES 2270N

SUB-CORE - 2260N
- EUs 2262N
- SAMPLERS 2264N

MEDIA ENGINE – 2237
- VQE 2230
- MFX 2233

GRAPHICS CORE – 2280A

SUB-CORE 2250A
- EUs 2252A
- SAMPLERS 2254A

SHARED RESOURCES 2270A

SUB-CORE - 2260A
- EUs 2262A
- SAMPLERS 2264A

PIPELINE FRONT-END 2204
- COMMAND STREAMER 2203
- VIDEO FRONT END 2234
- GEOMETRY PIPELINE 2236

2202

RING INTERCONNECT

2400

APPLICATION PROGRAMING INTERFACE TO INDICATE CONCURRENT WIRELESS CELL CAPABILITY

TECHNICAL FIELD

At least one embodiment pertains to processing resources for fifth generation new radio ("5G-NR") operations. For example, a processor comprising one or more circuits to perform an application programming interface ("API") to indicate a number of 5G-NR cells that are able to be performed concurrently by one or more processors (e.g., one or more graphics processing units ("GPUs")).

BACKGROUND

Processing 5G-NR workloads can use significant memory, time, or computing resources. An amount of memory, time, or computing resources used to process 5G-NR workloads can be improved.

BRIEF DESCRIPTION OF THE DRAWINGS

FIG. 22 illustrates a graphics processor, according to at least one embodiment;

DETAILED DESCRIPTION

Figure 1:
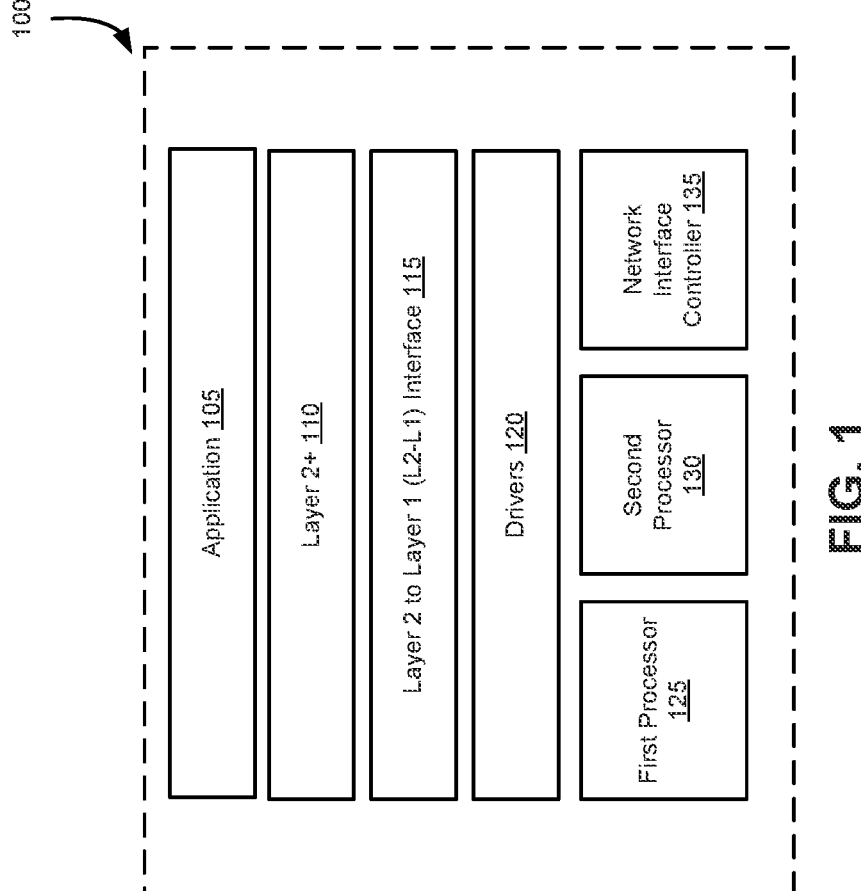
FIG. 1 is a schematic overview block diagram for a network protocol stack, in accordance with at least one embodiment.

Numerous specific details are set forth to provide a more thorough understanding of at least one embodiment. However, it will be apparent to a skilled person that these inventive concepts may be practiced without one or more of these specific details.

In at least one embodiment, in open radio access network ("O-RAN") deployment, one or more central processing units ("CPUs") process functional operations that are part of a Distributed Unit ("DU") or a centralized unit ("CU"). In at least one embodiment in O-RAN deployment, one or more CPUs can offload operations for compute-intensive algorithms such as physical layer signal processing, gaming processing, and video processing to hardware accelerators in a lower layer of an O-RAN network protocol stack. In at least one embodiment, hardware accelerators can be a GPU, field programmable gate array ("FPGA"), application specific integrated circuit ("ASIC"), system on chip ("SoC"), or another processor specialized to accelerate processing (e.g., PPUs). In at least one embodiment, hardware accelerators provide a performance boost to processing operations in O-RAN because they are designed to accelerate processing. For example, a GPU can perform thousands of operations in parallel as compared to a CPU that performs operations serially.

In at least one embodiment, 5G-NR service providers use O-RAN to provide a range of services as part of "network slicing," where different network slices of a 5G-NR network provide a different type of service corresponding to a different quality of service ("QoS"). For example, a 5G-NR service provider offers network slices with enhanced mobile broadband ("eMBB"), ultra-reliable low latency communications ("URLLC"), massive machine-type communications ("mMTC"), and/or vehicle-to-everything ("V2X") for one or several cells in a 5G-NR network, where each service type has a different QoS, e.g., URLLC relates to ultra-low latency when processing 5G-NR workloads. In at least one embodiment, cells refer to sections of a 5G-NR network that are divided into geographical areas (e.g., 5G small cells). In at least one embodiment, cells refer to sections of a 5G-NR network that are operated using a different frequency range or different frequency band (e.g., macrocells, microcells, femtocells, or picocells).

In at least one embodiment, hardware accelerators can have different capabilities for processing different types of 5G-NR workloads, e.g., for processing workloads in different network slices that have different QoS requirements. For example, a particular GPU or group of GPUs may inherently be better for performing an mMTC workload related to gaming than a CPU because of parallel processing architecture; as another example, a FPGA or group FPGAs programmed for low latency workloads may be better at performing a URLLC workload to meet a QoS requirement as compared to a CPU because of programming design to reduce latency in said FPGA or group of FPGA.

In at least one embodiment, an application deployed on an O-RAN network may not know whether hardware accelerators in a lower layer (e.g., layer 1) are optimized for performing particular workloads to meet a QoS requirement. More specifically, without determining what QoS requirements can be met by hardware accelerators, an application assumes that hardware accelerators are standard and can meet pre-defined QoS requirements that may be below capabilities of a specialized hardware accelerator (e.g., a newly designed GPU that is optimized for machine learning operations), which may result in underutilization of hardware accelerator resources.

To account for varying capabilities of hardware accelerators and reduce underutilization of hardware accelerators that are designed or specialized to handle workloads above a pre-defined standard, in at least one embodiment, apparatuses, systems, and techniques perform one or more APIs that communicate data between a layer 2 ("L2") and a layer 1 ("L1") of an O-RAN network protocol stack so that L2 and L1 can improve (e.g., optimize) utilization of hardware accelerator resources in L1 to meet QoS requirements. In at least one embodiment, said one or more APIs can be performed by one or more processors, as described below, to exchange information between L2 and L1 of an O-RAN network protocol stack such that an application through L2 determines what QoS requirements one or more resources (e.g., hardware accelerators in L1) can meet when processing 5G-NR workloads for 5G-NR cells.

In at least one embodiment, said one or more APIs can be performed by one or more processors, such as described below, to determine a maximum number of 5G-NR cells that resources in L1 can support while meeting a desired QoS requirement. For example, an application can use a set of APIs to determine how many 5G-NR cells resources in L1 can support URLLC workloads. Said one or more APIs are disclosed in more detail in FIGS. 3-6. In at least one embodiment, because an application queried L1 to determine a maximum number of 5G-NR cells that can be supported while meeting a quality requirement, underutilization of hardware accelerators in L1 is reduced because said application has asked resources in L1 for a maximum number of cells that can be supported while meeting a quality parameter that is above a pre-defined standard.

FIG. 1 is a schematic overview block diagram for a network protocol stack 100, in accordance with at least one embodiment. In at least one embodiment, network protocol stack 100 corresponds to or is to perform one or more operations for O-RAN network or other network protocol stack that is to provide 5G-NR service, in other embodiments, network protocol stack 100 corresponds to providing sixth generation (6G) new radio network service or another wireless communication protocol stack (e.g., any 3rd Generation partnership Project (3GPP) wireless communication standard). In at least one embodiment, network protocol stack 100 is used to support networks disclosed in FIGS. 34-38 and 40.

FIG. 1 includes network protocol stack 100, an application 105, a layer 2 ("L2") or higher layer 110 (also referred to as "L2+"), layer 2 to layer 1 interface 115 (also referred to as a "L2-L1 interface"), drivers 120, first processor 125, second processor 130, and network interface controller 135. In at least one embodiment, L2 relates to a data link layer for 5G-NR that is responsible for scheduling functions related to 5G-NR workloads. In at least one embodiment, layer 1 ("L1") refers to a physical layer of RAN protocol stack, which can be implemented as a L1 software library running on a first processor 125 (e.g., a CPU) and/or a second processor 130 (e.g., an accelerated L1 run by an FPGA, GPU, ASIC, or a SoC). In at least one embodiment, a layer refers to an abstraction of hardware that performs functions or operations for a system, network, or computer, e.g., L2 is an abstraction of hardware that performs data link and scheduling operations for an O-RAN network and L1 is an abstraction of a real time hardware operations that perform physical layer operations for an O-RAN network (e.g., O-RAN network). For example, layers correspond to Open Systems Interconnection (OSI) model (e.g., L1, L2, L3) exposed by one or more interfaces to handle functions or operations for 5G-NR.

In at least one embodiment, application 105 is a RAN protocol stack program running on a host CPU (e.g., first processor 125). For example, application 105 relates to software for a service provider of 5G-NR to provide eMBB, URLLC, mMTC, and/or V2X for one or several cells in a 5G-NR network. While one application 105 is shown in FIG. 1, several applications can be run on network protocol stack 100, where each application 105 provides identical or different services.

In at least one embodiment, L2-L1 interface 115 enables application 105 to communicate with L1 and to cause drivers 120 in L1 to control first processor 125, second processor 130, and network interface controller 135. In at least one embodiment, an application 105 uses L2-L1 interface 115 and one or more APIs to determine how many 5G-NR cells can be supported concurrently be L1 resources (e.g., hardware accelerators), scheduling or prioritizing workloads that are processed by L1 resources and performing operations to reconfigure or update L1 resources as traffic conditions change in a 5G-NR network (see FIGS. 3-5 for more detail regarding said one or more APIs). In at least one embodiment, L2-L1 interface 115 is an interface such as a 5th Generation Functional Application Programming Interface (5G FAPI), and/or variations thereof. More detail regarding said L2-L1 interface is disclosed in FIG. 7. In at least one embodiment, L2-L1 interface 115 communicates with an acceleration abstraction layer (AAL) interface as disclosed in FIG. 7.

In at least one embodiment, drivers 120 include libraries to operate first processor 125, second processor 130, and network interface controller 135. In at least one embodiment, a driver, also referred to as a device driver, is a computer program that operates, controls, or otherwise provides an interface with various hardware, such as hardware accelerator devices and network communication/interface devices. In at least one embodiment, drivers 120 comprise one or more functions, processes, libraries, interfaces, and/or variations thereof that provide support for L2-L1 interface 115. In at least one embodiment, drivers 120 are implemented such that functions of L2-L1 interface 115 can be appropriately processed in connection with first processor 125, second processor 130, and network interface controller 135.

In at least one embodiment, first processor 125 is a processor that has one or more circuits to perform operations corresponding to network protocol stack 100. For example, first processor 125 is a CPU that is configured to perform or operation a DU or CU for a O-RAN. In at least one embodiment, second processor 130 is a hardware accelerator. Hardware accelerators can be graphics processing units (GPUs), field programmable gate arrays (FPGAs), application specific integrated circuits (ASICs), system on chip (SoC), or other processors specialized to improve performance processing (e.g., parallel processing units). In at least one embodiment, first processor 125 (e.g., CPU running a DU in an O-RAN network) can offload operations for compute-intensive algorithms such as physical (PHY) layer signal processing, gaming related processing, video processing, and crypto processing to second processor 130 (e.g., hardware accelerators).

In at least one embodiment, a network interface controller (NIC) 135 is a hardware component that connects one or more computing systems to one or more computing networks. In at least one embodiment, NIC 135 receives data to be processed by first processor 125 or second processor 130 (e.g., a hardware accelerator) and transmits data processed by first processor 125 or second processor 130 to another component in an O-RAN network (e.g., base station). In at least one embodiment, NIC 135 receives data to be processed through one or more functions of acceleration abstraction layer interface (see FIG. 7) and transmits data processed through one or more functions of acceleration abstraction layer interface. In at least one embodiment, NIC 135 interacts with a remote radio head (RRH), also referred to as a remote radio unit (RRU) as part of providing 5G-NR service.

Figure 2:
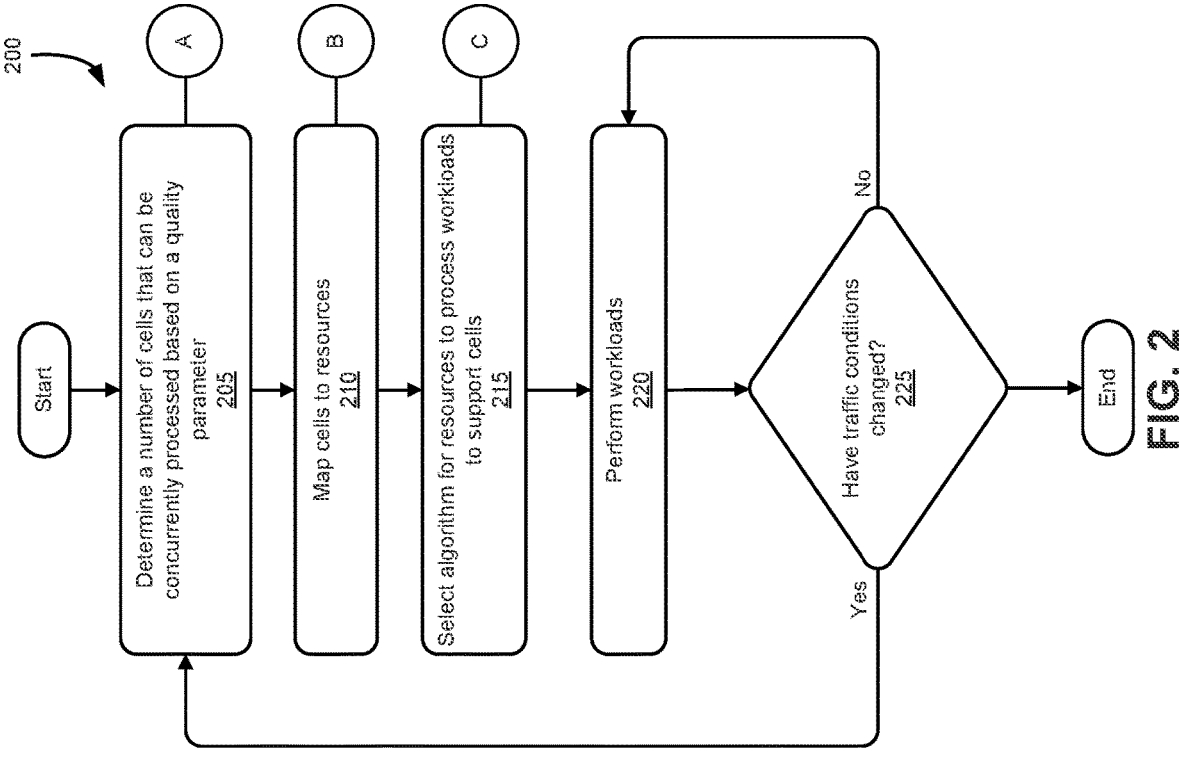
FIG. 2 is a process flow diagram corresponding to processing workloads with said network protocol stack from FIG. 1, in accordance with at least one embodiment.

FIG. 2 illustrates a process flow diagram for processing a workload for one or more 5G-NR cells, in accordance with at least one embodiment. In at least one embodiment, a processor comprising one or more circuits or a system comprising one or more processors performs process 200 to process a 5G-NR workload for a O-RAN network protocol stack (e.g., network protocol stack 100 as shown in FIG. 1).

In at least one embodiment, some or all of process 200 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer readable storage medium in form of a computer program comprising a plurality of computer readable instructions executable by one or more processors. In at least one embodiment, a computer readable storage medium is a non-transitory computer readable medium. In at least one embodiment, at least some computer readable instructions usable to perform process 200 are not stored solely using transitory signals (e.g., a propagating transient electric or electromagnetic transmission). In at least one embodiment, a non-transitory computer readable medium does not necessarily include non-transitory data storage circuitry (e.g., buffers, caches, and queues) within transceivers of transitory signals. In at least one embodiment, process 200 is performed at least in part on a computer system such as those described elsewhere in this disclosure. In at least one embodiment, logic (e.g., hardware, software, or a combination of hardware and software) performs process 200. In at least one embodiment, process 200 can begin at determine operation 205 and proceed to map operation 210.

At determine operation 205, in at least one embodiment, one or more processors performs an API to determine a number of cells that can be concurrently processed by one or more hardware accelerators in L1 based on a quality parameter. In a least one embodiment, a quality parameter relates to QoS requirement for processing a workload, e.g., a quality threshold to meet that corresponds to latency, throughput, reliability, and/or connectivity of processing one or more workloads corresponding to 5G-NR cells. In at least one embodiment, a quality parameter corresponds to a key performance indicator (KPI) (also referred to as "performance indicator") matrix that is accessible to a hardware accelerators processing one or more workloads such that an input quality parameter from an API can be used by L1 to lookup (or determine) relevant KPIs for a workload to meet a quality parameter. For example, in determine operation 102, one or more processors performing an L2+ application negotiate with one or more processors providing an L1 in an O-RAN network to determine how many 5G-NR cells can be supported by hardware acceleration resources in L1 to meet a URLLC or mMTB workload for these cells. In such an example, L1 can query hardware accelerator resources such as GPUs, CPUs, FPGAs, ASICs, and/or SoCs to determine how many 5G cells they can support while meeting a quality parameter for URLLC or mMTB workload. More detail regarding said API and determine operation are disclosed in FIG. 3 as noted by "A" in FIG. 2.

At map operation 210, one or more processors performs an API to map specific 5G-NR cells (e.g., cell IDs) to hardware accelerator resources in L1 that will process workloads to meet a particular quality parameter as negotiated by an API in determine operation 102. In at least one embodiment, one or more processors providing an L2+ or L2 application provide cell identification numbers (e.g., cell IDs) to one or more processors providing an L1 such that L1 can receive said cell IDs for mapping specific hardware accelerator to L1 resources. In at least one embodiment, after determine operation 205, an application already knows a maximum number of cells that L1 can support while meeting a quality parameter, so map operations 210 further specifics cell IDs and L1 hardware resources that will handle workloads for these cells. In at least one embodiment, an API can respond that a mapping of cell IDs to hardware accelerator resources was successful (e.g., "1") or not successful (e.g., "0"). More detail regarding said API and map operation 210 are disclosed in FIG. 4 as noted by "B" in FIG. 2.

At select algorithm operation 215, one or more processors performs an API to select an algorithm for processing a 5G-NR workload. In at least one embodiment, one or more processors providing L1 has access to a library that includes different processing algorithms (e.g., one or more techniques) to process a particular workload to meet a quality parameter, e.g., a low latency algorithm to process workloads that have a low latency quality parameter, a high throughput algorithm that is design to process a workload to meet a high throughput quality parameter. In at least one embodiment, one or more processors comprising one or more circuits is configured to schedule workload processing sequentially or in parallel. In at least one embodiment, one or more processors performs an API that determines to process workloads sequentially or in parallel to meet a quality parameter. More detail regarding said API and operation 215 are disclosed in FIG. 5 as noted by "C" in FIG. 2.

Figure 7:
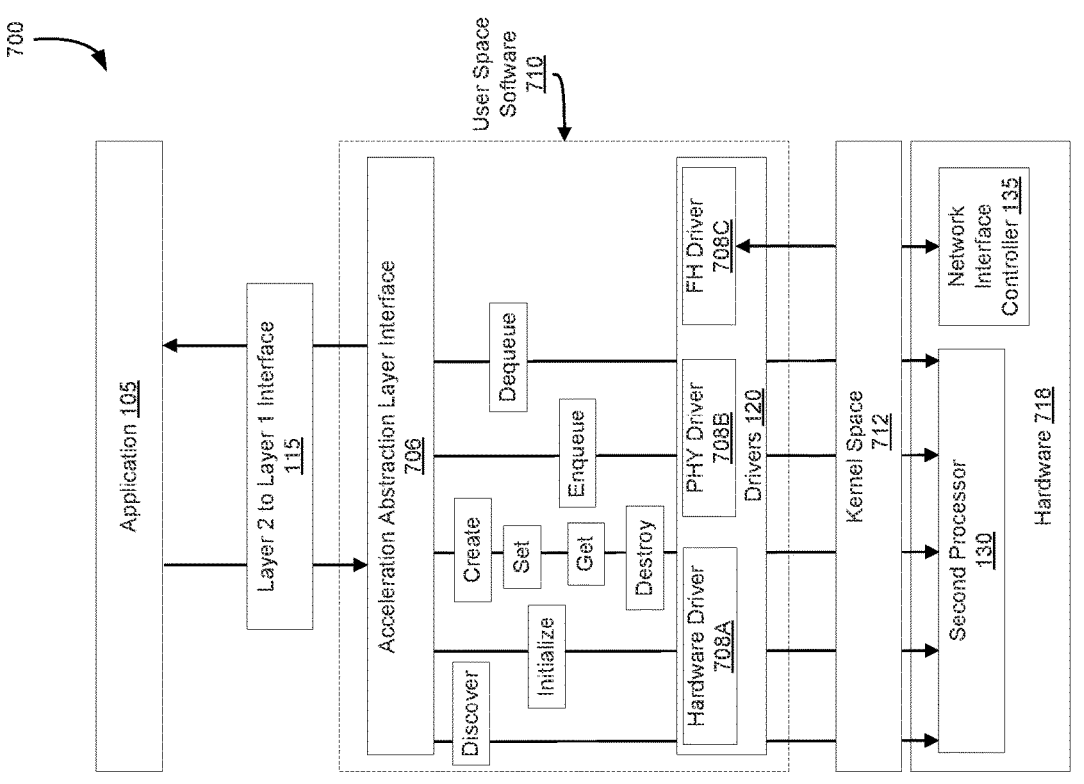
FIG. 7 illustrates a diagram of an acceleration abstraction layer ("AAL") interface, according to at least one embodiment.
Figure 8:
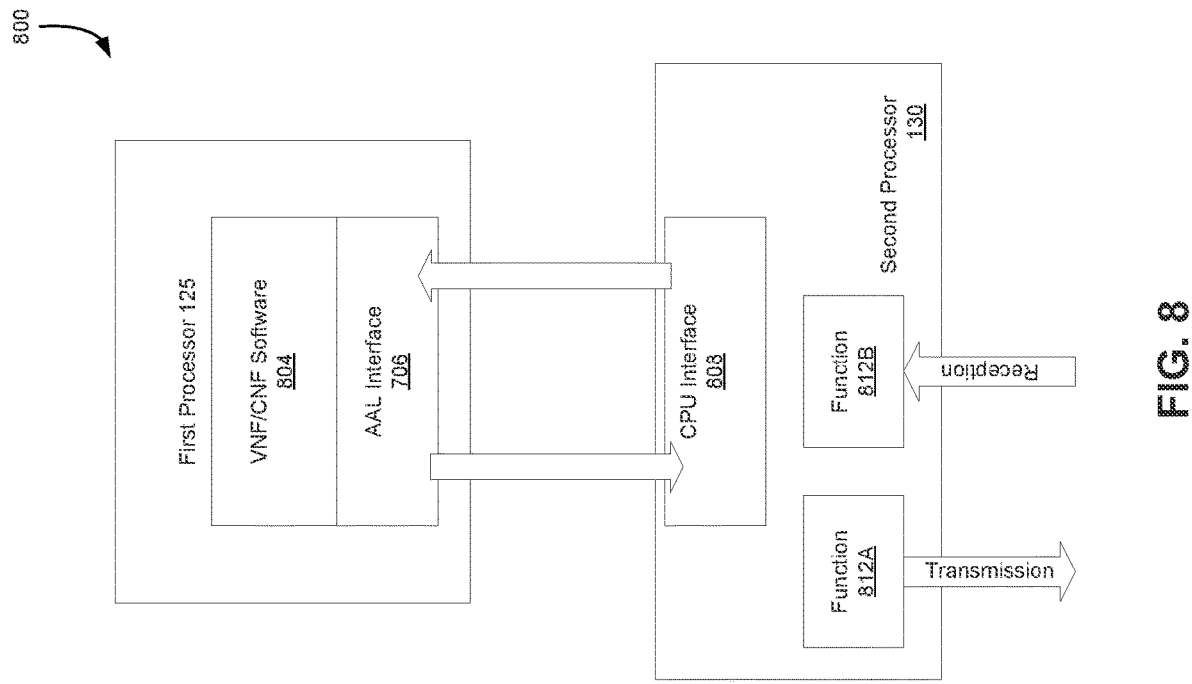
FIG. 8 illustrates a diagram of an inline acceleration model, according to at least one embodiment.

At perform workload operation 220, in at least one embodiment, one or more processors performs one or more APIs to perform a workload that has been set and mapped based on determine operation 102, map operation 210, and select algorithm operation 215. In at least one embodiment, L2 can provide information related to a number of cells that hardware resources in L1 can support to a Service Management and Orchestrator (SMO) of an O-RAN such that updated scheduling information can determined. In at least one embodiment, one or more processors performs one or more APIs from 5G FAPI and/or variations thereof to perform one or more workloads. FIG. 7 discloses more detail regarding performing one or more workloads using said 5G FAPI or variations thereof.

At determine traffic conditions decision operation 225, in at least one embodiment, one or more processors or a system performing an application (e.g., L2 or L2+ application) determines that traffic conditions have changed based on monitoring traffic for a network, e.g., a 5G-NR network supported by a service provider. In at least one embodiment, if one or more processors or a system performing an application determines that traffic conditions have changed (e.g., between daytime and nighttime or based on providing a new 5G-NR service for a different network slice), said one or more processors or a system performing an application determine a new number of cells that can be concurrently processed based on a quality parameter (e.g., as in determine operation 205, but with a new quality parameter corresponding to changed traffic conditions). For example, if an application receives a request to change from a URLLC to mMTB service, such an application determines a new quality parameter based on new service mMTB and requests to determine a maximum number of cells that resources in L1 can support based on said new quality parameter. In at least one embodiment, said one or more processors or a system performing an application determine that traffic conditions have not changed, said one or more processors or a system performing an application determine to continue to perform said workloads to support 5G-NR cells (e.g., as already mapped by map operation 210).

After traffic conditions decision operation 225, in at least one embodiment, one or more circuits can repeat process 200 or parts of process 200, e.g., for a new application that requests to use hardware accelerators in L1. In at least one embodiment, traffic conditions decision operation 225, one or more processors comprising one or more circuits or a system can end process 200 (e.g., an application is finished providing 5G-NR service).

Figure 3:
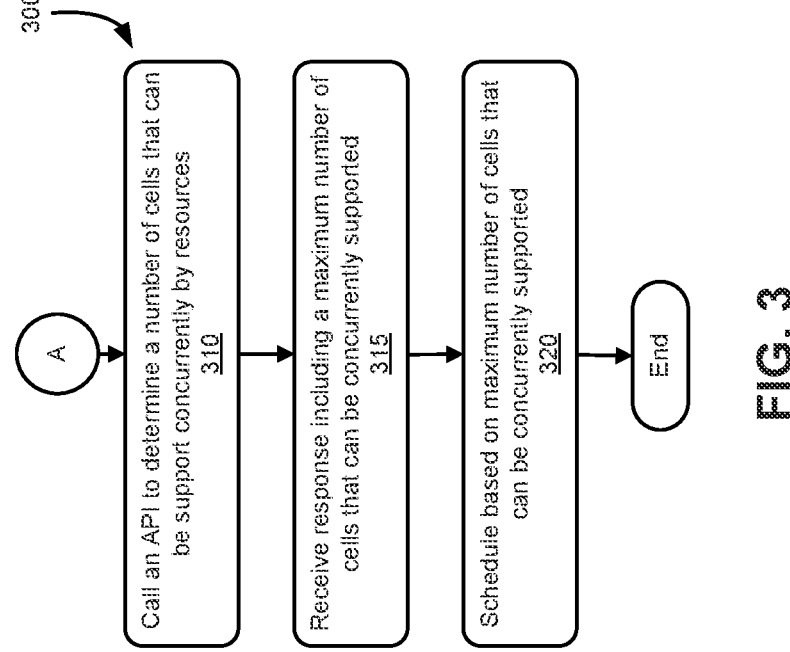
FIG. 3 is a process flow diagram including more detail for processing workloads with said network protocol stack, in accordance with at least one embodiment.

FIG. 3 is a process flow diagram including more detail for processing workloads with network protocol stack 100 (see FIG. 1), in accordance with at least one embodiment. As shown in FIG. 2 with said "A" marking, FIG. 3 provides more detail that can be integrated into process 300 or performed by an API. In at least one embodiment, process 300 is performed by one or more circuits to process a 5G-NR workload for a O-RAN network protocol stack (e.g., network protocol stack 100 as shown in FIG. 1).

In at least one embodiment, some or all of process 300 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, at least some computer readable instructions usable to perform process 300 are not stored solely using transitory signals (e.g., a propagating transient electric or electromagnetic transmission). In at least one embodiment, process 300 is performed at least in part on a computer system such as those described elsewhere in this disclosure. In at least one embodiment, logic (e.g., hardware, software, or a combination of hardware and software) performs process 300. In at least one embodiment, process 300 can begin at call operation 310 and proceeds to response operation 315.

At call operation 310, in at least one embodiment, an application calls an API to query how many 5G-NR cells one or more L1 resources can support while meeting a quality parameter (e.g., threshold quality of service). In at least one embodiment, said API is called a "QoS_config" API. In at least one embodiment, said API can receive input parameters such as a QoS array (pointer to an integer array) that includes a quality parameter corresponding to a QoS requirement(s) for processing one or more workloads corresponding to one or more 5G-NR cells. In at least one embodiment, an application calls said API and only provides QoS array as input to determine how many maximum L1 can support while meeting quality requirements in said QoS array. In at least one embodiment, an application invokes said API to send a list of QoS requirements through QoS array to L1 (e.g., [int Q1, int Q2, int Qn], where each QoS value maps to a set of KPIs corresponding to a quality parameter). For example, a QoS array can be mapped to KPIs as follows: Q1 "latency mode" refers to a limit on maximum allowed latency when processing a workload, which can be useful for URLLC; Q2 "throughput mode" refers to a minimum user throughput, which can be useful for eMBB; Q3 "reliability mode" refers to a minimum reliability (in terms of bit error rate (BER) (KPI)), which can be useful for mission critical traffic, e.g., remote surgery; and Q4 "Connectivity mode" refers to a minimum number of end users per 5G-NR cell, which can be useful for mMTC traffic. In at least one embodiment, call operation 310 can be performed to determine several different QoS parameters that can be supported by L1 resources (e.g., how many 5G-NR cells can be supported by resources in L1 while meet a latency requirement while simultaneously supporting several 5G-NR cells to be meet a throughput requirement). In at least one embodiment, other values can be input into a QoS array such as a combination of number of cells, throughput per cell, number of end users per cell, or other relevant factors for processing cell workloads.

In at least one embodiment, an application using said API can provide additional input parameters such as a maximum cell array (e.g., pointer to an integer array) that corresponds to a maximum number of 5G-NR cells that need to be supported for a particular quality parameter and/or a rank array (e.g., pointer to an integer array) that corresponds to a rank 5G-NR cells and services that have higher or low priority. In at least one embodiment, maximum number of 5G-NR cells requested for support or rank of cells or rank or workloads is used by one or more APIs to schedule and process one or more workloads corresponding to one or more 5G-NR cells.

At response operation 315, in at least one embodiment, an application receives a response from L1 (e.g., via an API) that provides whether L1 can admit a workload to support 5G-NR cells based on quality requirements. In at least one embodiment, based on L1's response, L2+ can adjust its scheduling strategy, e.g., an application in L2+ can schedule for less than or equal to a maximum number of cells for L1 that meet a certain quality parameter. In at least one embodiment, response operation 315 includes L1 responding with a simple "1" or "0" to indicate admit or deny (admit can also include allow, enable, accept start, and perform; deny can include reject, stop, prevent, or block). In at least one embodiment, response operation 315 includes L1 responding with admit and/or deny and including a maximum number of cells that can be supported while meeting one or more quality parameters (e.g., correspond to QoS for a network slice).

At schedule operation 320, in at least one embodiment, one or more processors or a system performing an application can provide said maximum number of cells to a scheduler so that said scheduler can base scheduling decisions based on said maximum number of cells. For example, an API can provide maximum number of 5G-NR cells that can be support while meeting a quality threshold to a L2+ application or hardware device (e.g., SMO) that is responsible for scheduling workload processing for L1. In at least one embodiment, schedule operation 320 is optional or performing prior to schedule operation 320 such that scheduling is performing not based on number of maximum cell available.

After response operation 315 or schedule operation 320, in at least one embodiment, one or more processors or systems performing an application can repeat process 300 or parts of process 300, e.g., for a new application that requests to use hardware accelerators in L1. In at least one embodiment, after schedule operation 320, one or more processors provide results to process 200, and end process 300.

Figure 4:
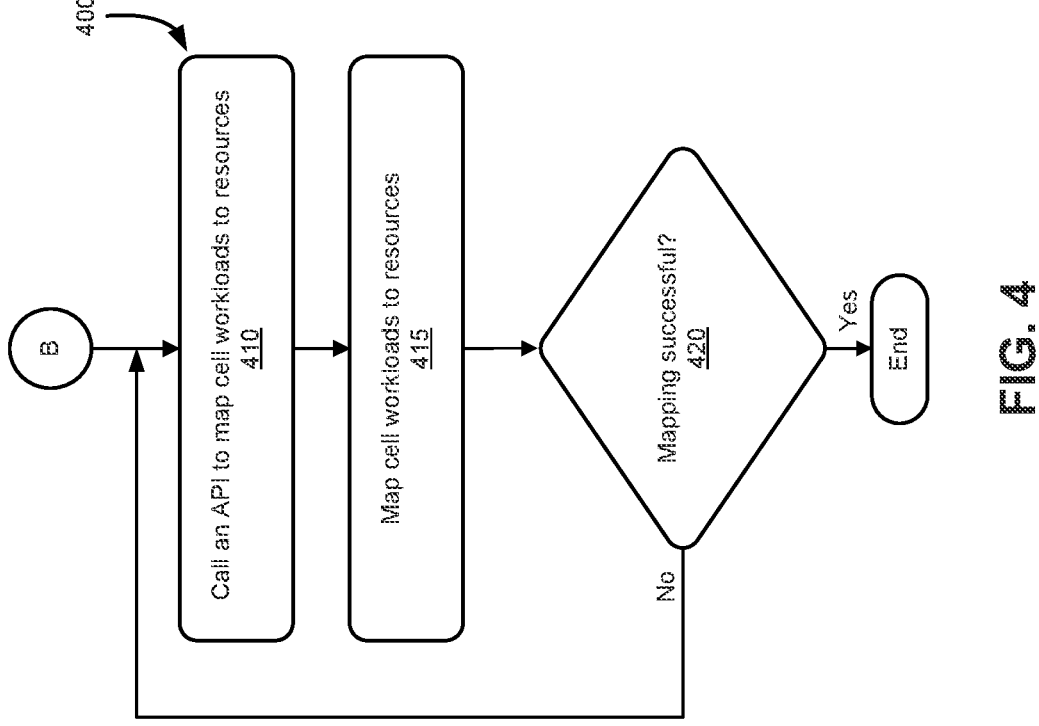
FIG. 4 is another process flow diagram including more detail for processing workloads with said network protocol stack, in accordance with at least one embodiment.

FIG. 4 is a process flow diagram including more detail for processing workloads with said network protocol stack, in accordance with at least one embodiment. As shown in FIG. 2 with said "B" marking in FIG. 2, FIG. 4 provides more detail that can be integrated into process 200 or performed in parallel to process 200 of FIG. 2. In at least one embodiment, one or more processors or a system performs process 400 by performing an API. In at least one embodiment, process 400 is performed by one or more circuits to process a 5G-NR workload for a O-RAN network protocol stack (e.g., network protocol stack 100 as shown in FIG. 1).

In at least one embodiment, some or all of process 400 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, at least some computer readable instructions usable to perform process 400 are not stored solely using transitory signals (e.g., a propagating transient electric or electromagnetic transmission). In at least one embodiment, process 400 is performed at least in part on a computer system such as those described elsewhere in this disclosure. In at least one embodiment, logic (e.g., hardware, software, or a combination of hardware and software) performs process 400. In at least one embodiment, process 400 can begin at call operation 410 and proceed to map cell operation 415 (e.g., as part of map operation 210 in process 200 of FIG. 2).

At operation call API to map cell workloads 410, in at least one embodiment, one or more processors or a system performing an application call an API to map specific 5G-NR cells (e.g., cell IDs) to specific resources in L1. In at least one embodiment, to map refers to mapping, allocating, or reserving L1 resources (e.g., hardware accelerators) for supporting or performing one or more workloads for 5G-NR cells with specific cell IDs. In at least one embodiment, mapping refers to associating 5G-NR cells with a particular hardware accelerators or particular threads or computing resources in L1. For example, an API can be called to map cell IDs for 5 5G-NR cells to 5 different GPUs or map cell IDs to 10000 different threads supported by different hardware accelerators in L1, where mapping is based on associating specific 5G-NR cells to meet quality parameters established in determine operation 205 (FIG. 2) or call operation 310 (FIG. 3). In at least one embodiment, said API can map cell IDs to other characteristics based on what was established in determine operation 205 (FIG. 2) or call operation 310 (FIG. 3) such as priority, rank, or combination.

At map cell operation 415, in at least one embodiment, one or more processors maps specific 5G-NR cells to hardware accelerator resources and responds to an application whether such mapping was successful. At verify mapping operation 420, in at least one embodiment, one or more processors or systems that provides L1 returns an array with entries "1" or "0" to indicate whether a mapping was successful or not. In at least one embodiment, one or more processors repeat map cell operation 415 if it was not successful.

After verify mapping operation 420, in at least one embodiment, one or more circuits can repeat process 400 or parts of process 400, e.g., for a new application that requests to use hardware accelerators in L1. In at least one embodiment, after verify mapping operation 420, one or more processors provide results of process 400 to process 200 and end process 400.

Figure 5:
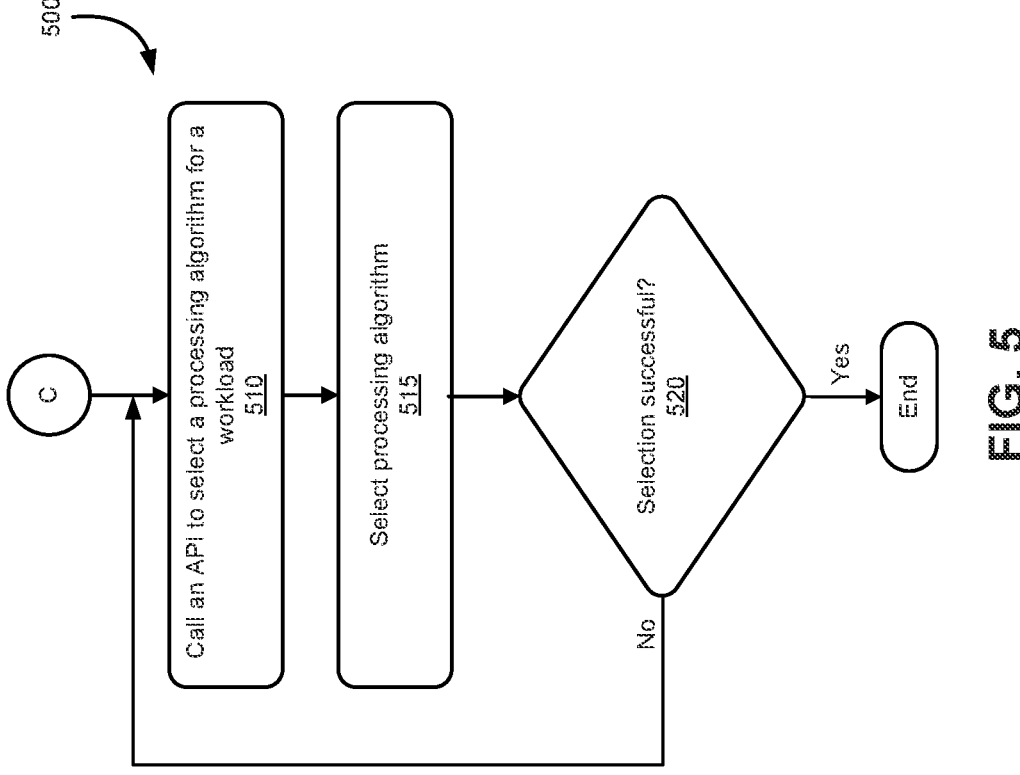
FIG. 5 is another process flow diagram including more detail for processing workloads with said network protocol stack, in accordance with at least one embodiment.

FIG. 5 is a process flow diagram including more detail for processing workloads with said network protocol stack, in accordance with at least one embodiment. As shown in FIG. 2 with said "C" marking, FIG. 5 provides more detail that can be integrated into process 200. In at least one embodiment, process 500 is performed by one or more circuits to process a 5G-NR workload for a O-RAN network protocol stack (e.g., network protocol stack 100 as shown in FIG. 1).

In at least one embodiment, some or all of process 500 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, at least some computer readable instructions usable to perform process 500 are not stored solely using transitory signals (e.g., a propagating transient electric or electromagnetic transmission). In at least one embodiment, a non-transitory computer readable medium does not necessarily include non-transitory data storage circuitry (e.g., buffers, caches, and queues) within transceivers of transitory signals. In at least one embodiment, process 500 is performed at least in part on a computer system such as those described elsewhere in this disclosure.

In at least one embodiment, logic (e.g., hardware, software, or a combination of hardware and software) performs process 500. In at least one embodiment, process 500 can begin at call operation 510 and proceed to response operation 515.

At call to select operation 510, one or more processors or a system performing an application call an API to select a processing algorithm for a workload, where said workload is related to supporting one or more 5G-NR cells as established in process 200 or process 400. In at least one embodiment, one or more processors providing L1 has access to a library that includes different processing algorithms (e.g., one or more techniques) to process a particular workload to meet a quality parameter, e.g., a low latency algorithm to process workloads that have a low latency quality parameter, a high throughput algorithm that is design to process a workload to meet a high throughput quality parameter. In at least one embodiment, said API has an input of a quality parameter, and based on said quality parameter said API searches a library for an algorithm that is optimized for particular workload while meeting said quality parameter. At select operation 515, one or more processors or a system performing select a processing algorithm based on call to select operation 510. In at least one embodiment, said API has an input of a quality parameter, and based on said quality parameter said API searches a library for an algorithm that is optimized for particular workload while meeting said quality parameter and said API's response causes said one or more processors to select an algorithm.

In addition to selecting an algorithm, in at least one embodiment, one or more processors perform an API to determine a schedule or order for processing workloads (e.g., sequentially or in parallel to meet a quality parameter or priority). For example, if heterogenous workloads are provided by one or more cells for processing, said API can cause one or more processors to schedule processing to prioritize a group that is a higher priority than a lower priority in a sequential processing (e.g., based on a rank input received from another API). In at least one embodiment, for homogeneous payload (e.g., no rank or priority), another scheduling strategy may be to group workloads based on direction of data flow (e.g., downlink or uplink) and prioritize processing of time sensitive downlink operations over less time sensitive uplink operations.

At query success operation 520, in at least one embodiment, one or more processors or a system respond to an application through an L2-L1 interface indicating that selection of an algorithm and/or scheduling for priority or rank was successful or not. For example, after L1 selects an algorithm and determines whether to process workloads in sequential or parallel, L1 can respond with a "1" to indicate that workloads are being processed and selection of algorithm was successful. In at least one embodiment, if one or more processors determines that said selection was not successful, said one or more processors can call said API again.

After query success operation 520, in at least one embodiment, one or more circuits can repeat process 500 or parts of process 500, e.g., for a new application that requests to use hardware accelerators in L1. In at least one embodiment, after query success operation 520, one or more processors provide results of process 500 to process 200 and end process 400.

Figure 6:
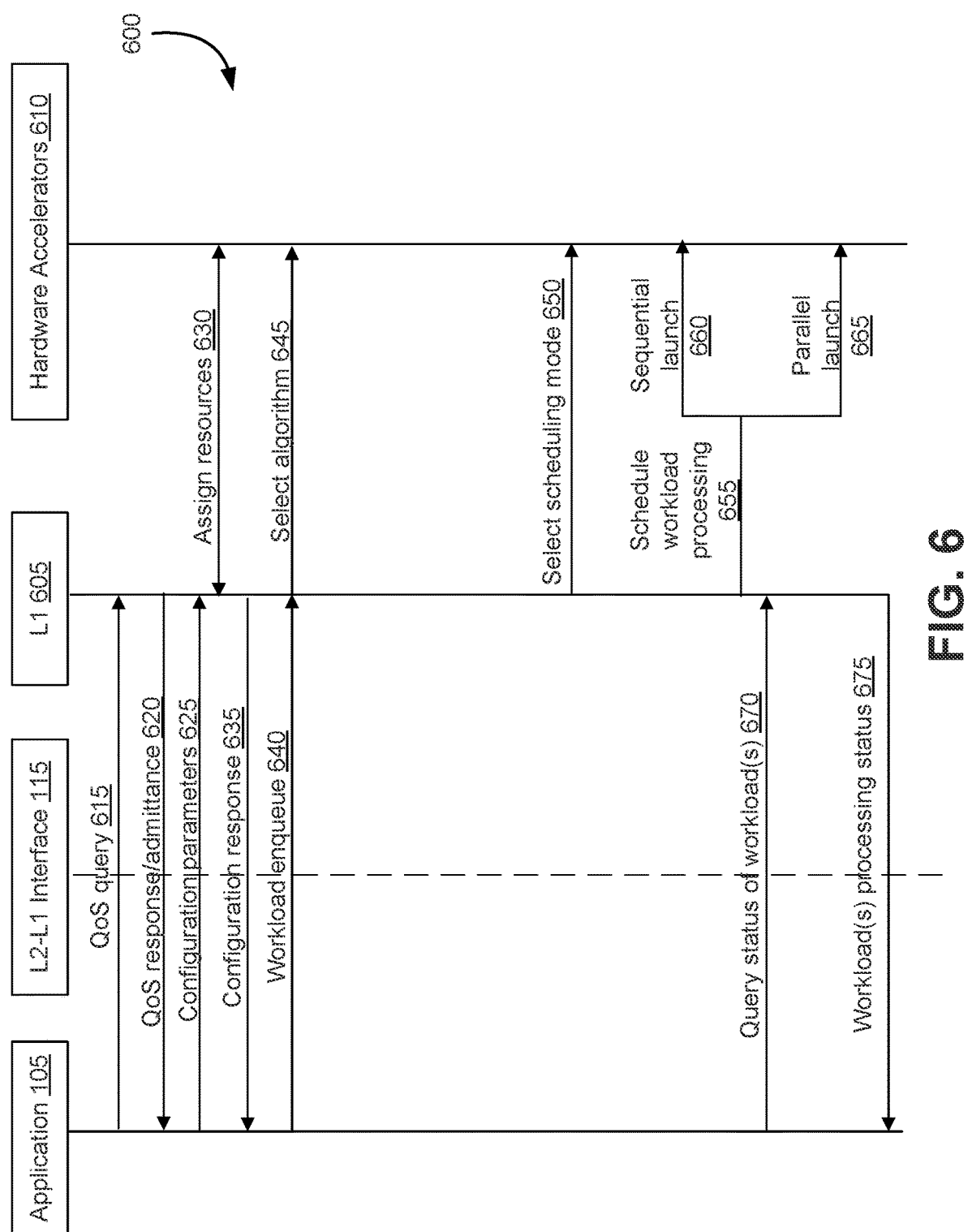
FIG. 6 illustrates a schematic flow diagram for processing workloads with said network protocol stack from FIG. 1, in accordance with at least one embodiment.

FIG. 6 illustrates a schematic block diagram for a flow 600 for processing workloads, in accordance with at least one embodiment. FIG. 6 includes application 105 (e.g., from FIG. 1), L2-L1 interface 115 (e.g., from FIG. 1), layer 1 (L1) 605, and hardware accelerators 610 (e.g., second processor 130 from FIG. 1). In at least one embodiment, one or more processors or a system perform flow 600 when supporting 5G-NR service for a number of 5G-NR cells. In at least one embodiment, application 105 queries L1 605 through L2-L1 interface 115 to determine how many 5G-NR cells can be supported by resources (e.g., hardware accelerators) in L1 605 as shown by QoS query 615. In at least one embodiment, QoS query is based on a quality parameter (e.g., latency correspond to URLLC) and a set of KPIs to meet that quality parameter. In response to QoS query 615, L1 605 can respond to application 105 to admit or deny a request to support a 5G-NR workload in QoS response/admittance 620, and it can also respond with a number of cells that it can support and meet a quality parameter (e.g., as discussed in FIGS. 2 and 3). In at least one embodiment, if a request is admitted, application 105 provides configuration parameters 625 to L1 605 through L2-L1 interface, e.g., using APIs as disclosed in FIGS. 3, 4, and 5. For example, application 105 provides cell IDs for 5G-NR cells that will be supported by one or more hardware accelerators in L1 605. After configuration response 635 is provided, L1 605 can assign specific cells to threads or hardware accelerators as shown by operation assign resources 630. For example, through interface L2-L1, L1 can reserve specific hardware accelerators 610 (e.g., 5 GPUs or 1 FPGA) to process workloads to support 5G-NR cells.

In at least one embodiment, L1 605 responds through L2-L1 interface 115 to application 105 with a confirmation response 635, e.g., whether mapping of cell IDs to specific hardware accelerators 610 was successful or not. After configuration response 635, in at least one embodiment, application 105 can provide workloads and enqueue (e.g., prepare) workloads using workload enqueue 640. Next, in at least one embodiment, L1 605 selects an algorithm 645 as disclosed in FIG. 2 for processing workloads such that an optimal algorithm is selected at least based on a quality parameter for workloads. For example, L1 can use libraries and drivers to cause hardware accelerators to select homogeneous workload processing if workloads have similar or same QoS requirements or L1 can use libraries and drivers to cause hardware accelerators to select heterogenous processing algorithms (e.g., one algorithm for processing a workload with a low latency QoS requirement and another algorithm for processing a different workload with a high throughput requirement).

L1 605, in at least one embodiment, L1 can select scheduling modes 650 such as scheduling processing of workloads to be sequential (e.g., process workload A first, and then process workload B second). Based on selected scheduling mode 650, in at least one embodiment, L1 605 schedules workload processing 655 to be sequential 660 (e.g., processing sequential workloads on a FPGA), parallel 665 (e.g., processing different workloads in parallel using a GPU or parallel processor), or a combination of sequentially and parallel such that workloads are processed to meet a QoS requirement and be processed on time. In at least one embodiment, application 105 can query status of workload(s) 670 being processed in L1 605 and receive a respond regarding workload(s) processing status 675 (e.g., workload processing is complete, still in progress, finished, or there was an error).

FIG. 7 illustrates a diagram 700 of an acceleration abstraction layer (AAL) interface, according to at least one embodiment. In at least one embodiment, an AAL interface is also referred to as an AAL, AAL API, AALI and/or variations thereof. In at least one embodiment, an application 105 (e.g., as disclosed in FIG. 1) through L2-L1 interface 115 (e.g., disclosed in FIG. 1) utilizes acceleration abstraction layer interface 706 to perform various functions, which are processed by drivers 708A, 708B, and 708C through kernel space 712 to cause hardware 718 (e.g., first processor 125 as disclosed in FIG. 1) to perform one or more functions. In at least one embodiment, drivers 708A, 708B, and 708C are drivers 120 in FIG. 1.

In at least one embodiment, application 105 comprises one or more computer programs, application software, and/or variations thereof that execute in connection with one or more layers of a cellular network such as a 5G-NR network. In at least one embodiment, application 105 comprises software executing in connection with L2 as well as higher layers (e.g., layer 3-layer 7) of a network (e.g., 5G-NR cellular network). In at least one embodiment, a 5G-NR cellular network is also referred to as a 5G network, 5G Long Term Evolution (LTE) network, 5G wireless communications network, 5G, and/or variations thereof; further information regarding a 5G cellular network is disclosed in FIGS. 33-46. In at least one embodiment, application 105 includes various virtualized network function (VNF) and/or containerized or cloud-native network function (CNF) software applications. In at least one embodiment, application 105 includes software executing in connection with an application layer of a 5th generation cellular network. Further information regarding layers of a 5th generation cellular network in accordance with an Open Systems Interconnection (OSI) model is disclosed below.

In at least one embodiment, a VNF refers to a software application that provides various network functions such as file sharing, directory services, internet protocol (IP) configuration, and/or variations thereof and utilizes a network functions virtualization (NFV) architecture. In at least one embodiment, a NFV architecture refers to a network architecture in which various network functions and services are virtualized to run on various standardized hardware; further information regarding NFV can be found in description of FIG. 48. In at least one embodiment, a CNF refers to a network function that is provided through one or more container images. In at least one embodiment, a container image refers to an executable package of software that comprises components sufficient to execute one or more functions and/or processes. In at least one embodiment, an executable package of software for a container image comprises a minimum set of components for executing to execute one or more functions and/or processes.

In at least one embodiment, user space is a memory area where various application software and drivers execute. In at least one embodiment, user space, also referred to as userland, comprises various software programs, interfaces, and libraries that enable interaction with a kernel. In at least one embodiment, software executing in a user space includes input/output communication software, file system manipulation software, application software, and/or variations thereof. In at least one embodiment, processes that execute in a user space execute in virtual memory spaces that cannot access memory of other processes. In at least one embodiment, user space software 710 refers to software executing in a user space. In at least one embodiment, acceleration abstraction layer interface 706 and drivers 708A, 708B, and/or 708C execute as user space software 710. In at least one embodiment, user space software 710 executes on layer 1.

In at least one embodiment, application 105 utilizes acceleration abstraction layer interface 706 through L2-L1 interface 115. In at least one embodiment, L2-L1 interface 115 interface 104 comprises one or more interfaces that provide methods of communication between L2 and L1. In at least one embodiment, L2-L1 interface 115 comprises one or more interfaces, communication protocols, and/or variations thereof that provide an interface between various hardware and/or software components of L2 and various hardware and/or software components of layer 1.

In at least one embodiment, acceleration abstraction layer interface 706 defines various functions that are utilized by layer application 105 to perform one or more workloads. In at least one embodiment, acceleration abstraction layer interface 706 comprises one or more interfaces, functions, and/or processes that provide connections with drivers 708A, 708B, and 708C that can interact with hardware 718 to cause hardware 718 to perform one or more functions specified in connection with commands submitted via acceleration abstraction layer interface 706. In at least one embodiment, hardware 718 is first processor 125 or second processor 130 (FIG. 1). In at least one embodiment, L2-L1 interface 115 is a 5G FAPI and acceleration abstraction layer interface 706 is implemented to process data formatted in accordance with 5G FAPI. In at least one embodiment, different implementations of L2-L1 interface 115 correspond to different implementations of acceleration abstraction layer interface 706 such that acceleration abstraction layer interface 706 can process data formatted in accordance with a particular implementation of L2-L1 interface 115 (e.g., to be vendor specific or vendor agnostic).

In at least one embodiment, acceleration abstraction layer interface 706 provides a set of API functions. In at least one embodiment, acceleration abstraction layer interface 706 provides at least a Discover function, Initialize function, a Create function, a Set function, a Get function, a Destroy function, an Enqueue function, a Dequeue function, and/or variations thereof, wherein each of these functions are disclosed below in more detail. In at least one embodiment, said API functions can be integrated or used with APIs disclosed in FIGS. 3-5.

In at least one embodiment, a Discover API call comprises no input parameters. In at least one embodiment, parameters for a Discover API call can include identifiers of physical devices to analyze, identifiers of specific properties of physical devices to analyze, and can further include other parameters that can further define aspects of available physical devices and their properties.

In at least one embodiment, a response to a Discover API call includes a results data structure. In at least one embodiment, a results data structure is a pre-defined data structure populated with device related information, such as a number of devices, device identifiers, device names, device profiles, device characteristics, and/or variations thereof. In at least one embodiment, a result data structure is a data structure such as an array, list, and/or variations thereof. In at least one embodiment, following a Discover API call, available physical devices, such as hardware accelerators, are analyzed and a data object comprising device specific information is returned. In at least one embodiment, device specific information comprises information corresponding to physical devices that are available to process one or more workloads, network functions, 5G new radio operations, and/or variations thereof.

In at least one embodiment, an Initialize API function is utilized to create a context, also referred to as an AAL context, which is a data structure that indicates one or more aspects of workloads to be performed on one or more hardware accelerators. In at least one embodiment, an AAL context is also referred to as a PHY context, context data structure, and/or variations thereof. In at least one embodiment, an AAL context refers to a portion of memory, also referred to as a memory space, reserved for one or more data objects that can be configured and queried. In at least one embodiment, objects of an AAL API can include data objects that indicate devices/device properties, tasks/task properties, cell/cell properties, and/or variations thereof. In at least one embodiment, an Initialize API call comprises no input parameters. In at least one embodiment, parameters for an Initialize API call can include identifiers of specific locations in memory in which an AAL context is to be reserved, and can further include other parameters that can further define aspects of an AAL context.

In at least one embodiment, a response to an Initialize API call includes a context pointer. In at least one embodiment, a context pointer is a pointer to a location in memory of an AAL context. In at least one embodiment, following an Initialize API call, a location in memory for an AAL context is reserved and a pointer indicating said location is returned.

In at least one embodiment, a Create API function is utilized to create an object within an AAL context. In at least one embodiment, objects can be data structures and/or objects such as arrays, lists, and/or variations thereof, and can include a cell object, a device object, a task object, and/or variations thereof. In at least one embodiment, a device data object is a data object that comprises information specific to a device (e.g., hardware accelerator), such as device capabilities, device attributes, device state, device status, and/or variations thereof. In at least one embodiment, a task data object is a data object that comprises information associated with one or more tasks, workloads, and/or functions to be performed (e.g., PHY functions, PHY pipelines, 5G new radio operations, and/or variations thereof), such as task attributes, task state, task status, task priority (e.g., priority value/level), and/or variations thereof. In at least one embodiment, a cell data object is a data object that comprises information associated with a cell, such as cell attributes, cell state, cell status, and/or variations thereof. In at least one embodiment, a cell refers to an area or region in which service of a cellular network such as a $5^{th}$ generation cellular network is provided. In at least one embodiment, a cell refers to an area or region where data is transmitted to and/or received from as part of a cellular network such as a $5^{th}$ generation cellular network.

In at least one embodiment, parameters for a Create API call include a context pointer, an object configure pointer, an object identifier, and can further include other parameters that can further define aspects of an object that is to be created. In at least one embodiment, a context pointer parameter specifies a location of an AAL context and inputs to said context pointer parameter can include a pointer to a location in memory of an AAL context. In at least one embodiment, an object configure pointer parameter specifies a location of an object configuration data object that comprises configuration information sufficient to configure a particular object and inputs to said object configure pointer parameter can include a pointer to a location in memory of an object configuration data object. In at least one embodiment, an object configuration data object can be referred to as object parameters, object configuration parameters, configuration information, and/or variations thereof, and can be a data structure and/or object such as an array, list, and/or variations thereof. In at least one embodiment, configuration information can include information such as identifiers of a type of object (e.g., cell, device, task, and/or variations thereof), characteristics of an object or type of object, status/attributes of an object, and/or variations thereof. In at least one embodiment, an object identifier parameter specifies a name of an object to be created and inputs to said object identifier parameter can include a name or identifier of an object.

In at least one embodiment, a response to a Create API call includes an operation status. In at least one embodiment, following a Create API call indicating creation of a particular object, said object is created based at least in part on an identifier specified by object identifier parameter and configuration information specified by object configure pointer parameter, and stored in an AAL context specified by context pointer parameter. In at least one embodiment, operation status is returned in response to a Create API call to indicate a status of said Create API call. In at least one embodiment, operation status indicates if creation of an object indicated by a Create API call is successful, has failed, or if other errors have occurred.

In at least one embodiment, a Get API function is utilized to retrieve information regarding an object within an AAL context. In at least one embodiment, a Get API function is utilized to query to determine status and attributes of an object. In at least one embodiment, objects can be data structures and/or objects such as arrays, lists, and/or variations thereof and can include a cell data object, a device data object, a task data object, and/or variations thereof. In at least one embodiment, parameters for a Get API call include a context pointer, an object configure pointer, an object identifier, and can further include other parameters that can further define aspects of information regarding an object that is to be retrieved.

In at least one embodiment, a context pointer parameter specifies a location of an AAL context and inputs to said context pointer parameter can include a pointer to a location in memory of an AAL context. In at least one embodiment, an object configure pointer parameter specifies a location in memory in which configuration information is to be stored, and inputs to said object configure pointer parameter can include a pointer to a location in memory. In at least one embodiment, an object identifier parameter specifies a name of an object that information is to be retrieved about and inputs to said object identifier parameter can include a name or identifier of an object.

In at least one embodiment, a response to a Get API call includes an operation status. In at least one embodiment, following a Get API call indicating a particular object specified by object identifier parameter, configuration information of said particular object is retrieved and stored in a location specified by object configure pointer parameter. In at least one embodiment, configuration information can include information such as identifiers of a type of object (e.g., cell, device, task, and/or variations thereof), characteristics of an object or type of object, status/attributes of an object, and/or variations thereof. In at least one embodiment, operation status is returned in response to a Get API call to indicate a status of said Get API call. In at least one embodiment, operation status indicates if information retrieval of an object indicated by a Get API call is successful, has failed, or if other errors have occurred.

In at least one embodiment, a Set API function is utilized to set configuration information of an object within an AAL context. In at least one embodiment, a Set API function is utilized to change a state of an object, such as activating or deactivating a cell data object. In at least one embodiment, objects can be data structures and/or objects such as arrays, lists, and/or variations thereof and can include a cell data object, a device data object, a task data object, and/or variations thereof. In at least one embodiment, parameters for a Set API call include a context pointer, an object configure pointer, an object identifier, and can further include other parameters that can further define aspects of configuration information of an object that is to be set.

In at least one embodiment, a context pointer parameter specifies a location of an AAL context and inputs to said context pointer parameter can include a pointer to a location in memory of an AAL context. In at least one embodiment, an object configure pointer parameter specifies a location in memory in which configuration information is stored, and inputs to said object configure pointer parameter can include a pointer to a location in memory. In at least one embodiment, configuration information can include information such as identifiers of a type of object (e.g., cell, device, task, and/or variations thereof), characteristics of an object or type of object, status/attributes of an object, and/or variations thereof. In at least one embodiment, configuration information can include information indicating a desired state of an object, such as activated or deactivated. In at least one embodiment, an object identifier parameter specifies a name of an object that is to be configured and inputs to said object identifier parameter can include a name or identifier of an object.

In at least one embodiment, a response to a Set API call includes an operation status. In at least one embodiment, following a Set API call indicating a particular object specified by object identifier parameter, configuration information of said particular object is set based at least in part configuration information specified by object configure pointer parameter. In at least one embodiment, operation status is returned in response to a Set API call to indicate a status of said Set API call. In at least one embodiment, operation status indicates if setting configuration information of an object indicated by a Set API call is successful, has failed, or if other errors have occurred.

In at least one embodiment, a Destroy API function is utilized to destroy or otherwise delete an object within an AAL context. In at least one embodiment, objects can be data structures and/or objects such as arrays, lists, and/or variations thereof and can include a cell data object, a device data object, a task data object, and/or variations thereof. In at least one embodiment, parameters for a Destroy API call include a context pointer, an object configure pointer, an object identifier, and can further include other parameters that can further define aspects of an object that is to be destroyed.

In at least one embodiment, a context pointer parameter specifies a location of an AAL context and inputs to said context pointer parameter can include a pointer to a location in memory of an AAL context. In at least one embodiment, an object configure pointer parameter specifies a location of an object configuration data object that comprises configuration information of a particular object and inputs to said object configure pointer parameter can include a pointer to a location in memory of an object configuration data object. In at least one embodiment, an object identifier parameter specifies a name of an object that is to be destroyed and inputs to said object identifier parameter can include a name or identifier of an object.

In at least one embodiment, a response to a Destroy API call includes an operation status. In at least one embodiment, following a Destroy API call indicating a particular object specified by object identifier parameter, said object is deleted or otherwise destroyed from AAL context specified by context pointer parameter. In at least one embodiment, operation status is returned in response to a Destroy API call to indicate a status of said Destroy API call. In at least one embodiment, operation status indicates if an object deletion indicated by a Destroy API call is successful, has failed, or if other errors have occurred.

In at least one embodiment, an Enqueue API function is utilized to submit one or more physical layer workloads. In at least one embodiment, an Enqueue API call indicates a plurality of 5G new radio operations. In at least one embodiment, a workload is also referred to as a task, function, operation, process, and/or variations thereof. In at least one embodiment, priority can be attached to individual workloads. In at least one embodiment, one or more workloads can be executed in parallel, or in any specified order (e.g., sequentially and/or based on priority values/levels or other logic) through an Enqueue API function. In at least one embodiment, parameters for an Enqueue API call include a context pointer, slot command, and can further include other parameters than can further define aspects of a physical layer workload. In at least one embodiment, an Enqueue API function is utilized by various software (e.g., VNF/CNF software) in connection with a layer 2 to submit one or more tasks, workloads, and/or functions to be processed.

In at least one embodiment, a context pointer parameter specifies a location of an AAL context and inputs to said context pointer parameter can include a pointer to a location in memory of an AAL context. In at least one embodiment, an AAL context comprises various information regarding a plurality of 5G new radio operations, such as devices, tasks, cells, and/or variations thereof that are utilized in connection with performing a plurality of 5G new radio operations. In at least one embodiment, an AAL context indicates a plurality of 5G new radio operations through one or more data objects such as a cell data object, a device data object, a task data object, and/or variations thereof. In at least one embodiment, a slot command parameter specifies one or more characteristics, parameters, and/or variations thereof of one or more workloads to be processed, and inputs to said slot command parameter can include a slot command data structure, a pointer to a slot command data structure, and/or variations thereof. In at least one embodiment, a slot command data structure is a data structure that comprises configuration information sufficient to process one or more physical layer functions and/or workloads. In at least one embodiment, a slot command data structure comprises information sufficient to process one or more uplink and/or downlink physical layer workloads, functions, and/or operations. In at least one embodiment, a slot command data structure comprises one or more pointers to one or more buffers for data input/output. In at least one embodiment, a slot command data structure comprises various information regarding one or more tasks to be processed, such as identifiers of one or more tasks to be processed, an order of one or more tasks to be processed, priority values and/or levels of one or more tasks to be processed, and/or variations thereof.

In at least one embodiment, a response to an Enqueue API call includes an operation status. In at least one embodiment, following an Enqueue API call indicating a particular workload, said particular workload is set to be executed in connection with AAL context specified by context pointer parameter and information specified by slot command parameter. In at least one embodiment, an Enqueue API call causes one or more workloads, tasks, and/or functions to be performed on one or more hardware accelerators. In at least one embodiment, operation status is returned in response to an Enqueue API call to indicate a status of said Enqueue API call. In at least one embodiment, operation status indicates if enqueuing one or more tasks to be performed or executed as indicated by an Enqueue API call is successful, has failed, or if other errors have occurred. In at least one embodiment, operation status can also indicate one or more task identifiers of one or more workloads, tasks, and/or functions to be performed or executed as indicated by an Enqueue API call.

In at least one embodiment, a Dequeue API function is utilized to determine status of one or more enqueued workloads. In at least one embodiment, a Dequeue function is utilized to determine completion status of execution of one or more tasks, workloads, and/or functions. In at least one embodiment, parameters for a Dequeue API call include a task identifier, and can further include other parameters than can further define aspects of a physical layer workload.

In at least one embodiment, a task identifier parameter specifies one or more tasks, workloads, and/or functions that have been enqueued through an Enqueue API call, and inputs to said task identifier parameter can include an identifier of said one or more tasks, workloads, and/or functions. In at least one embodiment, a response to a Dequeue API call includes a task status. In at least one embodiment, following a Dequeue API call indicating one or more tasks, workloads, and/or functions specified by task identifier parameter, said one or more tasks, workloads, and/or functions are identified and a status of said one or more tasks, workloads, and/or functions is determined and returned as task status. In at least one embodiment, task status indicates whether execution of one or more tasks, workloads, and/or functions as indicated by a Dequeue API call is successful, has failed, or if other errors have occurred. In at least one embodiment, task status can indicate completion or non-completion of a task, a measure of completion of a task, and/or various characteristics of a task.

In at least one embodiment, drivers 708 comprise a hardware driver 708A, a physical layer (PHY) driver 708B, and a fronthaul (FH) driver 708C. In at least one embodiment, hardware driver 708A comprises one or more interfaces and/or functions that enable communication with a hardware accelerator, such as hardware accelerator unit 114. In at least one embodiment, PHY driver 708B comprises one or more interfaces and/or functions that are sufficient to implement various physical layer functions. In at least one embodiment, PHY driver 708B comprises one or more interfaces that interact with hardware driver 708A to cause hardware 718 to perform one or more functions and/or processes. In at least one embodiment, FH driver 708C comprises one or more interfaces and/or functions that enable communication with various network hardware and transceivers, such as NIC 135.

In at least one embodiment, kernel space 712 refers to a memory area in which code executing has access to any of other memory and any underlying hardware. In at least one embodiment, kernel space 712 is a memory area in which a kernel runs. In at least one embodiment, a kernel refers to one or more computer programs that facilitate interactions between hardware and software components. In at least one embodiment, kernel space 712 refers to code that enables interaction with various hardware, such as hardware 718. In at least one embodiment, software of user space software 710 interact with hardware 718 through one or more processes of kernel space 712. In at least one embodiment, drivers 708A, 708B, and 708C, through kernel space 712, cause hardware 718 to perform various functions and/or processes.

FIG. 2 illustrates a diagram 800 of an inline acceleration model, according to at least one embodiment. In at least one embodiment, an inline acceleration model is also referred to as an inline acceleration offload architecture, an acceleration abstraction layer inline acceleration model, an end-to-end High-PHY inline acceleration model and/or variations thereof. In at least one embodiment, an inline acceleration model is a model for accelerating various functions (e.g., 5G-NR operations) in which acceleration by function and input/output based acceleration are performed on a physical interface (e.g., a hardware accelerator) as packets ingress (e.g., enter) and/or egress (e.g., exit). In at least one embodiment, diagram 800 depicts an inline acceleration model in which VNF/CNF software 804 utilize acceleration abstraction layer (AAL) interface 706 to perform network functions on second processor 130 (e.g., a hardware accelerator).

In at least one embodiment, second processor 130 is one or more specialized computer hardware components that process and/or perform various network functions. In at least one embodiment, second processor 130 comprises hardware such as a FPGA, an ASIC, a DSP, a GPU, an SoC and/or variations thereof. In at least one embodiment, second processor 130 comprises a CPU interface 808 that provides functionality to second processor 130 to process data received from AAL interface 706. In at least one embodiment, CPU interface 808 comprises one or more interfaces, communication protocols, and/or variations thereof that provide an interface between various hardware and/or software components of and in connection with a CPU and various hardware and/or software components of second processor 130. In at least one embodiment, CPU interface 808 processes various commands, functions, data, and/or variations thereof from AAL interface 706.

In at least one embodiment, function 812A and function 812B are network functions, such as VNFs, CNFs, and/or variations thereof. In at least one embodiment, function 812A and function 812B denote various 5G new radio operations. In at least one embodiment function 812A and function 812B denote functions to be processed in which processing of said functions can be accelerated through one or more hardware accelerators, such as second processor 130. In at least one embodiment, function 812A and function 812B are physical layer functions, also referred to as PHY functions, PHY layer functions, PHY layer algorithms, and/ or variations thereof.

In at least one embodiment, VNF/CNF software 804 utilize various functions of AAL interface 706 to perform various functions on second processor 130. In at least one embodiment, VNF/CNF software 804 utilize an enqueue API function to perform various functions. In at least one embodiment, CPU interface 808 receives data from VNF/ CNF software 804 through AAL interface 706 indicating various data, functions, and/or processes and causes second processor 130 to perform various functions and/or processes.

In at least one embodiment, for network functions that comprise transmission of data (e.g., downlink operations), VNF/CNF software 804 utilize AAL interface 706 to enqueue function 812A to be performed on hardware accelerator, in which second processor 130 performs function 812A in connection with various data from VNF/CNF software 804, in which results of function 812A are transmitted to one or more other systems for further processing. In at least one embodiment, data of function 812A (e.g., results of function 212A) is transmitted through various network interfaces, such as an Ethernet interface, fronthaul interface, and/or variations thereof. In at least one embodiment, for network functions that comprise reception of data (e.g., uplink operations), VNF/CNF software 804 utilize AAL interface 706 to enqueue function 812B to be performed on hardware accelerator, in which second processor 130 receives data from one or more other systems and performs function 812B in connection with received data, in which results of function 812B are provided back to VNF/ CNF software 804 for further processing. In at least one embodiment, data of function 812B (e.g., data to be processed by function 812B) is received through various network interfaces, such as an Ethernet interface, fronthaul interface, and/or variations thereof.

Data Center

Figure 9:
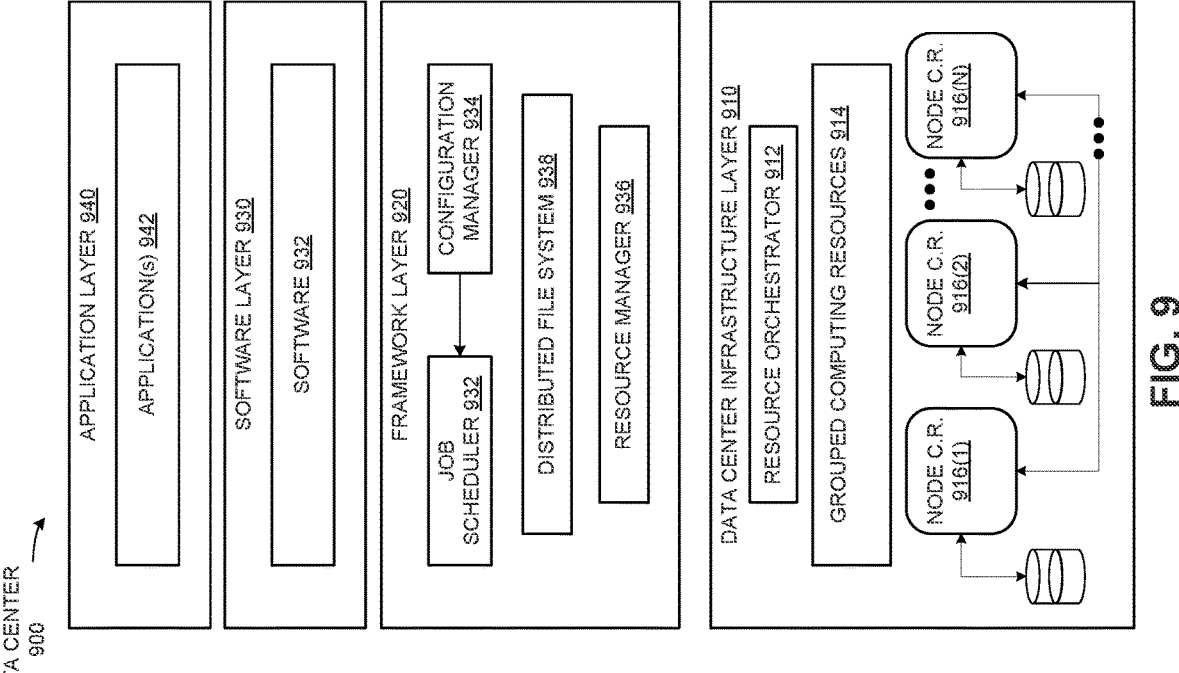
FIG. 9 illustrates an example data center system, according to at least one embodiment.

FIG. 9 illustrates an example data center 900, in which at least one embodiment may be used. In at least one embodiment, data center 900 includes a data center infrastructure layer 910, a framework layer 920, a software layer 930 and an application layer 940. In at least one embodiment, application layer 940 includes application 105, and application layer 940 can perform operations, processes, and flows disclosed in FIGS. 3-6.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). In at least one embodiment, separate groupings of node C.R.s within grouped computing resources 914 may include grouped compute, network, memory, or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator may include hardware, software, or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. In at least one embodiment, one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. In at least one embodiment, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center 900 may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Figure 10A:
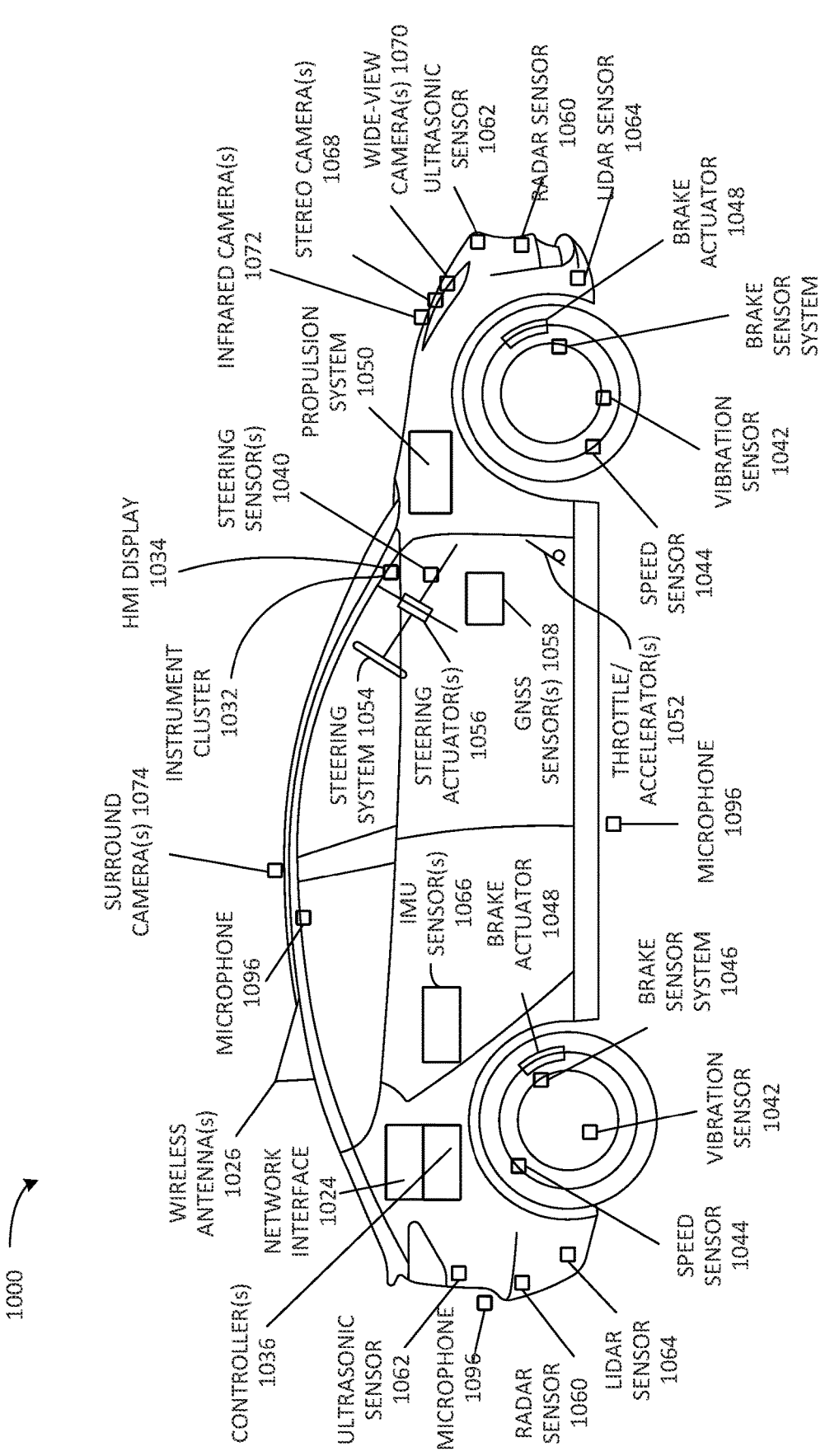
FIG. 10A illustrates an example of an autonomous vehicle, according to at least one embodiment.

FIG. 10A illustrates an example of an autonomous vehicle 1000, according to at least one embodiment. In at least one embodiment, autonomous vehicle 1000 performs application 105 (FIG. 1) to transmit operations to a 5G-NR network protocol stack for processing. In at least one embodiment, autonomous vehicle 1000 includes one or more processors or systems that perform processes in FIGS. 3-6. In at least one embodiment, autonomous vehicle 1000 (alternatively referred to herein as "vehicle 1000") may be, without limitation, a passenger vehicle, such as a car, a truck, a bus, and/or another type of vehicle that accommodates one or more passengers. In at least one embodiment, vehicle 1000 may be a semi-tractor-trailer truck used for hauling cargo. In at least one embodiment, vehicle 1000 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1000 may be capable of functionality in accordance with one or more of level 1-level 5 of autonomous driving levels. For example, in at least one embodiment, vehicle 1000 may be capable of conditional automation (Level 3), high automation (Level 4), and/or full automation (Level 5), depending on embodiment.

In at least one embodiment, vehicle 1000 may include, without limitation, components such as a chassis, a vehicle body, wheels (e.g., 2, 4, 6, 8, 18, etc.), tires, axles, and other components of a vehicle. In at least one embodiment, vehicle 1000 may include, without limitation, a propulsion system 1050, such as an internal combustion engine, hybrid electric power plant, an all-electric engine, and/or another propulsion system type. In at least one embodiment, propulsion system 1050 may be connected to a drive train of vehicle 1000, which may include, without limitation, a transmission, to enable propulsion of vehicle 1000. In at least one embodiment, propulsion system 1050 may be controlled in response to receiving signals from a throttle/accelerator(s) 1052.

In at least one embodiment, a steering system 1054, which may include, without limitation, a steering wheel, is used to steer a vehicle 1000 (e.g., along a desired path or route) when a propulsion system 1050 is operating (e.g., when vehicle is in motion). In at least one embodiment, a steering system 1054 may receive signals from steering actuator(s) 1056. In at least one embodiment, steering wheel may be optional for full automation (Level 5) functionality. In at least one embodiment, a brake sensor system 1046 may be used to operate vehicle brakes in response to receiving signals from brake actuator(s) 1048 and/or brake sensors.

In at least one embodiment, controller(s) 1036, which may include, without limitation, one or more system on chips ("SoCs") (not shown in FIG. 10A) and/or graphics processing unit(s) ("GPU(s)"), provide signals (e.g., representative of commands) to one or more components and/or systems of vehicle 1000. For instance, in at least one embodiment, controller(s) 1036 may send signals to operate vehicle brakes via brake actuators 1048, to operate steering system 1054 via steering actuator(s) 1056, to operate propulsion system 1050 via throttle/accelerator(s) 1052. In at least one embodiment, controller(s) 1036 may include one or more onboard (e.g., integrated) computing devices (e.g., supercomputers) that process sensor signals, and output operation commands (e.g., signals representing commands) to enable autonomous driving and/or to assist a human driver in driving vehicle 1000. In at least one embodiment, controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In at least one embodiment, a single controller 1036 may handle two or more of above functionalities, two or more controllers 1036 may handle a single functionality, and/or any combination thereof.

In at least one embodiment, controller(s) 1036 provide signals for controlling one or more components and/or systems of vehicle 1000 in response to sensor data received from one or more sensors (e.g., sensor inputs). In at least one embodiment, sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit ("IMU") sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range cameras (not shown in FIG. 10A), mid-range camera(s) (not shown in FIG. 10A), speed sensor(s) 1044 (e.g., for measuring speed of vehicle 1000), vibration sensor(s) 1042, steering sensor(s) 1040, brake sensor(s) (e.g., as part of brake sensor system 1046), and/or other sensor types.

In at least one embodiment, one or more of controller(s) 1036 may receive inputs (e.g., represented by input data) from an instrument cluster 1032 of vehicle 1000 and provide outputs (e.g., represented by output data, display data, etc.) via a human-machine interface ("HMI") display 1034, an audible annunciator, a loudspeaker, and/or via other components of vehicle 1000. In at least one embodiment, outputs may include information such as vehicle velocity, speed, time, map data (e.g., a High Definition map (not shown in FIG. 10A), location data, e.g., vehicle's 1000 location, such as on a map), direction, location of other vehicles (e.g., an occupancy grid), information about objects and status of objects as perceived by controller(s) 1036, etc. For example, in at least one embodiment, HMI display 1034 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1000 further includes a network interface 1024 which may use wireless antenna(s) 1026 and/or modem(s) to communicate over one or more networks. For example, in at least one embodiment, network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1026 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 10B:
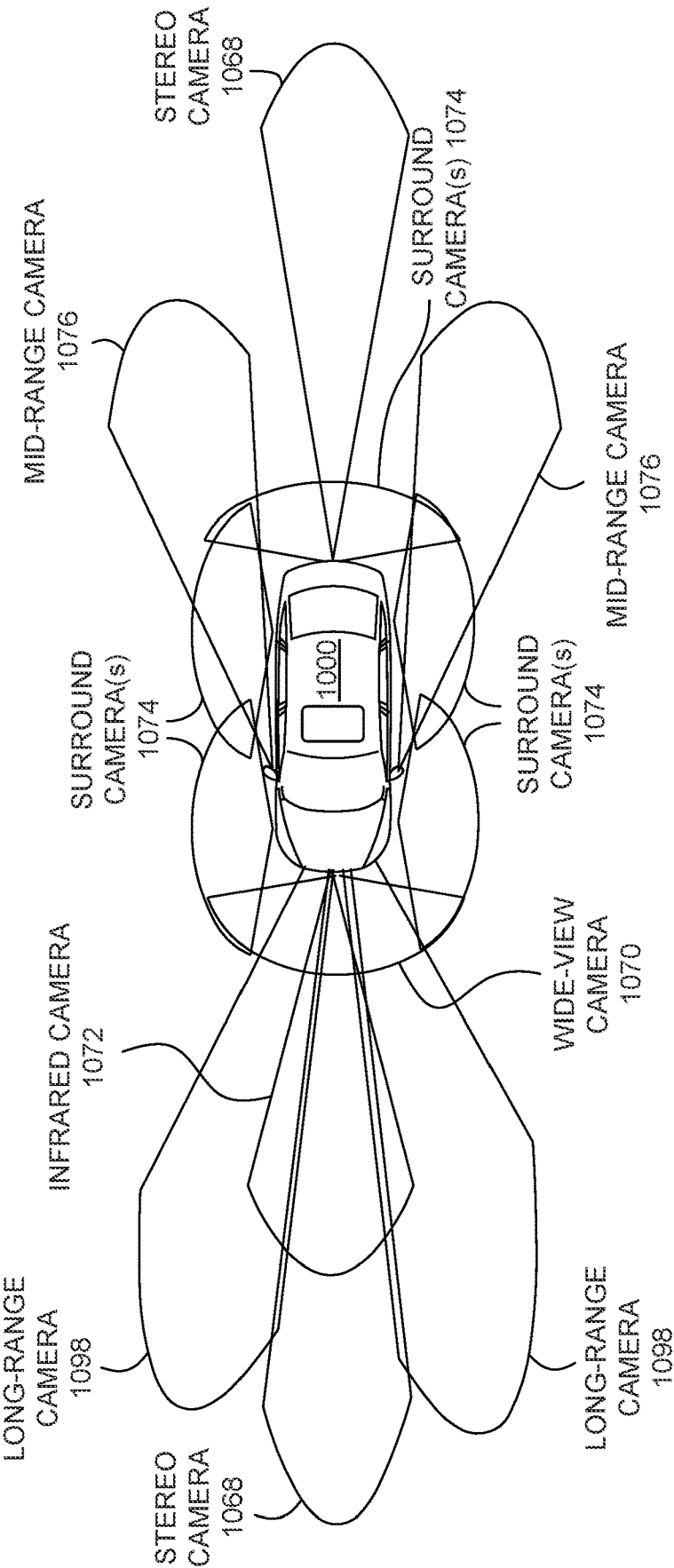
FIG. 10B illustrates an example of camera locations and fields of view for autonomous vehicle of FIG. 10A, according to at least one embodiment.

FIG. 10B illustrates an example of camera locations and fields of view for autonomous vehicle 1000 of FIG. 10A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1000.

In at least one embodiment, camera types for cameras may include, but are not limited to, digital cameras that may be adapted for use with components and/or systems of vehicle 1000. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another types of color filter arrays. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within a car (e.g., reflections from dashboard reflected in windshield mirrors) which may interfere with a camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. In at least one embodiment, for side-view cameras, camera(s) may also be integrated within four pillars at each corner of car.

In at least one embodiment, cameras with a field of view that include portions of environment in front of vehicle 1000 (e.g., front-facing cameras) may be used for surround view, to help identify forward facing paths and obstacles, as well as aid in, with help of one or more of controllers 1036 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1070 may be used to perceive objects coming into view from periphery (e.g., pedestrians, crossing traffic or bicycles). Although only one wide-view camera 1070 is illustrated in FIG. 10B, in other embodiments, there may be any number (including zero) of wide-view camera(s) 1070 on vehicle 1000. In at least one embodiment, any number of long-range camera(s) 1098 (e.g., a long-view stereo camera pair) may be used for depth-based object detection, especially for objects for which a neural network has not yet been trained. In at least one embodiment, long-range camera(s) 1098 may also be used for object detection and classification, as well as basic object tracking.

In at least one embodiment, any number of stereo camera(s) 1068 may also be included in a front-facing configuration. In at least one embodiment, one or more of stereo camera(s) 1068 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1000, including a distance estimate for all points in image. In at least one embodiment, one or more of stereo camera(s) 1068 may include, without limitation, compact stereo vision sensor(s) that may include, without limitation, two camera lenses (one each on left and right) and an image processing chip that may measure distance from vehicle 1000 to target object and use generated information (e.g., metadata) to activate autonomous emergency braking and lane departure warning functions. In at least one embodiment, other types of stereo camera(s) 1068 may be used in addition to, or alternatively from, those described herein.

In at least one embodiment, cameras with a field of view that include portions of environment to side of vehicle 1000 (e.g., side-view cameras) may be used for surround view, providing information used to create and update occupancy grid, as well as to generate side impact collision warnings. For example, in at least one embodiment, surround camera(s) 1074 (e.g., four surround cameras 1074 as illustrated in FIG. 10B) could be positioned on vehicle 1000. In at least one embodiment, surround camera(s) 1074 may include, without limitation, any number and combination of wide-view camera(s) 1070, fisheye camera(s), 360 degree camera(s), and/or like. For instance, in at least one embodiment, four fisheye cameras may be positioned on front, rear, and sides of vehicle 1000. In at least one embodiment, vehicle 1000 may use three surround camera(s) 1074 (e.g., left, right, and rear), and may leverage one or more other camera(s) (e.g., a forward-facing camera) as a fourth surround-view camera.

In at least one embodiment, cameras with a field of view that include portions of environment to rear of vehicle 1000 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1098 and/or mid-range camera(s) 1076, stereo camera(s) 1068), infrared camera(s) 1072, etc., as described herein.

Figure 10C:
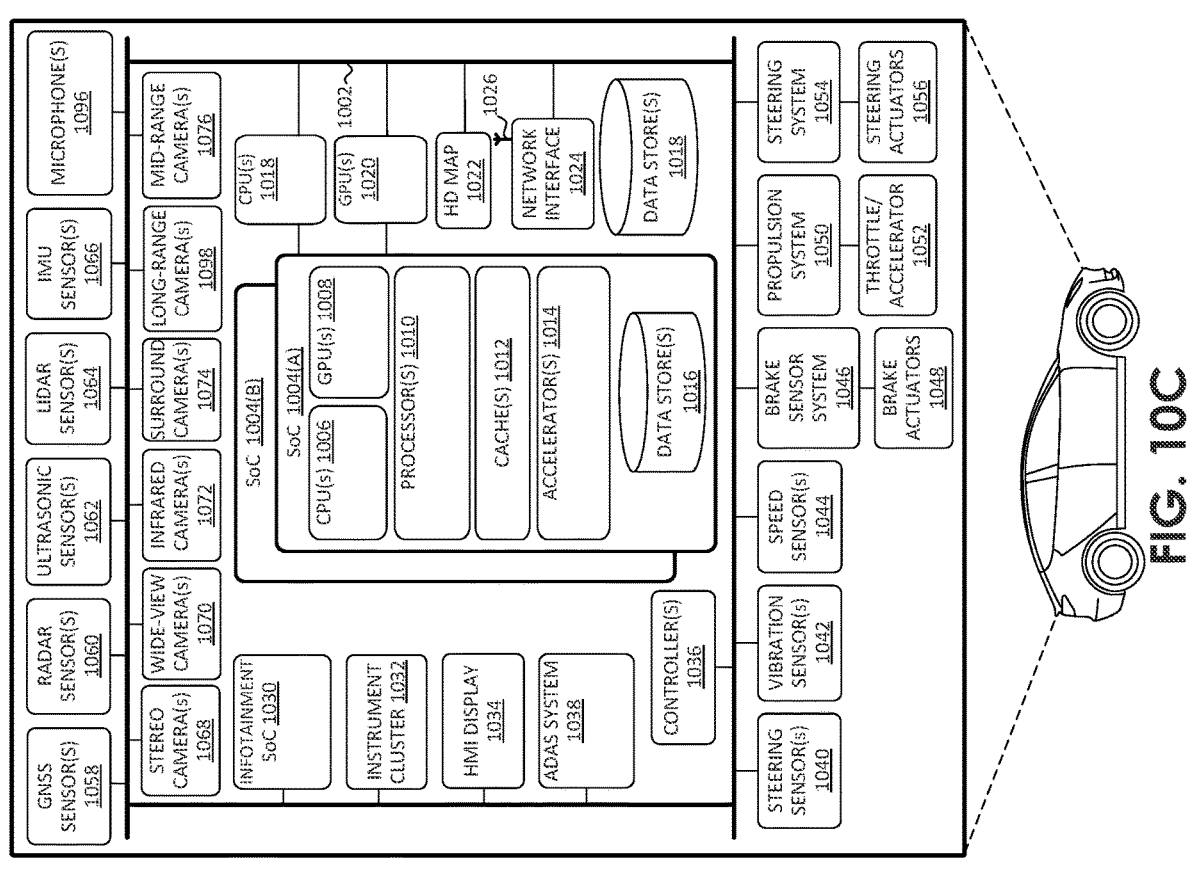
FIG. 10C is a block diagram illustrating an example system architecture for autonomous vehicle of FIG. 10A, according to at least one embodiment.

FIG. 10C is a block diagram illustrating an example system architecture for autonomous vehicle 1000 of FIG. 10A, according to at least one embodiment. In at least one embodiment, each of components, features, and systems of vehicle 1000 in FIG. 10C are illustrated as being connected via a bus 1002. In at least one embodiment, bus 1002 may include, without limitation, a CAN data interface (alternatively referred to herein as a "CAN bus"). In at least one embodiment, a CAN may be a network inside vehicle 1000 used to aid in control of various features and functionality of vehicle 1000, such as actuation of brakes, acceleration, braking, steering, windshield wipers, etc. In at least one embodiment, bus 1002 may be configured to have dozens or even hundreds of nodes, each with its own unique identifier (e.g., a CAN ID). In at least one embodiment, bus 1002 may be read to find steering wheel angle, ground speed, engine revolutions per minute ("RPMs"), button positions, and/or other vehicle status indicators. In at least one embodiment, bus 1002 may be a CAN bus that is ASIL B compliant.

In at least one embodiment, in addition to, or alternatively from CAN, FlexRay and/or Ethernet may be used. In at least one embodiment, there may be any number of busses 1002, which may include, without limitation, zero or more CAN busses, zero or more FlexRay busses, zero or more Ethernet busses, and/or zero or more other types of busses using a different protocol. In at least one embodiment, two or more busses 1002 may be used to perform different functions, and/or may be used for redundancy. For example, a first bus 1002 may be used for collision avoidance functionality and a second bus 1002 may be used for actuation control. In at least one embodiment, each bus 1002 may communicate with any of components of vehicle 1000, and two or more busses 1002 may communicate with same components. In at least one embodiment, each of any number of system(s) on chip(s) ("SoC(s)") 1004, each of controller(s) 1036, and/or each computer within vehicle may have access to same input data (e.g., inputs from sensors of vehicle 1000), and may be connected to a common bus, such CAN bus.

In at least one embodiment, vehicle 1000 may include one or more controller(s) 1036, such as those described herein with respect to FIG. 10A. In at least one embodiment, controller(s) 1036 may be used for a variety of functions. In at least one embodiment, controller(s) 1036 may be coupled to any of various other components and systems of vehicle 1000, and may be used for control of vehicle 1000, artificial intelligence of vehicle 1000, infotainment for vehicle 1000, and/or like.

In at least one embodiment, vehicle 1000 may include any number of SoCs 1004. Each of SoCs 1004 may include, without limitation, central processing units ("CPU(s)") 1006, GPU(s) 1008, processor(s) 1010, cache(s) 1012, accelerator(s) 1014, data store(s) 1016, and/or other components and features not illustrated. In at least one embodiment, SoC(s) 1004 may be used to control vehicle 1000 in a variety of platforms and systems. For example, in at least one embodiment, SoC(s) 1004 may be combined in a system (e.g., system of vehicle 1000) with a High Definition ("HD")

map 1022 which may obtain map refreshes and/or updates via network interface 1024 from one or more servers (not shown in FIG. 10C).

In at least one embodiment, CPU(s) 1006 may include a CPU cluster or CPU complex (alternatively referred to herein as a "CCPLEX"). In at least one embodiment, CPU(s) 1006 may include multiple cores and/or level two ("L2") caches. For instance, in at least one embodiment, CPU(s) 1006 may include eight cores in a coherent multi-processor configuration. In at least one embodiment, CPU(s) 1006 may include four dual-core clusters where each cluster has a dedicated L2 cache (e.g., a 2 MB L2 cache). In at least one embodiment, CPU(s) 1006 (e.g., CCPLEX) may be configured to support simultaneous cluster operation enabling any combination of clusters of CPU(s) 1006 to be active at any given time.

In at least one embodiment, one or more of CPU(s) 1006 may implement power management capabilities that include, without limitation, one or more of following features: individual hardware blocks may be clock-gated automatically when idle to save dynamic power; each core clock may be gated when core is not actively executing instructions due to execution of Wait for Interrupt (WFI)/Wait for Event (WFE) instructions; each core may be independently power-gated; each core cluster may be independently clock-gated when all cores are clock-gated or power-gated; and/or each core cluster may be independently power-gated when all cores are power-gated. In at least one embodiment, CPU(s) 1006 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1008 may include an integrated GPU (alternatively referred to herein as an "iGPU"). In at least one embodiment, GPU(s) 1008 may be programmable and may be efficient for parallel workloads. In at least one embodiment, GPU(s) 1008, in at least one embodiment, may use an enhanced tensor instruction set. In on embodiment, GPU(s) 1008 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1008 may include at least eight streaming microprocessors. In at least one embodiment, GPU(s) 1008 may use compute API(s). In at least one embodiment, GPU(s) 1008 may use one or more parallel computing platforms and/or programming models (e.g., NVIDIA's CUDA).

In at least one embodiment, one or more of GPU(s) 1008 may be power-optimized for best performance in automotive and embedded use cases. For example, in on embodiment, GPU(s) 1008 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1008 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1008 may include unified memory technology. In at least one embodiment, address translation services ("ATS") support may be used to allow GPU(s) 1008 to access CPU(s) 1006 page tables directly. In at least one embodiment, embodiment, when GPU(s) 1008 memory management unit ("MMU") experiences a miss, an address translation request may be transmitted to CPU(s) 1006. In response, CPU(s) 1006 may look in its page tables for virtual-to-physical mapping for address and transmits translation back to GPU(s) 1008, in at least one embodiment. In at least one embodiment, unified memory technology may allow a single unified virtual address space for memory of both CPU(s) 1006 and GPU(s) 1008, thereby simplifying GPU(s) 1008 programming and porting of applications to GPU(s) 1008.

In at least one embodiment, GPU(s) 1008 may include any number of access counters that may keep track of frequency of access of GPU(s) 1008 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1004 may include any number of cache(s) 1012, including those described herein. For example, in at least one embodiment, cache(s) 1012 could include a level three ("L3") cache that is available to both CPU(s) 1006 and GPU(s) 1008 (e.g., that is connected to both CPU(s) 1006 and GPU(s) 1008). In at least one embodiment, cache(s) 1012 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1004 may include one or more accelerator(s) 1014 (e.g., hardware accelerators, software accelerators, or a combination thereof). In at least one embodiment, SoC(s) 1004 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1008 and to off-load some of tasks of GPU(s) 1008 (e.g., to free up more cycles of GPU(s) 1008 for performing other tasks). In at least one embodiment, accelerator(s) 1014 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1014 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1096; a CNN for facial recognition and vehicle owner identification using data from camera sensors; and/or a CNN for security and/or safety related events.

In at least one embodiment, DLA(s) may perform any function of GPU(s) 1008, and by using an inference accelerator, for example, a designer may target either DLA(s) or GPU(s) 1008 for any function. For example, in at least one embodiment, designer may focus processing of CNNs and floating point operations on DLA(s) and leave other functions to GPU(s) 1008 and/or other accelerator(s) 1014.

In at least one embodiment, accelerator(s) 1014 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1038, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1006. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as a primary processing engine of PVA and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1014 (e.g., hardware acceleration cluster) may include a computer vision network on-chip and static random-access memory ("SRAM"), for providing a high-bandwidth, low latency SRAM for accelerator(s) 1014. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1004 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1014 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1000, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time-of-flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 1066 that correlates with vehicle 1000 orientation, distance, 3D location estimates of object obtained from neural network and/or other sensors (e.g., LIDAR sensor(s) 1064 or RADAR sensor(s) 1060), among others.

In at least one embodiment, one or more of SoC(s) 1004 may include data store(s) 1016 (e.g., memory). In at least one embodiment, data store(s) 1016 may be on-chip memory of SoC(s) 1004, which may store neural networks to be executed on GPU(s) 1008 and/or DLA. In at least one embodiment, data store(s) 1016 may be large enough in capacity to store multiple instances of neural networks for redundancy and safety. In at least one embodiment, data store(s) 1012 may comprise L2 or L3 cache(s).

In at least one embodiment, one or more of SoC(s) 1004 may include any number of processor(s) 1010 (e.g., embedded processors). In at least one embodiment, processor(s) 1010 may include a boot and power management processor that may be a dedicated processor and subsystem to handle boot power and management functions and related security enforcement. In at least one embodiment, boot and power management processor may be a part of SoC(s) 1004 boot sequence and may provide runtime power management services. In at least one embodiment, boot power and management processor may provide clock and voltage programming, assistance in system low power state transitions, management of SoC(s) 1004 thermals and temperature sensors, and/or management of SoC(s) 1004 power states. In at least one embodiment, each temperature sensor may be implemented as a ring-oscillator whose output frequency is proportional to temperature, and SoC(s) 1004 may use ring-oscillators to detect temperatures of CPU(s) 1006, GPU(s) 1008, and/or accelerator(s) 1014. In at least one embodiment, if temperatures are determined to exceed a threshold, then boot and power management processor may enter a temperature fault routine and put SoC(s) 1004 into a lower power state and/or put vehicle 1000 into a chauffeur to safe stop mode (e.g., bring vehicle 1000 to a safe stop).

In at least one embodiment, processor(s) 1010 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1010 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1010 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1010 may further include a real-time camera engine that may include, without limitation, a dedicated processor subsystem for handling real-time camera management. In at least one embodiment, processor(s) 1010 may further include a high-dynamic range signal processor that may include, without limitation, an image signal processor that is a hardware engine that is part of camera processing pipeline.

In at least one embodiment, processor(s) 1010 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1070, surround camera(s) 1074, and/or on in-cabin monitoring camera sensor(s). In at least one embodiment, in-cabin monitoring camera sensor(s) are preferably monitored by a neural network running on another instance of SoC 1004, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1008 are not required to continuously render new surfaces. In at least one embodiment, when GPU(s) 1008 are powered on and active doing 3D rendering, video image compositor may be used to offload GPU(s) 1008 to improve performance and responsiveness.

In at least one embodiment, one or more of SoC(s) 1004 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1004 may further include an input/output controller(s) that may be controlled by software and may be used for receiving I/O signals that are uncommitted to a specific role.

In at least one embodiment, one or more of SoC(s) 1004 may further include a broad range of peripheral interfaces to enable communication with peripherals, audio encoders/decoders ("codecs"), power management, and/or other devices. SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus), etc. In at least one embodiment, one or more of SoC(s) 1004 may further include dedicated high-performance mass storage controllers that may include their own DMA engines, and that may be used to free CPU(s) 1006 from routine data management tasks.

In at least one embodiment, SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1004 may be faster, more reliable, and even more energy-efficient and space-efficient than conventional systems. For example, in at least one embodiment, accelerator(s) 1014, when combined with CPU(s) 1006, GPU(s) 1008, and data store(s) 1016, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1020) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1008.

In at least one embodiment, a CNN for facial recognition and vehicle owner identification may use data from camera sensors to identify presence of an authorized driver and/or owner of vehicle 1000. In at least one embodiment, an always on sensor processing engine may be used to unlock vehicle when owner approaches driver door and turn on lights, and, in security mode, to disable vehicle when owner leaves vehicle. In this way, SoC(s) 1004 provide for security against theft and/or carjacking.

In at least one embodiment, a CNN for emergency vehicle detection and identification may use data from microphones 1096 to detect and identify emergency vehicle sirens. In at least one embodiment, SoC(s) 1004 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1058. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1062, until emergency vehicle(s) passes.

In at least one embodiment, vehicle 1000 may include CPU(s) 1018 (e.g., discrete CPU(s), or dCPU(s)), that may be coupled to SoC(s) 1004 via a high-speed interconnect (e.g., PCIe). In at least one embodiment, CPU(s) 1018 may include an X86 processor, for example. CPU(s) 1018 may be used to perform any of a variety of functions, including arbitrating potentially inconsistent results between ADAS sensors and SoC(s) 1004, and/or monitoring status and health of controller(s) 1036 and/or an infotainment system on a chip ("infotainment SoC") 1030, for example.

In at least one embodiment, vehicle 1000 may include GPU(s) 1020 (e.g., discrete GPU(s), or dGPU(s)), that may be coupled to SoC(s) 1004 via a high-speed interconnect (e.g., NVIDIA's NVLINK). In at least one embodiment, GPU(s) 1020 may provide additional artificial intelligence functionality, such as by executing redundant and/or different neural networks and may be used to train and/or update neural networks based at least in part on input (e.g., sensor data) from sensors of vehicle 1000.

In at least one embodiment, vehicle 1000 may further include network interface 1024 which may include, without limitation, wireless antenna(s) 1026 (e.g., one or more wireless antennas 1026 for different communication protocols, such as a cellular antenna, a Bluetooth antenna, etc.).

In at least one embodiment, network interface 1024 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 1000 and other vehicle and/or an indirect link may be established (e.g., across networks and over Internet). In at least one embodiment, direct links may be provided using a vehicle-to-vehicle communication link. In at least one embodiment, vehicle-to-vehicle communication link may provide vehicle 1000 information about vehicles in proximity to vehicle 1000 (e.g., vehicles in front of, on side of, and/or behind vehicle 1000). In at least one embodiment, aforementioned functionality may be part of a cooperative adaptive cruise control functionality of vehicle 1000.

In at least one embodiment, network interface 1024 may include an SoC that provides modulation and demodulation functionality and enables controller(s) 1036 to communicate over wireless networks. In at least one embodiment, network interface 1024 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 1000 may further include data store(s) 1028 which may include, without limitation, off-chip (e.g., off SoC(s) 1004) storage. In at least one embodiment, data store(s) 1028 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1000 may further include GNSS sensor(s) 1058 (e.g., GPS and/or assisted GPS sensors), to assist in mapping, perception, occupancy grid generation, and/or path planning functions. In at least one embodiment, any number of GNSS sensor(s) 1058 may be used, including, for example and without limitation, a GPS using a USB connector with an Ethernet to Serial (e.g., RS-232) bridge.

In at least one embodiment, vehicle 1000 may further include RADAR sensor(s) 1060. RADAR sensor(s) 1060 may be used by vehicle 1000 for long-range vehicle detection, even in darkness and/or severe weather conditions. In at least one embodiment, RADAR functional safety levels may be ASIL B. RADAR sensor(s) 1060 may use CAN and/or bus 1002 (e.g., to transmit data generated by RADAR sensor(s) 1060) for control and to access object tracking data, with access to Ethernet to access raw data in some examples. In at least one embodiment, wide variety of RADAR sensor types may be used. For example, and without limitation, RADAR sensor(s) 1060 may be suitable for front, rear, and side RADAR use. In at least one embodiment, one or more of RADAR sensors(s) 1060 are Pulse Doppler RADAR sensor(s).

In at least one embodiment, RADAR sensor(s) 1060 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1060 may help in distinguishing between static and moving objects, and may be used by ADAS system 1038 for emergency brake assist and forward collision warning. In at least one embodiment, sensors 1060(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1000 surroundings at higher speeds with minimal interference from traffic in adjacent lanes. In at least one embodiment, other two antennae may expand field of view, making it possible to quickly detect vehicles entering or leaving vehicle's 1000 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1060 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1038 for blind spot detection and/or lane change assist.

In at least one embodiment, vehicle 1000 may further include ultrasonic sensor(s) 1062. In at least one embodiment, ultrasonic sensor(s) 1062, which may be positioned at front, back, and/or sides of vehicle 1000, may be used for park assist and/or to create and update an occupancy grid. In at least one embodiment, a wide variety of ultrasonic sensor(s) 1062 may be used, and different ultrasonic sensor(s) 1062 may be used for different ranges of detection (e.g., 2.5 m, 4 m). In at least one embodiment, ultrasonic sensor(s) 1062 may operate at functional safety levels of ASIL B.

In at least one embodiment, vehicle 1000 may include LIDAR sensor(s) 1064. LIDAR sensor(s) 1064 may be used for object and pedestrian detection, emergency braking, collision avoidance, and/or other functions. In at least one embodiment, LIDAR sensor(s) 1064 may be functional safety level ASIL B. In at least one embodiment, vehicle 1000 may include multiple LIDAR sensors 1064 (e.g., two, four, six, etc.) that may use Ethernet (e.g., to provide data to a Gigabit Ethernet switch).

In at least one embodiment, LIDAR sensor(s) 1064 may be capable of providing a list of objects and their distances for a 360-degree field of view. In at least one embodiment, commercially available LIDAR sensor(s) 1064 may have an advertised range of approximately 100 m, with an accuracy of 2 cm-3 cm, and with support for a 100 Mbps Ethernet connection, for example. In at least one embodiment, one or more non-protruding LIDAR sensors 1064 may be used. In such an embodiment, LIDAR sensor(s) 1064 may be implemented as a small device that may be embedded into front, rear, sides, and/or corners of vehicle 1000. In at least one embodiment, LIDAR sensor(s) 1064, in such an embodiment, may provide up to a 120-degree horizontal and 35-degree vertical field-of-view, with a 200 m range even for low-reflectivity objects. In at least one embodiment, front-mounted LIDAR sensor(s) 1064 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1000 up to approximately 200 m. In at least one embodiment, a flash LIDAR unit includes, without limitation, a receptor, which records laser pulse transit time and reflected light on each pixel, which in turn corresponds to range from vehicle 1000 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1000. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nano-second class I (eye-safe) laser pulse per frame and may capture reflected laser light in form of 3D range point clouds and co-registered intensity data.

In at least one embodiment, vehicle may further include IMU sensor(s) 1066. In at least one embodiment, IMU sensor(s) 1066 may be located at a center of rear axle of vehicle 1000, in at least one embodiment. In at least one embodiment, IMU sensor(s) 1066 may include, for example and without limitation, accelerometer(s), magnetometer(s), gyroscope(s), magnetic compass(es), and/or other sensor types. In at least one embodiment, such as in six-axis applications, IMU sensor(s) 1066 may include, without limitation, accelerometers and gyroscopes. In at least one embodiment, such as in nine-axis applications, IMU sensor(s) 1066 may include, without limitation, accelerometers, gyroscopes, and magnetometers.

In at least one embodiment, IMU sensor(s) 1066 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1066 may enable vehicle 1000 to estimate heading without requiring input from a magnetic sensor by directly observing and correlating changes in velocity from GPS to IMU sensor(s) 1066. In at least one embodiment, IMU sensor(s) 1066 and GNSS sensor(s) 1058 may be combined in a single integrated unit.

In at least one embodiment, vehicle 1000 may include microphone(s) 1096 placed in and/or around vehicle 1000. In at least one embodiment, microphone(s) 1096 may be used for emergency vehicle detection and identification, among other things.

In at least one embodiment, vehicle 1000 may further include any number of camera types, including stereo camera(s) 1068, wide-view camera(s) 1070, infrared camera(s) 1072, surround camera(s) 1074, long-range camera(s) 1098, mid-range camera(s) 1076, and/or other camera types. In at least one embodiment, cameras may be used to capture image data around an entire periphery of vehicle 1000. In at least one embodiment, types of cameras used depends on vehicle 1000. In at least one embodiment, any combination of camera types may be used to provide necessary coverage around vehicle 1000. In at least one embodiment, number of cameras may differ depending on embodiment. For example, in at least one embodiment, vehicle 1000 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet. In at least one embodiment, each of camera(s) is described with more detail previously herein with respect to FIG. 10A and FIG. 10B.

In at least one embodiment, vehicle 1000 may further include vibration sensor(s) 1042. In at least one embodiment, vibration sensor(s) 1042 may measure vibrations of components of vehicle 1000, such as axle(s). For example, in at least one embodiment, changes in vibrations may indicate a change in road surfaces. In at least one embodiment, when two or more vibration sensors 1042 are used, differences between vibrations may be used to determine friction or slippage of road surface (e.g., when difference in vibration is between a power-driven axle and a freely rotating axle).

In at least one embodiment, vehicle 1000 may include ADAS system 1038. ADAS system 1038 may include, without limitation, an SoC, in some examples. In at least one embodiment, ADAS system 1038 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1060, LIDAR sensor(s) 1064, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1000 and automatically adjust speed of vehicle 1000 to maintain a safe distance from vehicles ahead. In at least one embodiment, lateral ACC system performs distance keeping, and advises vehicle 1000 to change lanes when necessary. In at least one embodiment, lateral ACC is related to other ADAS applications such as LC and CW.

In at least one embodiment, CACC system uses information from other vehicles that may be received via network interface 1024 and/or wireless antenna(s) 1026 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1000), while I2V communication concept provides information about traffic further ahead. In at least one embodiment, CACC system may include either or both I2V and V2V information sources. In at least one embodiment, given information of vehicles ahead of vehicle 1000, CACC system may be more reliable, and it has potential to improve traffic flow smoothness and reduce congestion on a road.

In at least one embodiment, FCW system is designed to alert driver to a hazard, so that driver may take corrective action. In at least one embodiment, FCW system uses a front-facing camera and/or RADAR sensor(s) 1060, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1060, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1000 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1000 if vehicle 1000 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1000 is backing up. In at least one embodiment, RCTW system includes AEB system to ensure that vehicle brakes are applied to avoid a crash. In at least one embodiment, RCTW system may use one or more rear-facing RADAR sensor(s) 1060, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1000 itself decides, in case of conflicting results, whether to heed result from a primary computer or a secondary computer (e.g., first controller 1036 or second controller 1036). For example, in at least one embodiment, ADAS system 1038 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1038 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1004.

In at least one embodiment, ADAS system 1038 may include a secondary computer that performs ADAS functionality using traditional rules of computer vision. In at least one embodiment, secondary computer may use classic computer vision rules (if-then), and presence of a neural network(s) in supervisory MCU may improve reliability, safety, and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1038 may be fed into primary computer's perception block and/or primary computer's dynamic driving task block. For example, in at least one embodiment, if ADAS system 1038 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1000 may further include infotainment SoC 1030 (e.g., an in-vehicle infotainment system (IVI)). Although illustrated and described as an SoC, infotainment system 1030, in at least one embodiment, may not be an SoC, and may include, without limitation, two or more discrete components. In at least one embodiment, infotainment SoC 1030 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1000. For example, infotainment SoC 1030 could include radios, disk players, navigation systems, video players, USB and Bluetooth connectivity, carputers, in-car entertainment, WiFi, steering wheel audio controls, hands free voice control, a heads-up display ("HUD"), HMI display 1034, a telematics device, a control panel (e.g., for controlling and/or interacting with various components, features, and/or systems), and/or other components. In at least one embodiment, infotainment SoC 1030 may further be used to provide information (e.g., visual and/or audible) to user(s) of vehicle, such as information from ADAS system 1038, autonomous driving information such as planned vehicle maneuvers, trajectories, surrounding environment information (e.g., intersection information, vehicle information, road information, etc.), and/or other information.

In at least one embodiment, infotainment SoC 1030 may include any amount and type of GPU functionality. In at least one embodiment, infotainment SoC 1030 may communicate over bus 1002 (e.g., CAN bus, Ethernet, etc.) with other devices, systems, and/or components of vehicle 1000. In at least one embodiment, infotainment SoC 1030 may be coupled to a supervisory MCU such that GPU of infotainment system may perform some self-driving functions in event that primary controller(s) 1036 (e.g., primary and/or backup computers of vehicle 1000) fail. In at least one embodiment, infotainment SoC 1030 may put vehicle 1000 into a chauffeur to safe stop mode, as described herein.

In at least one embodiment, vehicle 1000 may further include instrument cluster 1032 (e.g., a digital dash, an electronic instrument cluster, a digital instrument panel, etc.). In at least one embodiment, instrument cluster 1032 may include, without limitation, a controller and/or supercomputer (e.g., a discrete controller or supercomputer). In at least one embodiment, instrument cluster 1032 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1030 and instrument cluster 1032.

In at least one embodiment, instrument cluster 1032 may be included as part of infotainment SoC 1030, or vice versa.

Figure 10D:
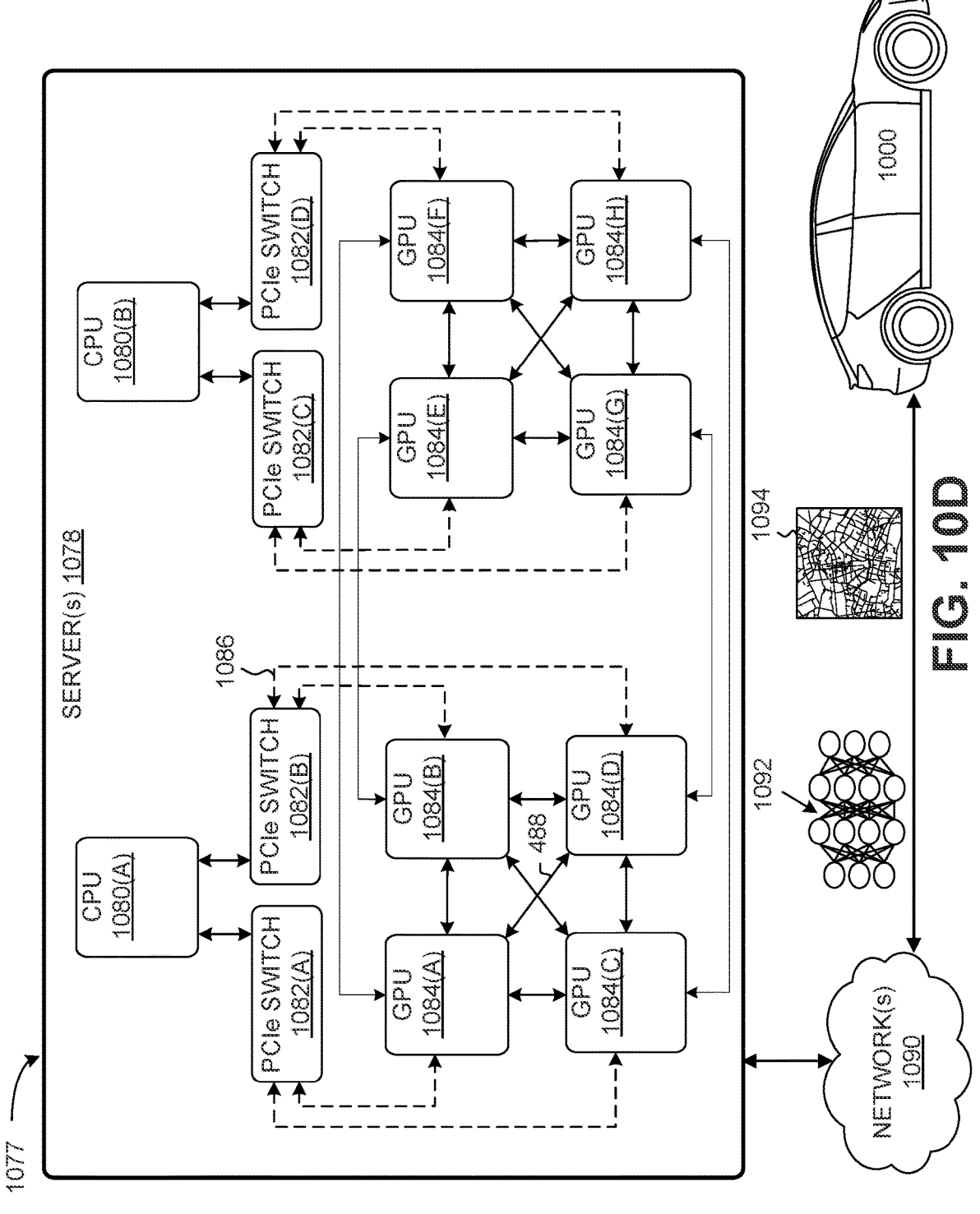
FIG. 10D is a diagram illustrating a system for communication between cloud-based server(s) and autonomous vehicle of FIG. 10A, according to at least one embodiment.

FIG. 10D is a diagram of a system 1077 for communication between cloud-based server(s) and autonomous vehicle 1000 of FIG. 10A, according to at least one embodiment. In at least one embodiment, system 1077 may include, without limitation, server(s) 1078, network(s) 1090, and any number and type of vehicles, including vehicle 1000. server(s) 1078 may include, without limitation, a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). GPUs 1084, CPUs 1080, and PCIe switches 1082 may be interconnected with high-speed interconnects such as, for example and without limitation, NVLink interfaces 1088 developed by NVIDIA and/or PCIe connections 1086. In at least one embodiment, GPUs 1084 are connected via an NVLink and/or NVSwitch SoC and GPUs 1084 and PCIe switches 1082 are connected via PCIe interconnects. In at least one embodiment, although eight GPUs 1084, two CPUs 1080, and four PCIe switches 1082 are illustrated, this is not intended to be limiting. In at least one embodiment, each of server(s) 1078 may include, without limitation, any number of GPUs 1084, CPUs 1080, and/or PCIe switches 1082, in any combination. For example, in at least one embodiment, server(s) 1078 could each include eight, sixteen, thirty-two, and/or more GPUs 1084.

In at least one embodiment, server(s) 1078 may receive, over network(s) 1090 and from vehicles, image data representative of images showing unexpected or changed road conditions, such as recently commenced roadwork. In at least one embodiment, server(s) 1078 may transmit, over network(s) 1090 and to vehicles, neural networks 1092, updated neural networks 1092, and/or map information 1094, including, without limitation, information regarding traffic and road conditions. In at least one embodiment, updates to map information 1094 may include, without limitation, updates for HD map 1022, such as information regarding construction sites, potholes, detours, flooding, and/or other obstructions. In at least one embodiment, neural networks 1092, updated neural networks 1092, and/or map information 1094 may have resulted from new training and/or experiences represented in data received from any number of vehicles in environment, and/or based at least in part on training performed at a data center (e.g., using server(s) 1078 and/or other servers).

In at least one embodiment, server(s) 1078 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1090, and/or machine learning models may be used by server(s) 1078 to remotely monitor vehicles).

In at least one embodiment, server(s) 1078 may receive data from vehicles and apply data to up-to-date real-time neural networks for real-time intelligent inferencing. In at least one embodiment, server(s) 1078 may include deep-learning supercomputers and/or dedicated AI computers powered by GPU(s) 1084, such as a DGX and DGX Station machines developed by NVIDIA. However, in at least one embodiment, server(s) 1078 may include deep learning infrastructure that use CPU-powered data centers.

In at least one embodiment, deep-learning infrastructure of server(s) 1078 may be capable of fast, real-time inferencing, and may use that capability to evaluate and verify health of processors, software, and/or associated hardware in vehicle 1000. For example, in at least one embodiment, deep-learning infrastructure may receive periodic updates from vehicle 1000, such as a sequence of images and/or objects that vehicle 1000 has located in that sequence of images (e.g., via computer vision and/or other machine learning object classification techniques). In at least one embodiment, deep-learning infrastructure may run its own neural network to identify objects and compare them with objects identified by vehicle 1000 and, if results do not match and deep-learning infrastructure concludes that AI in vehicle 1000 is malfunctioning, then server(s) 1078 may transmit a signal to vehicle 1000 instructing a fail-safe computer of vehicle 1000 to assume control, notify passengers, and complete a safe parking maneuver.

In at least one embodiment, server(s) 1078 may include GPU(s) 1084 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing.

Computer Systems

Figure 11:
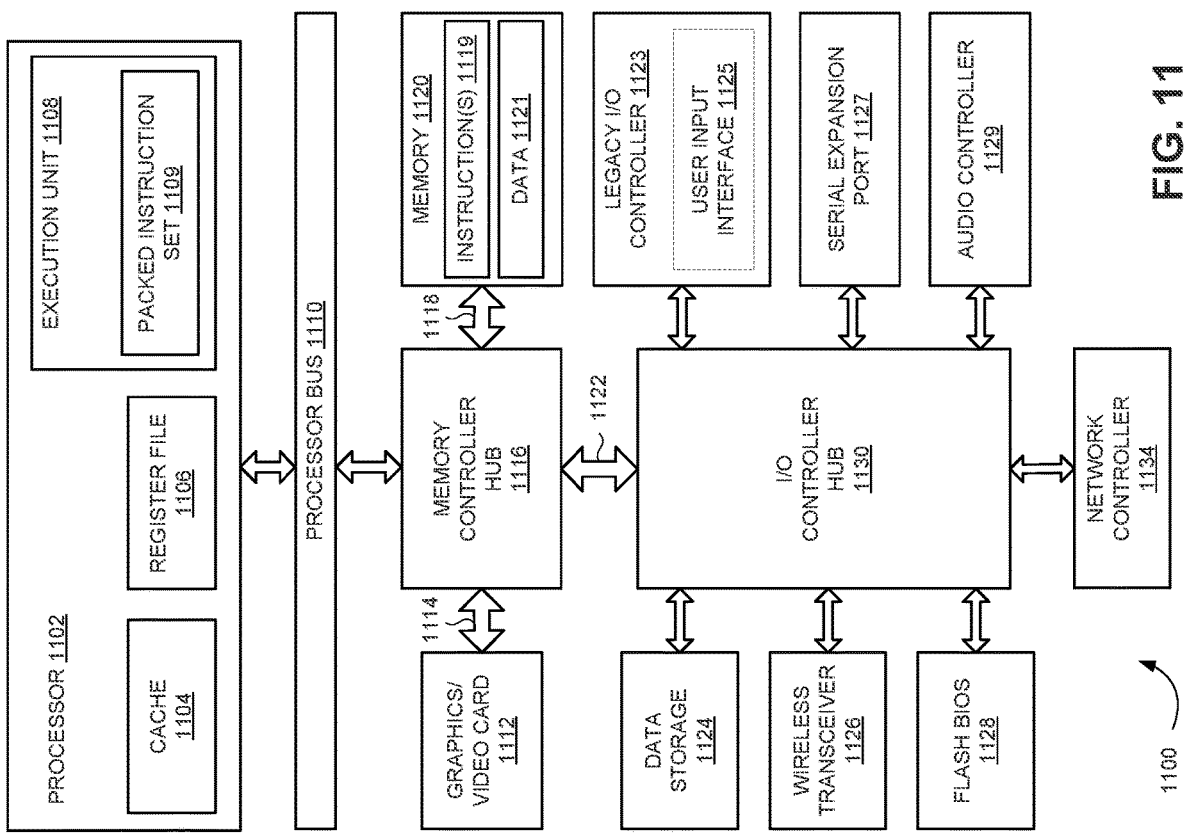
FIG. 11 is a block diagram illustrating a computer system, according to at least one embodiment.

FIG. 11 is a block diagram illustrating an exemplary computer system, which may be a system with interconnected devices and components, a system-on-a-chip (SOC) or some combination thereof 1100 formed with a processor that may include execution units to execute an instruction, according to at least one embodiment. In at least one embodiment, processor 1102 includes first processor 125 or second processor 130, wherein processor 1102 can perform processes and flows disclosed in FIGS. 3-6. In at least one embodiment, computer system 1100 may include, without limitation, a component, such as a processor 1102 to employ execution units including logic to perform algorithms for process data, in accordance with present disclosure, such as in embodiment described herein. In at least one embodiment, computer system 1100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1100 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1100 may include, without limitation, processor 1102 that may include, without limitation, one or more execution units 1108 to perform machine learning model training and/or inferencing according to techniques described herein. In at least one embodiment, system 11 is a single processor desktop or server system, but in another embodiment system 11 may be a multiprocessor system. In at least one embodiment, processor 1102 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. Other embodiments may also include a combination of both internal and external caches depending on particular implementation and needs. In at least one embodiment, register file 1106 may store different types of data in various registers including, without limitation, integer registers, floating point registers, status registers, and instruction pointer register.

In at least one embodiment, execution unit 1108, including, without limitation, logic to perform integer and floating point operations, also resides in processor 1102. In at least one embodiment, processor 1102 may also include a microcode ("ucode") read only memory ("ROM") that stores microcode for certain macro instructions. In at least one embodiment, execution unit 1108 may include logic to handle a packed instruction set 1109. In at least one embodiment, by including packed instruction set 1109 in instruction set of a general-purpose processor 1102, along with associated circuitry to execute instructions, operations used by many multimedia applications may be performed using packed data in a general-purpose processor 1102. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1108 may also be used in microcontrollers, embedded processors, graphics devices, DSPs, and other types of logic circuits. In at least one embodiment, computer system 1100 may include, without limitation, a memory 1120. In at least one embodiment, memory 1120 may be implemented as a Dynamic Random Access Memory ("DRAM") device, a Static Random Access Memory ("SRAM") device, flash memory device, or other memory device. In at least one embodiment, memory 1120 may store instruction(s) 1119 and/or data 1121 represented by data signals that may be executed by processor 1102.

In at least one embodiment, system logic chip may be coupled to processor bus 1110 and memory 1120. In at least one embodiment, system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data, and textures. In at least one embodiment, MCH 1116 may direct data signals between processor 1102, memory 1120, and other components in computer system 1100 and to bridge data signals between processor bus 1110, memory 1120, and a system I/O 1122. In at least one embodiment, system logic chip may provide a graphics port for coupling to a graphics controller. In at least one embodiment, MCH 1116 may be coupled to memory 1120 through a high bandwidth memory path 1118 and graphics/video card 1112 may be coupled to MCH 1116 through an Accelerated Graphics Port ("AGP") interconnect 1114.

In at least one embodiment, computer system 1100 may use system I/O 1122 that is a proprietary hub interface bus to couple MCH 1116 to I/O controller hub ("ICH") 1130. In at least one embodiment, ICH 1130 may provide direct connections to some I/O devices via a local I/O bus. In at least one embodiment, local I/O bus may include, without limitation, a high-speed I/O bus for connecting peripherals to memory 1120, chipset, and processor 1102. Examples may include, without limitation, an audio controller 1129, a firmware hub ("flash BIOS") 1128, a wireless transceiver 1126, a data storage 1124, a legacy I/O controller 1123 containing user input and keyboard interfaces, a serial expansion port 1127, such as Universal Serial Bus ("USB"), and a network controller 1134. In at least one embodiment, data storage 1124 may comprise a hard disk drive, a floppy disk drive, a CD-ROM device, a flash memory device, or other mass storage device.

In at least one embodiment, FIG. 11 illustrates a system, which includes interconnected hardware devices or "chips", whereas in other embodiments, FIG. 11 may illustrate an exemplary System on a Chip ("SoC"). In at least one embodiment, devices illustrated in FIG. 11 may be interconnected with proprietary interconnects, standardized interconnects (e.g., PCIe) or some combination thereof. In at least one embodiment, one or more components of system 1100 are interconnected using compute express link (CXL) interconnects.

Figure 12:
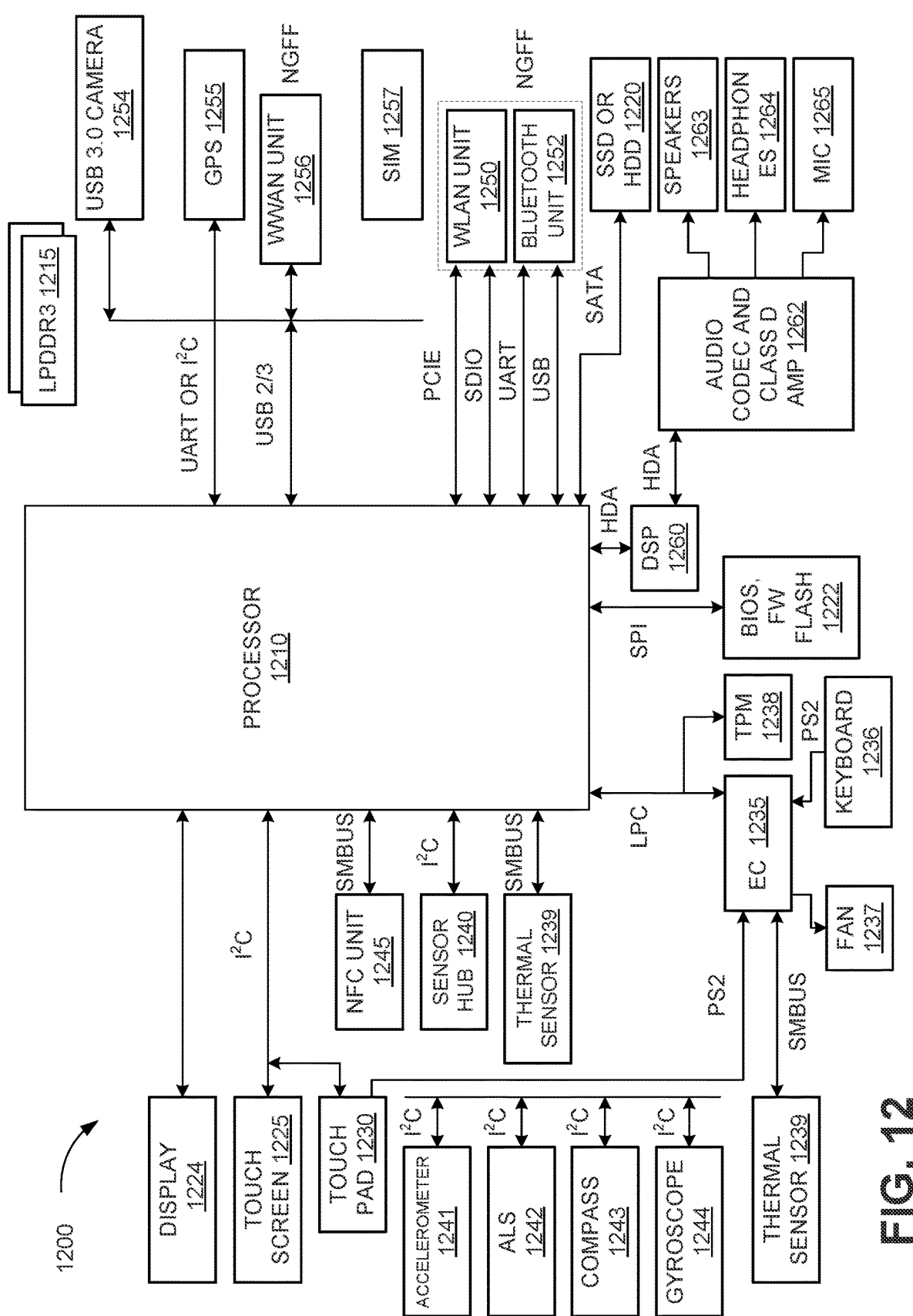
FIG. 12 is a block diagram illustrating computer system, according to at least one embodiment.

FIG. 12 is a block diagram illustrating an electronic device 1200 for utilizing a processor 1210, according to at least one embodiment. In at least one embodiment, processor 1210 includes first processor 125 or second processor 130, wherein processor 1210 can perform processes and flows disclosed in FIGS. 3-6. In at least one embodiment, electronic device 1200 includes first processor 125 or second processor 130, wherein processor 1102 can perform processes and flows disclosed in FIGS. 3-6. In at least one embodiment, electronic device 1200 may be, for example and without limitation, a notebook, a tower server, a rack server, a blade server, a laptop, a desktop, a tablet, a mobile device, a phone, an embedded computer, or any other suitable electronic device.

In at least one embodiment, system 1200 may include, without limitation, processor 1210 communicatively coupled to any suitable number or kind of components, peripherals, modules, or devices. In at least one embodiment, processor 1210 coupled using a bus or interface, such as a 1° C. bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 12 illustrates a system, which includes interconnected hardware devices or "chips", whereas in other embodiments, FIG. 12 may illustrate an exemplary System on a Chip ("SoC"). In at least one embodiment, devices illustrated in FIG. 12 may be interconnected with proprietary interconnects, standardized interconnects (e.g., PCIe) or some combination thereof. In at least one embodiment, one or more components of FIG. 12 are interconnected using compute express link (CXL) interconnects.

In at least one embodiment, FIG. 12 may include a display 1224, a touch screen 1225, a touch pad 1230, a Near Field Communications unit ("NFC") 1245, a sensor hub 1240, a thermal sensor 1246, an Express Chipset ("EC") 1235, a Trusted Platform Module ("TPM") 1238, BIOS/firmware/flash memory ("BIOS, FW Flash") 1222, a DSP 1260, a drive "SSD or HDD" 1220 such as a Solid State Disk ("SSD") or a Hard Disk Drive ("HDD"), a wireless local area network unit ("WLAN") 1250, a Bluetooth unit 1252, a Wireless Wide Area Network unit ("WWAN") 1256, a Global Positioning System (GPS) 1255, a camera ("USB 3.0 camera") 1254 such as a USB 3.0 camera, or a Low Power Double Data Rate ("LPDDR") memory unit ("LPDDR3") 1215 implemented in, for example, LPDDR3 standard. These components may each be implemented in any suitable manner.

In at least one embodiment, other components may be communicatively coupled to processor 1210 through components discussed above. In at least one embodiment, an accelerometer 1241, Ambient Light Sensor ("ALS") 1242, compass 1243, and a gyroscope 1244 may be communicatively coupled to sensor hub 1240. In at least one embodiment, thermal sensor 1239, a fan 1237, a keyboard 1246, and a touch pad 1230 may be communicatively coupled to EC 1235. In at least one embodiment, speaker 1263, a headphone 1264, and a microphone ("mic") 1265 may be communicatively coupled to an audio unit ("audio codec and class d amp") 1264, which may in turn be communicatively coupled to DSP 1260. In at least one embodiment, audio unit 1264 may include, for example and without limitation, an audio coder/decoder ("codec") and a class D amplifier. In at least one embodiment, SIM card ("SIM") 1257 may be communicatively coupled to WWAN unit 1256. In at least one embodiment, components such as WLAN unit 1250 and Bluetooth unit 1252, as well as WWAN unit 1256 may be implemented in a Next Generation Form Factor ("NGFF").

Figure 13:
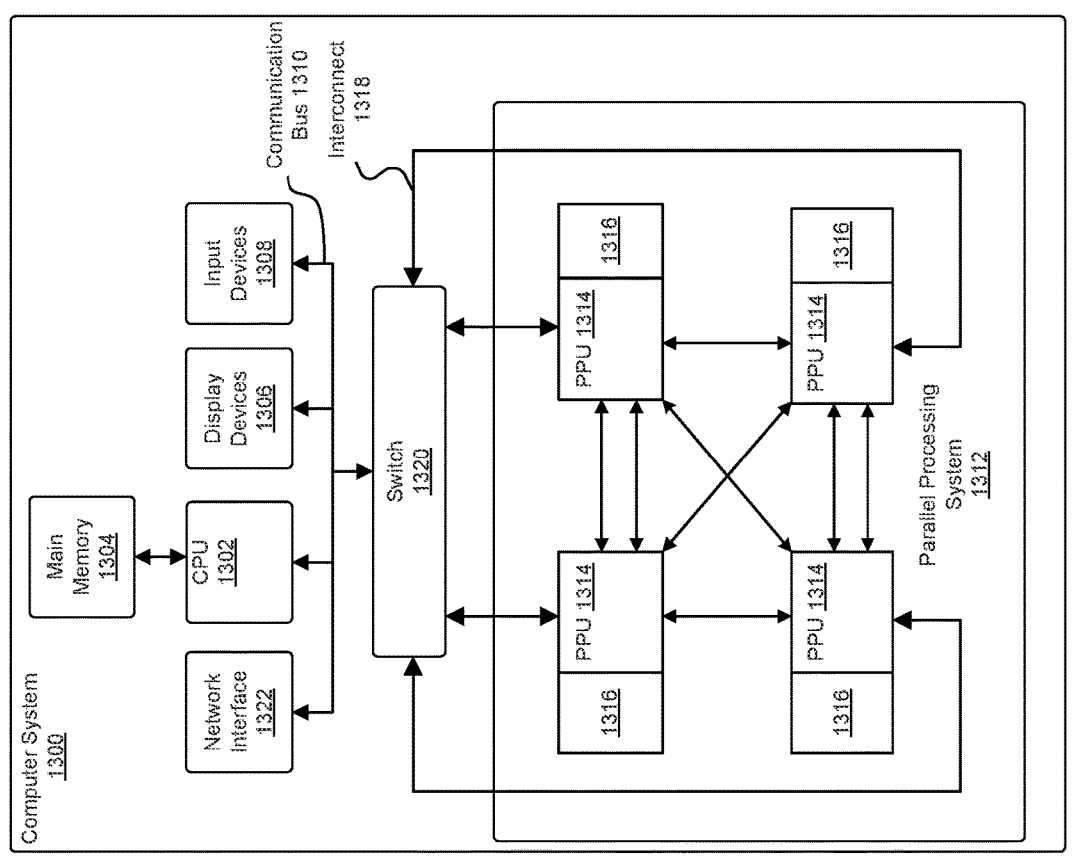
FIG. 13 illustrates a computer system, according to at least one embodiment.

FIG. 13 illustrates a computer system 1300, according to at least one embodiment. In at least one embodiment, computer system 1300 is configured to implement various processes and methods described throughout this disclosure. In at least one embodiment, computer system 1300 includes first processor 125 or second processor 130, wherein computer system 1300 can perform processes and flows disclosed in FIGS. 3-6.

In at least one embodiment, computer system 1300 comprises, without limitation, at least one central processing unit ("CPU") 1302 that is connected to a communication bus 1310 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1300 includes, without limitation, a main memory 1304 and control logic (e.g., implemented as hardware, software, or a combination thereof) and data are stored in main memory 1304 which may take form of random access memory ("RAM"). In at least one embodiment, a network interface subsystem ("network interface") 1322 provides an interface to other computing devices and networks for receiving data from and transmitting data to other systems from computer system 1300.

In at least one embodiment, computer system 1300, in at least one embodiment, includes, without limitation, input devices 1308, parallel processing system 1312, and display devices 1306 which can be implemented using a conventional cathode ray tube ("CRT"), liquid crystal display ("LCD"), light emitting diode ("LED"), plasma display, or other suitable display technologies. In at least one embodiment, user input is received from input devices 1308 such as keyboard, mouse, touchpad, microphone, and more. In at least one embodiment, each of foregoing modules can be situated on a single semiconductor platform to form a processing system.

Figure 14:
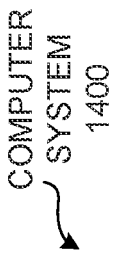
FIG. 14 illustrates a computer system, according at least one embodiment.
Figure 14:
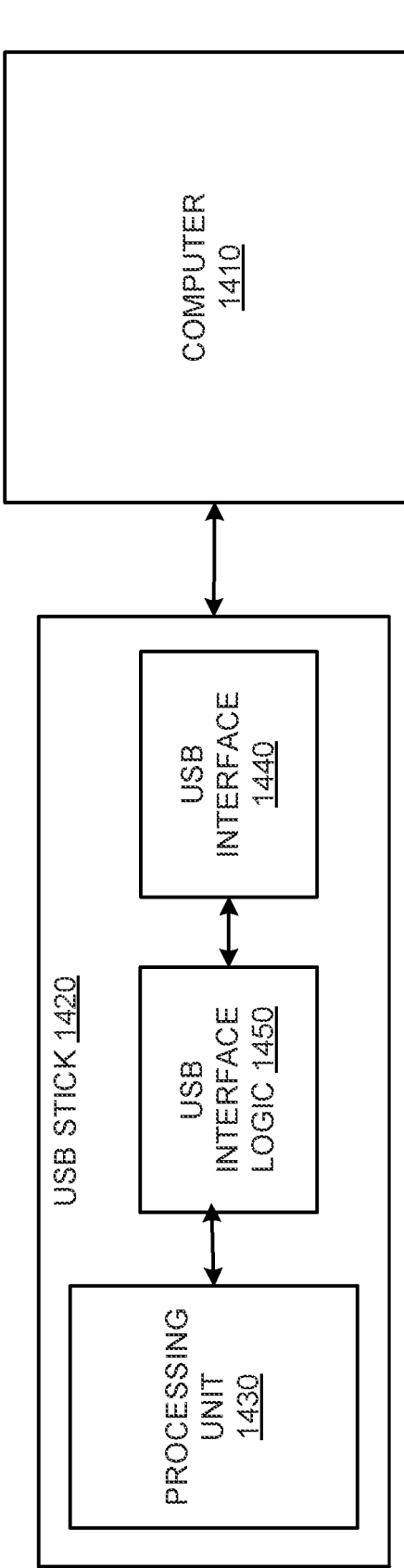

FIG. 14 illustrates a computer system 1400, according to at least one embodiment. In at least one embodiment, computer system 1400 includes, without limitation, a computer 1410 and a USB stick 1420. In at least one embodiment, computer system 1400 includes first processor 125 or second processor 130, wherein computer system 1400 can perform processes and flows disclosed in FIGS. 3-6. In at least one embodiment, computer 1410 may include, without limitation, any number and type of processor(s) (not shown) and a memory (not shown). In at least one embodiment, computer 1410 includes, without limitation, a server, a cloud instance, a laptop, and a desktop computer.

In at least one embodiment, USB stick 1420 includes, without limitation, a processing unit 1430, a USB interface 1440, and USB interface logic 1450. In at least one embodiment, processing unit 1430 may be any instruction execution system, apparatus, or device capable of executing instructions. In at least one embodiment, processing unit 1430 may include, without limitation, any number and type of processing cores (not shown). In at least one embodiment, processing core 1430 comprises an application specific integrated circuit ("ASIC") that is optimized to perform any amount and type of operations associated with machine learning. For instance, in at least one embodiment, processing core 1430 is a tensor processing unit ("TPC") that is optimized to perform machine learning inference operations. In at least one embodiment, processing core 1430 is a vision processing unit ("VPU") that is optimized to perform machine vision and machine learning inference operations.

In at least one embodiment, USB interface 1440 may be any type of USB connector or USB socket. For instance, in at least one embodiment, USB interface 1440 is a USB 3.0 Type-C socket for data and power. In at least one embodiment, USB interface 1440 is a USB 3.0 Type-A connector. In at least one embodiment, USB interface logic 1450 may include any amount and type of logic that enables processing unit 1430 to interface with or devices (e.g., computer 1410) via USB connector 1440.

Figure 15A:
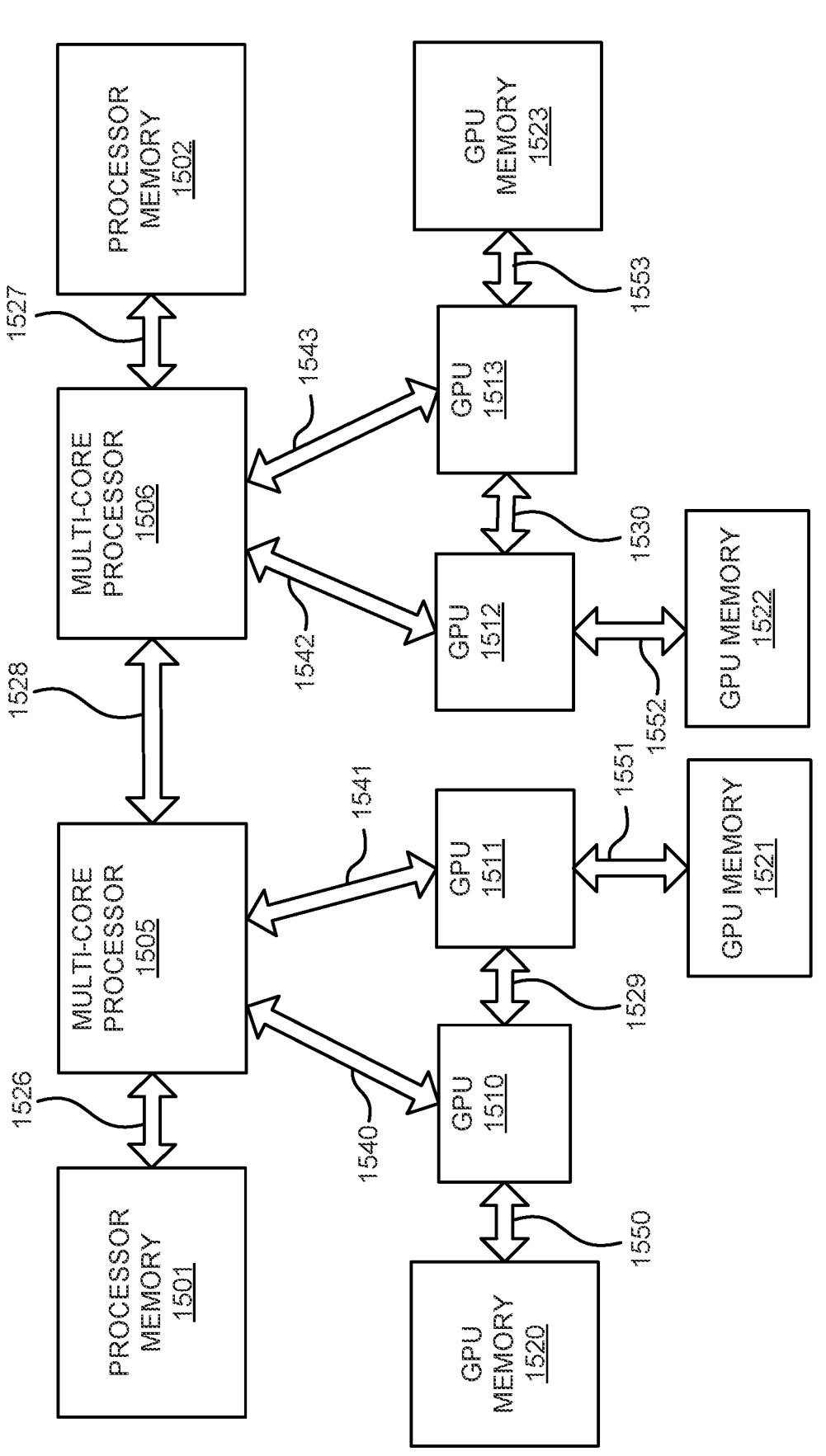
FIG. 15A illustrates a computer system, according to at least one embodiment.

FIG. 15A illustrates an exemplary architecture in which a plurality of GPUs 1510-1513 is communicatively coupled to a plurality of multi-core processors 1505-1506 over high-speed links 1540-1543 (e.g., buses, point-to-point interconnects, etc.). In at least one embodiment, GPUs 1510-1513 are a part of first processor 125 or second processor 130, wherein GPUs 1510-1513 can perform processes and flows disclosed in FIGS. 3-6. In one embodiment, high-speed links 1540-1543 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 1510-1513 are interconnected over high-speed links 1529-1530, which may be implemented using same or different protocols/links than those used for high-speed links 1540-1543. Similarly, two or more of multi-core processors 1505-1506 may be connected over high-speed link 1528 which may be symmetric multi-processor (SMP) buses operating at 20 GB/s, 30 GB/s, 120 GB/s or higher. Alternatively, all communication between various system components shown in FIG. 15A may be accomplished using same protocols/links (e.g., over a common interconnection fabric).

In one embodiment, each multi-core processor 1505-1506 is communicatively coupled to a processor memory 1501-1502, via memory interconnects 1526-1527, respectively, and each GPU 1510-1513 is communicatively coupled to GPU memory 1520-1523 over GPU memory interconnects 1550-1553, respectively. Memory interconnects 1526-1527 and 1550-1553 may utilize same or different memory access technologies. By way of example, and not limitation, processor memories 1501-1502 and GPU memories 1520-1523 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 1501-1502 may be volatile memory and another portion may be non-volatile memory (e.g., using a two-level memory (2LM) hierarchy).

As described herein, although various processors 1505-1506 and GPUs 1510-1513 may be physically coupled to a particular memory 1501-1502, 1520-1523, respectively, a unified memory architecture may be implemented in which a same virtual system address space (also referred to as "effective address" space) is distributed among various physical memories. For example, processor memories 1501-1502 may each comprise 64 GB of system memory address space and GPU memories 1520-1523 may each comprise 32 GB of system memory address space (resulting in a total of 256 GB addressable memory in this example).

Figure 15B:
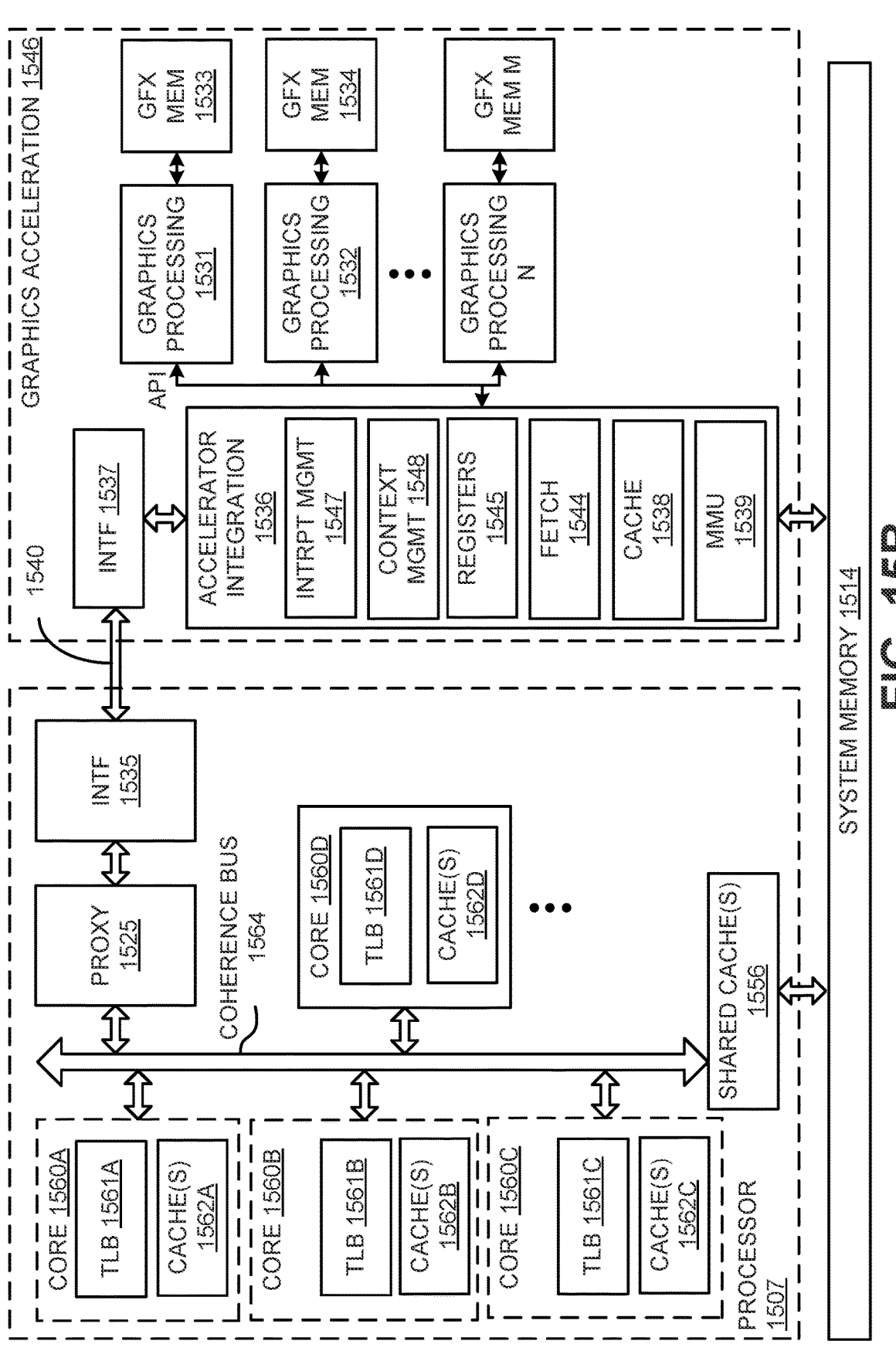
FIG. 15B illustrates a computer system, according to at least one embodiment.

FIG. 15B illustrates additional details for an interconnection between a multi-core processor 1507 and a graphics acceleration module 1546 in accordance with one exemplary embodiment. Graphics acceleration module 1546 may include one or more GPU chips integrated on a line card which is coupled to processor 1507 via high-speed link 1540. Alternatively, graphics acceleration module 1546 may be integrated on a same package or chip as processor 1507.

In at least one embodiment, illustrated processor 1507 includes a plurality of cores 1560A-1560D, each with a translation lookaside buffer 1561A-1561D and one or more caches 1562A-1562D. In at least one embodiment, cores 1560A-1560D may include various other components for executing instructions and processing data which are not illustrated. Caches 1562A-1562D may comprise level 1 (L1) and level 2 (L2) caches. In addition, one or more shared caches 1556 may be included in caches 1562A-1562D and shared by sets of cores 1560A-1560D. For example, one embodiment of processor 1507 includes 24 cores, each with its own L1 cache, twelve shared L2 caches, and twelve shared L3 caches. In this embodiment, one or more L2 and L3 caches are shared by two adjacent cores. Processor 1507 and graphics acceleration module 1546 connect with system memory 1514, which may include processor memories 1501-1502 of FIG. 15A.

Coherency is maintained for data and instructions stored in various caches 1562A-1562D, 1556 and system memory 1514 via inter-core communication over a coherence bus

1564. For example, each cache may have cache coherency logic/circuitry associated therewith to communicate to over coherence bus 1564 in response to detected reads or writes to particular cache lines. In one implementation, a cache snooping protocol is implemented over coherence bus 1564 to snoop cache accesses.

In one embodiment, a proxy circuit 1525 communicatively couples graphics acceleration module 1546 to coherence bus 1564, allowing graphics acceleration module 1546 to participate in a cache coherence protocol as a peer of cores 1560A-1560D. An interface 1535 provides connectivity to proxy circuit 1525 over high-speed link 1540 (e.g., a PCIe bus, NVLink, etc.) and an interface 1537 connects graphics acceleration module 1546 to link 1540.

In one implementation, an accelerator integration circuit 1536 provides cache management, memory access, context management, and interrupt management services on behalf of a plurality of graphics processing engines 1531, 1532, N of graphics acceleration module 1546. Graphics processing engines 1531, 1532, N may each comprise a separate graphics processing unit (GPU). Alternatively, graphics processing engines 1531, 1532, N may comprise different types of graphics processing engines within a GPU such as graphics execution units, media processing engines (e.g., video encoders/decoders), samplers, and blit engines. In at least one embodiment, graphics acceleration module 1546 may be a GPU with a plurality of graphics processing engines 1531-1532, N or graphics processing engines 1531-1532, N may be individual GPUs integrated on a common package, line card, or chip.

In one embodiment, accelerator integration circuit 1536 includes a memory management unit (MMU) 1539 for performing various memory management functions such as virtual-to-physical memory translations (also referred to as effective-to-real memory translations) and memory access protocols for accessing system memory 1514. MMU 1539 may also include a translation lookaside buffer (TLB) (not shown) for caching virtual/effective to physical/real address translations. In one implementation, a cache 1538 stores commands and data for efficient access by graphics processing engines 1531-1532, N. In one embodiment, data stored in cache 1538 and graphics memories 1533-1534, M is kept coherent with core caches 1562A-1562D, 1556 and system memory 1514. As mentioned, this may be accomplished via proxy circuit 1525 on behalf of cache 1538 and memories 1533-1534, M (e.g., sending updates to cache 1538 related to modifications/accesses of cache lines on processor caches 1562A-1562D, 1556 and receiving updates from cache 1538).

A set of registers 1545 store context data for threads executed by graphics processing engines 1531-1532, N and a context management circuit 1548 manages thread contexts. For example, context management circuit 1548 may perform save and restore operations to save and restore contexts of various threads during contexts switches (e.g., where a first thread is saved and a second thread is stored so that a second thread can be execute by a graphics processing engine). For example, on a context switch, context management circuit 1548 may store current register values to a designated region in memory (e.g., identified by a context pointer). It may then restore register values when returning to a context. In one embodiment, an interrupt management circuit 1547 receives and processes interrupts received from system devices.

In one implementation, virtual/effective addresses from a graphics processing engine 1531 are translated to real/physical addresses in system memory 1514 by MMU 1539.

One embodiment of accelerator integration circuit 1536 supports multiple (e.g., 4, 8, 16) graphics accelerator modules 1546 and/or other accelerator devices. Graphics accelerator module 1546 may be dedicated to a single application executed on processor 1507 or may be shared between multiple applications. In one embodiment, a virtualized graphics execution environment is presented in which resources of graphics processing engines 1531-1532, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1536 performs as a bridge to a system for graphics acceleration module 1546 and provides address translation and system memory cache services. In addition, accelerator integration circuit 1536 may provide virtualization facilities for a host processor to manage virtualization of graphics processing engines 1531-1532, interrupts, and memory management.

Because hardware resources of graphics processing engines 1531-1532, N are mapped explicitly to a real address space seen by host processor 1507, any host processor can address these resources directly using an effective address value. One function of accelerator integration circuit 1536, in one embodiment, is physical separation of graphics processing engines 1531-1532, N so that they appear to a system as independent units.

In at least one embodiment, one or more graphics memories 1533-1534, M are coupled to each of graphics processing engines 1531-1532, N, respectively. Graphics memories 1533-1534, M store instructions and data being processed by each of graphics processing engines 1531-1532, N. Graphics memories 1533-1534, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1540, biasing techniques are used to ensure that data stored in graphics memories 1533-1534, M is data which will be used most frequently by graphics processing engines 1531-1532, N and preferably not used by cores 1560A-1560D (at least not frequently). Similarly, a biasing mechanism attempts to keep data needed by cores (and preferably not graphics processing engines 1531-1532, N) within caches 1562A-1562D, 1556 of cores and system memory 1514.

Figure 15C:
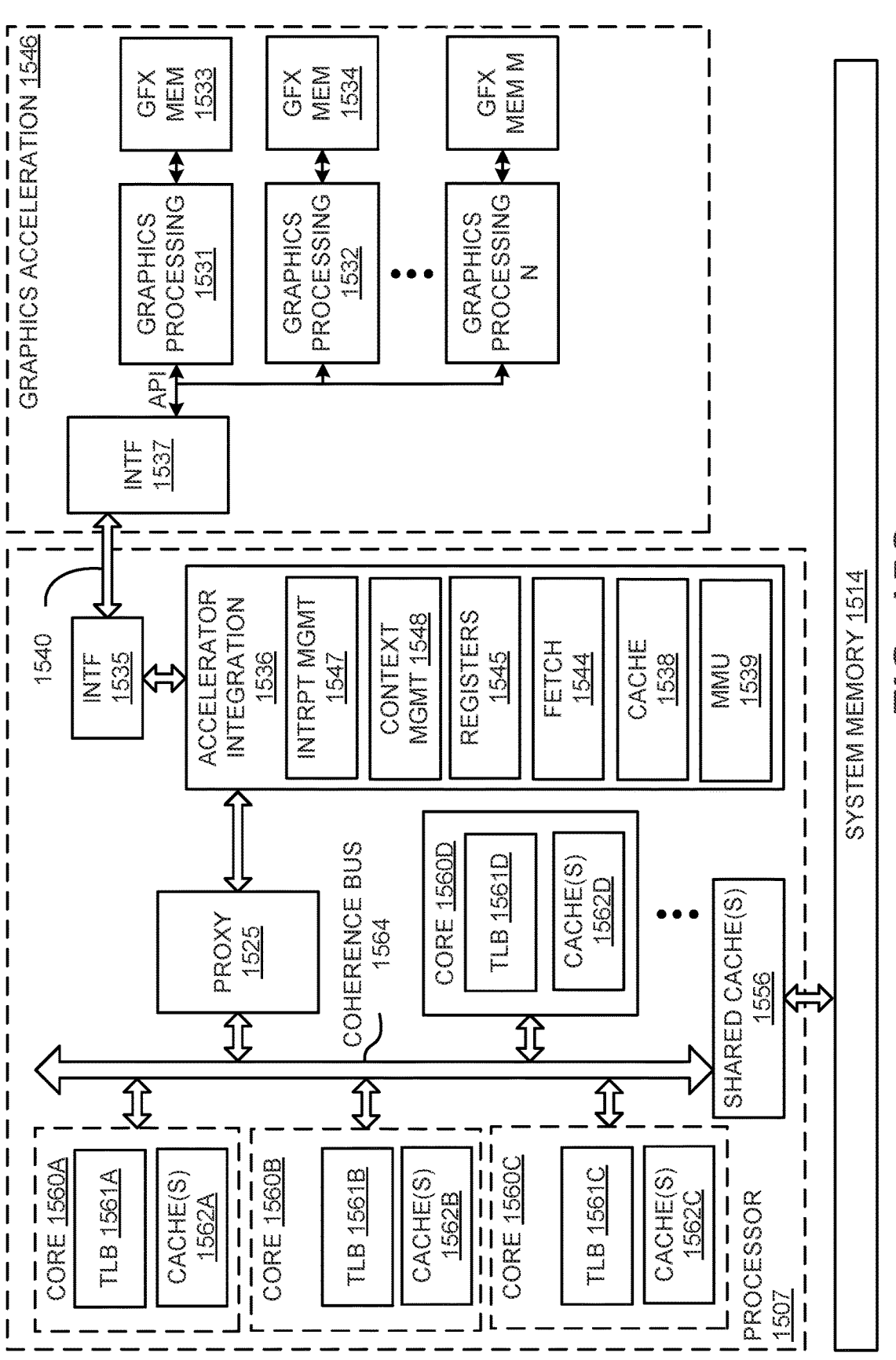
FIG. 15C illustrates a computer system, according to at least one embodiment.

FIG. 15C illustrates another exemplary embodiment in which accelerator integration circuit 1536 is integrated within processor 1507. In this embodiment, graphics processing engines 1531-1532, N communicate directly over high-speed link 1540 to accelerator integration circuit 1536 via interface 1537 and interface 1535 (which, again, may be utilize any form of bus or interface protocol). Accelerator integration circuit 1536 may perform same operations as those described with respect to FIG. 15B, but potentially at a higher throughput given its close proximity to coherence bus 1564 and caches 1562A-1562D, 1556. One embodiment supports different programming models including a dedicated-process programming model (no graphics acceleration module virtualization) and shared programming models (with virtualization), which may include programming models which are controlled by accelerator integration circuit 1536 and programming models which are controlled by graphics acceleration module 1546.

In at least one embodiment, graphics processing engines 1531-1532, N are dedicated to a single application or process under a single operating system. In at least one embodiment, a single application can funnel other application requests to graphics processing engines 1531-1532, N, providing virtualization within a VM/partition.

In at least one embodiment, graphics processing engines 1531-1532, N, may be shared by multiple VM/application partitions. In at least one embodiment, shared models may use a system hypervisor to virtualize graphics processing engines 1531-1532, N to allow access by each operating system. For single-partition systems without a hypervisor, graphics processing engines 1531-1532, N are owned by an operating system. In at least one embodiment, an operating system can virtualize graphics processing engines 1531-1532, N to provide access to each process or application.

In at least one embodiment, graphics acceleration module 1546 or an individual graphics processing engine 1531-1532, N selects a process element using a process handle. In one embodiment, process elements are stored in system memory 1514 and are addressable using an effective address to real address translation techniques described herein. In at least one embodiment, a process handle may be an implementation-specific value provided to a host process when registering its context with graphics processing engine 1531-1532, N (that is, calling system software to add a process element to a process element linked list). In at least one embodiment, a lower 16-bits of a process handle may be an offset of the process element within a process element linked list.

Figure 15D:
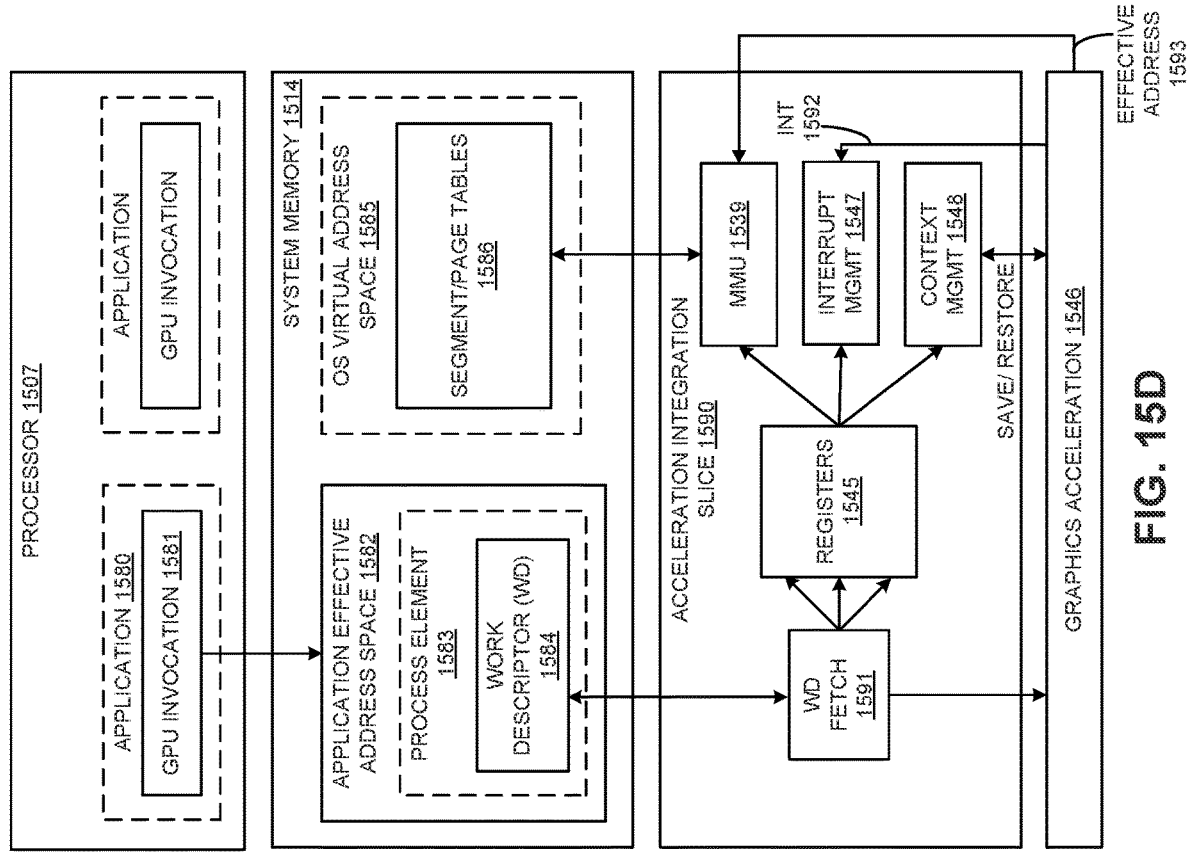
FIG. 15D illustrates a computer system, according to at least one embodiment.

FIG. 15D illustrates an exemplary accelerator integration slice 1590. As used herein, a "slice" comprises a specified portion of processing resources of accelerator integration circuit 1536. Application effective address space 1582 within system memory 1514 stores process elements 1583. In one embodiment, process elements 1583 are stored in response to GPU invocations 1581 from applications 1580 executed on processor 1507. A process element 1583 contains process state for corresponding application 1580. A work descriptor (WD) 1584 contained in process element 1583 can be a single job requested by an application or may contain a pointer to a queue of jobs. In at least one embodiment, WD 1584 is a pointer to a job request queue in an application's address space 1582.

Graphics acceleration module 1546 and/or individual graphics processing engines 1531-1532, N can be shared by all or a subset of processes in a system. In at least one embodiment, an infrastructure for setting up process state and sending a WD 1584 to a graphics acceleration module 1546 to start a job in a virtualized environment may be included.

In at least one embodiment, a dedicated-process programming model is implementation-specific. In this model, a single process owns graphics acceleration module 1546 or an individual graphics processing engine 1531. Because graphics acceleration module 1546 is owned by a single process, a hypervisor initializes accelerator integration circuit 1536 for an owning partition and an operating system initializes accelerator integration circuit 1536 for an owning process when graphics acceleration module 1546 is assigned.

In operation, a WD fetch unit 1591 in accelerator integration slice 1590 fetches next WD 1584 which includes an indication of work to be done by one or more graphics processing engines of graphics acceleration module 1546. Data from WD 1584 may be stored in registers 1545 and used by MMU 1539, interrupt management circuit 1547 and/or context management circuit 1548 as illustrated. For example, one embodiment of MMU 1539 includes segment/ page walk circuitry for accessing segment/page tables 1586 within OS virtual address space 1585. Interrupt management circuit 1547 may process interrupt events 1592 received from graphics acceleration module 1546. When performing graphics operations, an effective address 1593 generated by a graphics processing engine 1531-1532, N is translated to a real address by MMU 1539.

In one embodiment, a same set of registers 1545 are duplicated for each graphics processing engine 1531-1532, N and/or graphics acceleration module 1546 and may be initialized by a hypervisor or operating system. Each of these duplicated registers may be included in an accelerator integration slice 1590. Exemplary registers that may be initialized by a hypervisor are shown in Table 1.

TABLE 1

| Hypervisor Initialized Registers |
| --- |
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
| --- |
| 1  Process and Thread Identification |
| 2  Effective Address (EA) Context Save/Restore Pointer |
| 3  Virtual Address (VA) Accelerator Utilization Record Pointer |
| 4  Virtual Address (VA) Storage Segment Table Pointer |
| 5  Authority Mask |
| 6  Work descriptor |

In one embodiment, each WD 1584 is specific to a particular graphics acceleration module 1546 and/or graphics processing engines 1531-1532, N. It contains all information required by a graphics processing engine 1531-1532, N to do work or it can be a pointer to a memory location where an application has set up a command queue of work to be completed.

Figure 15E:
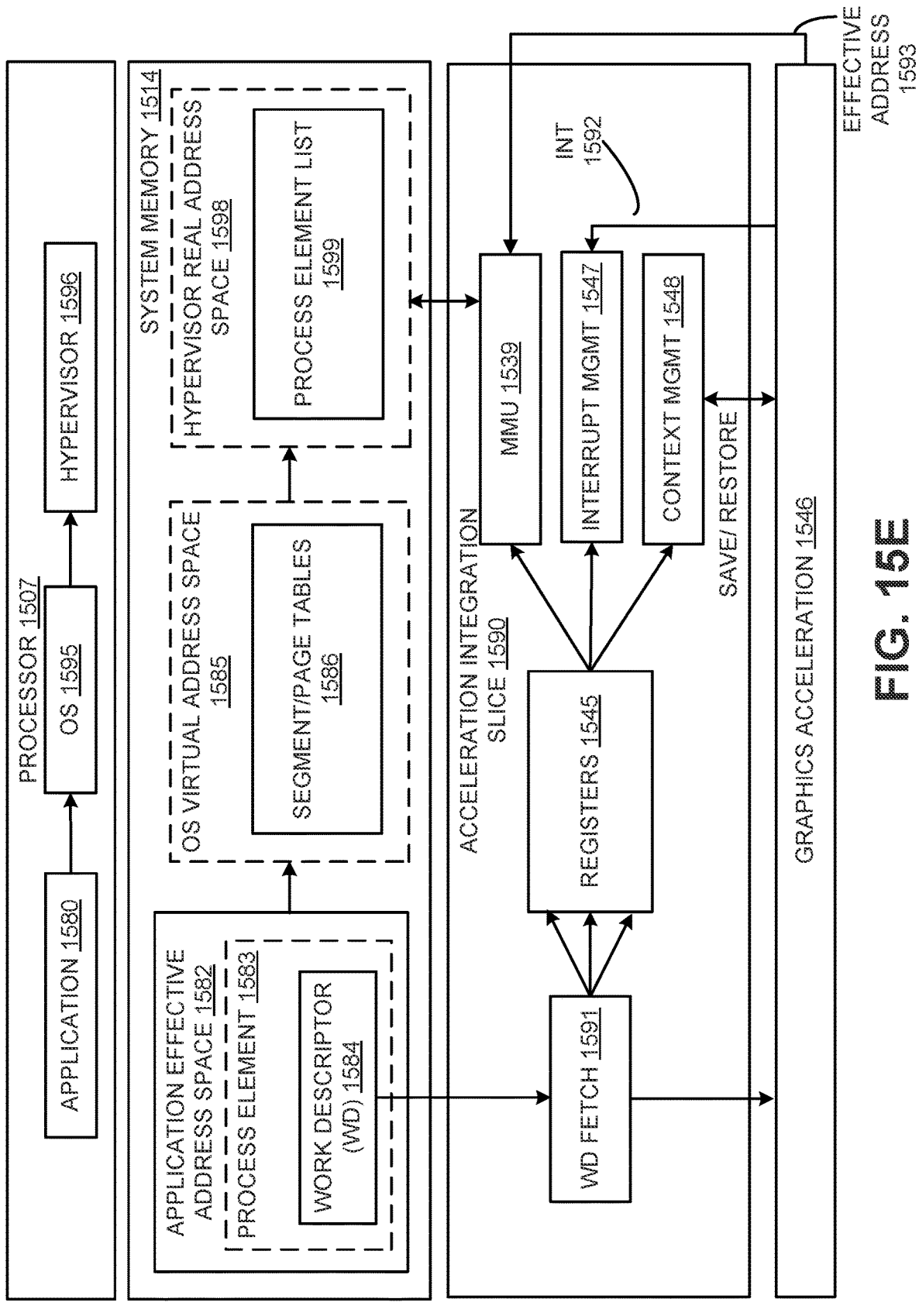
FIGS. 15E and 15F illustrate a shared programming model, according to at least one embodiment.

FIG. 15E illustrates additional details for one exemplary embodiment of a shared model. This embodiment includes a hypervisor real address space 1598 in which a process element list 1599 is stored. Hypervisor real address space 1598 is accessible via a hypervisor 1596 which virtualizes graphics acceleration module engines for operating system 1595.

In at least one embodiment, shared programming models allow for all or a subset of processes from all or a subset of partitions in a system to use a graphics acceleration module 1546. There are two programming models where graphics acceleration module 1546 is shared by multiple processes and partitions: time-sliced shared and graphics directed shared.

In this model, system hypervisor 1596 owns graphics acceleration module 1546 and makes its function available to all operating systems 1595. For a graphics acceleration module 1546 to support virtualization by system hypervisor 1596, graphics acceleration module 1546 may adhere to the following: 1) An application's job request must be autonomous (that is, state does not need to be maintained between jobs), or graphics acceleration module 1546 must provide a context save and restore mechanism. 2) An application's job request is guaranteed by graphics acceleration module 1546 to complete in a specified amount of time, including any translation faults, or graphics acceleration module 1546 provides an ability to preempt processing of a job. 3) Graphics acceleration module 1546 must be guaranteed fairness between processes when operating in a directed shared programming model.

In at least one embodiment, application 1580 is required to make an operating system 1595 system call with a graphics acceleration module 1546 type, a work descriptor (WD), an authority mask register (AMR) value, and a context save/restore area pointer (CSRP). In at least one embodiment, graphics acceleration module 1546 type describes a targeted acceleration function for a system call. In at least one embodiment, graphics acceleration module 1546 type may be a system-specific value. In at least one embodiment, WD is formatted specifically for graphics acceleration module 1546 and can be in a form of a graphics acceleration module 1546 command, an effective address pointer to a user-defined structure, an effective address pointer to a queue of commands, or any other data structure to describe work to be done by graphics acceleration module 1546. In one embodiment, an AMR value is an AMR state to use for a current process. In at least one embodiment, a value passed to an operating system is similar to an application setting an AMR. If accelerator integration circuit 1536 and graphics acceleration module 1546 implementations do not support a User Authority Mask Override Register (UAMOR), an operating system may apply a current UAMOR value to an AMR value before passing an AMR in a hypervisor call. Hypervisor 1596 may optionally apply a current Authority Mask Override Register (AMOR) value before placing an AMR into process element 1583. In at least one embodiment, CSRP is one of registers 1545 containing an effective address of an area in an application's address space 1582 for graphics acceleration module 1546 to save and restore context state. This pointer is optional if no state is required to be saved between jobs or when a job is preempted. In at least one embodiment, context save/restore area may be pinned system memory.

Upon receiving a system call, operating system 1595 may verify that application 1580 has registered and been given authority to use graphics acceleration module 1546. Operating system 1595 then calls hypervisor 1596 with information shown in Table 3.

TABLE 3

| OS to Hypervisor Call Parameters |
| --- |
| 1  A work descriptor (WD) |
| 2  An Authority Mask Register (AMR) value (potentially masked) |
| 3  An effective address (EA) Context Save/Restore Area Pointer (CSRP) |
| 4  A process ID (PID) and optional thread ID (TID) |
| 5  A virtual address (VA) accelerator utilization record pointer (AURP) |
| 6  Virtual address of storage segment table pointer (SSTP) |
| 7  A logical interrupt service number (LISN) |

Upon receiving a hypervisor call, hypervisor 1596 verifies that operating system 1595 has registered and been given authority to use graphics acceleration module 1546. Hypervisor 1596 then puts process element 1583 into a process element linked list for a corresponding graphics acceleration module 1546 type. A process element may include information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)
7 A logical interrupt service number (LISN)
8 Interrupt vector table, derived from hypervisor call parameters
9 A state register (SR) value
10 A logical partition ID (LPID)
11 A real address (RA) hypervisor accelerator utilization record pointer
12 Storage Descriptor Register (SDR)

In at least one embodiment, hypervisor initializes a plurality of accelerator integration slice 1590 registers 1545.

Figure 15F:
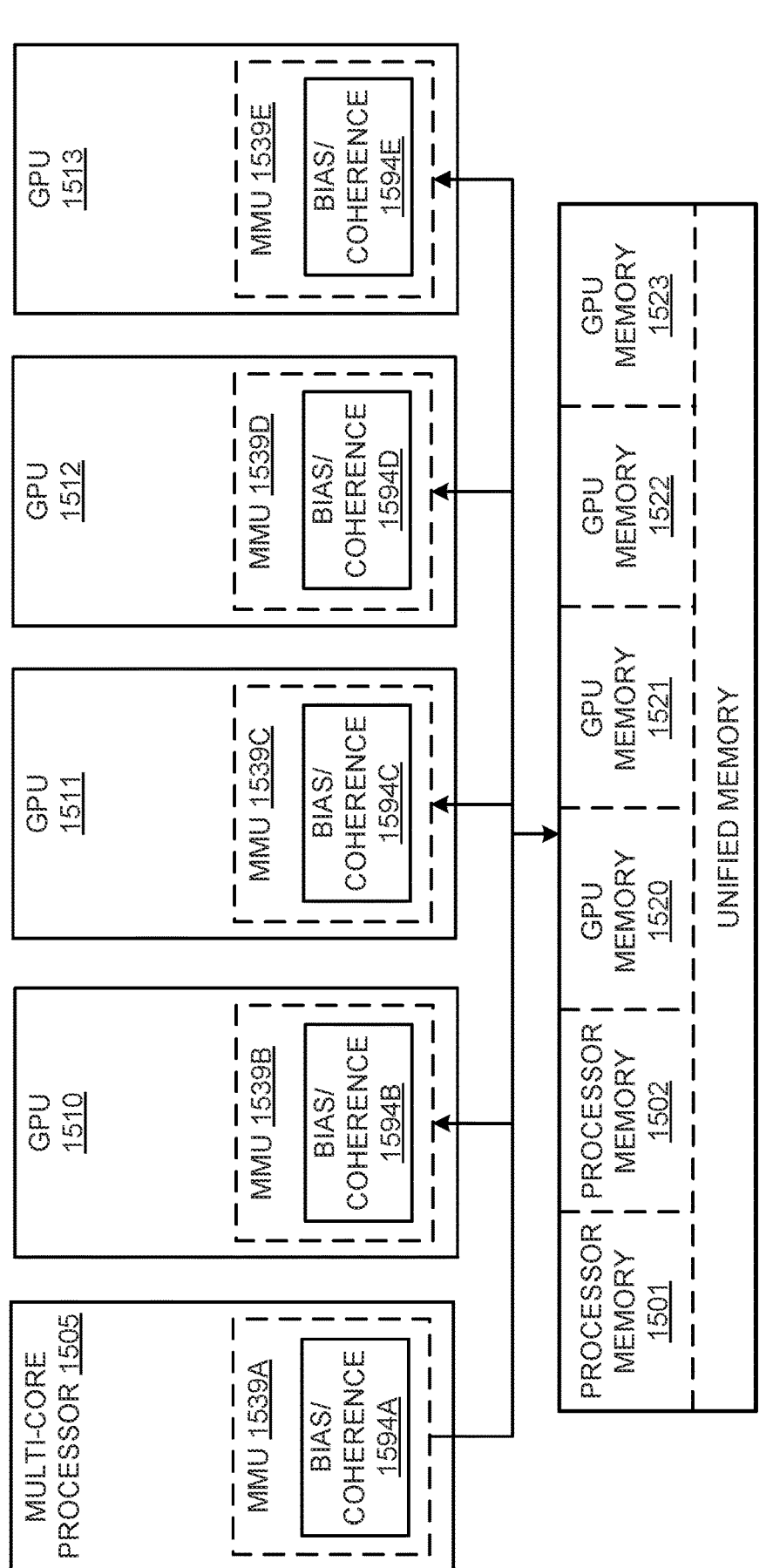

As illustrated in FIG. 15F, in at least one embodiment, a unified memory is used, addressable via a common virtual memory address space used to access physical processor memories 1501-1502 and GPU memories 1520-1523. In this implementation, operations executed on GPUs 1510-1513 utilize a same virtual/effective memory address space to access processor memories 1501-1502 and vice versa, thereby simplifying programmability. In one embodiment, a first portion of a virtual/effective address space is allocated to processor memory 1501, a second portion to second processor memory 1502, a third portion to GPU memory 1520, and so on. In at least one embodiment, an entire virtual/effective memory space (sometimes referred to as an effective address space) is thereby distributed across each of processor memories 1501-1502 and GPU memories 1520-1523, allowing any processor or GPU to access any physical memory with a virtual address mapped to that memory.

In one embodiment, bias/coherence management circuitry 1594A-1594E within one or more of MMUs 1539A-1539E ensures cache coherence between caches of one or more host processors (e.g., 1505) and GPUs 1510-1513 and implements biasing techniques indicating physical memories in which certain types of data should be stored. While multiple instances of bias/coherence management circuitry 1594A-1594E are illustrated in FIG. 15F, bias/coherence circuitry may be implemented within an MMU of one or more host processors 1505 and/or within accelerator integration circuit 1536.

One embodiment allows GPU-attached memory 1520-1523 to be mapped as part of system memory, and accessed using shared virtual memory (SVM) technology, but without suffering performance drawbacks associated with full system cache coherence. In at least one embodiment, an ability for GPU-attached memory 1520-1523 to be accessed as system memory without onerous cache coherence overhead provides a beneficial operating environment for GPU offload. This arrangement allows host processor 1505 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 1520-1523 without cache coherence overheads can be critical to execution time of an offloaded computation. In cases with substantial streaming write memory traffic, for example, cache coherence overhead can significantly reduce an effective write bandwidth seen by a GPU 1510-1513. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 1520-1523, with or without a bias cache in GPU 1510-1513 (e.g., to cache frequently/recently used entries of a bias table). Alternatively, an entire bias table may be maintained within a GPU.

In at least one embodiment, a bias table entry associated with each access to GPU-attached memory 1520-1523 is accessed prior to actual access to a GPU memory, causing the following operations. First, local requests from GPU 1510-1513 that find their page in GPU bias are forwarded directly to a corresponding GPU memory 1520-1523. Local requests from a GPU that find their page in host bias are forwarded to processor 1505 (e.g., over a high-speed link as discussed above). In one embodiment, requests from processor 1505 that find a requested page in host processor bias complete a request like a normal memory read. Alternatively, requests directed to a GPU-biased page may be forwarded to GPU 1510-1513. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 1505 bias to GPU bias, but is not for an opposite transition.

In one embodiment, cache coherency is maintained by temporarily rendering GPU-biased pages uncacheable by host processor 1505. To access these pages, processor 1505 may request access from GPU 1510 which may or may not grant access right away. Thus, to reduce communication between processor 1505 and GPU 1510 it is beneficial to ensure that GPU-biased pages are those which are required by a GPU but not host processor 1505 and vice versa.

Figure 16:
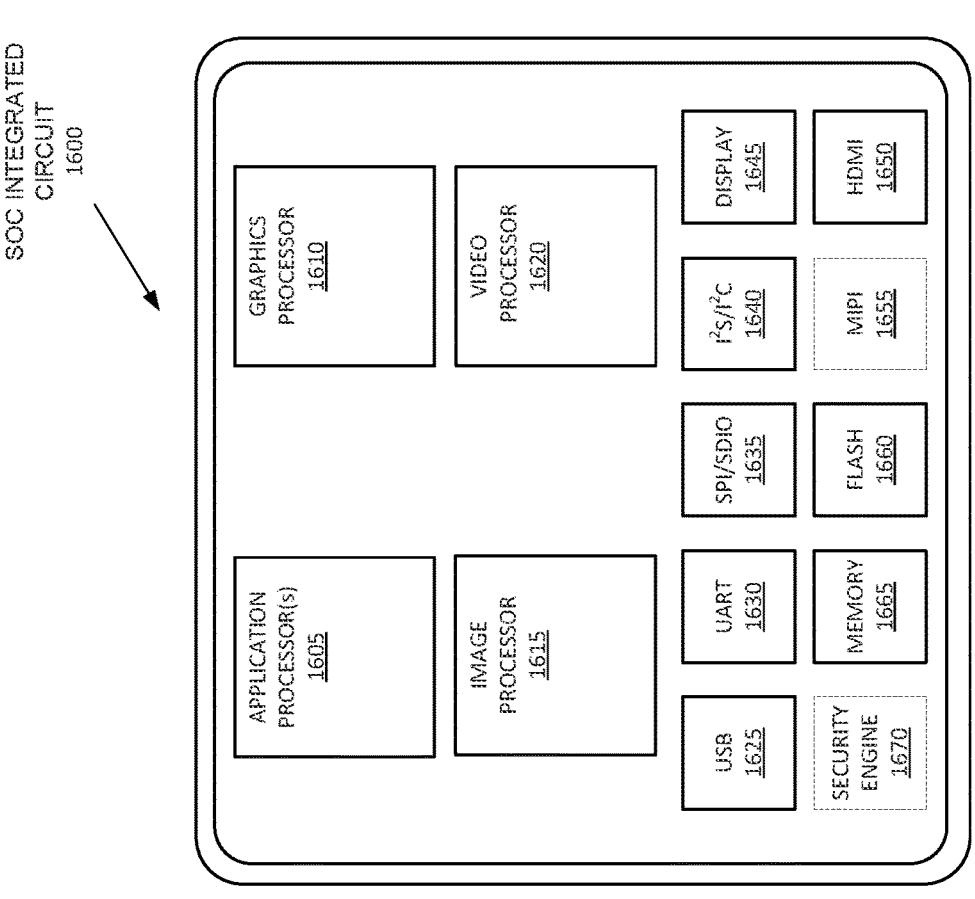
FIG. 16 illustrates exemplary integrated circuits and associated graphics processors, according to at least one embodiment.

FIG. 16 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 16 is a block diagram illustrating an exemplary system on a chip integrated circuit 1600 that may be fabricated using one or more IP cores, according to at least one embodiment. In at least one embodiment, integrated circuit 1600 are a part of first processor 125 or second processor 130, wherein integrated circuit 1600 can perform processes and flows disclosed in FIGS. 3-6. In at least one embodiment, integrated circuit 1600 includes one or more application processor(s) 1605 (e.g., CPUs), at least one graphics processor 1610, and may additionally include an image processor 1615 and/or a video processor 1620, any of which may be a modular IP core. In at least one embodiment, integrated circuit 1600 includes peripheral or bus logic including a USB controller 1625, UART controller 1630, an SPI/SDIO controller 1635, and an I.sup.2S/I.sup.2C controller 1640. In at least one embodiment, integrated circuit 1600 can include a display device 1645 coupled to one or more of a high-definition multimedia interface (HDMI) controller 1650 and a mobile industry processor interface (MIPI) display interface 1655. In at least one embodiment, storage may be provided by a flash memory subsystem 1660 including flash memory and a flash memory controller. In at least one embodiment, memory interface may be provided via a memory controller 1665 for access to SDRAM or SRAM memory devices. In at least one embodiment, some integrated circuits additionally include an embedded security engine 1670.

Figure 17A:
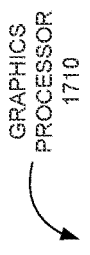
FIGS. 17A and 17B illustrate exemplary integrated circuits and associated graphics processors, according to at least one embodiment.
Figure 17A:
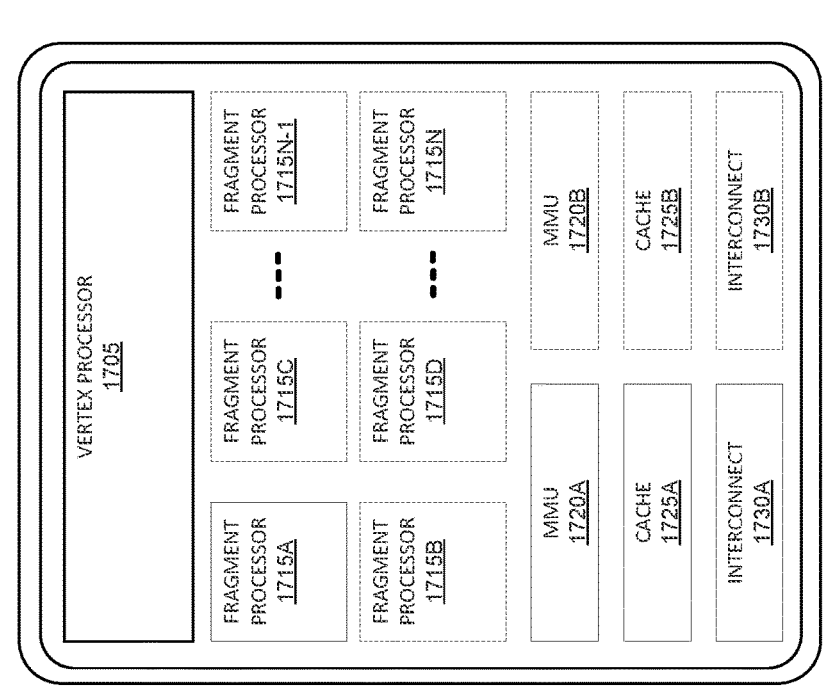
Figure 17B:
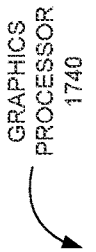
Figure 17B:
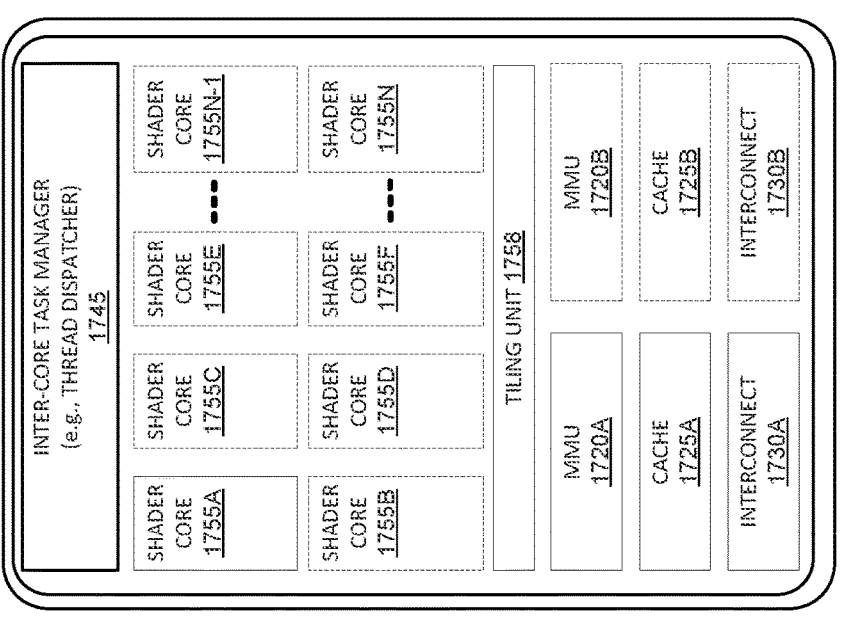

FIGS. 17A-17B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 17A-17B are block diagrams illustrating exemplary graphics processors for use within an SoC, according to embodiments described herein. FIG. 17A illustrates an exemplary graphics processor 1710 of a system on a chip integrated circuit that may be fabricated using one or more IP cores, according to at least one embodiment. In at least one embodiment, graphics processor 1710 are a part of first processor 125 or second processor 130, wherein graphics processor 1710 can perform processes and flows disclosed in FIGS. 3-6. FIG. 17B illustrates an additional exemplary graphics processor 1740 of a system on a chip integrated circuit that may be fabricated using one or more IP cores, according to at least one embodiment. In at least one embodiment, graphics processor 1710 of FIG. 17A is a low power graphics processor core. In at least one embodiment, graphics processor 1740 of FIG. 17B is a higher performance graphics processor core. In at least one embodiment, each of graphics processors 1710, 1740 can be variants of graphics processor 1610 of FIG. 16.

In at least one embodiment, graphics processor 1710 includes a vertex processor 1705 and one or more fragment processor(s) 1715A-1715N (e.g., 1715A, 1715B, 1715C, 1715D, through 1715N-1, and 1715N). In at least one embodiment, graphics processor 1710 can execute different shader programs via separate logic, such that vertex processor 1705 is optimized to execute operations for vertex shader programs, while one or more fragment processor(s) 1715A-1715N execute fragment (e.g., pixel) shading operations for fragment or pixel shader programs. In at least one embodiment, vertex processor 1705 performs a vertex processing stage of a 3D graphics pipeline and generates primitives and vertex data. In at least one embodiment, fragment processor(s) 1715A-1715N use primitive and vertex data generated by vertex processor 1705 to produce a framebuffer that is displayed on a display device. In at least one embodiment, fragment processor(s) 1715A-1715N are optimized to execute fragment shader programs as provided for in an OpenGL API, which may be used to perform similar operations as a pixel shader program as provided for in a Direct 3D API.

In at least one embodiment, graphics processor 1710 additionally includes one or more memory management units (MMUs) 1720A-1720B, cache(s) 1725A-1725B, and circuit interconnect(s) 1730A-1730B. In at least one embodiment, one or more MMU(s) 1720A-1720B provide for virtual to physical address mapping for graphics processor 1710, including for vertex processor 1705 and/or fragment processor(s) 1715A-1715N, which may reference vertex or image/texture data stored in memory, in addition to vertex or image/texture data stored in one or more cache(s) 1725A-1725B. In at least one embodiment, one or more MMU(s) 1720A-1720B may be synchronized with other MMUs within system, including one or more MMUs associated with one or more application processor(s) 1605, image processors 1615, and/or video processors 1620 of FIG. 16, such that each processor 1605-1620 can participate in a shared or unified virtual memory system. In at least one embodiment, one or more circuit interconnect(s) 1730A-1730B enable graphics processor 1710 to interface with other IP cores within SoC, either via an internal bus of SoC or via a direct connection.

In at least one embodiment, graphics processor 1740 includes one or more MMU(s) 1720A-1720B, caches 1725A-1725B, and circuit interconnects 1730A-1730B of graphics processor 1710 of FIG. 17A. In at least one embodiment, graphics processor 1740 includes one or more shader core(s) 1755A-1755N (e.g., 1755A, 1755B, 1755C, 1755D, 1755E, 1755F, through 1755N-1, and 1755N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1740 includes an inter-core task manager 1745, which acts as a thread dispatcher to dispatch execution threads to one or more shader cores 1755A-1755N and a tiling unit 1758 to accelerate tiling operations for tile-based rendering, in which rendering operations for a scene are subdivided in image space, for example to exploit local spatial coherence within a scene or to optimize use of internal caches.

Figure 18A:
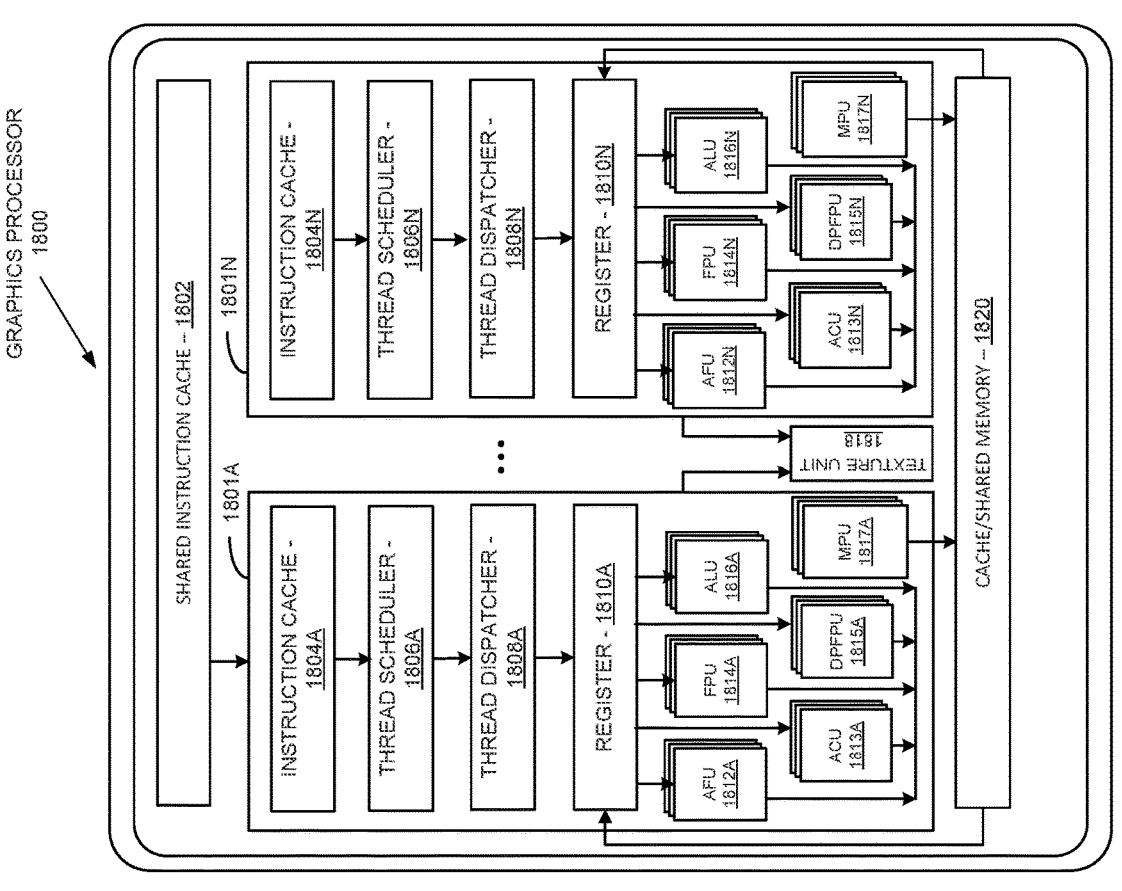
FIGS. 18A and 18B illustrate additional exemplary graphics processor logic according to at least one embodiment.
Figure 18B:
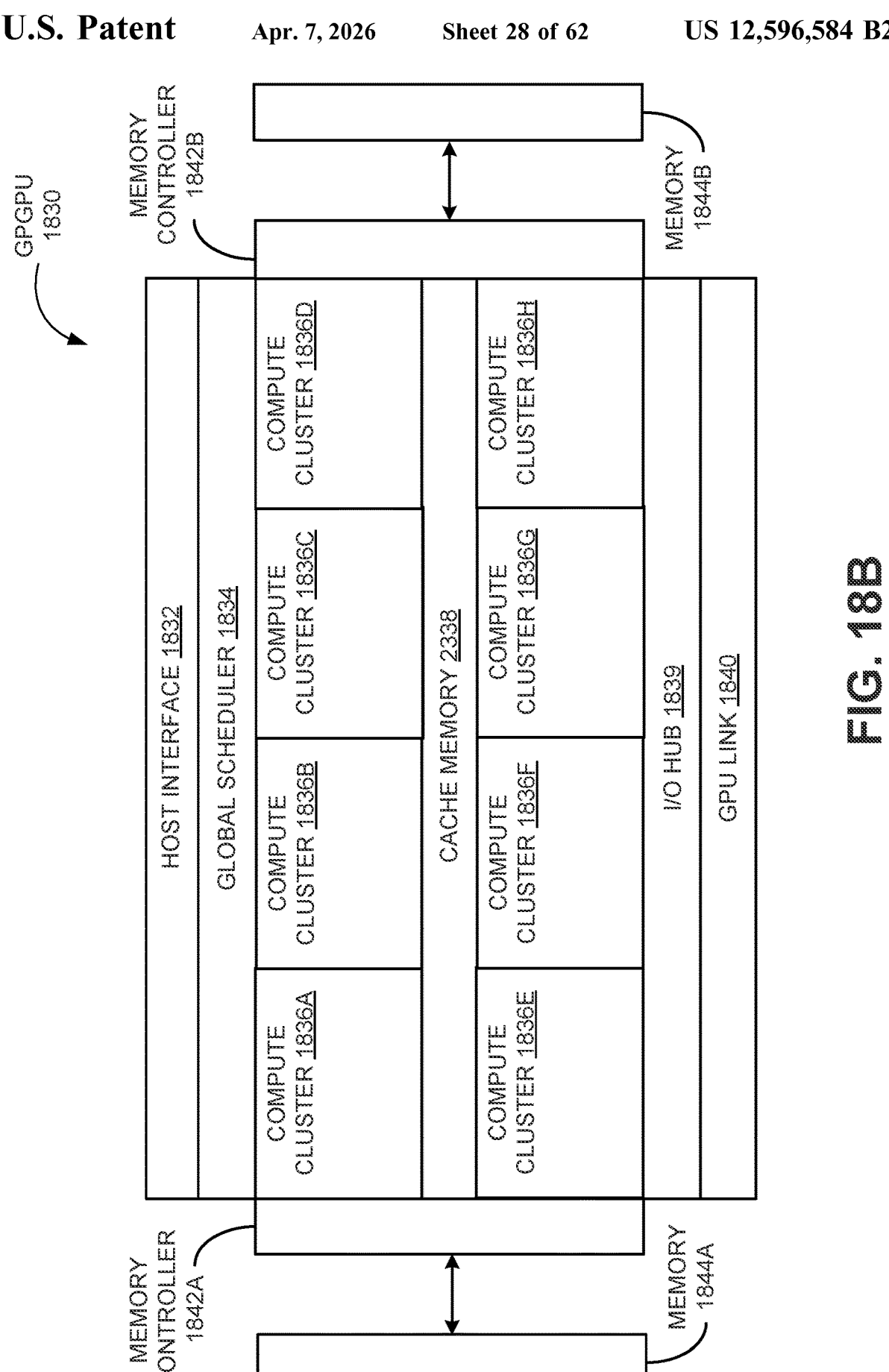

FIGS. 18A-18B illustrate additional exemplary graphics processor logic according to embodiments described herein. FIG. 18A illustrates a graphics core 1800 that may be included within graphics processor 1610 of FIG. 16, in at least one embodiment, and may be a unified shader core 1755A-1755N as in FIG. 17B in at least one embodiment. FIG. 18B illustrates a highly-parallel general-purpose graphics processing unit 1830 suitable for deployment on a multi-chip module in at least one embodiment.

In at least one embodiment, graphics core 1800 includes a shared instruction cache 1802, a texture unit 1818, and a cache/shared memory 1820 that are common to execution resources within graphics core 1800. In at least one embodiment, graphics core 1800 can include multiple slices 1801A-1801N or partition for each core, and a graphics processor can include multiple instances of graphics core 1800. Slices 1801A-1801N can include support logic including a local instruction cache 1804A-1804N, a thread scheduler 1806A-1806N, a thread dispatcher 1808A-1808N, and a set of registers 1810A-1810N. In at least one embodiment, slices 1801A-1801N can include a set of additional function units (AFUs 1812A-1812N), floating-point units (FPU 1814A-1814N), integer arithmetic logic units (ALUs 1816-1816N), address computational units (ACU 1813A-1813N), double-precision floating-point units (DPFPU 1815A-1815N), and matrix processing units (MPU 1817A-1817N).

In at least one embodiment, FPUs 1814A-1814N can perform single-precision (32-bit) and half-precision (16-bit)

floating point operations, while DPFPUs 1815A-1815N perform double precision (64-bit) floating point operations. In at least one embodiment, ALUs 1816A-1816N can perform variable precision integer operations at 8-bit, 16-bit, and 32-bit precision, and can be configured for mixed precision operations. In at least one embodiment, MPUs 1817A-1817N can also be configured for mixed precision matrix operations, including half-precision floating point and 8-bit integer operations. In at least one embodiment, MPUs 1817-1817N can perform a variety of matrix operations to accelerate machine learning application frameworks, including enabling support for accelerated general matrix to matrix multiplication (GEMM). In at least one embodiment, AFUs 1812A-1812N can perform additional logic operations not supported by floating-point or integer units, including trigonometric operations (e.g., Sine).

FIG. 18B illustrates a general-purpose processing unit (GPGPU) 1830 that can be configured to enable highly-parallel compute operations to be performed by an array of graphics processing units, in at least one embodiment. In at least one embodiment, GPGPU 1830 can be linked directly to other instances of GPGPU 1830 to create a multi-GPU cluster to improve training speed for deep neural networks. In at least one embodiment, GPGPU 1830 includes a host interface 1832 to enable a connection with a host processor. In at least one embodiment, host interface 1832 is a PCI Express interface. In at least one embodiment, host interface 1832 can be a vendor specific communications interface or communications fabric. In at least one embodiment, GPGPU 1830 receives commands from a host processor and uses a global scheduler 1834 to distribute execution threads associated with those commands to a set of compute clusters 1836A-1836H. In at least one embodiment, compute clusters 1836A-1836H share a cache memory 1838. In at least one embodiment, cache memory 1838 can serve as a higher-level cache for cache memories within compute clusters 1836A-1836H.

In at least one embodiment, GPGPU 1830 includes memory 1844A-1844B coupled with compute clusters 1836A-1836H via a set of memory controllers 1842A-1842B. In at least one embodiment, memory 1844A-1844B can include various types of memory devices including dynamic random access memory (DRAM) or graphics random access memory, such as synchronous graphics random access memory (SGRAM), including graphics double data rate (GDDR) memory.

In at least one embodiment, compute clusters 1836A-1836H each include a set of graphics cores, such as graphics core 1800 of FIG. 18A, which can include multiple types of integer and floating point logic units that can perform computational operations at a range of precisions including suited for machine learning computations. For example, in at least one embodiment, at least a subset of floating point units in each of compute clusters 1836A-1836H can be configured to perform 16-bit or 32-bit floating point operations, while a different subset of floating point units can be configured to perform 64-bit floating point operations.

In at least one embodiment, multiple instances of GPGPU 1830 can be configured to operate as a compute cluster. In at least one embodiment, communication used by compute clusters 1836A-1836H for synchronization and data exchange varies across embodiments. In at least one embodiment, multiple instances of GPGPU 1830 communicate over host interface 1832. In at least one embodiment, GPGPU 1830 includes an I/O hub 1839 that couples GPGPU 1830 with a GPU link 1840 that enables a direct connection to other instances of GPGPU 1830. In at least one embodiment, GPU link 1840 is coupled to a dedicated GPU-to-GPU bridge that enables communication and synchronization between multiple instances of GPGPU 1830. In at least one embodiment GPU link 1840 couples with a high-speed interconnect to transmit and receive data to other GPGPUs or parallel processors. In at least one embodiment, multiple instances of GPGPU 1830 are located in separate data processing systems and communicate via a network device that is accessible via host interface 1832. In at least one embodiment GPU link 1840 can be configured to enable a connection to a host processor in addition to or as an alternative to host interface 1832.

In at least one embodiment, GPGPU 1830 can be configured to train neural networks. In at least one embodiment, GPGPU 1830 can be used within an inferencing platform. In at least one embodiment, in which GPGPU 1830 is used for inferencing, GPGPU may include fewer compute clusters 1836A-1836H relative to when GPGPU is used for training a neural network. In at least one embodiment, memory technology associated with memory 1844A-1844B may differ between inferencing and training configurations, with higher bandwidth memory technologies devoted to training configurations. In at least one embodiment, inferencing configuration of GPGPU 1830 can support inferencing specific instructions. For example, in at least one embodiment, an inferencing configuration can provide support for one or more 8-bit integer dot product instructions, which may be used during inferencing operations for deployed neural networks.

Figure 19:
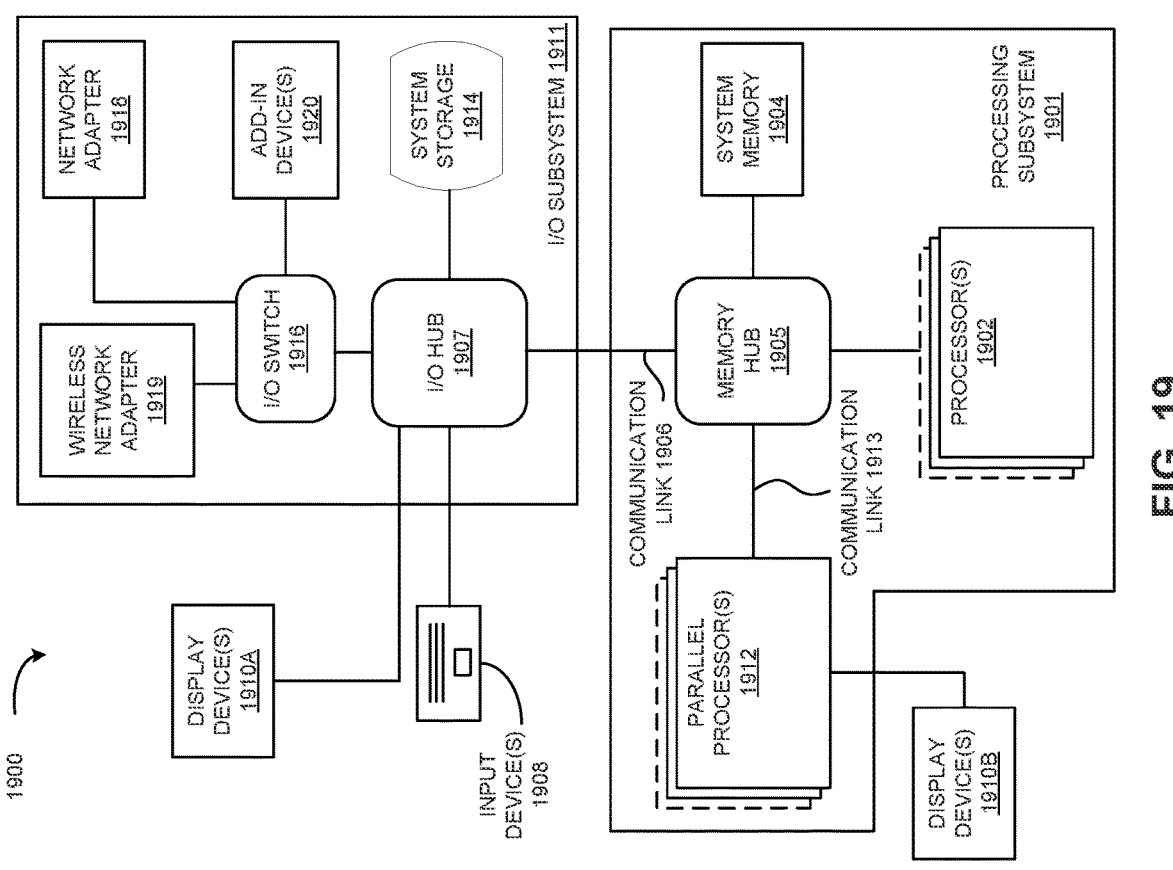
FIG. 19 illustrates a computer system, according to at least one embodiment.

FIG. 19 is a block diagram illustrating a computing system 1900 according to at least one embodiment. In at least one embodiment, computing system 1900 includes a first processor 125 or second processor 130, wherein computing system 1900 can perform processes and flows disclosed in FIGS. 3-6. In at least one embodiment, computing system 1900 includes a processing subsystem 1901 having one or more processor(s) 1902 and a system memory 1904 communicating via an interconnection path that may include a memory hub 1905. In at least one embodiment, memory hub 1905 may be a separate component within a chipset component or may be integrated within one or more processor(s) 1902. In at least one embodiment, memory hub 1905 couples with an I/O subsystem 1911 via a communication link 1906. In at least one embodiment, I/O subsystem 1911 includes an I/O hub 1907 that can enable computing system 1900 to receive input from one or more input device(s) 1908. In at least one embodiment, I/O hub 1907 can enable a display controller, which may be included in one or more processor(s) 1902, to provide outputs to one or more display device(s) 1910A. In at least one embodiment, one or more display device(s) 1910A coupled with I/O hub 1907 can include a local, internal, or embedded display device.

In at least one embodiment, processing subsystem 1901 includes one or more parallel processor(s) 1912 coupled to memory hub 1905 via a bus or other communication link 1913. In at least one embodiment, communication link 1913 may be one of any number of standards based communication link technologies or protocols, such as, but not limited to PCI Express, or may be a vendor specific communications interface or communications fabric. In at least one embodiment, one or more parallel processor(s) 1912 form a computationally focused parallel or vector processing system that can include a large number of processing cores and/or processing clusters, such as a many integrated core (MIC) processor. In at least one embodiment, one or more parallel processor(s) 1912 form a graphics processing subsystem that can output pixels to one of one or more display device(s) 1910A coupled via I/O Hub 1907. In at least one embodiment, one or more parallel processor(s) 1912 can also include a display controller and display interface (not shown) to enable a direct connection to one or more display device(s) 1910B.

In at least one embodiment, a system storage unit 1914 can connect to I/O hub 1907 to provide a storage mechanism for computing system 1900. In at least one embodiment, an I/O switch 1916 can be used to provide an interface mechanism to enable connections between I/O hub 1907 and other components, such as a network adapter 1918 and/or wireless network adapter 1919 that may be integrated into platform, and various other devices that can be added via one or more add-in device(s) 1920. In at least one embodiment, network adapter 1918 can be an Ethernet adapter or another wired network adapter. In at least one embodiment, wireless network adapter 1919 can include one or more of a Wi-Fi, Bluetooth, near field communication (NFC), or other network device that includes one or more wireless radios.

In at least one embodiment, computing system 1900 can include other components not explicitly shown, including USB or other port connections, optical storage drives, video capture devices, and like, may also be connected to I/O hub 1907. In at least one embodiment, communication paths interconnecting various components in FIG. 19 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 1912 incorporate circuitry optimized for graphics and video processing, including, for example, video output circuitry, and constitutes a graphics processing unit (GPU). In at least one embodiment, one or more parallel processor(s) 1912 incorporate circuitry optimized for general purpose processing. In at least embodiment, components of computing system 1900 may be integrated with one or more other system elements on a single integrated circuit. For example, in at least one embodiment, one or more parallel processor(s) 1912, memory hub 1905, processor(s) 1902, and I/O hub 1907 can be integrated into a system on chip (SoC) integrated circuit. In at least one embodiment, components of computing system 1900 can be integrated into a single package to form a system in package (SIP) configuration. In at least one embodiment, at least a portion of components of computing system 1900 can be integrated into a multi-chip module (MCM), which can be interconnected with other multi-chip modules into a modular computing system.

Processors

Figure 20A:
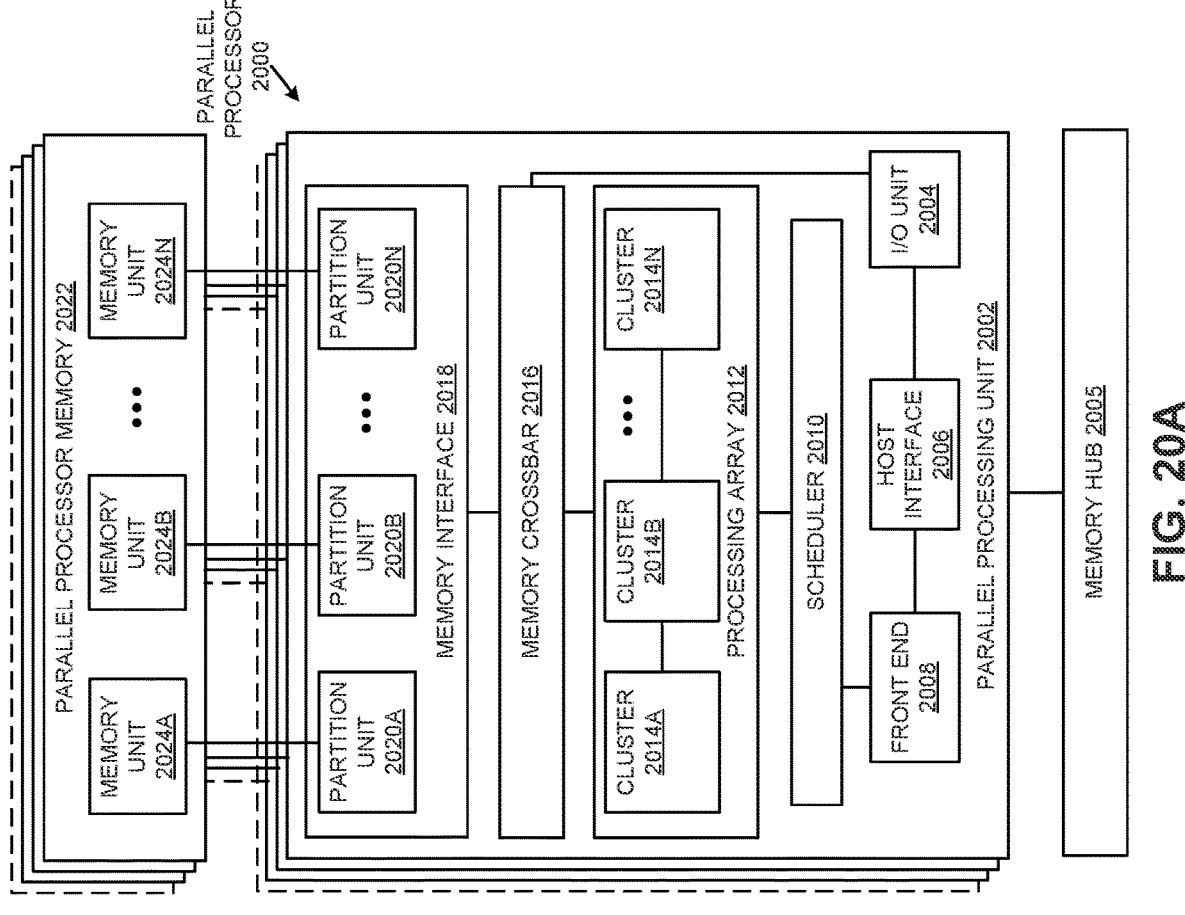
FIG. 20A illustrates a parallel processor, according to at least one embodiment.

FIG. 20A illustrates a parallel processor 2000 according to at least on embodiment. In at least one embodiment, parallel processor 2000 includes a first processor 125 or second processor 130, wherein parallel processor 2000 can perform processes and flows disclosed in FIGS. 3-6. In at least one embodiment, various components of parallel processor 2000 may be implemented using one or more integrated circuit devices, such as programmable processors, application specific integrated circuits (ASICs), or field programmable gate arrays (FPGA). In at least one embodiment, illustrated parallel processor 2000 is a variant of one or more parallel processor(s) 1912 shown in FIG. 19 according to an exemplary embodiment.

In at least one embodiment, parallel processor 2000 includes a parallel processing unit 2002. In at least one embodiment, parallel processing unit 2002 includes an I/O unit 2004 that enables communication with other devices, including other instances of parallel processing unit 2002. In at least one embodiment, I/O unit 2004 may be directly connected to other devices. In at least one embodiment, I/O unit 2004 connects with other devices via use of a hub or switch interface, such as memory hub 1905. In at least one embodiment, connections between memory hub 1905 and I/O unit 2004 form a communication link 1913. In at least one embodiment, I/O unit 2004 connects with a host interface 2006 and a memory crossbar 2016, where host interface 2006 receives commands directed to performing processing operations and memory crossbar 2016 receives commands directed to performing memory operations.

In at least one embodiment, when host interface 2006 receives a command buffer via I/O unit 2004, host interface 2006 can direct work operations to perform those commands to a front end 2008. In at least one embodiment, front end 2008 couples with a scheduler 2010, which is configured to distribute commands or other work items to a processing cluster array 2012. In at least one embodiment, scheduler 2010 ensures that processing cluster array 2012 is properly configured and in a valid state before tasks are distributed to processing cluster array 2012 of processing cluster array 2012. In at least one embodiment, scheduler 2010 is implemented via firmware logic executing on a microcontroller. In at least one embodiment, microcontroller implemented scheduler 2010 is configurable to perform complex scheduling and work distribution operations at coarse and fine granularity, enabling rapid preemption and context switching of threads executing on processing array 2012. In at least one embodiment, host software can prove workloads for scheduling on processing array 2012 via one of multiple graphics processing doorbells. In at least one embodiment, workloads can then be automatically distributed across processing array 2012 by scheduler 2010 logic within a microcontroller including scheduler 2010.

In at least one embodiment, processing cluster array 2012 can include up to "N" processing clusters (e.g., cluster 2014A, cluster 2014B, through cluster 2014N). In at least one embodiment, each cluster 2014A-2014N of processing cluster array 2012 can execute a large number of concurrent threads. In at least one embodiment, scheduler 2010 can allocate work to clusters 2014A-2014N of processing cluster array 2012 using various scheduling and/or work distribution algorithms, which may vary depending on workload arising for each type of program or computation. In at least one embodiment, scheduling can be handled dynamically by scheduler 2010, or can be assisted in part by compiler logic during compilation of program logic configured for execution by processing cluster array 2012. In at least one embodiment, different clusters 2014A-2014N of processing cluster array 2012 can be allocated for processing different types of programs or for performing different types of computations.

In at least one embodiment, processing cluster array 2012 can be configured to perform various types of parallel processing operations. In at least one embodiment, processing cluster array 2012 is configured to perform general-purpose parallel compute operations. For example, in at least one embodiment, processing cluster array 2012 can include logic to execute processing tasks including filtering of video and/or audio data, performing modeling operations, including physics operations, and performing data transformations.

In at least one embodiment, processing cluster array 2012 is configured to perform parallel graphics processing operations. In at least one embodiment, processing cluster array 2012 can include additional logic to support execution of such graphics processing operations, including, but not limited to texture sampling logic to perform texture operations, as well as tessellation logic and other vertex processing logic. In at least one embodiment, processing cluster array 2012 can be configured to execute graphics processing related shader programs such as, but not limited to vertex shaders, tessellation shaders, geometry shaders, and pixel shaders. In at least one embodiment, parallel processing unit 2002 can transfer data from system memory via I/O unit 2004 for processing. In at least one embodiment, during processing, transferred data can be stored to on-chip memory (e.g., parallel processor memory 2022) during processing, then written back to system memory.

In at least one embodiment, when parallel processing unit 2002 is used to perform graphics processing, scheduler 2010 can be configured to divide a processing workload into approximately equal sized tasks, to better enable distribution of graphics processing operations to multiple clusters 2014A-2014N of processing cluster array 2012. In at least one embodiment, portions of processing cluster array 2012 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2014A-2014N may be stored in buffers to allow intermediate data to be transmitted between clusters 2014A-2014N for further processing.

In at least one embodiment, processing cluster array 2012 can receive processing tasks to be executed via scheduler 2010, which receives commands defining processing tasks from front end 2008. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2010 may be configured to fetch indices corresponding to tasks or may receive indices from front end 2008. In at least one embodiment, front end 2008 can be configured to ensure processing cluster array 2012 is configured to a valid state before a workload specified by incoming command buffers (e.g., batch-buffers, push buffers, etc.) is initiated.

In at least one embodiment, each of one or more instances of parallel processing unit 2002 can couple with parallel processor memory 2022. In at least one embodiment, parallel processor memory 2022 can be accessed via memory crossbar 2016, which can receive memory requests from processing cluster array 2012 as well as I/O unit 2004. In at least one embodiment, memory crossbar 2016 can access parallel processor memory 2022 via a memory interface 2018. In at least one embodiment, memory interface 2018 can include multiple partition units (e.g., partition unit 2020A, partition unit 2020B, through partition unit 2020N) that can each couple to a portion (e.g., memory unit) of parallel processor memory 2022. In at least one embodiment, a number of partition units 2020A-2020N is configured to be equal to a number of memory units, such that a first partition unit 2020A has a corresponding first memory unit 2024A, a second partition unit 2020B has a corresponding memory unit 2024B, and an Nth partition unit 2020N has a corresponding Nth memory unit 2024N. In at least one embodiment, a number of partition units 2020A-2020N may not be equal to a number of memory devices.

In at least one embodiment, memory units 2024A-2024N can include various types of memory devices, including dynamic random access memory (DRAM) or graphics random access memory, such as synchronous graphics random access memory (SGRAM), including graphics double data rate (GDDR) memory. In at least one embodiment, memory units 2024A-2024N may also include 3D stacked memory, including but not limited to high bandwidth memory (HBM). In at least one embodiment, render targets, such as frame buffers or texture maps may be stored across memory units 2024A-2024N, allowing partition units 2020A-2020N to write portions of each render target in parallel to efficiently use available bandwidth of parallel processor memory 2022. In at least one embodiment, a local instance of parallel processor memory 2022 may be excluded in favor of a unified memory design that utilizes system memory in conjunction with local cache memory.

In at least one embodiment, any one of clusters 2014A-2014N of processing cluster array 2012 can process data that will be written to any of memory units 2024A-2024N within parallel processor memory 2022. In at least one embodiment, memory crossbar 2016 can be configured to transfer an output of each cluster 2014A-2014N to any partition unit 2020A-2020N or to another cluster 2014A-2014N, which can perform additional processing operations on an output. In at least one embodiment, each cluster 2014A-2014N can communicate with memory interface 2018 through memory crossbar 2016 to read from or write to various external memory devices. In at least one embodiment, memory crossbar 2016 has a connection to memory interface 2018 to communicate with I/O unit 2004, as well as a connection to a local instance of parallel processor memory 2022, enabling processing units within different processing clusters 2014A-2014N to communicate with system memory or other memory that is not local to parallel processing unit 2002. In at least one embodiment, memory crossbar 2016 can use virtual channels to separate traffic streams between clusters 2014A-2014N and partition units 2020A-2020N.

In at least one embodiment, multiple instances of parallel processing unit 2002 can be provided on a single add-in card, or multiple add-in cards can be interconnected. In at least one embodiment, different instances of parallel processing unit 2002 can be configured to inter-operate even if different instances have different numbers of processing cores, different amounts of local parallel processor memory, and/or other configuration differences. For example, in at least one embodiment, some instances of parallel processing unit 2002 can include higher precision floating point units relative to other instances. In at least one embodiment, systems incorporating one or more instances of parallel processing unit 2002 or parallel processor 2000 can be implemented in a variety of configurations and form factors, including but not limited to desktop, laptop, or handheld personal computers, servers, workstations, game consoles, and/or embedded systems.

Figure 20B:
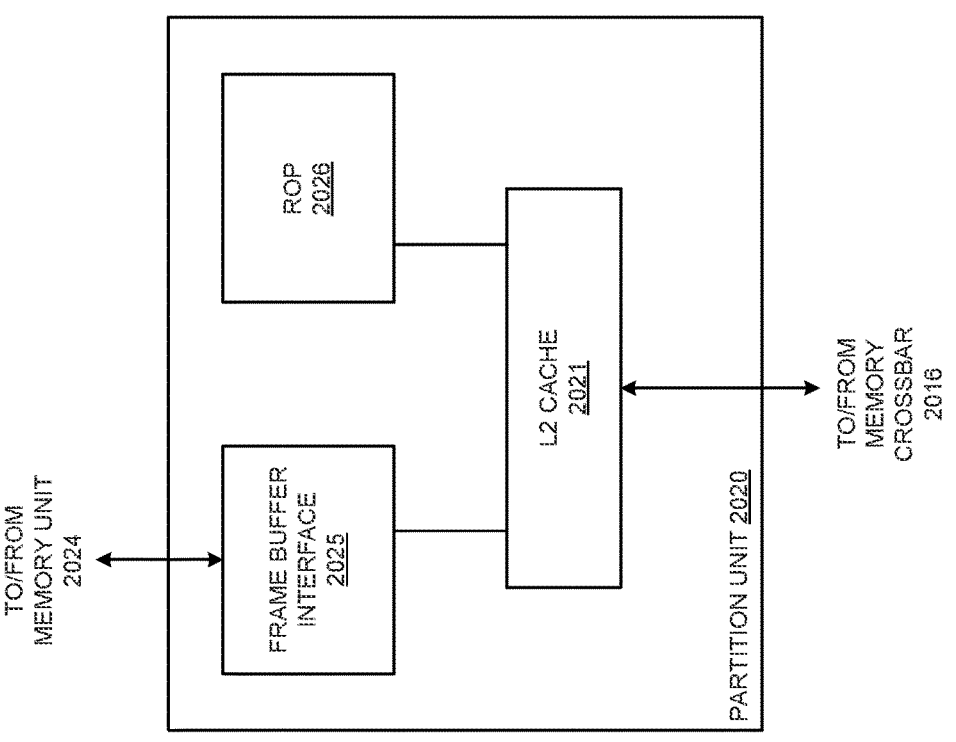
FIG. 20B illustrates a partition unit, according to at least one embodiment.

FIG. 20B is a block diagram of a partition unit 2020 according to at least one embodiment. In at least one embodiment, partition unit 2020 is an instance of one of partition units 2020A-2020N of FIG. 20A. In at least one embodiment, partition unit 2020 includes an L2 cache 2021, a frame buffer interface 2025, and a ROP 2026 (raster operations unit). L2 cache 2021 is a read/write cache that is configured to perform load and store operations received from memory crossbar 2016 and ROP 2026. In at least one embodiment, read misses and urgent write-back requests are output by L2 cache 2021 to frame buffer interface 2025 for processing. In at least one embodiment, updates can also be sent to a frame buffer via frame buffer interface 2025 for processing. In at least one embodiment, frame buffer interface 2025 interfaces with one of memory units in parallel processor memory, such as memory units 2024A-2024N of FIG. 20 (e.g., within parallel processor memory 2022).

In at least one embodiment, ROP 2026 is a processing unit that performs raster operations such as stencil, z test, blending, and like. In at least one embodiment, ROP 2026 then outputs processed graphics data that is stored in graphics memory. In at least one embodiment, ROP 2026 includes compression logic to compress depth or color data that is written to memory and decompress depth or color data that is read from memory. In at least one embodiment, compression logic can be lossless compression logic that makes use of one or more of multiple compression algorithms. In at least one embodiment, type of compression that is performed by ROP 2026 can vary based on statistical characteristics of data to be compressed. For example, in at least one embodiment, delta color compression is performed on depth and color data on a per-tile basis.

In at least one embodiment, ROP 2026 is included within each processing cluster (e.g., cluster 2014A-2014N of FIG. 20) instead of within partition unit 2020. In at least one embodiment, read and write requests for pixel data are transmitted over memory crossbar 2016 instead of pixel fragment data. In at least one embodiment, processed graphics data may be displayed on a display device, such as one of one or more display device(s) 1910 of FIG. 19, routed for further processing by processor(s) 1902, or routed for further processing by one of processing entities within parallel processor 2000 of FIG. 20A.

Figure 20C:
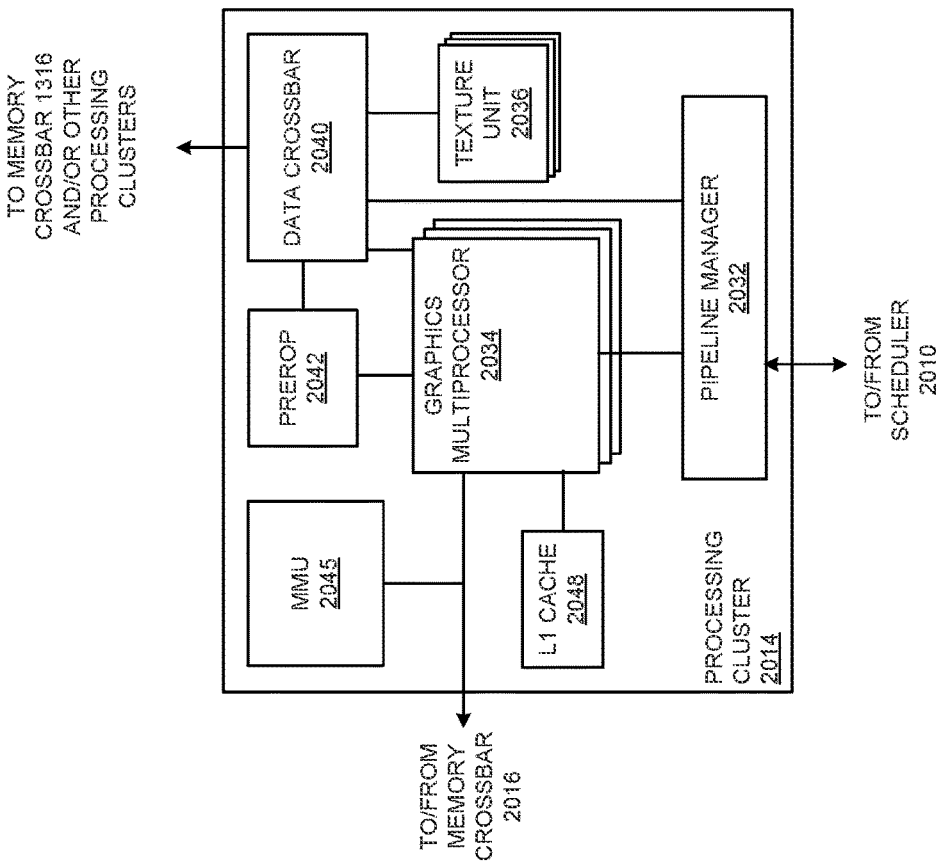
FIG. 20C illustrates a processing cluster, according to at least one embodiment.

FIG. 20C is a block diagram of a processing cluster 2014 within a parallel processing unit according to at least one embodiment. In at least one embodiment, a processing cluster is an instance of one of processing clusters 2014A-2014N of FIG. 20. In at least one embodiment, processing cluster 2014 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2014 can be controlled via a pipeline manager 2032 that distributes processing tasks to SIMT parallel processors. In at least one embodiment, pipeline manager 2032 receives instructions from scheduler 2010 of FIG. 20 and manages execution of those instructions via a graphics multiprocessor 2034 and/or a texture unit 2036. In at least one embodiment, graphics multiprocessor 2034 is an exemplary instance of a SIMT parallel processor. However, in at least one embodiment, various types of SIMT parallel processors of differing architectures may be included within processing cluster 2014. In at least one embodiment, one or more instances of graphics multiprocessor 2034 can be included within a processing cluster 2014. In at least one embodiment, graphics multiprocessor 2034 can process data and a data crossbar 2040 can be used to distribute processed data to one of multiple possible destinations, including other shader units. In at least one embodiment, pipeline manager 2032 can facilitate distribution of processed data by specifying destinations for processed data to be distributed via data crossbar 2040.

In at least one embodiment, each graphics multiprocessor 2034 within processing cluster 2014 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2014 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2034. In at least one embodiment, a thread group may include fewer threads than a number of processing engines within graphics multiprocessor 2034. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2034. In at least one embodiment, when a thread group includes more threads than number of processing engines within graphics multiprocessor 2034, processing can be performed over consecutive clock cycles. In at least one embodiment, multiple thread groups can be executed concurrently on a graphics multiprocessor 2034.

In at least one embodiment, graphics multiprocessor 2034 includes an internal cache memory to perform load and store operations. In at least one embodiment, graphics multiprocessor 2034 can forego an internal cache and use a cache memory (e.g., L1 cache 2048) within processing cluster 2014. In at least one embodiment, each graphics multiprocessor 2034 also has access to L2 caches within partition units (e.g., partition units 2020A-2020N of FIG. 20) that are shared among all processing clusters 2014 and may be used to transfer data between threads. In at least one embodiment, graphics multiprocessor 2034 may also access off-chip global memory, which can include one or more of local parallel processor memory and/or system memory. In at least one embodiment, any memory external to parallel processing unit 2002 may be used as global memory. In at least one embodiment, processing cluster 2014 includes multiple instances of graphics multiprocessor 2034 can share common instructions and data, which may be stored in L1 cache 2048.

In at least one embodiment, each processing cluster 2014 may include an MMU 2045 (memory management unit) that is configured to map virtual addresses into physical addresses. In at least one embodiment, one or more instances of MMU 2045 may reside within memory interface 2018 of FIG. 20. In at least one embodiment, MMU 2045 includes a set of page table entries (PTEs) used to map a virtual address to a physical address of a tile and optionally a cache line index. In at least one embodiment, MMU 2045 may include address translation lookaside buffers (TLB) or caches that may reside within graphics multiprocessor 2034 or L1 cache or processing cluster 2014. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2014 may be configured such that each graphics multiprocessor 2034 is coupled to a texture unit 2036 for performing texture mapping operations, e.g., determining texture sample positions, reading texture data, and filtering texture data. In at least one embodiment, texture data is read from an internal texture L1 cache (not shown) or from an L1 cache within graphics multiprocessor 2034 and is fetched from an L2 cache, local parallel processor memory, or system memory, as needed. In at least one embodiment, each graphics multiprocessor 2034 outputs processed tasks to data crossbar 2040 to provide processed task to another processing cluster 2014 for further processing or to store processed task in an L2 cache, local parallel processor memory, or system memory via memory crossbar 2016. In at least one embodiment, preROP 2042 (pre-raster operations unit) is configured to receive data from graphics multiprocessor 2034, direct data to ROP units, which may be located with partition units as described herein (e.g., partition units 2020A-2020N of FIG. 20). In at least one embodiment, PreROP 2042 unit can perform optimizations for color blending, organize pixel color data, and perform address translations.

Figure 20D:
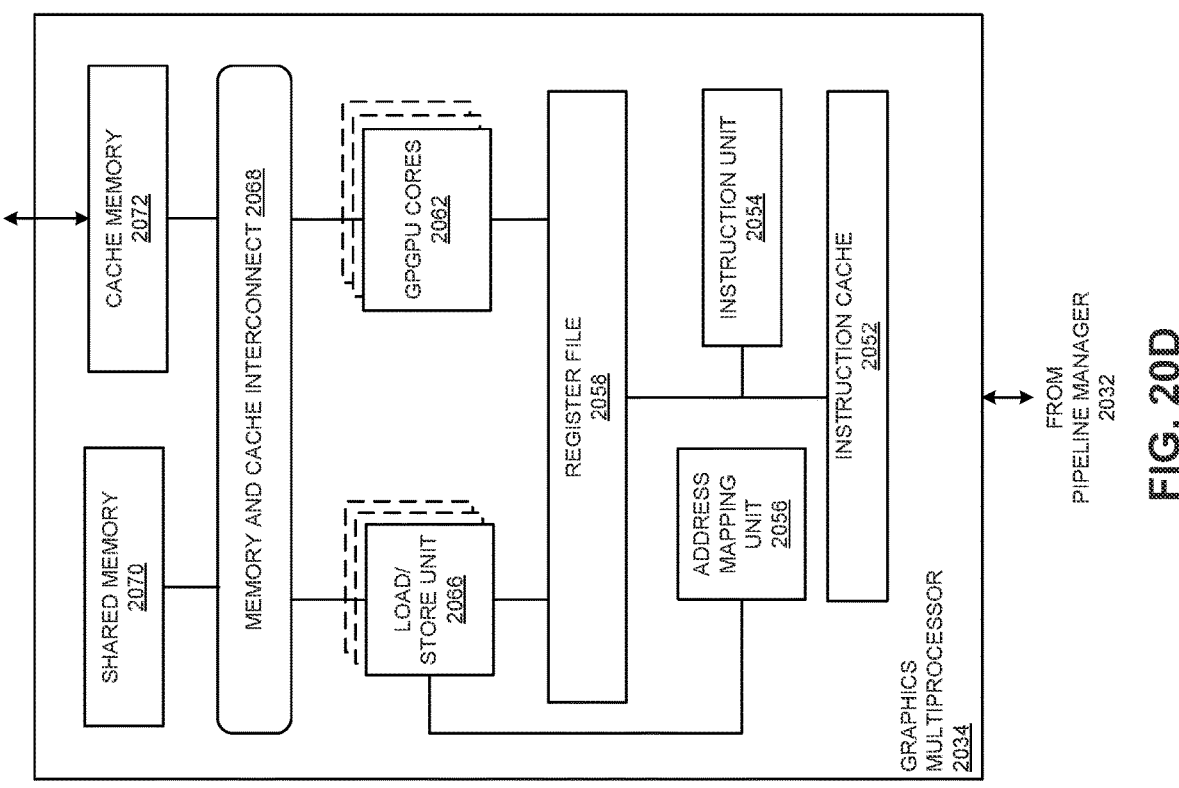
FIG. 20D illustrates a graphics multiprocessor, according to at least one embodiment.

FIG. 20D shows a graphics multiprocessor 2034 according to at least one embodiment. In at least one embodiment, graphics multiprocessor 2034 includes a first processor 125 or second processor 130, wherein graphics multiprocessor 2034 can perform processes and flows disclosed in FIG. 3-6. In at least one embodiment, graphics multiprocessor 2034 couples with pipeline manager 2032 of processing cluster 2014. In at least one embodiment, graphics multiprocessor 2034 has an execution pipeline including but not limited to an instruction cache 2052, an instruction unit 2054, an address mapping unit 2056, a register file 2058, one or more general purpose graphics processing unit (GPGPU) cores 2062, and one or more load/store units 2066. GPGPU cores 2062 and load/store units 2066 are coupled with cache memory 2072 and shared memory 2070 via a memory and cache interconnect 2068.

In at least one embodiment, instruction cache 2052 receives a stream of instructions to execute from pipeline manager 2032. In at least one embodiment, instructions are cached in instruction cache 2052 and dispatched for execution by instruction unit 2054. In at least one embodiment, instruction unit 2054 can dispatch instructions as thread groups (e.g., warps), with each thread of thread group assigned to a different execution unit within GPGPU core 2062. In at least one embodiment, an instruction can access any of a local, shared, or global address space by specifying an address within a unified address space. In at least one embodiment, address mapping unit 2056 can be used to translate addresses in a unified address space into a distinct memory address that can be accessed by load/store units 2066.

In at least one embodiment, register file 2058 provides a set of registers for functional units of graphics multiprocessor 2034. In at least one embodiment, register file 2058 provides temporary storage for operands connected to data paths of functional units (e.g., GPGPU cores 2062, load/store units 2066) of graphics multiprocessor 2034. In at least one embodiment, register file 2058 is divided between each of functional units such that each functional unit is allocated a dedicated portion of register file 2058. In at least one embodiment, register file 2058 is divided between different warps being executed by graphics multiprocessor 2034.

In at least one embodiment, GPGPU cores 2062 can each include floating point units (FPUs) and/or integer arithmetic logic units (ALUs) that are used to execute instructions of graphics multiprocessor 2034. GPGPU cores 2062 can be similar in architecture or can differ in architecture. In at least one embodiment, a first portion of GPGPU cores 2062 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2034 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2062 include SIMD logic capable of performing a single instruction on multiple sets of data. In at least one embodiment GPGPU cores 2062 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2068 is an interconnect network that connects each functional unit of graphics multiprocessor 2034 to register file 2058 and to shared memory 2070. In at least one embodiment, memory and cache interconnect 2068 is a crossbar interconnect that allows load/store unit 2066 to implement load and store operations between shared memory 2070 and register file 2058. In at least one embodiment, register file 2058 can operate at a same frequency as GPGPU cores 2062, thus data transfer between GPGPU cores 2062 and register file 2058 is very low latency. In at least one embodiment, shared memory 2070 can be used to enable communication between threads that execute on functional units within graphics multiprocessor 2034. In at least one embodiment, cache memory 2072 can be used as a data cache for example, to cache texture data communicated between functional units and texture unit 2036. In at least one embodiment, shared memory 2070 can also be used as a program managed cached. In at least one embodiment, threads executing on GPGPU cores 2062 can programmatically store data within shared memory in addition to automatically cached data that is stored within cache memory 2072.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high-speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Figure 21:
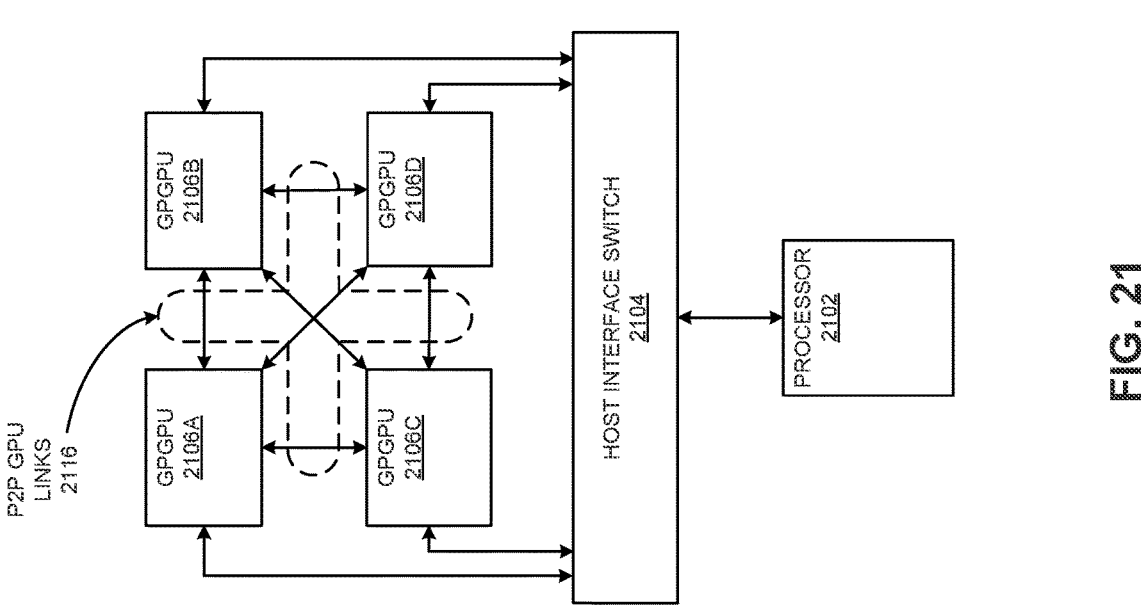
FIG. 21 illustrates a multi-graphics processing unit ("GPU") system, according to at least one embodiment.

FIG. 21 illustrates a multi-GPU computing system 2100, according to at least one embodiment. In at least one embodiment, computing system 2100 includes a first processor 125 or second processor 130, wherein computing system 2100 can perform processes and flows disclosed in FIGS. 3-6. In at least one embodiment, multi-GPU computing system 2100 can include a processor 2102 coupled to multiple general purpose graphics processing units (GPGPUs) 2106A-D via a host interface switch 2104. In at least one embodiment, host interface switch 2104 is a PCI express switch device that couples processor 2102 to a PCI express bus over which processor 2102 can communicate with GPGPUs 2106A-D. GPGPUs 2106A-D can interconnect via a set of high-speed point to point GPU to GPU links 2116. In at least one embodiment, GPU to GPU links 2116 connect to each of GPGPUs 2106A-D via a dedicated GPU link. In at least one embodiment, P2P GPU links 2116 enable direct communication between each of GPGPUs 2106A-D without requiring communication over host interface bus 2104 to which processor 2102 is connected. In at least one embodiment, with GPU-to-GPU traffic directed to P2P GPU links 2116, host interface bus 2104 remains available for system memory access or to communicate with other instances of multi-GPU computing system 2100, for example, via one or more network devices. While in at least one embodiment GPGPUs 2106A-D connect to processor 2102 via host interface switch 2104, in at least one embodiment processor 2102 includes direct support for P2P GPU links 2116 and can connect directly to GPGPUs 2106A-D.

FIG. 22 is a block diagram of a graphics processor 2200, according to at least one embodiment. In at least one embodiment, graphics processor 2200 includes a first processor 125 or second processor 130, wherein graphics processor 2200 can perform processes and flows disclosed in FIGS. 3-6. In at least one embodiment, graphics processor 2200 includes a ring interconnect 2202, a pipeline front-end 2204, a media engine 2237, and graphics cores 2280A-2280N. In at least one embodiment, ring interconnect 2202 couples graphics processor 2200 to other processing units, including other graphics processors or one or more general-purpose processor cores. In at least one embodiment, graphics processor 2200 is one of many processors integrated within a multi-core processing system.

In at least one embodiment, graphics processor 2200 receives batches of commands via ring interconnect 2202. In at least one embodiment, incoming commands are interpreted by a command streamer 2203 in pipeline front-end 2204. In at least one embodiment, graphics processor 2200 includes scalable execution logic to perform 3D geometry processing and media processing via graphics core(s) 2280A-2280N. In at least one embodiment, for 3D geometry processing commands, command streamer 2203 supplies commands to geometry pipeline 2236. In at least one embodiment, for at least some media processing commands, command streamer 2203 supplies commands to a video front end 2234, which couples with a media engine 2237. In at least one embodiment, media engine 2237 includes a Video Quality Engine (VQE) 2230 for video and image post-processing and a multi-format encode/decode (MFX) 2233 engine to provide hardware-accelerated media data encode and decode. In at least one embodiment, geometry pipeline 2236 and media engine 2237 each generate execution threads for thread execution resources provided by at least one graphics core 2280A.

In at least one embodiment, graphics processor 2200 includes scalable thread execution resources featuring modular cores 2280A-2280N (sometimes referred to as core slices), each having multiple sub-cores 2250A-550N, 2260A-2260N (sometimes referred to as core sub-slices). In at least one embodiment, graphics processor 2200 can have any number of graphics cores 2280A through 2280N. In at least one embodiment, graphics processor 2200 includes a graphics core 2280A having at least a first sub-core 2250A and a second sub-core 2260A. In at least one embodiment, graphics processor 2200 is a low power processor with a single sub-core (e.g., 2250A). In at least one embodiment, graphics processor 2200 includes multiple graphics cores 2280A-2280N, each including a set of first sub-cores 2250A-2250N and a set of second sub-cores 2260A-2260N. In at least one embodiment, each sub-core in first sub-cores 2250A-2250N includes at least a first set of execution units 2252A-2252N and media/texture samplers 2254A-2254N. In at least one embodiment, each sub-core in second sub-cores 2260A-2260N includes at least a second set of execution units 2262A-2262N and samplers 2264A-2264N. In at least one embodiment, each sub-core 2250A-2250N, 2260A-2260N shares a set of shared resources 2270A-2270N. In at least one embodiment, shared resources include shared cache memory and pixel operation logic.

Figure 23:
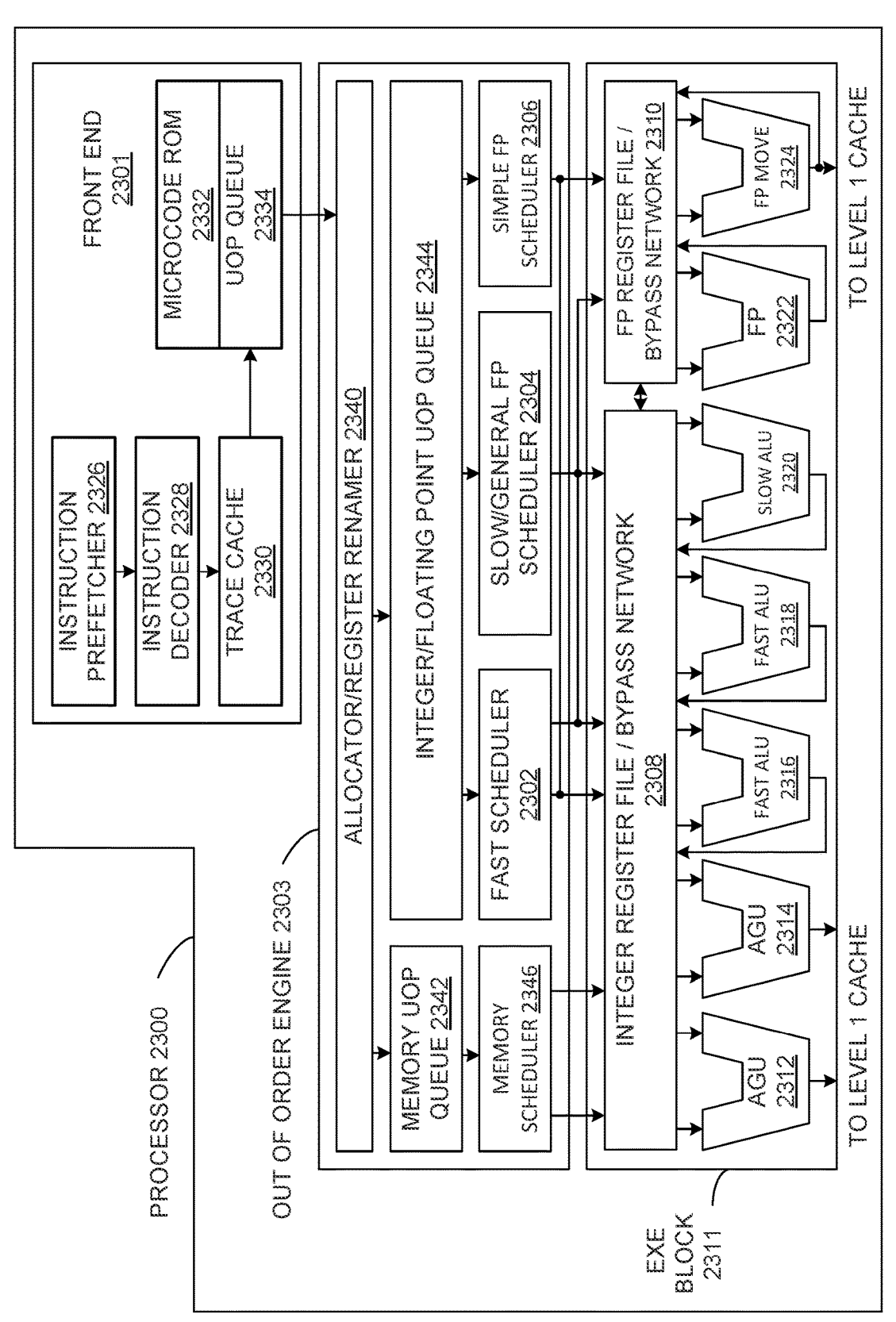
FIG. 23 is a block diagram illustrating a processor micro-architecture for a processor, according to at least one embodiment.

FIG. 23 is a block diagram illustrating micro-architecture for a processor 2300 that may include logic circuits to perform instructions, according to at least one embodiment. In at least one embodiment, processor 2300 includes or is first processor 125 or second processor 130, wherein processor 2300 can perform processes and flows disclosed in FIGS. 3-6. In at least one embodiment, processor 2300 may perform instructions, including x86 instructions, ARM instructions, specialized instructions for application-specific integrated circuits (ASICs), etc. In at least one embodiment, processor 2310 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2310 may perform instructions to accelerate machine learning or deep learning algorithms, training, or inferencing.

In at least one embodiment, processor 2300 includes an in-order front end ("front end") 2301 to fetch instructions to be executed and prepare instructions to be used later in processor pipeline. In at least one embodiment, front end 2301 may include several units. In at least one embodiment, an instruction prefetcher 2326 fetches instructions from memory and feeds instructions to an instruction decoder 2328 which in turn decodes or interprets instructions. For example, in at least one embodiment, instruction decoder 2328 decodes a received instruction into one or more operations called "micro-instructions" or "micro-operations" (also called "micro ops" or "uops") that machine may execute. In at least one embodiment, instruction decoder 2328 parses instruction into an opcode and corresponding data and control fields that may be used by micro-architecture to perform operations in accordance with at least one embodiment. In at least one embodiment, a trace cache 2330 may assemble decoded uops into program ordered sequences or traces in a uop queue 2334 for execution. In at least one embodiment, when trace cache 2330 encounters a complex instruction, a microcode ROM 2332 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 2328 may access microcode ROM 2332 to perform instruction. In at least one embodiment, an instruction may be decoded into a small number of micro-ops for processing at instruction decoder 2328. In at least one embodiment, an instruction may be stored within microcode ROM 2332 should a number of micro-ops be needed to accomplish operation. In at least one embodiment, trace cache 2330 refers to an entry point programmable logic array ("PLA") to determine a correct micro-instruction pointer for reading microcode sequences to complete one or more instructions from microcode ROM 2332 in accordance with at least one embodiment. In at least one embodiment, after microcode ROM 2332 finishes sequencing micro-ops for an instruction, front end 2301 of machine may resume fetching micro-ops from trace cache 2330.

In at least one embodiment, out-of-order execution engine ("out of order engine") 2303 may prepare instructions for execution. In at least one embodiment, out-of-order execution logic has a number of buffers to smooth out and re-order flow of instructions to optimize performance as they go down pipeline and get scheduled for execution. out-of-order execution engine 2303 includes, without limitation, an allocator/register renamer 2340, a memory uop queue 2342, an integer/floating point uop queue 2344, a memory scheduler 2346, a fast scheduler 2302, a slow/general floating point scheduler ("slow/general FP scheduler") 2304, and a simple floating point scheduler ("simple FP scheduler") 2306. In at least one embodiment, fast schedule 2302, slow/general floating point scheduler 2304, and simple floating point scheduler 2306 are also collectively referred to herein as "uop schedulers 2302, 2304, 2306." In at least one embodiment, allocator/register renamer 2340 allocates machine buffers and resources that each uop needs in order to execute. In at least one embodiment, allocator/register renamer 2340 renames logic registers onto entries in a register file. In at least one embodiment, allocator/register renamer 2340 also allocates an entry for each uop in one of two uop queues, memory uop queue 2342 for memory operations and integer/floating point uop queue 2344 for non-memory operations, in front of memory scheduler 2346 and uop schedulers 2302, 2304, 2306. In at least one embodiment, uop schedulers 2302, 2304, 2306, determine when a uop is ready to execute based on readiness of their dependent input register operand sources and availability of execution resources uops need to complete their operation. In at least one embodiment, fast scheduler 2302 of at least one embodiment may schedule on each half of main clock cycle while slow/general floating point scheduler 2304 and simple floating point scheduler 2306 may schedule once per main processor clock cycle. In at least one embodiment, uop schedulers 2302, 2304, 2306 arbitrate for dispatch ports to schedule uops for execution.

In at least one embodiment, execution block b11 includes, without limitation, an integer register file/bypass network 2308, a floating point register file/bypass network ("FP register file/bypass network") 2310, address generation units ("AGUs") 2312 and 2314, fast Arithmetic Logic Units (ALUs) ("fast ALUs") 2316 and 2318, a slow Arithmetic Logic Unit ("slow ALU") 2320, a floating point ALU ("FP") 2322, and a floating point move unit ("FP move") 2324. In at least one embodiment, integer register file/bypass network 2308 and floating point register file/bypass network 2310 are also referred to herein as "register files 2308, 2310." In at least one embodiment, AGUs 2312 and 2314, fast ALUs 2316 and 2318, slow ALU 2320, floating point ALU 2322, and floating point move unit 2324 are also referred to herein as "execution units 2312, 2314, 2316, 2318, 2320, 2322, and 2324." In at least one embodiment, execution block b11 may include, without limitation, any number (including zero) and type of register files, bypass networks, address generation units, and execution units, in any combination.

In at least one embodiment, register files 2308, 2310 may be arranged between uop schedulers 2302, 2304, 2306, and execution units 2312, 2314, 2316, 2318, 2320, 2322, and 2324. In at least one embodiment, integer register file/bypass network 2308 performs integer operations. In at least one embodiment, floating point register file/bypass network 2310 performs floating point operations. In at least one embodiment, each of register files 2308, 2310 may include, without limitation, a bypass network that may bypass or forward just completed results that have not yet been written into register file to new dependent uops. In at least one embodiment, register files 2308, 2310 may communicate data with each other. In at least one embodiment, integer register file/bypass network 2308 may include, without limitation, two separate register files, one register file for low-order thirty-two bits of data and a second register file for high order thirty-two bits of data. In at least one embodiment, floating point register file/bypass network 2310 may include, without limitation, 128-bit wide entries because floating point instructions typically have operands from 64 to 128 bits in width.

In at least one embodiment, execution units 2312, 2314, 2316, 2318, 2320, 2322, 2324 may execute instructions. In at least one embodiment, register files 2308, 2310 store integer and floating point data operand values that micro-instructions need to execute. In at least one embodiment, processor 2300 may include, without limitation, any number and combination of execution units 2312, 2314, 2316, 2318, 2320, 2322, 2324. In at least one embodiment, floating point ALU 2322 and floating point move unit 2324, may execute floating point, MMX, SIMD, AVX and SSE, or other operations, including specialized machine learning instructions. In at least one embodiment, floating point ALU 2322 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2316, 2318. In at least one embodiment, fast ALUS 2316, 2318 may execute fast operations with an effective latency of half a clock cycle. In at least one embodiment, most complex integer operations go to slow ALU 2320 as slow ALU 2320 may include, without limitation, integer execution hardware for long-latency type of operations, such as a multiplier, shifts, flag logic, and branch processing.

In at least one embodiment, memory load/store operations may be executed by AGUS 2312, 2314. In at least one embodiment, fast ALU 2316, fast ALU 2318, and slow ALU 2320 may perform integer operations on 64-bit data operands. In at least one embodiment, fast ALU 2316, fast ALU 2318, and slow ALU 2320 may be implemented to support a variety of data bit sizes including sixteen, thirty-two, 128, 256, etc. In at least one embodiment, floating point ALU 2322 and floating point move unit 2324 may be implemented to support a range of operands having bits of various widths. In at least one embodiment, floating point ALU 2322 and floating point move unit 2324 may operate on 128-bit wide packed data operands in conjunction with SIMD and multimedia instructions.

In at least one embodiment, uop schedulers 2302, 2304, 2306, dispatch dependent operations before parent load has finished executing. In at least one embodiment, as uops may be speculatively scheduled and executed in processor 2300, processor 2300 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 24:
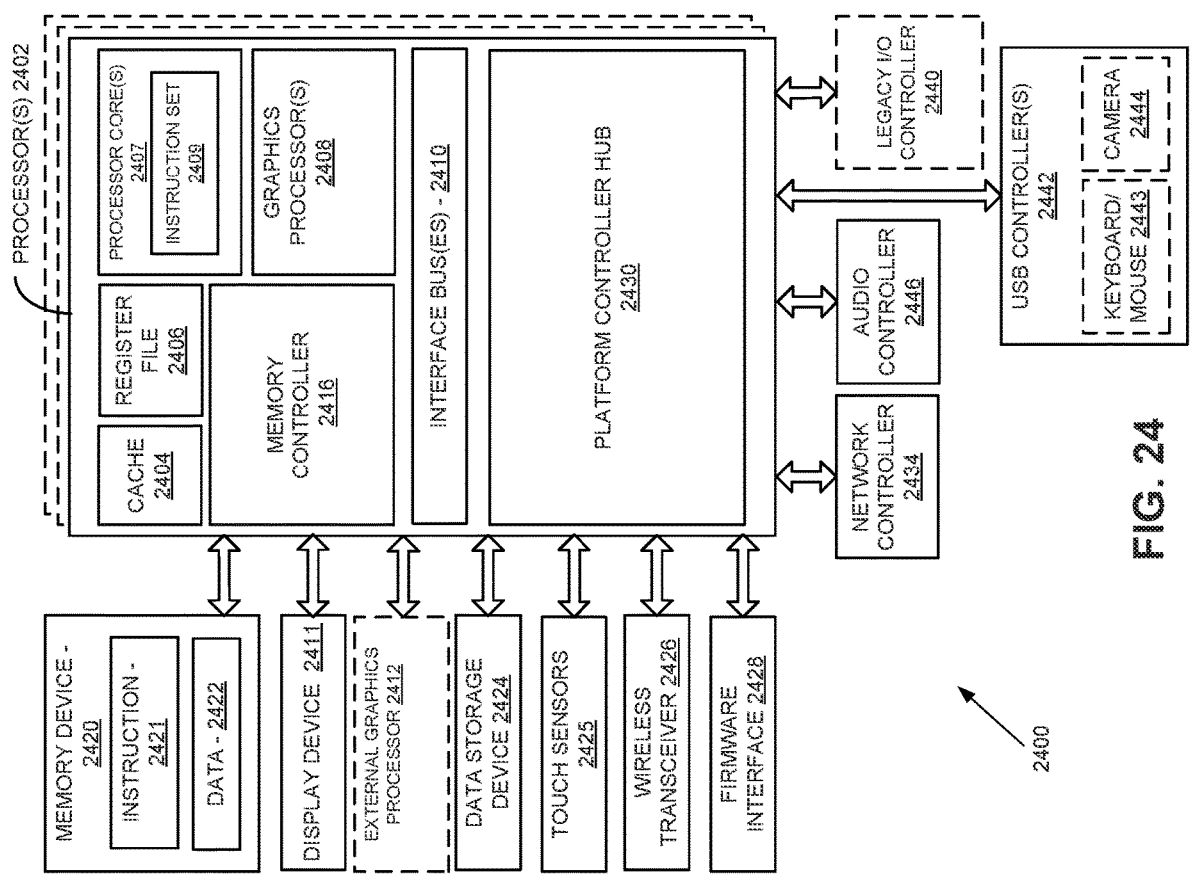
FIG. 24 illustrates at least portions of a graphics processor, according to one or more embodiments.

FIG. 24 is a block diagram of a processing system, according to at least one embodiment. In at least one embodiment, system 2400 includes one or more processors 2402 and one or more graphics processors 2408, and may be a single processor desktop system, a multiprocessor workstation system, or a server system having a large number of processors 2402 or processor cores 2407. In at least one embodiment, system 2400 includes or is first processor 125 or second processor 130, wherein system 2400 can perform processes and flows disclosed in FIGS. 3-6. In at least one embodiment, system 2400 is a processing platform incorporated within a system-on-a-chip (SoC) integrated circuit for use in mobile, handheld, or embedded devices.

In at least one embodiment, system 2400 can include, or be incorporated within a server-based gaming platform, a game console, including a game and media console, a mobile gaming console, a handheld game console, or an online game console. In at least one embodiment, system 2400 is a mobile phone, smart phone, tablet computing device or mobile Internet device. In at least one embodiment, processing system 2400 can also include, couple with, or be integrated within a wearable device, such as a smart watch wearable device, smart eyewear device, augmented reality device, or virtual reality device. In at least one embodiment, processing system 2400 is a television or set top box device having one or more processors 2402 and a graphical interface generated by one or more graphics processors 2408.

In at least one embodiment, one or more processors 2402 each include one or more processor cores 2407 to process instructions which, when executed, perform operations for system and user software. In at least one embodiment, each of one or more processor cores 2407 is configured to process a specific instruction set 2409. In at least one embodiment, instruction set 2409 may facilitate Complex Instruction Set Computing (CISC), Reduced Instruction Set Computing (RISC), or computing via a Very Long Instruction Word (VLIW). In at least one embodiment, processor cores 2407 may each process a different instruction set 2409, which may include instructions to facilitate emulation of other instruction sets. In at least one embodiment, processor core 2407 may also include other processing devices, such a Digital Signal Processor (DSP).

In at least one embodiment, processor 2402 includes cache memory 2404. In at least one embodiment, processor 2402 can have a single internal cache or multiple levels of internal cache. In at least one embodiment, cache memory is shared among various components of processor 2402. In at least one embodiment, processor 2402 also uses an external cache (e.g., a Level-3 (L3) cache or Last Level Cache (LLC)) (not shown), which may be shared among processor cores 2407 using known cache coherency techniques. In at least one embodiment, register file 2406 is additionally included in processor 2402 which may include different types of registers for storing different types of data (e.g., integer registers, floating point registers, status registers, and an instruction pointer register). In at least one embodiment, register file 2406 may include general-purpose registers or other registers.

In at least one embodiment, one or more processor(s) 2402 are coupled with one or more interface bus (es) 2410 to transmit communication signals such as address, data, or control signals between processor 2402 and other components in system 2400. In at least one embodiment interface bus 2410, in one embodiment, can be a processor bus, such as a version of a Direct Media Interface (DMI) bus. In at least one embodiment, interface 2410 is not limited to a DMI bus, and may include one or more Peripheral Component Interconnect buses (e.g., PCI, PCI Express), memory busses, or other types of interface busses. In at least one embodiment processor(s) 2402 include an integrated memory controller 2416 and a platform controller hub 2430. In at least one embodiment, memory controller 2416 facilitates communication between a memory device and other components of system 2400, while platform controller hub (PCH) 2430 provides connections to I/O devices via a local I/O bus.

In at least one embodiment, memory device 2420 can be a dynamic random access memory (DRAM) device, a static random access memory (SRAM) device, flash memory device, phase-change memory device, or some other memory device having suitable performance to serve as process memory. In at least one embodiment memory device 2420 can operate as system memory for system 2400, to store data 2422 and instructions 2421 for use when one or more processors 2402 executes an application or process. In at least one embodiment, memory controller 2416 also couples with an optional external graphics processor 2412, which may communicate with one or more graphics processors 2408 in processors 2402 to perform graphics and media operations. In at least one embodiment, a display device 2411 can connect to processor(s) 2402. In at least one embodiment display device 2411 can include one or more of an internal display device, as in a mobile electronic device or a laptop device or an external display device attached via a display interface (e.g., DisplayPort, etc.). In at least one embodiment, display device 2411 can include a head mounted display (HMD) such as a stereoscopic display device for use in virtual reality (VR) applications or augmented reality (AR) applications.

In at least one embodiment, platform controller hub 2430 enables peripherals to connect to memory device 2420 and processor 2402 via a high-speed I/O bus. In at least one embodiment, I/O peripherals include, but are not limited to, an audio controller 2446, a network controller 2434, a firmware interface 2428, a wireless transceiver 2426, touch sensors 2425, a data storage device 2424 (e.g., hard disk drive, flash memory, etc.). In at least one embodiment, data storage device 2424 can connect via a storage interface (e.g., SATA) or via a peripheral bus, such as a Peripheral Component Interconnect bus (e.g., PCI, PCI Express). In at least one embodiment, touch sensors 2425 can include touch screen sensors, pressure sensors, or fingerprint sensors. In at least one embodiment, wireless transceiver 2426 can be a Wi-Fi transceiver, a Bluetooth transceiver, or a mobile network transceiver such as a 3G, 4G, or Long Term Evolution (LTE) transceiver. In at least one embodiment, firmware interface 2428 enables communication with system firmware, and can be, for example, a unified extensible firmware interface (UEFI). In at least one embodiment, network controller 2434 can enable a network connection to a wired network. In at least one embodiment, a high-performance network controller (not shown) couples with interface bus 2410. In at least one embodiment, audio controller 2446 is a multi-channel high definition audio controller. In at least one embodiment, system 2400 includes an optional legacy I/O controller 2440 for coupling legacy (e.g., Personal System 2 (PS/2)) devices to system. In at least one embodiment, platform controller hub 2430 can also connect to one or more Universal Serial Bus (USB) controllers 2442 connect input devices, such as keyboard and mouse 2443 combinations, a camera 2444, or other USB input devices.

In at least one embodiment, an instance of memory controller 2416 and platform controller hub 2430 may be integrated into a discreet external graphics processor, such as external graphics processor 2412. In at least one embodiment, platform controller hub 2430 and/or memory controller 2416 may be external to one or more processor(s) 2402. For example, in at least one embodiment, system 2400 can include an external memory controller 2416 and platform controller hub 2430, which may be configured as a memory controller hub and peripheral controller hub within a system chipset that is in communication with processor(s) 2402.

Figure 25:
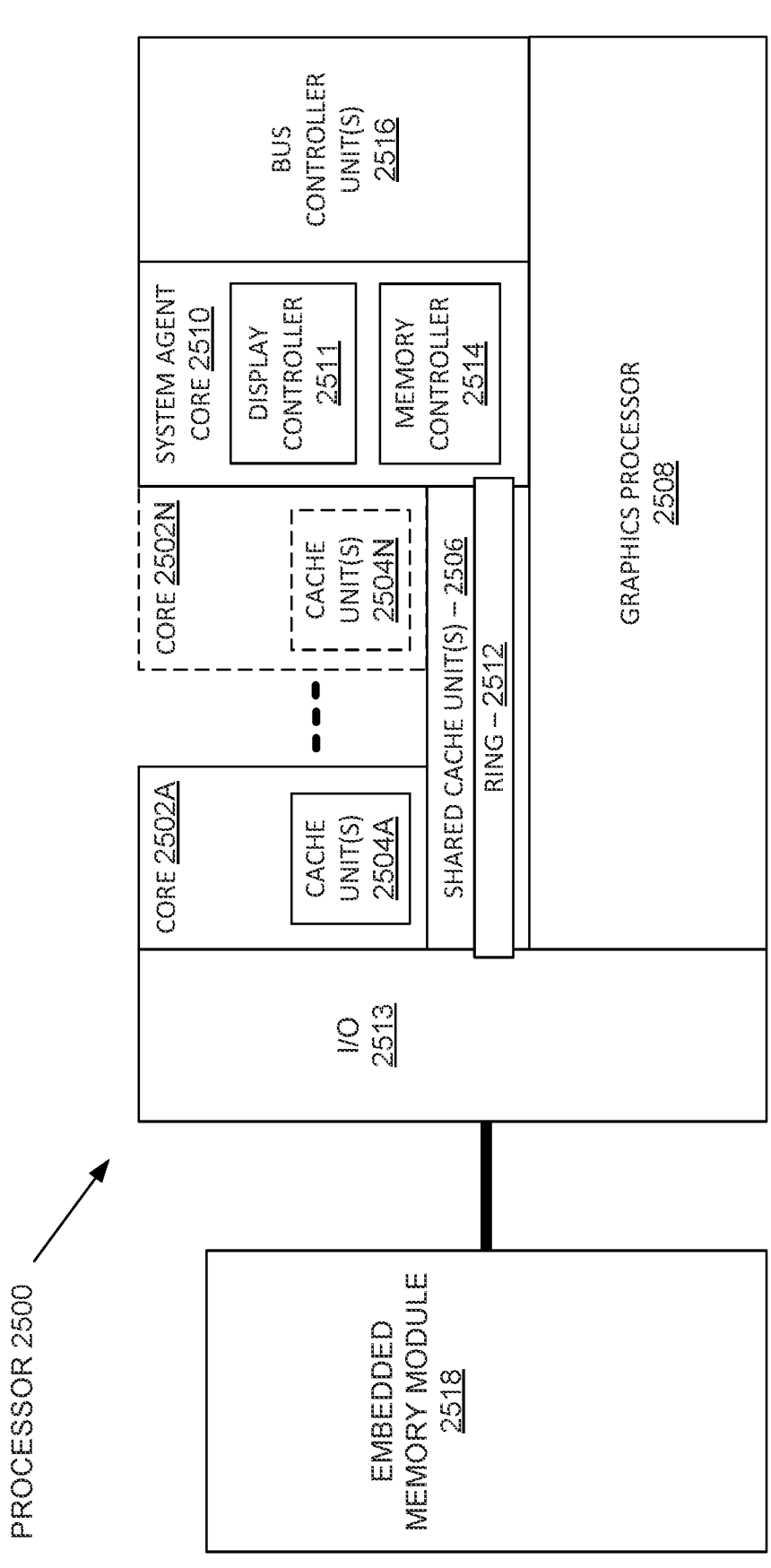
FIG. 25 illustrates at least portions of a graphics processor, according to one or more embodiments.

FIG. 25 is a block diagram of a processor 2500 having one or more processor cores 2502A-2502N, an integrated memory controller 2514, and an integrated graphics processor 2508, according to at least one embodiment. In at least one embodiment, processor 2500 includes or is first processor 125 or second processor 130, processor 2500 can perform processes and flows disclosed in FIGS. 3-6. In at least one embodiment, processor 2500 can include additional cores up to and including additional core 2502N represented by dashed lined boxes. In at least one embodiment, each of processor cores 2502A-2502N includes one or more internal cache units 2504A-2504N. In at least one embodiment, each processor core also has access to one or more shared cached units 2506.

In at least one embodiment, internal cache units 2504A-2504N and shared cache units 2506 represent a cache memory hierarchy within processor 2500. In at least one embodiment, cache memory units 2504A-2504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 2506 and 2504A-2504N.

In at least one embodiment, processor 2500 may also include a set of one or more bus controller units 2516 and a system agent core 2510. In at least one embodiment, one or more bus controller units 2516 manage a set of peripheral buses, such as one or more PCI or PCI express busses. In at least one embodiment, system agent core 2510 provides management functionality for various processor components. In at least one embodiment, system agent core 2510 includes one or more integrated memory controllers 2514 to manage access to various external memory devices (not shown).

In at least one embodiment, one or more of processor cores 2502A-2502N include support for simultaneous multi-threading. In at least one embodiment, system agent core 2510 includes components for coordinating and operating cores 2502A-2502N during multi-threaded processing. In at least one embodiment, system agent core 2510 may additionally include a power control unit (PCU), which includes logic and components to regulate one or more power states of processor cores 2502A-2502N and graphics processor 2508.

In at least one embodiment, processor 2500 additionally includes graphics processor 2508 to execute graphics processing operations. In at least one embodiment, graphics processor 2508 couples with shared cache units 2506, and system agent core 2510, including one or more integrated memory controllers 2514. In at least one embodiment, system agent core 2510 also includes a display controller 2511 to drive graphics processor output to one or more coupled displays. In at least one embodiment, display controller 2511 may also be a separate module coupled with graphics processor 2508 via at least one interconnect, or may be integrated within graphics processor 2508.

In at least one embodiment, a ring based interconnect unit 2512 is used to couple internal components of processor 2500. In at least one embodiment, an alternative interconnect unit may be used, such as a point-to-point interconnect, a switched interconnect, or other techniques. In at least one embodiment, graphics processor 2508 couples with ring interconnect 2512 via an I/O link 2513.

In at least one embodiment, I/O link 2513 represents at least one of multiple varieties of I/O interconnects, including an on package I/O interconnect which facilitates communication between various processor components and a high-performance embedded memory module 2518, such as an eDRAM module. In at least one embodiment, each of processor cores 2502A-2502N and graphics processor 2508 use embedded memory modules 2518 as a shared Last Level Cache.

In at least one embodiment, processor cores 2502A-2502N are homogenous cores executing a common instruction set architecture. In at least one embodiment, processor cores 2502A-2502N are heterogeneous in terms of instruction set architecture (ISA), where one or more of processor cores 2502A-2502N execute a common instruction set, while one or more other cores of processor cores 2502A-25-02N executes a subset of a common instruction set or a different instruction set. In at least one embodiment, processor cores 2502A-2502N are heterogeneous in terms of microarchitecture, where one or more cores having a relatively higher power consumption couple with one or more power cores having a lower power consumption. In at least one embodiment, processor 2500 can be implemented on one or more chips or as an SoC integrated circuit.

Figure 26:
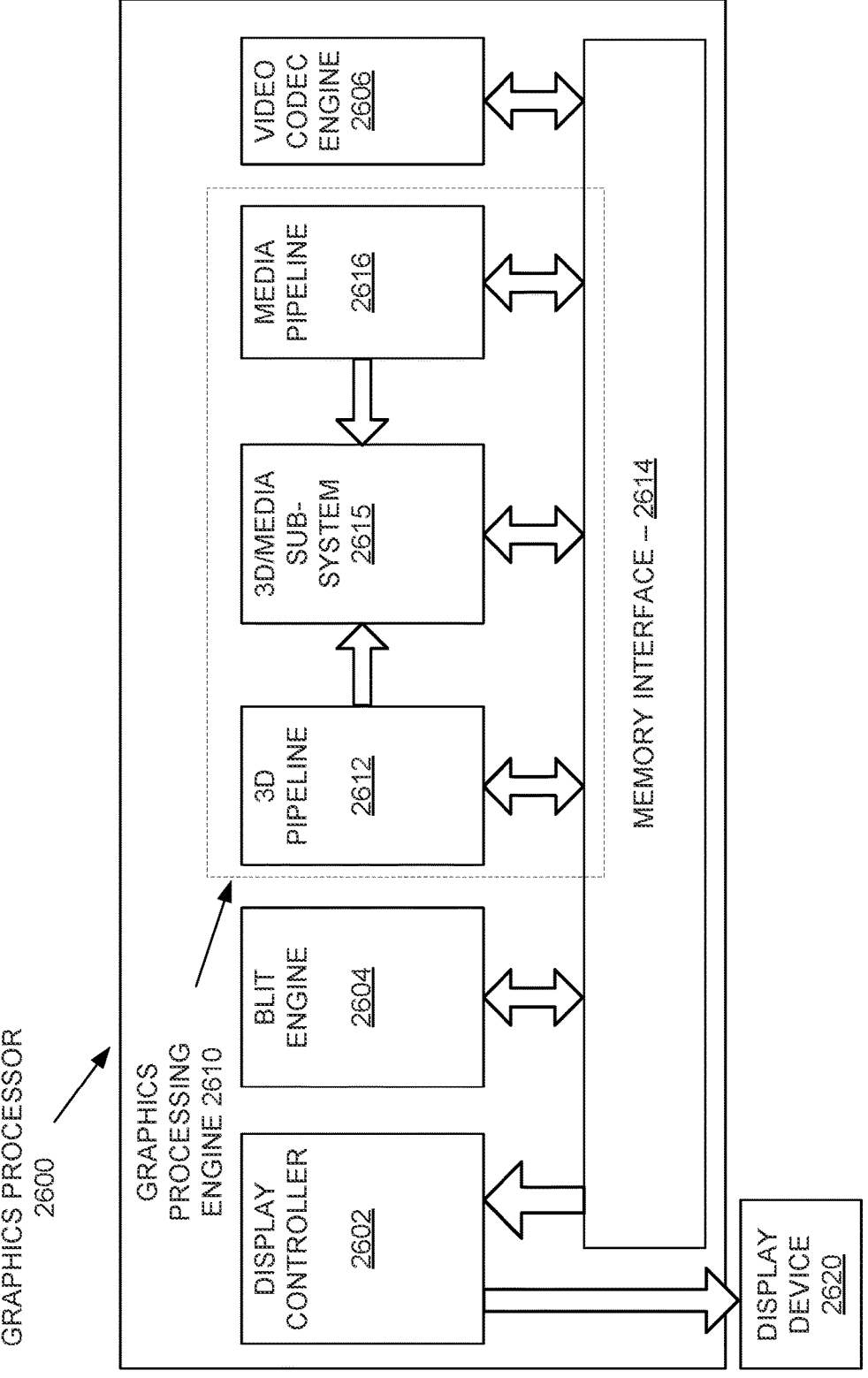
FIG. 26 illustrates at least portions of a graphics processor, according to one or more embodiments.

FIG. 26 is a block diagram of a graphics processor 2600, which may be a discrete graphics processing unit, or may be a graphics processor integrated with a plurality of processing cores. In at least one embodiment, graphics processor 2600 includes or is first processor 125 or second processor 130, graphics processor 2600 can perform processes and flows disclosed in FIGS. 3-6. In at least one embodiment, graphics processor 2600 communicates via a memory mapped I/O interface to registers on graphics processor 2600 and with commands placed into memory. In at least one embodiment, graphics processor 2600 includes a memory interface 2614 to access memory. In at least one embodiment, memory interface 2614 is an interface to local memory, one or more internal caches, one or more shared external caches, and/or to system memory.

In at least one embodiment, graphics processor 2600 also includes a display controller 2602 to drive display output data to a display device 2620. In at least one embodiment, display controller 2602 includes hardware for one or more overlay planes for display device 2620 and composition of multiple layers of video or user interface elements. In at least one embodiment, display device 2620 can be an internal or external display device. In at least one embodiment, display device 2620 is a head mounted display device, such as a virtual reality (VR) display device or an augmented reality (AR) display device. In at least one embodiment, graphics processor 2600 includes a video codec engine 2606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 2600 includes a block image transfer (BLIT) engine 2604 to perform two-dimensional (2D) rasterizer operations including, for example, bit-boundary block transfers. However, in at least one embodiment, 2D graphics operations are performed using one or more components of graphics processing engine (GPE) 2610. In at least one embodiment, GPE 2610 is a compute engine for performing graphics operations, including three-dimensional (3D) graphics operations and media operations.

In at least one embodiment, GPE 2610 includes a 3D pipeline 2612 for performing 3D operations, such as rendering three-dimensional images and scenes using processing functions that act upon 3D primitive shapes (e.g., rectangle, triangle, etc.). 3D pipeline 2612 includes programmable and fixed function elements that perform various tasks and/or spawn execution threads to a 3D/Media subsystem 2615. While 3D pipeline 2612 can be used to perform media operations, in at least one embodiment, GPE 2610 also includes a media pipeline 2616 that is used to perform media operations, such as video post-processing and image enhancement.

In at least one embodiment, media pipeline 2616 includes fixed function or programmable logic units to perform one or more specialized media operations, such as video decode acceleration, video de-interlacing, and video encode acceleration in place of, or on behalf of video codec engine 2606. In at least one embodiment, media pipeline 2616 additionally includes a thread spawning unit to spawn threads for execution on 3D/Media sub-system 2615. In at least one embodiment, spawned threads perform computations for media operations on one or more graphics execution units included in 3D/Media sub-system 2615.

In at least one embodiment, 3D/Media subsystem 2615 includes logic for executing threads spawned by 3D pipeline 2612 and media pipeline 2616. In at least one embodiment, 3D pipeline 2612 and media pipeline 2616 send thread execution requests to 3D/Media subsystem 2615, which includes thread dispatch logic for arbitrating and dispatching various requests to available thread execution resources. In at least one embodiment, execution resources include an array of graphics execution units to process 3D and media threads. In at least one embodiment, 3D/Media subsystem 2615 includes one or more internal caches for thread instructions and data. In at least one embodiment, subsystem 2615 also includes shared memory, including registers and addressable memory, to share data between threads and to store output data.

Figure 27:
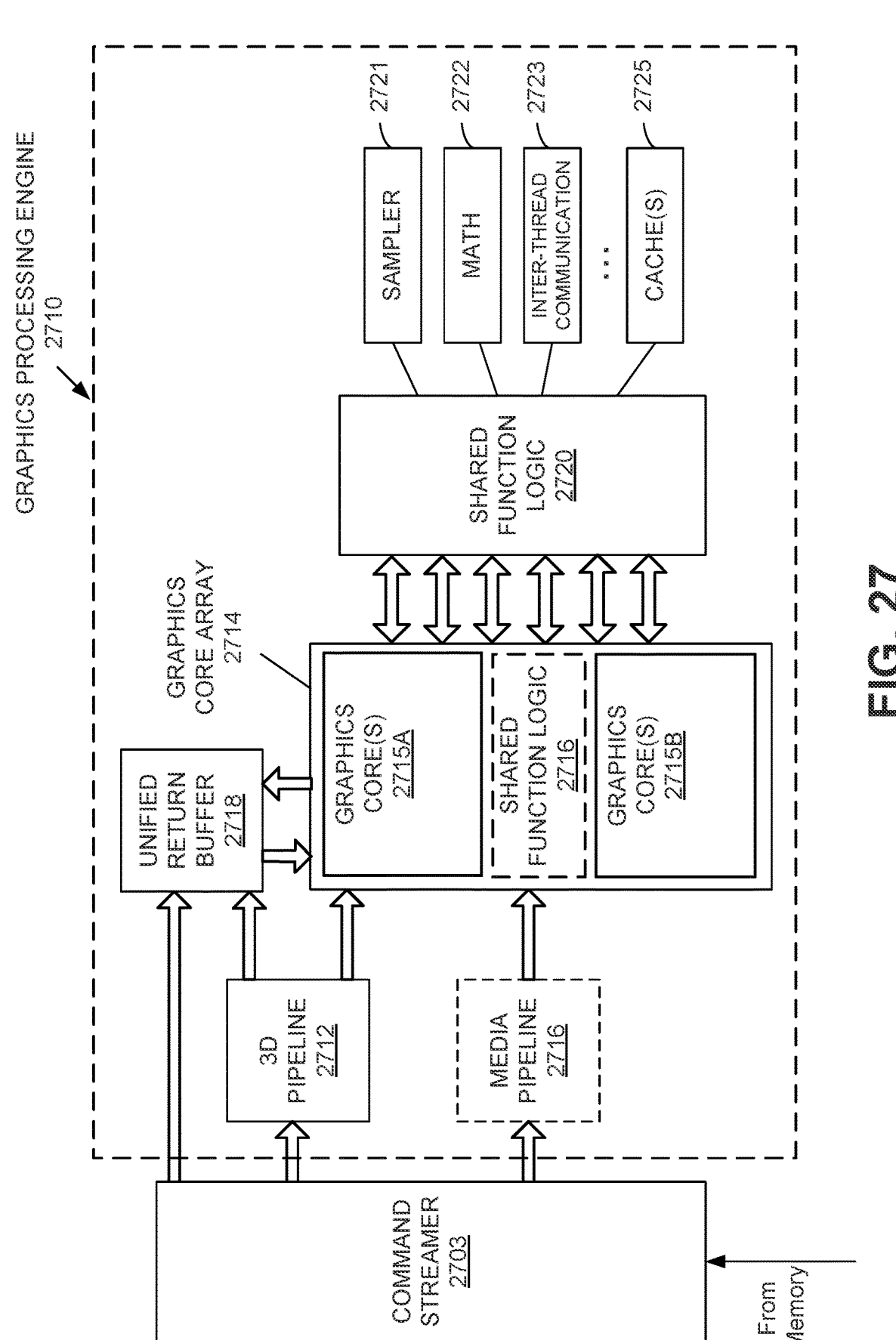
FIG. 27 is a block diagram of a graphics processing engine of a graphics processor, in accordance with at least one embodiment.

FIG. 27 is a block diagram of a graphics processing engine 2710 of a graphics processor in accordance with at least one embodiment. In at least one embodiment, graphics processing engine (GPE) 2710 includes or is first processor 125 or second processor 130, graphics processing engine (GPE) 2710 can perform processes and flows disclosed in FIGS. 3-6. In at least one embodiment, graphics processing engine (GPE) 2710 is a version of GPE 2610 shown in FIG. 26. In at least one embodiment, media pipeline 2716 is optional and may not be explicitly included within GPE 2710. In at least one embodiment, a separate media and/or image processor is coupled to GPE 2710.

In at least one embodiment, GPE 2710 is coupled to or includes a command streamer 2703, which provides a command stream to 3D pipeline 2712 and/or media pipelines 2716. In at least one embodiment, command streamer 2703 is coupled to memory, which can be system memory, or one or more of internal cache memory and shared cache memory. In at least one embodiment, command streamer 2703 receives commands from memory and sends commands to 3D pipeline 2712 and/or media pipeline 2716. In at least one embodiment, commands are instructions, primitives, or micro-operations fetched from a ring buffer, which stores commands for 3D pipeline 2712 and media pipeline 2716. In at least one embodiment, a ring buffer can additionally include batch command buffers storing batches of multiple commands. In at least one embodiment, commands for 3D pipeline 2712 can also include references to data stored in memory, such as but not limited to vertex and geometry data for 3D pipeline 2712 and/or image data and memory objects for media pipeline 2716. In at least one embodiment, 3D pipeline 2712 and media pipeline 2716 process commands and data by performing operations or by dispatching one or more execution threads to a graphics core array 2714. In at least one embodiment graphics core array 2714 includes one or more blocks of graphics cores (e.g., graphics core(s) 2715A, graphics core(s) 2715B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic.

In at least one embodiment, 3D pipeline 2712 includes fixed function and programmable logic to process one or more shader programs, such as vertex shaders, geometry shaders, pixel shaders, fragment shaders, compute shaders, or other shader programs, by processing instructions and dispatching execution threads to graphics core array 2714. In at least one embodiment, graphics core array 2714 provides a unified block of execution resources for use in processing shader programs. In at least one embodiment, multi-purpose execution logic (e.g., execution units) within graphics core(s) 2715A-2715B of graphic core array 2714 includes support for various 3D API shader languages and can execute multiple simultaneous execution threads associated with multiple shaders.

In at least one embodiment, graphics core array 2714 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 2714 can output data to memory in a unified return buffer (URB) 2718. URB 2718 can store data for multiple threads. In at least one embodiment, URB 2718 may be used to send data between different threads executing on graphics core array 2714. In at least one embodiment, URB 2718 may additionally be used for synchronization between threads on graphics core array 2714 and fixed function logic within shared function logic 2720.

In at least one embodiment, graphics core array 2714 is scalable, such that graphics core array 2714 includes a variable number of graphics cores, each having a variable number of execution units based on a target power and performance level of GPE 2710. In at least one embodiment, execution resources are dynamically scalable, such that execution resources may be enabled or disabled as needed.

In at least one embodiment, graphics core array 2714 is coupled to shared function logic 2720 that includes multiple resources that are shared between graphics cores in graphics core array 2714. In at least one embodiment, shared functions performed by shared function logic 2720 are embodied in hardware logic units that provide specialized supplemental functionality to graphics core array 2714. In at least one embodiment, shared function logic 2720 includes but is not limited to sampler 2721, math 2722, and inter-thread communication (ITC) 2723 logic. In at least one embodiment, one or more cache(s) 2725 are in included in or couple to shared function logic 2720.

In at least one embodiment, a shared function is used if demand for a specialized function is insufficient for inclusion within graphics core array 2714. In at least one embodiment, a single instantiation of a specialized function is used in shared function logic 2720 and shared among other execution resources within graphics core array 2714. In at least one embodiment, specific shared functions within shared function logic 2720 that are used extensively by graphics core array 2714 may be included within shared function logic 2716 within graphics core array 2714. In at least one embodiment, shared function logic 2716 within graphics core array 2714 can include some or all logic within shared function logic 2720. In at least one embodiment, all logic elements within shared function logic 2720 may be duplicated within shared function logic 2716 of graphics core array 2714. In at least one embodiment, shared function logic 2720 is excluded in favor of shared function logic 2716 within graphics core array 2714.

Figure 28:
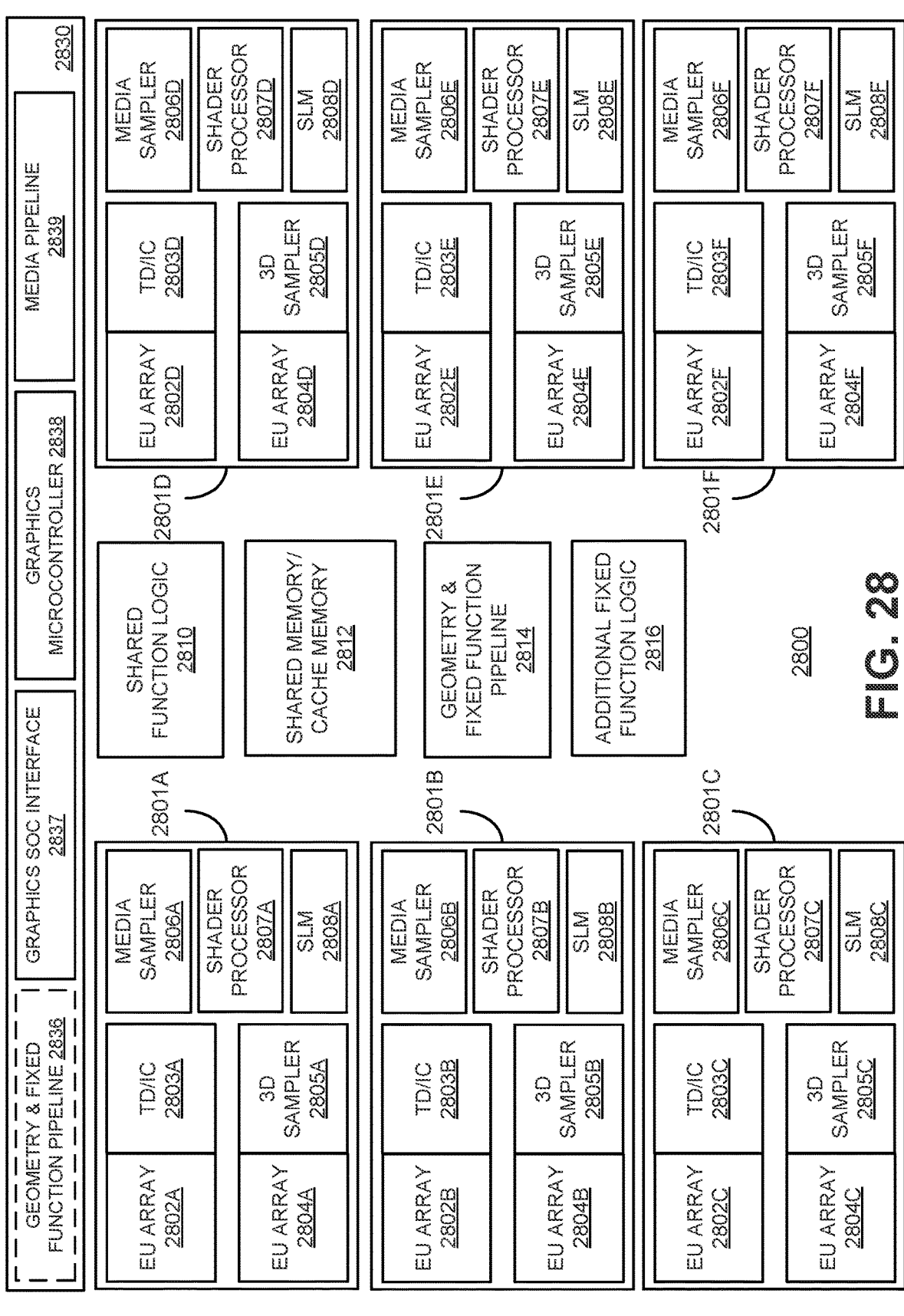
FIG. 28 is a block diagram of at least portions of a graphics processor core, according to at least one embodiment.

FIG. 28 is a block diagram of hardware logic of a graphics processor core 2800, according to at least one embodiment described herein. In at least one embodiment, first processor 125 or second processor 130 include graphics processor core 2800, where graphics processor core 2800 can perform processes and flows disclosed in FIGS. 3-6. In at least one embodiment, graphics processor core 2800 is included within a graphics core array. In at least one embodiment, graphics processor core 2800, sometimes referred to as a core slice, can be one or multiple graphics cores within a modular graphics processor. In at least one embodiment, graphics processor core 2800 is exemplary of one graphics core slice, and a graphics processor as described herein may include multiple graphics core slices based on target power and performance envelopes. In at least one embodiment, each graphics core 2800 can include a fixed function block 2830 coupled with multiple sub-cores 2801A-2801F, also referred to as sub-slices, that include modular blocks of general-purpose and fixed function logic.

In at least one embodiment, fixed function block 2830 includes a geometry/fixed function pipeline 2836 that can be shared by all sub-cores in graphics processor 2800, for example, in lower performance and/or lower power graphics processor implementations. In at least one embodiment, geometry/fixed function pipeline 2836 includes a 3D fixed function pipeline, a video front-end unit, a thread spawner and thread dispatcher, and a unified return buffer manager, which manages unified return buffers.

In at least one embodiment fixed function block 2830 also includes a graphics SoC interface 2837, a graphics micro-controller 2838, and a media pipeline 2839. Graphics SoC interface 2837 provides an interface between graphics core 2800 and other processor cores within a system on a chip integrated circuit. In at least one embodiment, graphics microcontroller 2838 is a programmable sub-processor that is configurable to manage various functions of graphics processor 2800, including thread dispatch, scheduling, and pre-emption. In at least one embodiment, media pipeline 2839 includes logic to facilitate decoding, encoding, pre-processing, and/or post-processing of multimedia data, including image and video data. In at least one embodiment, media pipeline 2839 implements media operations via requests to compute or sampling logic within sub-cores 2801-2801F.

In at least one embodiment, SoC interface 2837 enables graphics core 2800 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 2837 can also enable communication with fixed function devices within an SoC, such as camera imaging pipelines, and enables use of and/or implements global memory atomics that may be shared between graphics core 2800 and CPUs within an SoC. In at least one embodiment, SoC interface 2837 can also implement power management controls for graphics core 2800 and enable an interface between a clock domain of graphic core 2800 and other clock domains within an SoC. In at least one embodiment, SoC interface 2837 enables receipt of command buffers from a command streamer and global thread dispatcher that are configured to provide commands and instructions to each of one or more graphics cores within a graphics processor. In at least one embodiment, commands and instructions can be dispatched to media pipeline 2839, when media operations are to be performed, or a geometry and fixed function pipeline (e.g., geometry and fixed function pipeline 2836, geometry and fixed function pipeline 2814) when graphics processing operations are to be performed.

In at least one embodiment, graphics microcontroller 2838 can be configured to perform various scheduling and management tasks for graphics core 2800. In at least one embodiment, graphics microcontroller 2838 can perform graphics and/or compute workload scheduling on various graphics parallel engines within execution unit (EU) arrays 2802A-2802F, 2804A-2804F within sub-cores 2801A-2801F. In at least one embodiment, host software executing on a CPU core of an SoC including graphics core 2800 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 2838 can also facilitate low-power or idle states for graphics core 2800, providing graphics core 2800 with an ability to save and restore registers within graphics core 2800 across low-power state transitions independently from an operating system and/or graphics driver software on a system.

In at least one embodiment, graphics core 2800 may have greater than or fewer than illustrated sub-cores 2801A-2801F, up to N modular sub-cores. For each set of N sub-cores, in at least one embodiment, graphics core 2800 can also include shared function logic 2810, shared and/or cache memory 2812, a geometry/fixed function pipeline 2814, as well as additional fixed function logic 2816 to accelerate various graphics and compute processing operations. In at least one embodiment, shared function logic 2810 can include logic units (e.g., sampler, math, and/or inter-thread communication logic) that can be shared by each N sub-cores within graphics core 2800. Shared and/or cache memory 2812 can be a last-level cache for N sub-cores 2801A-2801F within graphics core 2800 and can also serve as shared memory that is accessible by multiple sub-cores. In at least one embodiment, geometry/fixed function pipeline 2814 can be included instead of geometry/fixed function pipeline 2836 within fixed function block 2830 and can include same or similar logic units.

In at least one embodiment, graphics core 2800 includes additional fixed function logic 2816 that can include various fixed function acceleration logic for use by graphics core 2800. In at least one embodiment, additional fixed function logic 2816 includes an additional geometry pipeline for use in position only shading. In position-only shading, at least two geometry pipelines exist, whereas in a full geometry pipeline within geometry/fixed function pipeline 2816, 2836, and a cull pipeline, which is an additional geometry pipeline which may be included within additional fixed function logic 2816. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2816 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 2816 can also include machine-learning acceleration logic, such as fixed function matrix multiplication logic, for implementations including optimizations for machine learning training or inferencing.

In at least one embodiment, within each graphics sub-core 2801A-2801F includes a set of execution resources that may be used to perform graphics, media, and compute operations in response to requests by graphics pipeline, media pipeline, or shader programs. In at least one embodiment, graphics sub-cores 2801A-2801F include multiple EU arrays 2802A-2802F, 2804A-2804F, thread dispatch and inter-thread communication (TD/IC) logic 2803A-2803F, a 3D (e.g., texture) sampler 2805A-2805F, a media sampler 2806A-2806F, a shader processor 2807A-2807F, and shared local memory (SLM) 2808A-2808F. EU arrays 2802A-2802F, 2804A-2804F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 2803A-2803F performs local thread dispatch and thread control operations for execution units within a sub-core and facilitate communication between threads executing on execution units of a sub-core. In at least one embodiment, 3D sampler 2805A-2805F can read texture or other 3D graphics related data into memory. In at least one embodiment, 3D sampler can read texture data differently based on a configured sample state and texture format associated with a given texture. In at least one embodiment, media sampler 2806A-2806F can perform similar read operations based on a type and format associated with media data. In at least one embodiment, each graphics sub-core 2801A-2801F can alternately include a unified 3D and media sampler. In at least one embodiment, threads executing on execution units within each of sub-cores 2801A-2801F can make use of shared local memory 2808A-2808F within each sub-core, to enable threads executing within a thread group to execute using a common pool of on-chip memory.

Figure 29A:
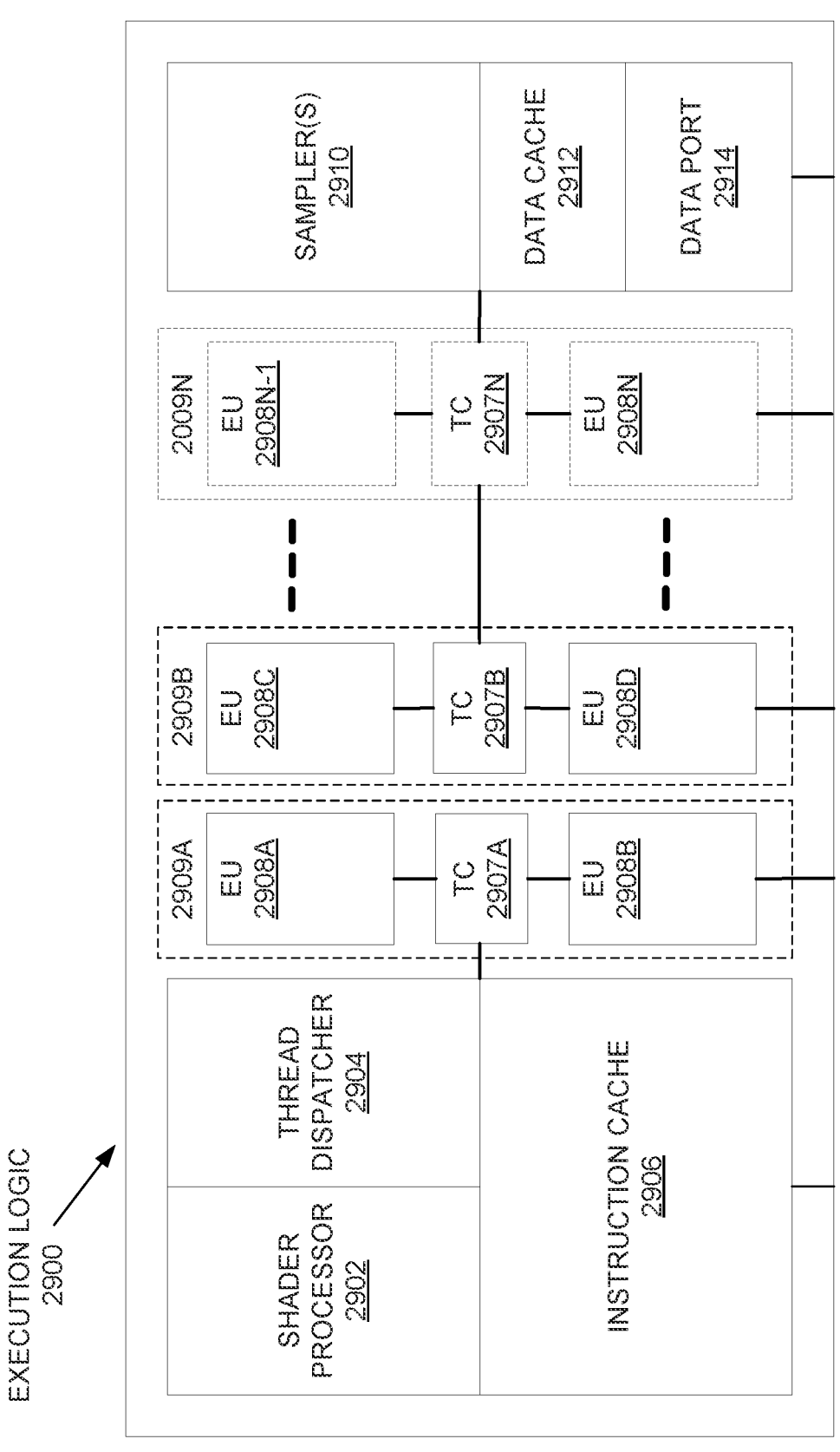
FIGS. 29A and 29B illustrate thread execution logic including an array of processing elements of a graphics processor core, according to at least one embodiment.
Figure 29B:
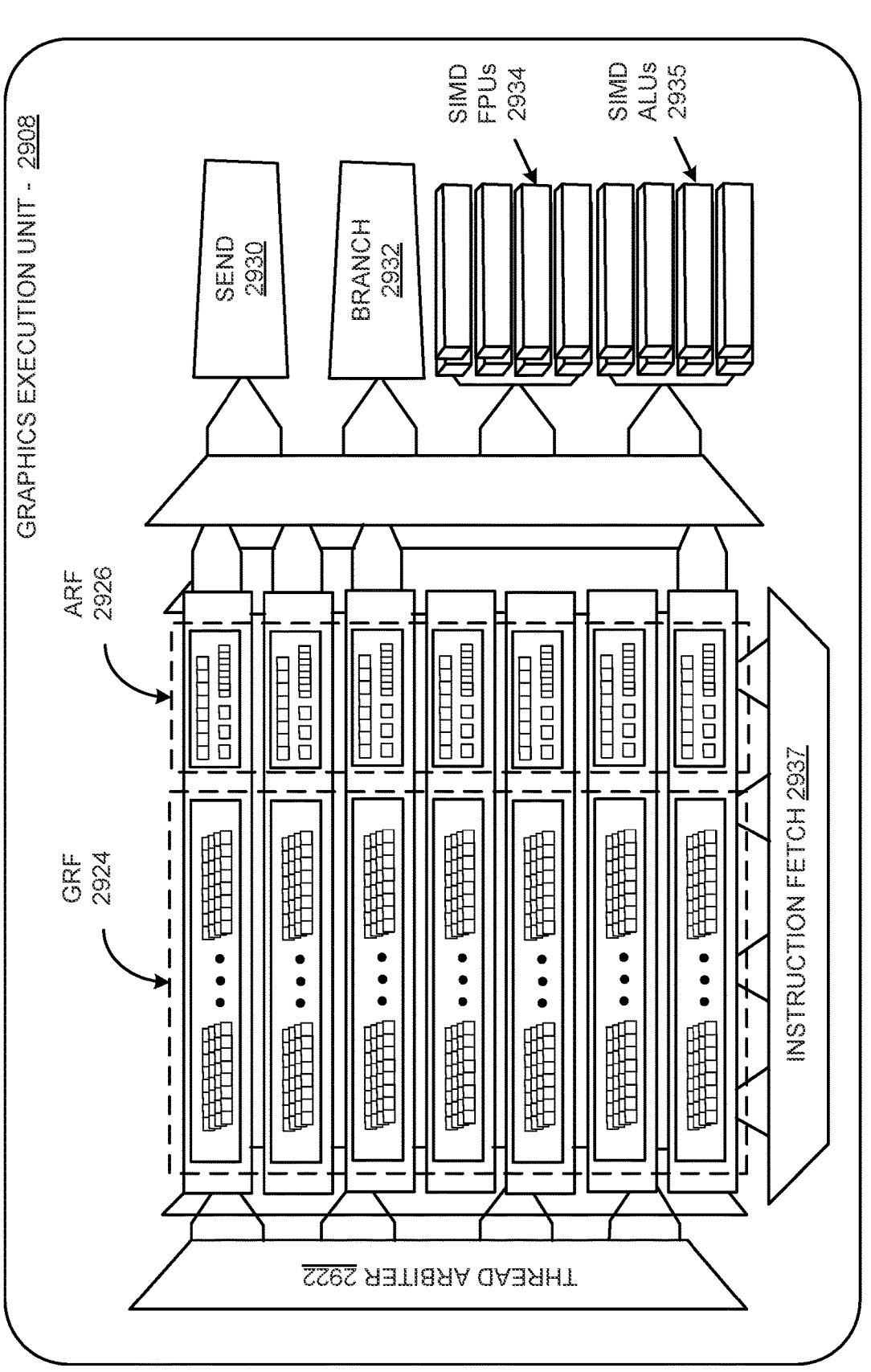

FIGS. 29A-29B illustrate thread execution logic 2900 including an array of processing elements of a graphics processor core according to at least one embodiment. In at least one embodiment, first processor 125 or second processor 130 include thread execution logic 2900, where thread execution logic 2900 can perform processes and flows disclosed in FIGS. 3-6. FIG. 29A illustrates at least one embodiment, in which thread execution logic 2900 is used.

FIG. 29B illustrates exemplary internal details of an execution unit, according to at least one embodiment.

As illustrated in FIG. 29A, in at least one embodiment, thread execution logic 2900 includes a shader processor 2902, a thread dispatcher 2904, instruction cache 2906, a scalable execution unit array including a plurality of execution units 2908A-2908N, a sampler 2910, a data cache 2912, and a data port 2914. In at least one embodiment a scalable execution unit array can dynamically scale by enabling or disabling one or more execution units (e.g., any of execution unit 2908A, 2908B, 2908C, 2908D, through 2908N-1 and 2908N) based on computational requirements of a workload, for example. In at least one embodiment, scalable execution units are interconnected via an interconnect fabric that links to each of execution unit. In at least one embodiment, thread execution logic 2900 includes one or more connections to memory, such as system memory or cache memory, through one or more of instruction cache 2906, data port 2914, sampler 2910, and execution units 2908A-2908N. In at least one embodiment, each execution unit (e.g., 2908A) is a stand-alone programmable general-purpose computational unit that is capable of executing multiple simultaneous hardware threads while processing multiple data elements in parallel for each thread. In at least one embodiment, array of execution units 2908A-2908N is scalable to include any number individual execution units.

In at least one embodiment, execution units 2908A-2908N are primarily used to execute shader programs. In at least one embodiment, shader processor 2902 can process various shader programs and dispatch execution threads associated with shader programs via a thread dispatcher 2904. In at least one embodiment, thread dispatcher 2904 includes logic to arbitrate thread initiation requests from graphics and media pipelines and instantiate requested threads on one or more execution units in execution units 2908A-2908N. For example, in at least one embodiment, a geometry pipeline can dispatch vertex, tessellation, or geometry shaders to thread execution logic for processing. In at least one embodiment, thread dispatcher 2904 can also process runtime thread spawning requests from executing shader programs.

In at least one embodiment, execution units 2908A-2908N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 2908A-2908N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 2908A-2908N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 2908A-2908N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 2908A-2908N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 2909A-2909N having thread control logic (2907A-2907N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 2909A-2909N includes at least two execution units. For example, in at least one embodiment, fused execution unit 2909A includes a first EU 2908A, second EU 2908B, and thread control logic 2907A that is common to first EU 2908A and second EU 2908B. In at least one embodiment, thread control logic 2907A controls threads executed on fused graphics execution unit 2909A, allowing each EU within fused execution units 2909A-2909N to execute using a common instruction pointer register.

In at least one embodiment, one or more internal instruction caches (e.g., 2906) are included in thread execution logic 2900 to cache thread instructions for execution units. In at least one embodiment, one or more data caches (e.g., 2912) are included to cache thread data during thread execution. In at least one embodiment, a sampler 2910 is included to provide texture sampling for 3D operations and media sampling for media operations. In at least one embodiment, sampler 2910 includes specialized texture or media sampling functionality to process texture or media data during sampling process before providing sampled data to an execution unit.

During execution, in at least one embodiment, graphics and media pipelines send thread initiation requests to thread execution logic 2900 via thread spawning and dispatch logic. In at least one embodiment, once a group of geometric objects has been processed and rasterized into pixel data, pixel processor logic (e.g., pixel shader logic, fragment shader logic, etc.) within shader processor 2902 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 2902 then executes an API-supplied pixel or fragment shader program. In at least one embodiment, to execute a shader program, shader processor 2902 dispatches threads to an execution unit (e.g., 2908A) via thread dispatcher 2904. In at least one embodiment, shader processor 2902 uses texture sampling logic in sampler 2910 to access texture data in texture maps stored in memory. In at least one embodiment, arithmetic operations on texture data and input geometry data compute pixel color data for each geometric fragment, or discards one or more pixels from further processing.

In at least one embodiment, data port 2914 provides a memory access mechanism for thread execution logic 2900 to output processed data to memory for further processing on a graphics processor output pipeline. In at least one embodiment, data port 2914 includes or couples to one or more cache memories (e.g., data cache 2912) to cache data for memory access via a data port.

As illustrated in FIG. 29B, in at least one embodiment, a graphics execution unit 2908 can include an instruction fetch unit 2937, a general register file array (GRF) 2924, an architectural register file array (ARF) 2926, a thread arbiter 2922, a send unit 2930, a branch unit 2932, a set of SIMD floating point units (FPUs) 2934, and In at least one embodiment a set of dedicated integer SIMD ALUs 2935. In at least one embodiment, GRF 2924 and ARF 2926 includes a set of general register files and architecture register files associated with each simultaneous hardware thread that may be active in graphics execution unit 2908. In at least one embodiment, per thread architectural state is maintained in ARF 2926, while data used during thread execution is stored in GRF 2924. In at least one embodiment, execution state of each thread, including instruction pointers for each thread, can be held in thread-specific registers in ARF 2926.

In at least one embodiment, graphics execution unit 2908 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 2908 can co-issue multiple instructions, which may each be different instructions. In at least one embodiment, thread arbiter 2922 of graphics execution unit thread 2908 can dispatch instructions to one of send unit 2930, branch unit 2942, or SIMD FPU(s) 2934 for execution. In at least one embodiment, each execution thread can access 128 general-purpose registers within GRF 2924, where each register can store 32 bytes, accessible as a SIMD 8-element vector of 32-bit data elements. In at least one embodiment, each execution unit thread has access to 4 Kbytes within GRF

2924, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 2924 can store a total of 28 Kbytes. In at least one embodiment, flexible addressing modes can permit registers to be addressed together to build effectively wider registers or to represent stride rectangular block data structures.

In at least one embodiment, memory operations, sampler operations, and other longer-latency system communications are dispatched via "send" instructions that are executed by message passing send unit 2930. In at least one embodiment, branch instructions are dispatched to a dedicated branch unit 2932 to facilitate SIMD divergence and eventual convergence.

In at least one embodiment graphics execution unit 2908 includes one or more SIMD floating point units (FPU(s)) 2934 to perform floating-point operations. In at least one embodiment, FPU(s) 2934 also support integer computation. In at least one embodiment FPU(s) 2934 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 2935 are also present, and may be specifically optimized to perform operations associated with machine learning computations.

In at least one embodiment, arrays of multiple instances of graphics execution unit 2908 can be instantiated in a graphics sub-core grouping (e.g., a sub-slice). In at least one embodiment execution unit 2908 can execute instructions across a plurality of execution channels. In at least one embodiment, each thread executed on graphics execution unit 2908 is executed on a different channel.

Figure 30:
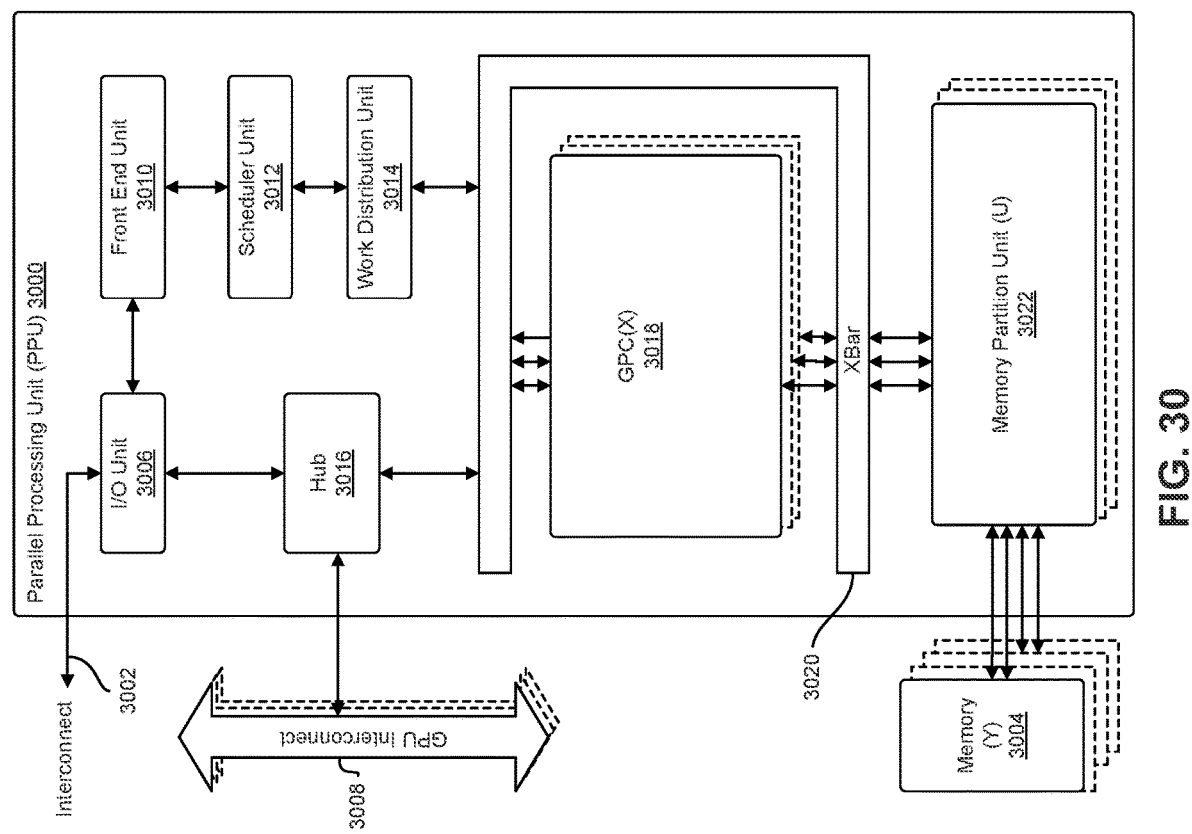
FIG. 30 illustrates a parallel processing unit ("PPU"), according to at least one embodiment.

FIG. 30 illustrates a parallel processing unit ("PPU") 3000, according to at least one embodiment. In at least one embodiment, first processor 125 or second processor 130 is or include PPU 3000, where PPU 3000 can perform processes and flows disclosed in FIGS. 3-6. In at least one embodiment, PPU 3000 is configured with machine-readable code that, if executed by PPU 3000, causes PPU 3000 to perform some or all of processes and techniques described throughout this disclosure. In at least one embodiment, PPU 3000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3000. In at least one embodiment, PPU 3000 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3000 is utilized to perform computations such as linear algebra operations and machine-learning operations. FIG. 30 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3000 are configured to accelerate High Performance Computing ("HPC"), data center, and machine learning applications. In at least one embodiment, PPU 3000 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3000 includes, without limitation, an Input/Output ("I/O") unit 3006, a front-end unit 3010, a scheduler unit 3012, a work distribution unit 3014, a hub 3016, a crossbar ("X-Bar") 3020, one or more general processing clusters ("GPCs") 3018, and one or more partition units ("memory partition units") 3022. In at least one embodiment, PPU 3000 is connected to a host processor or other PPUs 3000 via one or more high-speed GPU interconnects ("GPU interconnects") 3008. In at least one embodiment, PPU 3000 is connected to a host processor or other peripheral devices via an interconnect 3002. In at least one embodiment, PPU 3000 is connected to a local memory comprising one or more memory devices ("memory") 3004. In at least one embodiment, memory devices 3004 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3008 may refer to a wire-based multi-lane communications link that is used by systems to scale and include one or more PPUs 3000 combined with one or more central processing units ("CPUs"), supports cache coherence between PPUs 3000 and CPUs, and CPU mastering. In at least one embodiment, data and/or commands are transmitted by high-speed GPU interconnect 3008 through hub 3016 to/from other units of PPU 3000 such as one or more copy engines, video encoders, video decoders, power management units, and other components which may not be explicitly illustrated in FIG. 30.

In at least one embodiment, I/O unit 3006 is configured to transmit and receive communications (e.g., commands, data) from a host processor (not illustrated in FIG. 30) over system bus 3002. In at least one embodiment, I/O unit 3006 communicates with host processor directly via system bus 3002 or through one or more intermediate devices such as a memory bridge. In at least one embodiment, I/O unit 3006 may communicate with one or more other processors, such as one or more of PPUs 3000 via system bus 3002. In at least one embodiment, I/O unit 3006 implements a Peripheral Component Interconnect Express ("PCIe") interface for communications over a PCIe bus. In at least one embodiment, I/O unit 3006 implements interfaces for communicating with external devices.

In at least one embodiment, I/O unit 3006 decodes packets received via system bus 3002. In at least one embodiment, at least some packets represent commands configured to cause PPU 3000 to perform various operations. In at least one embodiment, I/O unit 3006 transmits decoded commands to various other units of PPU 3000 as specified by commands. In at least one embodiment, commands are transmitted to front-end unit 3010 and/or transmitted to hub 3016 or other units of PPU 3000 such as one or more copy engines, a video encoder, a video decoder, a power management unit, etc. (not explicitly illustrated in FIG. 30). In at least one embodiment, I/O unit 3006 is configured to route communications between and among various logical units of PPU 3000.

In at least one embodiment, a program executed by host processor encodes a command stream in a buffer that provides workloads to PPU 3000 for processing. In at least one embodiment, a workload comprises instructions and data to be processed by those instructions. In at least one embodiment, buffer is a region in a memory that is accessible (e.g., read/write) by both host processor and PPU 3000—a host interface unit may be configured to access buffer in a system memory connected to system bus 3002 via memory requests transmitted over system bus 3002 by I/O unit 3006. In at least one embodiment, host processor writes command stream to buffer and then transmits a pointer to start of command stream to PPU 3000 such that front-end unit 3010 receives pointers to one or more command streams and manages one or more command streams, reading commands from command streams and forwarding commands to various units of PPU 3000.

In at least one embodiment, front-end unit 3010 is coupled to scheduler unit 3012 that configures various GPCs 3018 to process tasks defined by one or more command streams. In at least one embodiment, scheduler unit 3012 is configured to track state information related to various tasks managed by scheduler unit 3012 where state information may indicate which of GPCs 3018 a task is assigned to, whether task is active or inactive, a priority level associated with task, and so forth. In at least one embodiment, scheduler unit 3012 manages execution of a plurality of tasks on one or more of GPCs 3018.

In at least one embodiment, scheduler unit 3012 is coupled to work distribution unit 3014 that is configured to dispatch tasks for execution on GPCs 3018. In at least one embodiment, work distribution unit 3014 tracks a number of scheduled tasks received from scheduler unit 3012 and work distribution unit 3014 manages a pending task pool and an active task pool for each of GPCs 3018. In at least one embodiment, pending task pool comprises a number of slots (e.g., 32 slots) that contain tasks assigned to be processed by a particular GPC 3018; active task pool may comprise a number of slots (e.g., 4 slots) for tasks that are actively being processed by GPCs 3018 such that as one of GPCs 3018 completes execution of a task, that task is evicted from active task pool for GPC 3018 and one of other tasks from pending task pool is selected and scheduled for execution on GPC 3018. In at least one embodiment, if an active task is idle on GPC 3018, such as while waiting for a data dependency to be resolved, then active task is evicted from GPC 3018 and returned to pending task pool while another task in pending task pool is selected and scheduled for execution on GPC 3018.

In at least one embodiment, work distribution unit 3014 communicates with one or more GPCs 3018 via XBar 3020. In at least one embodiment, XBar 3020 is an interconnect network that couples many of units of PPU 3000 to other units of PPU 3000 and can be configured to couple work distribution unit 3014 to a particular GPC 3018. In at least one embodiment, one or more other units of PPU 3000 may also be connected to XBar 3020 via hub 3016.

In at least one embodiment, tasks are managed by scheduler unit 3012 and dispatched to one of GPCs 3018 by work distribution unit 3014. GPC 3018 is configured to process task and generate results. In at least one embodiment, results may be consumed by other tasks within GPC 3018, routed to a different GPC 3018 via XBar 3020, or stored in memory 3004. In at least one embodiment, results can be written to memory 3004 via partition units 3022, which implement a memory interface for reading and writing data to/from memory 3004. In at least one embodiment, results can be transmitted to another PPU 3004 or CPU via high-speed GPU interconnect 3008. In at least one embodiment, PPU 3000 includes, without limitation, a number U of partition units 3022 that is equal to number of separate and distinct memory devices 3004 coupled to PPU 3000. In at least one embodiment, partition unit 3022 will be described in more detail herein in conjunction with FIG. 32.

In at least one embodiment, a host processor executes a driver kernel that implements an API that enables one or more applications executing on host processor to schedule operations for execution on PPU 3000. In at least one embodiment, multiple compute applications are simultaneously executed by PPU 3000 and PPU 3000 provides isolation, QoS, and independent address spaces for multiple compute applications. In at least one embodiment, an application generates instructions (e.g., in form of API calls) that cause driver kernel to generate one or more tasks for execution by PPU 3000 and driver kernel outputs tasks to one or more streams being processed by PPU 3000. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 32.

Figure 31:
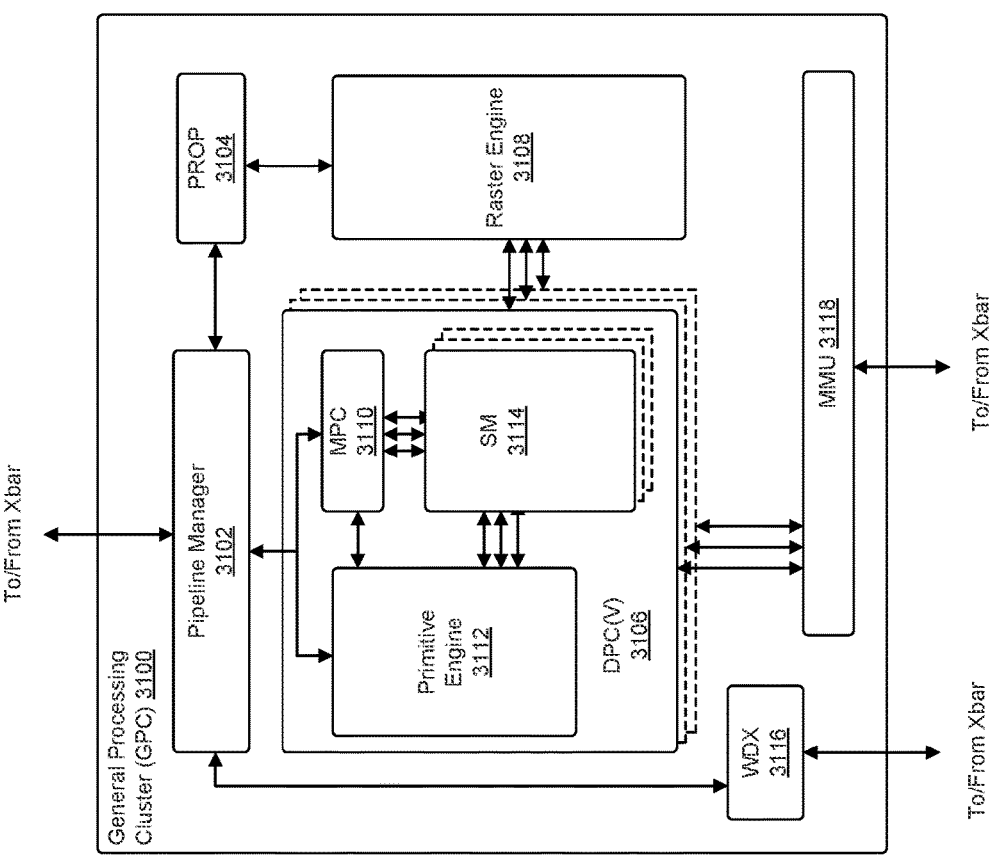
FIG. 31 illustrates a general processing cluster ("GPC"), according to at least one embodiment.

FIG. 31 illustrates a general processing cluster ("GPC") 3100, according to at least one embodiment. In at least one embodiment, GPC 3100 is GPC 3018 of FIG. 30. In at least one embodiment, first processor 125 or second processor 130 is or include GPC 3100, where GPC 3100 can perform processes and flows disclosed in FIGS. 3-6. In at least one embodiment, each GPC 3100 includes, without limitation, a number of hardware units for processing tasks and each GPC 3100 includes, without limitation, a pipeline manager 3102, a pre-raster operations unit ("PROP") 3104, a raster engine 3108, a work distribution crossbar ("WDX") 3116, a memory management unit ("MMU") 3118, one or more Data Processing Clusters ("DPCs") 3106, and any suitable combination of parts.

In at least one embodiment, operation of GPC 3100 is controlled by pipeline manager 3102. In at least one embodiment, pipeline manager 3102 manages configuration of one or more DPCs 3106 for processing tasks allocated to GPC 3100. In at least one embodiment, pipeline manager 3102 configures at least one of one or more DPCs 3106 to implement at least a portion of a graphics rendering pipeline. In at least one embodiment, DPC 3106 is configured to execute a vertex shader program on a programmable streaming multi-processor ("SM") 3114. In at least one embodiment, pipeline manager 3102 is configured to route packets received from a work distribution unit to appropriate logical units within GPC 3100, in at least one embodiment, and some packets may be routed to fixed function hardware units in PROP 3104 and/or raster engine 3108 while other packets may be routed to DPCs 3106 for processing by a primitive engine 3112 or SM 3114. In at least one embodiment, pipeline manager 3102 configures at least one of DPCs 3106 to implement a neural network model and/or a computing pipeline.

In at least one embodiment, PROP unit 3104 is configured, in at least one embodiment, to route data generated by raster engine 3108 and DPCs 3106 to a Raster Operations ("ROP") unit in partition unit 3022, described in more detail above in conjunction with FIG. 30. In at least one embodiment, PROP unit 3104 is configured to perform optimizations for color blending, organize pixel data, perform address translations, and more. In at least one embodiment, raster engine 3108 includes, without limitation, a number of fixed function hardware units configured to perform various raster operations, in at least one embodiment, and raster engine 3108 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 3108 comprises fragments to be processed by any suitable entity such as by a fragment shader implemented within DPC 3106.

In at least one embodiment, each DPC 3106 included in GPC 3100 comprise, without limitation, an M-Pipe Controller ("MPC") 3110; primitive engine 3112; one or more SMs 3114; and any suitable combination thereof. In at least one embodiment, MPC 3110 controls operation of DPC 3106, routing packets received from pipeline manager 3102 to appropriate units in DPC 3106. In at least one embodiment, packets associated with a vertex are routed to primitive engine 3112, which is configured to fetch vertex attributes associated with vertex from memory; in contrast, packets associated with a shader program may be transmitted to SM 3114.

In at least one embodiment, SM 3114 comprises, without limitation, a programmable streaming processor that is configured to process tasks represented by a number of threads. In at least one embodiment, SM 3114 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 3114 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 3114 are described in more detail herein.

In at least one embodiment, MMU 3118 provides an interface between GPC 3100 and memory partition unit (e.g., partition unit 3022 of FIG. 30) and MMU 3118 provides translation of virtual addresses into physical addresses, memory protection, and arbitration of memory requests. In at least one embodiment, MMU 3118 provides one or more translation lookaside buffers ("TLBs") for performing translation of virtual addresses into physical addresses in memory.

Figure 32:
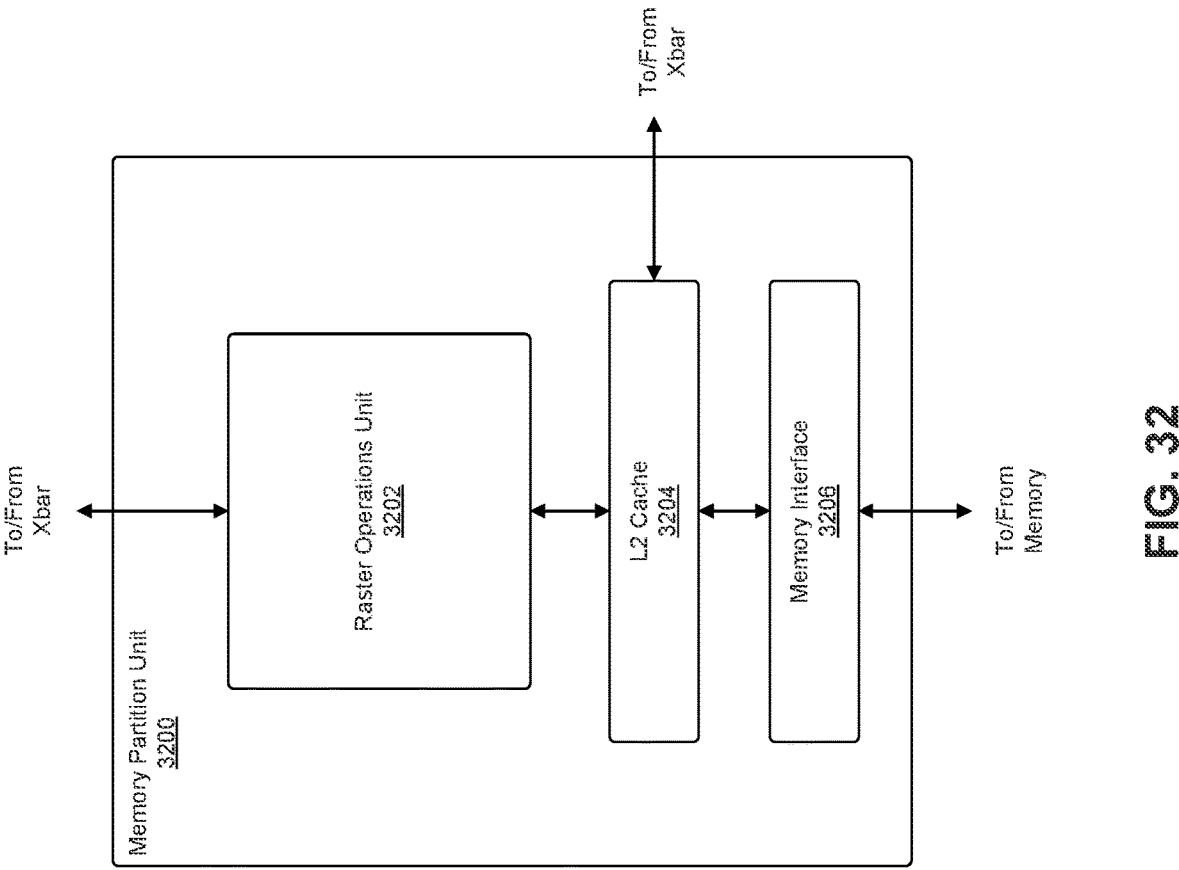
FIG. 32 illustrates a memory partition unit of a parallel processing unit ("PPU"), according to at least one embodiment.

FIG. 32 illustrates a memory partition unit 3200 of a parallel processing unit ("PPU"), in accordance with at least one embodiment. In at least one embodiment, first processor 125 or second processor 130 include memory partition unit 3200, where memory partition unit 3200 can perform or store processes and flows disclosed in FIGS. 3-6. In at least one embodiment, memory partition unit 3200 includes, without limitation, a Raster Operations ("ROP") unit 3202; a level two ("L2") cache 3204; a memory interface 3206; and any suitable combination thereof. In at least one embodiment, memory interface 3206 is coupled to memory. In at least one embodiment, memory interface 3206 may implement 32, 64, 128, 1024-bit data buses, or like, for high-speed data transfer. In at least one embodiment, PPU incorporates U memory interfaces 3206, one memory interface 3206 per pair of partition units 3200, where each pair of partition units 3200 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3206 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 3200 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3008 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 3200 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3004 of FIG. 30 or other system memory is fetched by memory partition unit 3200 and stored in L2 cache 3204, which is located on-chip and is shared between various GPCs, in accordance with at least one embodiment. Each memory partition unit 3200, in at least one embodiment, includes, without limitation, at least a portion of L2 cache associated with a corresponding memory device. In at least one embodiment, lower level caches are implemented in various units within GPCs. In at least one embodiment, each of SMs 3114 may implement a level one ("L1") cache wherein L1 cache is private memory that is dedicated to a particular SM 3114 and data from L2 cache 3204 is fetched and stored in each of L1 caches for processing in functional units of SMs 3114. In at least one embodiment, L2 cache 3204 is coupled to memory interface 3206 and XBar 3020.

ROP unit 3202 performs graphics raster operations related to pixel color, such as color compression, pixel blending, and more, in at least one embodiment. ROP unit 3202, in at least one embodiment, implements depth testing in conjunction with raster engine 3108, receiving a depth for a sample location associated with a pixel fragment from culling engine of raster engine 3108. In at least one embodiment, depth is tested against a corresponding depth in a depth buffer for a sample location associated with fragment. In at least one embodiment, if fragment passes depth test for sample location, then ROP unit 3202 updates depth buffer and transmits a result of depth test to raster engine 3108. It will be appreciated that number of partition units 3200 may be different than number of GPCs and, therefore, each ROP unit 3202 can, in at least one embodiment, be coupled to each of GPCs. In at least one embodiment, ROP unit 3202 tracks packets received from different GPCs and determines which that a result generated by ROP unit 3202 is routed to through XBar 3020.

Figure 33:
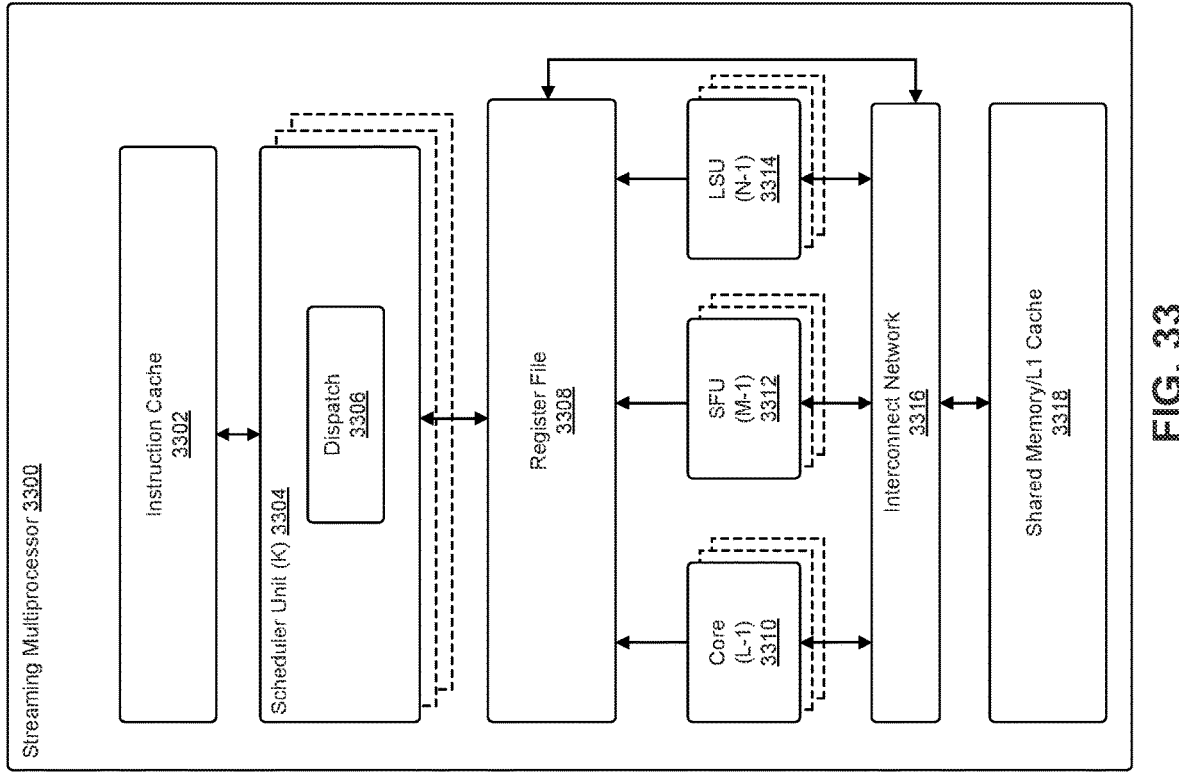
FIG. 33 illustrates a streaming multi-processor, according to at least one embodiment.

FIG. 33 illustrates a streaming multi-processor ("SM") 3300, according to at least one embodiment. In at least one embodiment, SM 3300 is SM of FIG. 31. In at least one embodiment, SM 3300 includes, without limitation, an instruction cache 3302; one or more scheduler units 3304; a register file 3308; one or more processing cores ("cores") 3310; one or more special function units ("SFUs") 3312; one or more load/store units ("LSUs") 3314; an interconnect network 3316; a shared memory/level one ("L1") cache 3318; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 3300. In at least one embodiment, scheduler unit 3304 receives tasks from work distribution unit and manages instruction scheduling for one or more thread blocks assigned to SM 3300. In at least one embodiment, scheduler unit 3304 schedules thread blocks for execution as warps of parallel threads, wherein each thread block is allocated at least one warp. In at least one embodiment, each warp executes threads. In at least one embodiment, scheduler unit 3304 manages a plurality of different thread blocks, allocating warps to different thread blocks and then dispatching instructions from plurality of different cooperative groups to various functional units (e.g., processing cores 3310, SFUs 3312, and LSUs 3314) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3306 is configured to transmit instructions to one or more of functional units and scheduler unit 3304 includes, without limitation, two dispatch units 3306 that enable two different instructions from same warp to be dispatched during each clock cycle. In at least one embodiment, each scheduler unit 3304 includes a single dispatch unit 3306 or additional dispatch units 3306.

In at least one embodiment, each SM 3300, in at least one embodiment, includes, without limitation, register file 3308 that provides a set of registers for functional units of SM 3300. In at least one embodiment, register file 3308 is divided between each of functional units such that each functional unit is allocated a dedicated portion of register file 3308. In at least one embodiment, register file 3308 is divided between different warps being executed by SM 3300 and register file 3308 provides temporary storage for operands connected to data paths of functional units. In at least one embodiment, each SM 3300 comprises, without limitation, a plurality of L processing cores 3310. In at least one embodiment, SM 3300 includes, without limitation, a large number (e.g., 128 or more) of distinct processing cores 3310. In at least one embodiment, each processing core 3310, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 3310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 3300 comprises, without limitation, M SFUs 3312 that perform special functions (e.g., attribute evaluation, reciprocal square root, and like). In at least one embodiment, SFUs 3312 include, without limitation, a tree traversal unit configured to traverse a hierarchical tree data structure. In at least one embodiment, SFUs 3312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3300. In at least one embodiment, texture maps are stored in shared memory/L1 cache 3318. In at least one embodiment, texture units implement texture operations such as filtering operations using mip-maps (e.g., texture maps of varying levels of detail), in accordance with at least one embodiment. In at least one embodiment, each SM 3300 includes, without limitation, two texture units.

Each SM 3300 comprises, without limitation, N LSUs 3314 that implement load and store operations between shared memory/L1 cache 3318 and register file 3308, in at least one embodiment. Each SM 3300 includes, without limitation, interconnect network 3316 that connects each of functional units to register file 3308 and LSU 3314 to register file 3308 and shared memory/L1 cache 3318 in at least one embodiment. In at least one embodiment, interconnect network 3316 is a crossbar that can be configured to connect any of functional units to any of registers in register file 3308 and connect LSUs 3314 to register file 3308 and memory locations in shared memory/L1 cache 3318.

In at least one embodiment, shared memory/L1 cache 3318 is an array of on-chip memory that allows for data storage and communication between SM 3300 and primitive engine and between threads in SM 3300, in at least one embodiment. In at least one embodiment, shared memory/ L1 cache 3318 comprises, without limitation, 128 KB of storage capacity and is in path from SM 3300 to partition unit. In at least one embodiment, shared memory/L1 cache 3318, in at least one embodiment, is used to cache reads and writes. In at least one embodiment, one or more of shared memory/L1 cache 3318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 3318 enables shared memory/L1 cache 3318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 3300 to execute program and perform calculations, shared memory/L1 cache 3318 to communicate between threads, and LSU 3314 to read and write global memory through shared memory/L1 cache 3318 and memory partition unit. In at least one embodiment, when configured for general purpose parallel computation, SM 3300 writes commands that scheduler unit 3304 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. In at least one embodiment, graphics card may be configured to interface with a PCIe slot on a motherboard of a desktop computer. In at least one embodiment, PPU may be an integrated graphics processing unit ("iGPU") included in chipset of motherboard.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improve-ments over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1304 and/or secondary storage. Computer programs, if executed by one or more processors, enable system 1300 to perform various functions in accordance with at least one embodiment. In at least one embodiment, memory 1304, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1302; parallel processing system 1312; an integrated circuit capable of at least a portion of capabilities of both CPU 1302; parallel processing system 1312; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1300 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1312 includes, without limitation, a plurality of parallel processing units ("PPUs") 1314 and associated memories 1316. In at least one embodiment, PPUs 1314 are connected to a host processor or other peripheral devices via an interconnect 1318 and a switch 1320 or multiplexer. In at least one embodiment, parallel processing system 1312 distributes computational tasks across PPUs 1314 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1314, although such shared memory may incur performance penalties relative to use of local memory and registers resident to a PPU 1314. In at least one embodiment, operation of PPUs 1314 is synchronized through use of a command such as syncthreads( ) wherein all threads in a block (e.g., executed across multiple PPUs 1314) to reach a certain point of execution of code before proceeding.

Networks

Figure 34:
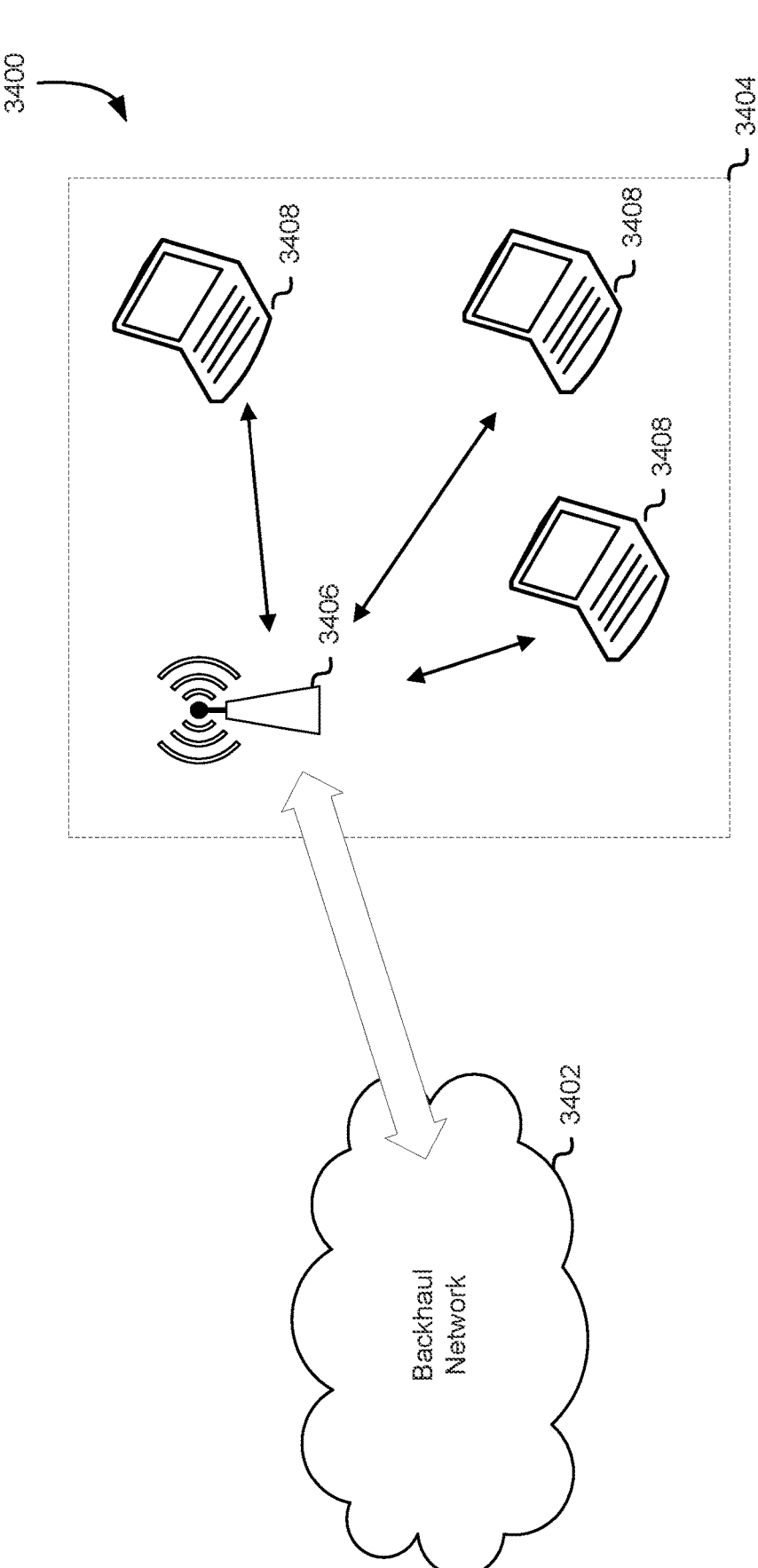
FIG. 34 illustrates a network for communicating data within a 5G wireless communications network, according to at least one embodiment.

FIG. 34 illustrates a network 3400 for communicating data within a 5G wireless communications network, in accordance with at least one embodiment. In at least one embodiment, network 3400 can be supported by network protocol stack 100 as shown in FIG. 1, and network 3400 can be used to perform processes and flows disclosed in FIG.

3-6. In at least one embodiment, network 3400 comprises a base station 3406 having a coverage area 3404, a plurality of mobile devices 3408, and a backhaul network 3402. In at least one embodiment, as shown, base station 3406 establishes uplink and/or downlink connections with mobile devices 3408, which serve to carry data from mobile devices 3408 to base station 3406 and vice-versa. In at least one embodiment, data carried over uplink/downlink connections may include data communicated between mobile devices 3408, as well as data communicated to/from a remote-end (not shown) by way of backhaul network 3402. In at least one embodiment, term "base station" refers to any component (or collection of components) configured to provide wireless access to a network, such as an enhanced base station (eNB), a macro-cell, a femtocell, a Wi-Fi access point (AP), or other wirelessly enabled devices. In at least one embodiment, base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. In at least one embodiment, term "mobile device" refers to any component (or collection of components) capable of establishing a wireless connection with a base station, such as a user equipment (UE), a mobile station (STA), and other wirelessly enabled devices. In some embodiments, network 3400 may comprise various other wireless devices, such as relays, low power nodes, etc.

Figure 35:
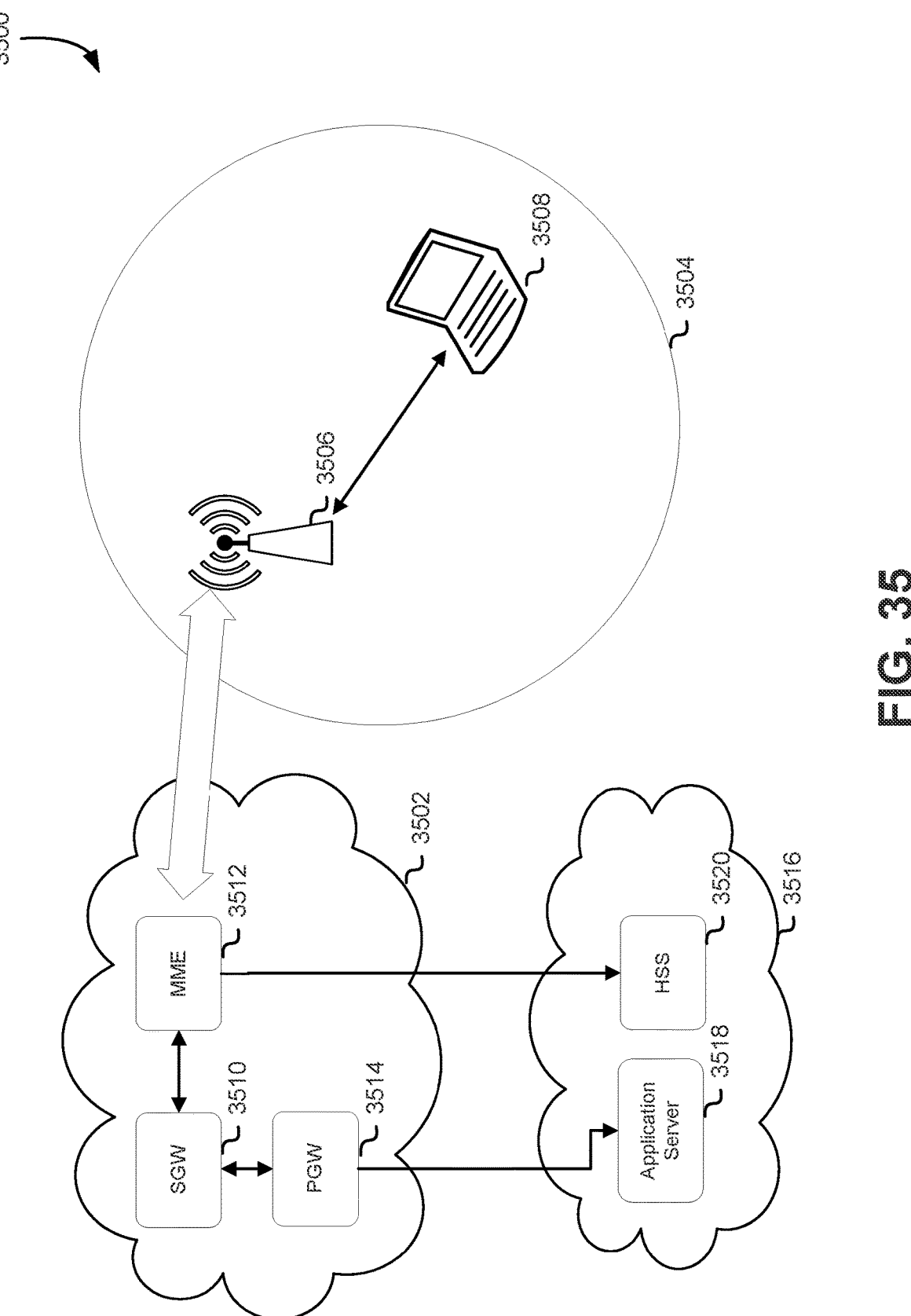
FIG. 35 illustrates a network architecture for a 5G LTE wireless network, according to at least one embodiment.

FIG. 35 illustrates a network architecture 3500 for a 5G wireless network, in accordance with at least one embodiment. In at least one embodiment, network architecture 3500 can be supported by network protocol stack 100 as shown in FIG. 1, and network architecture 3500 can be used to perform processes and flows disclosed in FIG. 3-6. In at least one embodiment, as shown, network architecture 3500 includes a radio access network (RAN) 3504, an evolved packet core (EPC) 3502, which may be referred to as a core network, and a home network 3516 of a UE 3508 attempting to access RAN 3504. In at least one embodiment, RAN 3504 and EPC 3502 form a serving wireless network. In at least one embodiment, RAN 3504 includes a base station 3506, and EPC 3502 includes a mobility management entity (MIME) 3512, a serving gateway (SGW) 3510, and a packet data network (PDN) gateway (PGW) 3514. In at least one embodiment, home network 3516 includes an application server 3518 and a home subscriber server (HSS) 3520. In at least one embodiment, HSS 3520 may be part of home network 3516, EPC 3502, and/or variations thereof.

In at least one embodiment, MME 3512 is a termination point in a network for ciphering/integrity protection for NAS signaling and handles security key management. In at least one embodiment, it should be appreciated that term "MME" is used in 4G LTE networks, and that 5G LTE networks may include a Security Anchor Node (SEAN) or a Security Access Function (SEAF) that performs similar functions. In at least one embodiment, terms "MME," "SEAN," and "SEAF" may be used interchangeably. In at least one embodiment, MME 3512 also provides control plane function for mobility between LTE and 2G/3G access networks, as well as an interface to home networks of roaming UEs. In at least one embodiment, SGW 3510 routes and forwards user data packets, while also acting as a mobility anchor for a user plane during handovers. In at least one embodiment, PGW 3514 provides connectivity from UEs to external packet data networks by being a point of exit and entry of traffic for UEs. In at least one embodiment, HSS 3520 is a central database that contains user-related and subscription-related information. In at least one embodiment, application server 3518 is a central database that contains user-related information regarding various applications that may utilize and communicate via network architecture 3500.

Figure 36:
FIG. 36 is a diagram illustrating some basic functionality of a mobile telecommunications network/system operating in accordance with LTE and 5G principles, according to at least one embodiment.

FIG. 36 is a diagram illustrating some basic functionality of a mobile telecommunications network/system operating in accordance with LTE and 5G principles, in accordance with at least one embodiment. In at least one embodiment, a mobile telecommunications system includes infrastructure equipment comprising base stations 3614 which are connected to a core network 3602, which operates in accordance with a conventional arrangement which will be understood by those acquainted with communications technology. In at least one embodiment, infrastructure equipment 3614 may also be referred to as a base station, network element, enhanced NodeB (eNodeB) or a coordinating entity for example, and provides a wireless access interface to one or more communications devices within a coverage area or cell represented by a broken line 3604, which may be referred to as a radio access network. In at least one embodiment, one or more mobile communications devices 3606 may communicate data via transmission and reception of signals representing data using a wireless access interface. In at least one embodiment, core network 3602 may also provide functionality including authentication, mobility management, charging and so on for communications devices served by a network entity.

In at least one embodiment, mobile communications devices of FIG. 36 may also be referred to as communications terminals, user equipment (UE), terminal devices and so forth, and are configured to communicate with one or more other communications devices served by a same or a different coverage area via a network entity. In at least one embodiment, these communications may be performed by transmitting and receiving signals representing data using a wireless access interface over two way communications links.

In at least one embodiment, as shown in FIG. 36, one of eNodeBs 3614*a* is shown in more detail to include a transmitter 3612 for transmitting signals via a wireless access interface to one or more communications devices or UEs 3606, and a receiver 3610 to receive signals from one or more UEs within coverage area 3604. In at least one embodiment, controller 3608 controls transmitter 3612 and receiver 3610 to transmit and receive signals via a wireless access interface. In at least one embodiment, controller 3608 may perform a function of controlling allocation of communications resource elements of a wireless access interface and may in some examples include a scheduler for scheduling transmissions via a wireless access interface for both uplink and downlink.

In at least one embodiment, an example UE 3606*a* is shown in more detail to include a transmitter 3620 for transmitting signals on an uplink of a wireless access interface to eNodeB 3614 and a receiver 3618 for receiving signals transmitted by eNodeB 3614 on a downlink via a wireless access interface. In at least one embodiment, transmitter 3620 and receiver 3618 are controlled by a controller 3616.

Figure 37:
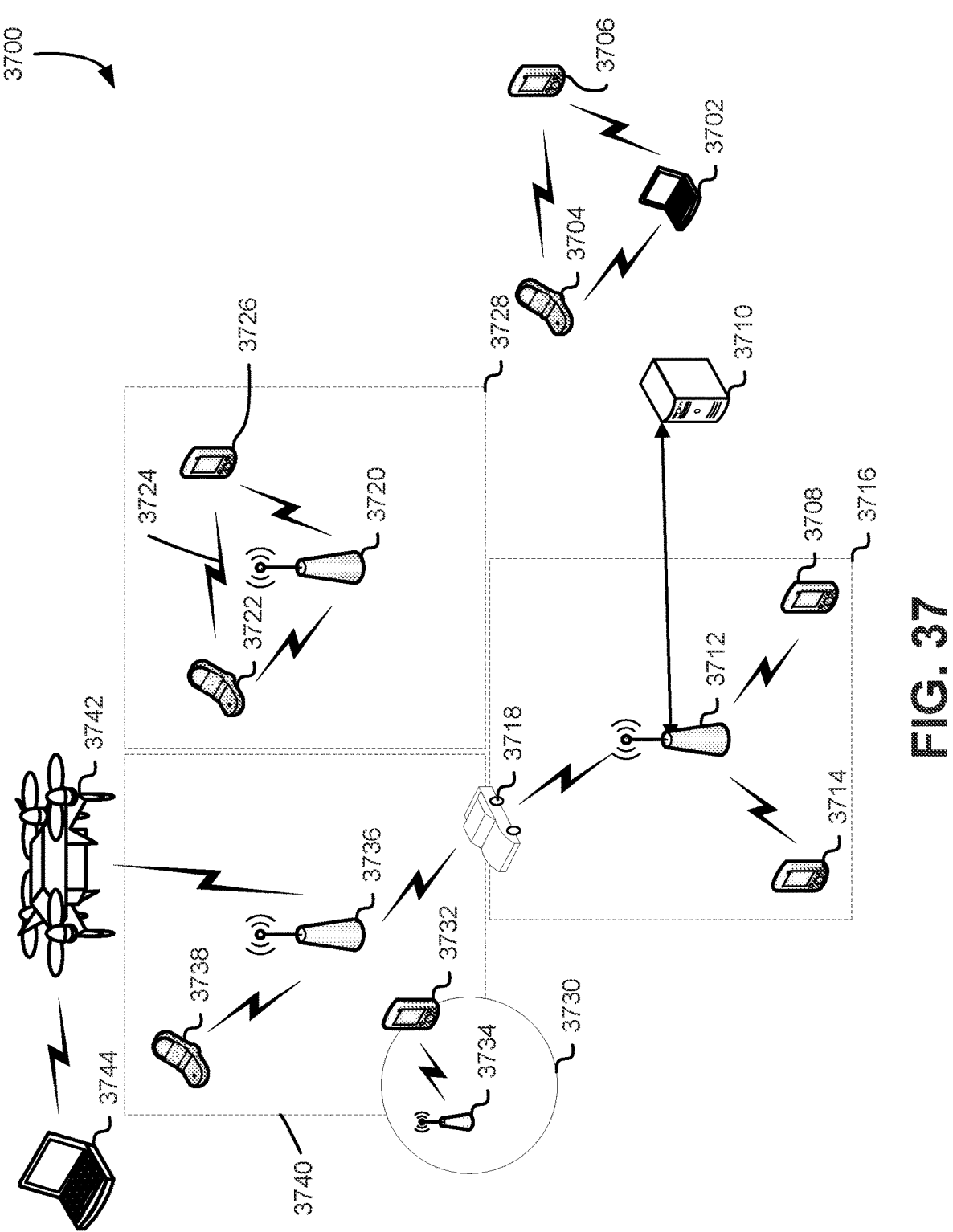
FIG. 37 illustrates a radio access network which may be part of a 5G network architecture, according to at least one embodiment.

FIG. 37 illustrates a radio access network 3700, which may be part of a 5G network architecture, in accordance with at least one embodiment. In at least one embodiment, radio access network 3700 can be supported by network protocol stack 100 as shown in FIG. 1, and network architecture 3700 can be used to perform processes and flows disclosed in FIG. 3-6. In at least one embodiment, radio access network 3700 covers a geographic region divided into a number of cellular regions (cells) that can be uniquely identified by a user equipment (UE) based on an identification broadcasted over a geographical area from one access point or base station. In at least one embodiment, macrocells 3740, 3728, and 3716, and a small cell 3730, may include one or more sectors. In at least one embodiment, a sector is a sub-area of a cell and all sectors within one cell are served by a same base station. In at least one embodiment, a single logical identification belonging to that sector can identify a radio link within a sector. In at least one embodiment, multiple sectors within a cell can be formed by groups of antennas with each antenna responsible for communication with UEs in a portion of a cell.

In at least one embodiment, each cell is served by a base station (BS). In at least one embodiment, a base station is a network element in a radio access network responsible for radio transmission and reception in one or more cells to or from a UE. In at least one embodiment, a base station may also be referred to as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In at least one embodiment, base stations may include a backhaul interface for communication with a backhaul portion of a network. In at least one embodiment, a base station has an integrated antenna or is connected to an antenna or remote radio head (RRH) by feeder cables.

In at least one embodiment, a backhaul may provide a link between a base station and a core network, and in some examples, a backhaul may provide interconnection between respective base stations. In at least one embodiment, a core network is a part of a wireless communication system that is generally independent of radio access technology used in a radio access network. In at least one embodiment, various types of backhaul interfaces, such as a direct physical connection, a virtual network, or like using any suitable transport network, may be employed. In at least one embodiment, some base stations may be configured as integrated access and backhaul (IAB) nodes, where a wireless spectrum may be used both for access links (i.e., wireless links with UEs), and for backhaul links, which is sometimes referred to as wireless self-backhauling. In at least one embodiment, through wireless self-backhauling, a wireless spectrum utilized for communication between a base station and UE may be leveraged for backhaul communication, enabling fast and easy deployment of highly dense small cell networks, as opposed to requiring each new base station deployment to be outfitted with its own hard-wired backhaul connection.

In at least one embodiment, high-power base stations 3736 and 3720 are shown in cells 3740 and 3728, and a high-power base station 3710 is shown controlling a remote radio head (RRH) 3712 in cell 3716. In at least one embodiment, cells 3740, 3728, and 3716 may be referred to as large size cells or macrocells. In at least one embodiment, a low-power base station 3734 is shown in small cell 3730 (e.g., a microcell, picocell, femtocell, home base station, home Node B, home eNode B, etc.) which may overlap with one or more macrocells, and may be referred to as a small cell or small size cell. In at least one embodiment, cell sizing can be done according to system design as well as component constraints. In at least one embodiment, a relay node may be deployed to extend size or coverage area of a given cell. In at least one embodiment, radio access network 3700 may include any number of wireless base stations and cells. In at least one embodiment, base stations 3736, 3720, 3710, 3734 provide wireless access points to a core network for any number of mobile apparatuses.

In at least one embodiment, a quadcopter or drone 3742 may be configured to function as a base station. In at least one embodiment, a cell may not necessarily be stationary, and a geographic area of a cell may move according to a location of a mobile base station such as quadcopter 3742.

In at least one embodiment, radio access network 3700 supports wireless communications for multiple mobile apparatuses. In at least one embodiment, a mobile apparatus is commonly referred to as user equipment (UE), but may also be referred to as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In at least one embodiment, a UE may be an apparatus that provides a user with access to network services.

In at least one embodiment, a "mobile" apparatus need not necessarily have a capability to move and may be stationary. In at least one embodiment, mobile apparatus or mobile device broadly refers to a diverse array of devices and technologies. In at least one embodiment, a mobile apparatus may be a mobile, a cellular (cell) phone, a smart phone, a session initiation protocol (SIP) phone, a laptop, a personal computer (PC), a notebook, a netbook, a smartbook, a tablet, a personal digital assistant (PDA), a broad array of embedded systems, e.g., corresponding to an "Internet of things" (IoT), an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, a digital home or smart home device such as a home audio, video, and/or multimedia device, an appliance, a vending machine, intelligent lighting, a home security system, a smart meter, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. In at least one embodiment, a mobile apparatus may provide for connected medicine or telemedicine support, i.e., health care at a distance. In at least one embodiment, telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

In at least one embodiment, cells of radio access network 3700 may include UEs that may be in communication with one or more sectors of each cell. In at least one embodiment, UEs 3714 and 3708 may be in communication with base station 3710 by way of RRH 3712; UEs 3722 and 3726 may be in communication with base station 3720; UE 3732 may be in communication with low-power base station 3734; UEs 3738 and 3718 may be in communication with base station 3736; and UE 3744 may be in communication with mobile base station 3742. In at least one embodiment, each base station 3710, 3720, 3734, 3736, and 3742 may be configured to provide an access point to a core network (not shown) for all UEs in respective cells and transmissions from a base station (e.g., base station 3736) to one or more UEs (e.g., UEs 3738 and 3718) may be referred to as downlink (DL) transmission, while transmissions from a UE (e.g., UE 3738) to a base station may be referred to as uplink (UL) transmissions. In at least one embodiment, downlink may refer to a point-to-multipoint transmission, which may be referred to as broadcast channel multiplexing. In at least one embodiment, uplink may refer to a point-to-point transmission.

In at least one embodiment, quadcopter 3742, which may be referred to as a mobile network node, may be configured to function as a UE within cell 3740 by communicating with base station 3736. In at least one embodiment, multiple UEs (e.g., UEs 3722 and 3726) may communicate with each other using peer to peer (P2P) or sidelink signals 3724, which may bypass a base station such as base station 3720.

In at least one embodiment, ability for a UE to communicate while moving, independent of its location, is referred to as mobility. In at least one embodiment, a mobility management entity (MME) sets up, maintains, and releases various physical channels between a UE and a radio access network. In at least one embodiment, DL-based mobility or UL-based mobility may be utilized by a radio access network 3700 to enable mobility and handovers (i.e., transfer of a UE's connection from one radio channel to another). In at least one embodiment, a UE, in a network configured for DL-based mobility, may monitor various parameters of a signal from its serving cell as well as various parameters of neighboring cells, and, depending on a quality of these parameters, a UE may maintain communication with one or more neighboring cells. In at least one embodiment, if signal quality from a neighboring cell exceeds that from a serving cell for a given amount of time, or if a UE moves from one cell to another, a UE may undertake a handoff or handover from a serving cell to a neighboring (target) cell. In at least one embodiment, UE 3718 (illustrated as a vehicle, although any suitable form of UE may be used) may move from a geographic area corresponding to a cell, such as serving cell 3740, to a geographic area corresponding to a neighbor cell, such as neighbor cell 3716. In at least one embodiment, UE 3718 may transmit a reporting message to its serving base station 3736 indicating its condition when signal strength or quality from a neighbor cell 3716 exceeds that of its serving cell 3740 for a given amount of time. In at least one embodiment, UE 3718 may receive a handover command, and may undergo a handover to cell 3716.

In at least one embodiment, UL reference signals from each UE may be utilized by a network configured for UL-based mobility to select a serving cell for each UE. In at least one embodiment, base stations 3736, 3720, and 3710/3712 may broadcast unified synchronization signals (e.g., unified Primary Synchronization Signals (PSSs), unified Secondary Synchronization Signals (SSSs) and unified Physical Broadcast Channels (PBCH)). In at least one embodiment, UEs 3738, 3718, 3722, 3726, 3714, and 3708 may receive unified synchronization signals, derive a carrier frequency and slot timing from synchronization signals, and in response to deriving timing, transmit an uplink pilot or reference signal. In at least one embodiment, two or more cells (e.g., base stations 3736 and 3710/3712) within radio access network 3700 may concurrently receive an uplink pilot signal transmitted by a UE (e.g., UE 3718). In at least one embodiment, cells may measure a strength of a pilot signal, and a radio access network (e.g., one or more of base stations 3736 and 3710/3712 and/or a central node within a core network) may determine a serving cell for UE 3718. In at least one embodiment, a network may continue to monitor an uplink pilot signal transmitted by UE 3718 as UE 3718 moves through radio access network 3700. In at least one embodiment, a network 3700 may handover UE 3718 from a serving cell to a neighboring cell, with or without informing UE 3718, when a signal strength or quality of a pilot signal measured by a neighboring cell exceeds that of a signal strength or quality measured by a serving cell.

In at least one embodiment, synchronization signals transmitted by base stations 3736, 3720, and 3710/3712 may be unified, but may not identify a particular cell and rather may identify a zone of multiple cells operating on a same frequency and/or with a same timing. In at least one embodiment, zones in 5G networks or other next generation communication networks enable uplink-based mobility framework and improves efficiency of both a UE and a network, since amounts of mobility messages that need to be exchanged between a UE and a network may be reduced.

In at least one embodiment, air interface in a radio access network 3700 may utilize unlicensed spectrum, licensed spectrum, or shared spectrum. In at least one embodiment, unlicensed spectrum provides for shared use of a portion of a spectrum without need for a government-granted license, however, while compliance with some technical rules is generally still required to access an unlicensed spectrum, generally, any operator or device may gain access. In at least one embodiment, licensed spectrum provides for exclusive use of a portion of a spectrum, generally by virtue of a mobile network operator purchasing a license from a government regulatory body. In at least one embodiment, shared spectrum may fall between licensed and unlicensed spectrum, wherein technical rules or limitations may be required to access a spectrum, but a spectrum may still be shared by multiple operators and/or multiple RATs. In at least one embodiment, for example, a holder of a license for a portion of licensed spectrum may provide licensed shared access (LSA) to share that spectrum with other parties, e.g., with suitable licensee-determined conditions to gain access.

Figure 38:
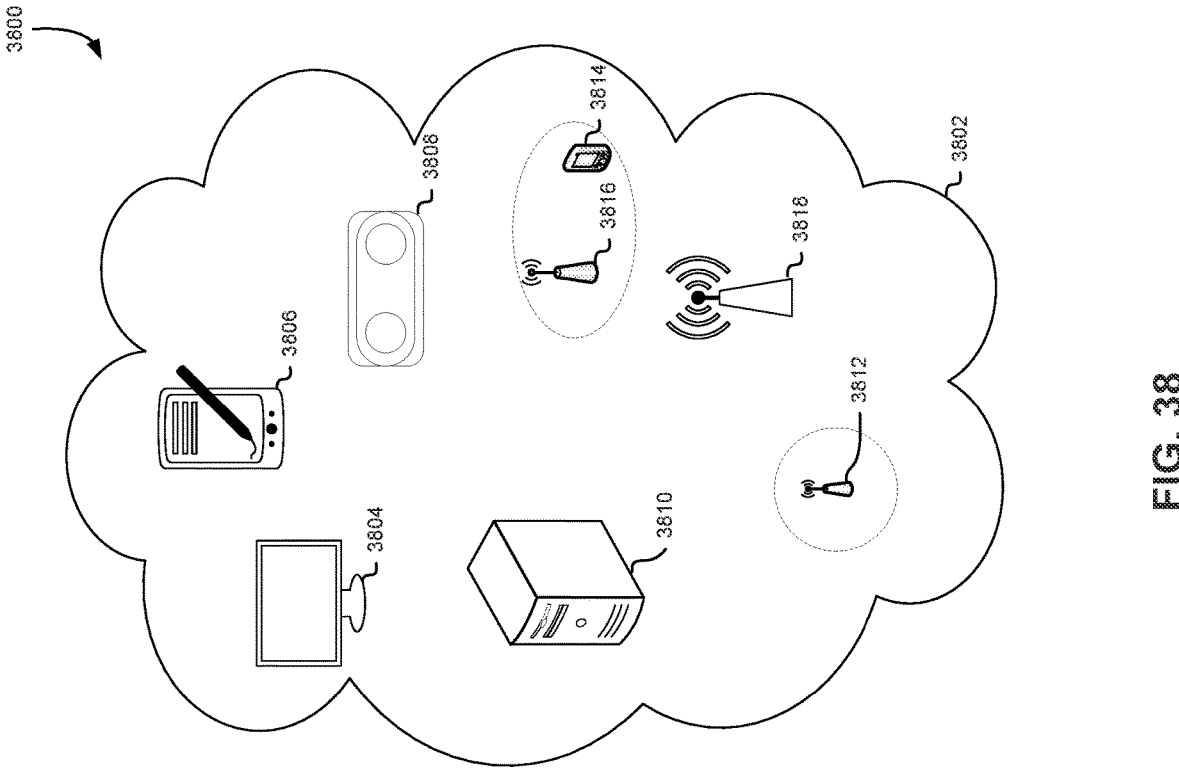
FIG. 38 provides an example illustration of a 5G mobile communications system in which a plurality of different types of devices is used, according to at least one embodiment.

FIG. 38 provides an example illustration of a 5G mobile communications system in which a plurality of different types of devices is used, in accordance with at least one embodiment. In at least one embodiment, a 5G mobile communications system can be supported by network protocol stack 100 as shown in FIG. 1. In at least one embodiment, as shown in FIG. 38, a first base station 3818 may be provided to a large cell or macro cell in which transmission of signals is over several kilometers. In at least one embodiment, however, system may also support transmission via a very small cell such as transmitted by a second infrastructure equipment 3816 which transmits and receives signals over a distance of hundreds of meters thereby forming a so called "Pico" cell. In at least one embodiment, a third type of infrastructure equipment 3812 may transmit and receive signals over a distance of tens of meters and therefore can be used to form a so called "Femto" cell.

In at least one embodiment, also shown in FIG. 38, different types of communications devices may be used to transmit and receive signals via different types of infrastructure equipment 3812, 3816, 3818 and communication of data may be adapted in accordance with different types of infrastructure equipment using different communications parameters. In at least one embodiment, conventionally, a mobile communications device may be configured to communicate data to and from a mobile communications network via available communication resources of network. In at least one embodiment, a wireless access system is configured to provide highest data rates to devices such as smart phones 3806. In at least one embodiment, "internet of things" may be provided in which low power machine type communications devices transmit and receive data at very low power, low bandwidth and may have a low complexity. In at least one embodiment, an example of such a machine type communication device 3814 may communicate via a Pico cell 3816. In at least one embodiment, a very high data rate and a low mobility may be characteristic of communications with, for example, a television 3804 which may be communicating via a Pico cell. In at least one embodiment, a very high data rate and low latency may be required by a virtual reality headset 3808. In at least one embodiment, a relay device 3810 may be deployed to extend size or coverage area of a given cell or network.

Figure 39:
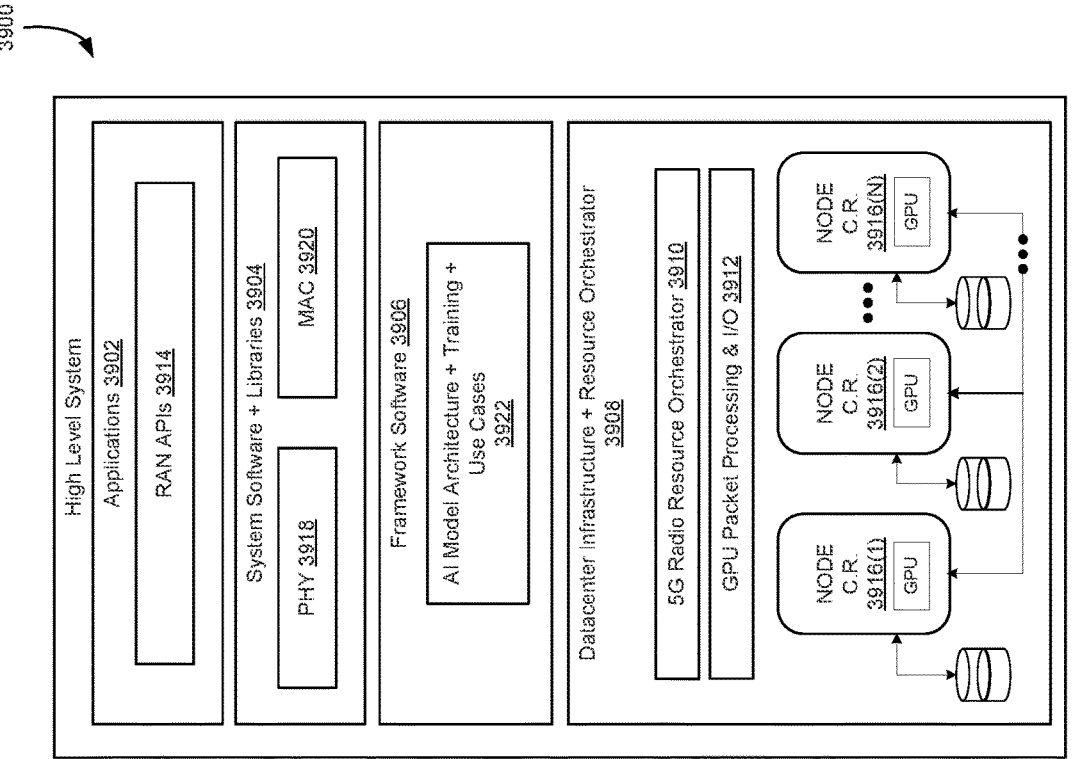
FIG. 39 illustrates an example high-level system, according to at least one embodiment.

FIG. 39 illustrates an example high level system 3900, in which at least one embodiment may be used. In at least one embodiment, high level system 3900 includes applications 3902, system software+libraries 3904, framework software 3906 and a datacenter infrastructure+resource orchestrator 3908. In at least one embodiment, high level system 3900 may be implemented as a cloud service, physical service, virtual service, network service, and/or variations thereof.

In at least one embodiment, as shown in FIG. 39, datacenter infrastructure+resource orchestrator 3908 may include 5G radio resource orchestrator 3910, GPU packet processing & I/O 3912, and node computing resources ("node C.R.s") 3916(1)-3916(N), where "N" represents any whole, positive integer. In at least one embodiment, node C.R.s 3916(1)-3916(N) may include, but are not limited to, any number of central processing units ("CPUs") or other processors (including accelerators, field programmable gate arrays (FPGAs), graphics processors ("GPUs"), etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 3916(1)-3916(N) may be a server having one or more of above-mentioned computing resources.

In at least one embodiment, 5G radio resource orchestrator 3910 may configure or otherwise control one or more node C.R.s 3916(1)-3916(N) and/or other various components and resources a 5G network architecture may comprise. In at least one embodiment, 5G radio resource orchestrator 3910 may include a software design infrastructure ("SDI") management entity for high level system 3900. In at least one embodiment, 5G radio resource orchestrator 3910 may include hardware, software, or some combination thereof. In at least one embodiment, 5G radio resource orchestrator 3910 may be utilized to configure or otherwise control various medium access control sublayers, radio access networks, physical layers or sublayers, and/or variations thereof, which may be part of a 5G network architecture. In at least one embodiment, 5G radio resource orchestrator 3910 may configure or allocate grouped compute, network, memory or storage resources to support one or more workloads which may be executed as part of a 5G network architecture.

In at least one embodiment, GPU packet processing & I/O 3912 may configure or otherwise process various inputs and outputs, as well as packets such as data packets, which may be transmitted/received as part of a 5G network architecture, which may be implemented by high level system 3900. In at least one embodiment, a packet may be data formatted to be provided by a network and may be typically divided into control information and payload (i.e., user data). In at least one embodiment, types of packets may include Internet Protocol version 4 (IPv4) packets, Internet Protocol version 6 (IPv6) packets, and Ethernet II frame packets. In at least one embodiment, control data of a data packet may be classified into data integrity fields and semantic fields. In at least one embodiment, network connections that a data packet may be received upon include a local area network, a wide-area network, a virtual private network, Internet, an intranet, an extranet, a public switched telephone network, an infrared network, a wireless network, a satellite network, and any combination thereof.

In at least one embodiment, framework software 3906 includes an AI Model Architecture+Training+Use Cases 3922. In at least one embodiment, AI Model Architecture+Training+Use Cases 3922 may include tools, services, software, or other resources to train one or more machine learning models or predict or infer information using one or more machine learning models according to one or more embodiments. For example, in at least one embodiment, a machine learning model may be trained by calculating weight parameters according to a neural network architecture using software and computing resources described above with respect to high level system 3900. In at least one embodiment, trained machine learning models corresponding to one or more neural networks may be used to infer or predict information using resources described above with respect to high level system 3900 by using weight parameters calculated through one or more training techniques. In at least one embodiment, framework software 3906 may include a framework to support system software+libraries 3904 and applications 3902.

In at least one embodiment, system software+libraries 3904 or applications 3902 may respectively include web-based service software or applications, such as those provided by Amazon Web Services, Google Cloud and Microsoft Azure. In at least one embodiment, framework software 3906 may include, but is not limited to, a type of free and open-source software web application framework such as Apache Spark™ (hereinafter "Spark"). In at least one embodiment, system software+libraries 3904 may include software used by at least portions of node C.R.s 3916(1)-3916(N). In at least one embodiment, one or more types of software may include, but are not limited to, Internet web page search software, e-mail virus scan software, database software, and streaming video content software.

In at least one embodiment, PHY 3918 is a set of system software and libraries configured to provide an interface with a physical layer of a wireless technology, which may be a physical layer such as a 5G New Radio (NR) physical layer. In at least one embodiment, an NR physical layer utilizes a flexible and scalable design and may comprise various components and technologies, such as modulation schemes, waveform structures, frame structures, reference signals, multi-antenna transmission and channel coding.

In at least one embodiment, a NR physical layer supports quadrature phase shift keying (QPSK), 16 quadrature amplitude modulation (QAM), 64 QAM and 256 QAM modulation formats. In at least one embodiment, different modulation schemes for different user entity (UE) categories may also be included in a NR physical layer. In at least one embodiment, a NR physical layer may utilize cyclic prefix orthogonal frequency division multiplexing (CP-OFDM) with a scalable numerology (subcarrier spacing, cyclic prefix) in both uplink (UL) and downlink (DL) up to at least 52.6 GHz. In at least one embodiment, a NR physical layer may support discrete Fourier transform spread orthogonal frequency division multiplexing (DFT-SOFDM) in UL for coverage-limited scenarios, with single stream transmissions (that is, without spatial multiplexing).

In at least one embodiment, a NR frame supports time division duplex (TDD) and frequency division duplex (FDD) transmissions and operation in both licensed and unlicensed spectrum, which enables very low latency, fast hybrid automatic repeat request (HARQ) acknowledgements, dynamic TDD, coexistence with LTE and transmissions of variable length (for example, short duration for URLLC and long duration for eMBB). In at least one embodiment, NR frame structure follows three key design principles to enhance forward compatibility and reduce interactions between different features.

In at least one embodiment, a first principle is that transmissions are self-contained, which can refer to a scheme in which data in a slot and in a beam are decodable on its own without dependency on other slots and beams. In at least one embodiment, this implies that reference signals required for demodulation of data are included in a given slot and a given beam. In at least one embodiment, a second principle is that transmissions are well confined in time and frequency, which results in a scheme in which new types of transmissions in parallel with legacy transmissions may be introduced. In at least one embodiment, a third principle is avoiding static and/or strict timing relations across slots and across different transmission directions. In at least one embodiment, usage of a third principle can entail utilizing asynchronous hybrid automatic repeat request (HARQ) instead of predefined retransmission time.

In at least one embodiment, NR frame structure also allows for rapid HARQ acknowledgement, in which decoding is performed during reception of DL data and HARQ acknowledgement is prepared by a UE during a guard period, when switching from DL reception to UL transmission. In at least one embodiment, to obtain low latency, a slot (or a set of slots in case of slot aggregation) is front-loaded with control signals and reference signals at a beginning of a slot (or set of slots).

In at least one embodiment, NR has an ultra-lean design that minimizes always-on transmissions to enhance network energy efficiency and ensure forward compatibility. In at least one embodiment, reference signals in NR are transmitted only when necessary. In at least one embodiment, four main reference signals are demodulation reference signal (DMRS), phase-tracking reference signal (PTRS), sounding reference signal (SRS) and channel-state information reference signal (CSI-RS).

In at least one embodiment, DMRS is used to estimate a radio channel for demodulation. In at least one embodiment, DMRS is UE-specific, can be beamformed, confined in a scheduled resource, and transmitted only when necessary, both in DL and UL. In at least one embodiment, to support multiple-layer multiple-input, multiple-output (MIMO) transmission, multiple orthogonal DMRS ports can be scheduled, one for each layer. In at least one embodiment, a basic DMRS pattern is front loaded, as a DMRS design takes into account an early decoding requirement to support low-latency applications. In at least one embodiment, for low-speed scenarios, DMRS uses low density in a time domain. In at least one embodiment, however, for high-speed scenarios, a time density of DMRS is increased to track fast changes in a radio channel.

In at least one embodiment, PTRS is introduced in NR to enable compensation of oscillator phase noise. In at least one embodiment, typically, phase noise increases as a function of oscillator carrier frequency. In at least one embodiment, PTRS can therefore be utilized at high carrier frequencies (such as mmWave) to mitigate phase noise. In at least one embodiment, PTRS is UE-specific, confined in a scheduled resource and can be beamformed. In at least one embodiment, PTRS is configurable depending on a quality of oscillators, carrier frequency, OFDM sub-carrier spacing, and modulation and coding schemes used for transmission.

In at least one embodiment, SRS is transmitted in UL to perform channel state information (CSI) measurements mainly for scheduling and link adaptation. In at least one embodiment, for NR, SRS is also utilized for reciprocity-based precoder design for massive MIMO and UL beam management. In at least one embodiment, SRS has a modular and flexible design to support different procedures and UE capabilities. In at least one embodiment, an approach for channel state information reference signal (CSI-RS) is similar.

In at least one embodiment, NR employs different antenna solutions and techniques depending on which part of a spectrum is used for its operation. In at least one embodiment, for lower frequencies, a low to moderate number of active antennas (up to around 32 transmitter chains) is assumed and FDD operation is common. In at least one embodiment, acquisition of CSI requires transmission of CSI-RS in a DL and CSI reporting in an UL. In at least one embodiment, limited bandwidths available in this frequency region require high spectral efficiency enabled by multi-user MIMO (MU-MIMO) and higher order spatial multiplexing, which is achieved via higher resolution CSI reporting compared with LTE.

In at least one embodiment, for higher frequencies, a larger number of antennas can be employed in a given aperture, which increases a capability for beamforming and multiuser (MU)-MIMO. In at least one embodiment, here, spectrum allocations are of TDD type and reciprocity-based operation is assumed. In at least one embodiment, high-resolution CSI in a form of explicit channel estimations is acquired by UL channel sounding. In at least one embodiment, such high-resolution CSI enables sophisticated precoding algorithms to be employed at a base station (BS). In at least one embodiment, for even higher frequencies (in mmWave range) an analog beamforming implementation is typically required currently, which limits transmission to a single beam direction per time unit and radio chain. In at least one embodiment, since an isotropic antenna element is very small in this frequency region owing to a short carrier wavelength, a great number of antenna elements is required to maintain coverage. In at least one embodiment, beamforming needs to be applied at both transmitter and receiver ends to combat increased path loss, even for control channel transmission.

In at least one embodiment, to support these diverse use cases, NR features a highly flexible but unified CSI framework, in which there is reduced coupling between CSI measurement, CSI reporting and an actual DL transmission in NR compared with LTE. In at least one embodiment, NR also supports more advanced schemes such as multi-point transmission and coordination. In at least one embodiment, control and data transmissions follow a self-contained principle, where all information required to decode a transmission (such as accompanying DMRS) is contained within a transmission itself. In at least one embodiment, as a result, a network can seamlessly change a transmission point or beam as a UE moves in a network.

In at least one embodiment, MAC 3920 is a set of system software and libraries configured to provide an interface with a medium access control (MAC) layer, which may be part of a 5G network architecture. In at least one embodiment, a MAC layer controls hardware responsible for interaction with a wired, optical, or wireless transmission medium. In at least one embodiment, MAC provides flow control and multiplexing for a transmission medium.

In at least one embodiment, a MAC sublayer provides an abstraction of a physical layer such that complexities of a physical link control are invisible to a logical link control (LLC) and upper layers of a network stack. In at least one embodiment, any LLC sublayer (and higher layers) may be used with any MAC. In at least one embodiment, any MAC can be used with any physical layer, independent of transmission medium. In at least one embodiment, a MAC sublayer, when sending data to another device on a network, encapsulates higher-level frames into frames appropriate for a transmission medium, adds a frame check sequence to identify transmission errors, and then forwards data to a physical layer as soon as appropriate channel access method permits it. In at least one embodiment, MAC is also responsible for compensating for collisions if a jam signal is detected, in which a MAC may initiate retransmission.

In at least one embodiment, applications 3902 may include one or more types of applications used by at least portions of node C.R.s 3916(1)-3916(N) and/or framework software 3906. In at least one embodiment, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, RAN APIs 3914 may be a set of subroutine definitions, communication protocols, and/or software tools that provide a method of communication with components of a radio access network (RAN) which may be part of a 5G network architecture. In at least one embodiment, a radio access network is part of a network communications system and may implement a radio access technology. In at least one embodiment, radio access network functionality is typically provided by a silicon chip residing in both a core network as well as user equipment. Further information regarding a radio access network can be found in the description of FIG. 37.

In at least one embodiment, high level system 3900 may use CPUs, application-specific integrated circuits (ASICs), GPUs, FPGAs, or other hardware to perform training, inferencing, and/or other various processes using above-described resources. In at least one embodiment, moreover, one or more software and/or hardware resources described above may be configured as a service to allow users to train or performing inferencing of information, such as image recognition, speech recognition, or other artificial intelligence services, as well as other services such as services that allow users to configure and implement various aspects of a 5G network architecture.

Figure 40:
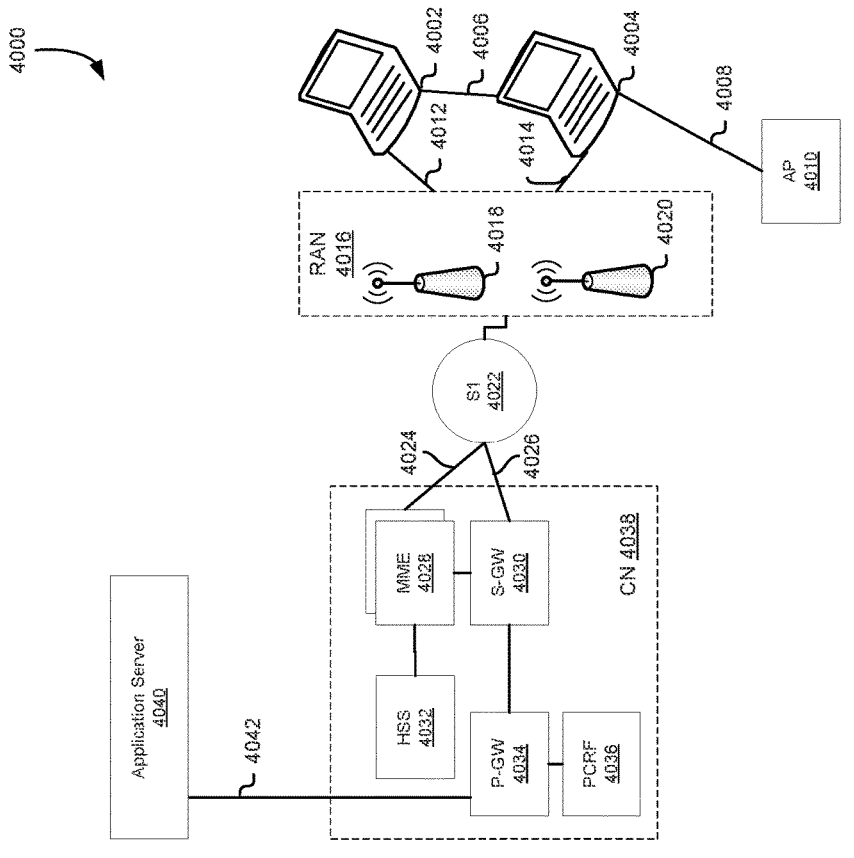
FIG. 40 illustrates an architecture of a system of a network, according to at least one embodiment.

FIG. 40 illustrates an architecture of a system 4000 of a network, in accordance with at least one embodiment. In at least one embodiment, architecture of a system 4000 includes first processor 125 or second processor 130 and can perform or store processes and flows disclosed in FIGS. 3-6. In at least one embodiment, system 4000 is shown to include a user equipment (UE) 4002 and a UE 4004. In at least one embodiment, UEs 4002 and 4004 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 4002 and 4004 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 4002 and 4004 may be configured to connect, e.g., communicatively couple, with a radio access network (RAN) 4016. In at least one embodiment, RAN 4016 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 4002 and 4004 utilize connections 4012 and 4014, respectively, each of which comprises a physical communications interface or layer. In at least one embodiment, connections 4012 and 4014 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 4002 and 4004 may further directly exchange communication data via a ProSe interface 4006. In at least one embodiment, ProSe interface 4006 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 4004 is shown to be configured to access an access point (AP) 4010 via connection 4008. In at least one embodiment, connection 4008 can comprise a local wireless connection, such as a connection consistent with any IEEE 802.11 protocol, wherein AP 4010 would comprise a wireless fidelity (WiFi®) router. In at least one embodiment, AP 4010 is shown to be connected to an Internet without connecting to a core network of a wireless system.

In at least one embodiment, RAN 4016 can include one or more access nodes that enable connections 4012 and 4014. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 4016 may include one or more RAN nodes for providing macrocells, e.g., macro RAN node 4018, and one or more RAN nodes for providing femtocells or picocells (e.g., cells having smaller coverage areas, smaller user capacity, or higher bandwidth compared to macrocells), e.g., low power (LP) RAN node 4020.

In at least one embodiment, any of RAN nodes 4018 and 4020 can terminate an air interface protocol and can be a first point of contact for UEs 4002 and 4004. In at least one embodiment, any of RAN nodes 4018 and 4020 can fulfill various logical functions for RAN 4016 including, but not limited to, radio network controller (RNC) functions such as radio bearer management, uplink and downlink dynamic radio resource management and data packet scheduling, and mobility management.

In at least one embodiment, UEs 4002 and 4004 can be configured to communicate using Orthogonal Frequency-Division Multiplexing (OFDM) communication signals with each other or with any of RAN nodes 4018 and 4020 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal sub-carriers.

In at least one embodiment, a downlink resource grid can be used for downlink transmissions from any of RAN nodes 4018 and 4020 to UEs 4002 and 4004, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 4002 and 4004. In at least one embodiment, a physical downlink control channel (PDCCH) may carry information about a transport format and resource allocations related to PDSCH channel, among other things. In at least one embodiment, it may also inform UEs 4002 and 4004 about a transport format, resource allocation, and HARQ (Hybrid Automatic Repeat Request) information related to an uplink shared channel. In at least one embodiment, typically, downlink scheduling (assigning control and shared channel resource blocks to UE 4002 within a cell) may be performed at any of RAN nodes 4018 and 4020 based on channel quality information fed back from any of UEs 4002 and 4004. In at least one embodiment, downlink resource assignment information may be sent on a PDCCH used for (e.g., assigned to) each of UEs 4002 and 4004.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element group (EREG). In at least one embodiment, an ECCE may have other numbers of EREGs in some situations.

In at least one embodiment, RAN 4016 is shown to be communicatively coupled to a core network (CN) 4038 via an S1 interface 4022. In at least one embodiment, CN 4038 may be an evolved packet core (EPC) network, a NextGen Packet Core (NPC) network, or some other type of CN. In at least one embodiment, S1 interface 4022 is split into two parts: S1-U interface 4026, which carries traffic data between RAN nodes 4018 and 4020 and serving gateway (S-GW) 4030, and a S1-mobility management entity (MME) interface 4024, which is a signaling interface between RAN nodes 4018 and 4020 and MMEs 4028.

In at least one embodiment, CN 4038 comprises MMEs 4028, S-GW 4030, Packet Data Network (PDN) Gateway (P-GW) 4034, and a home subscriber server (HSS) 4032. In at least one embodiment, MMEs 4028 may be similar in function to a control plane of legacy Serving General Packet Radio Service (GPRS) Support Nodes (SGSN). In at least one embodiment, MMEs 4028 may manage mobility aspects in access such as gateway selection and tracking area list management. In at least one embodiment, HSS 4032 may comprise a database for network users, including subscription related information to support a network entities' handling of communication sessions. In at least one embodiment, CN 4038 may comprise one or several HSSs 4032, depending on a number of mobile subscribers, on a capacity of an equipment, on an organization of a network, etc. In at least one embodiment, HSS 4032 can provide support for routing/roaming, authentication, authorization, naming/addressing resolution, location dependencies, etc.

In at least one embodiment, S-GW 4030 may terminate a S1 interface 4022 towards RAN 4016, and routes data packets between RAN 4016 and CN 4038. In at least one embodiment, S-GW 4030 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 4034 may terminate an SGi interface toward a PDN. In at least one embodiment, P-GW 4034 may route data packets between an EPC network 4038 and external networks such as a network including application server 4040 (alternatively referred to as application function (AF)) via an Internet Protocol (IP) interface 4042. In at least one embodiment, application server 4040 may be an element offering applications that use IP bearer resources with a core network (e.g., UMTS Packet Services (PS) domain, LTE PS data services, etc.). In at least one embodiment, P-GW 4034 is shown to be communicatively coupled to an application server 4040 via an IP communications interface 4042. In at least one embodiment, application server 4040 can also be configured to support one or more communication services (e.g., Voice-over-Internet Protocol (VoIP) sessions, PTT sessions, group communication sessions, social networking services, etc.) for UEs 4002 and 4004 via CN 4038.

In at least one embodiment, P-GW 4034 may further be a node for policy enforcement and charging data collection. In at least one embodiment, policy and Charging Enforcement Function (PCRF) 4036 is a policy and charging control element of CN 4038. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 4036 may be communicatively coupled to application server 4040 via P-GW 4034. In at least one embodiment, application server 4040 may signal PCRF 4036 to indicate a new service flow and select an appropriate Quality of Service (QoS) and charging parameters. In at least one embodiment, PCRF 4036 may provision this rule into a Policy and Charging Enforcement Function (PCEF) (not shown) with an appropriate traffic flow template (TFT) and QoS class of identifier (QCI), which commences a QoS and charging as specified by application server 4040.

Figure 41:
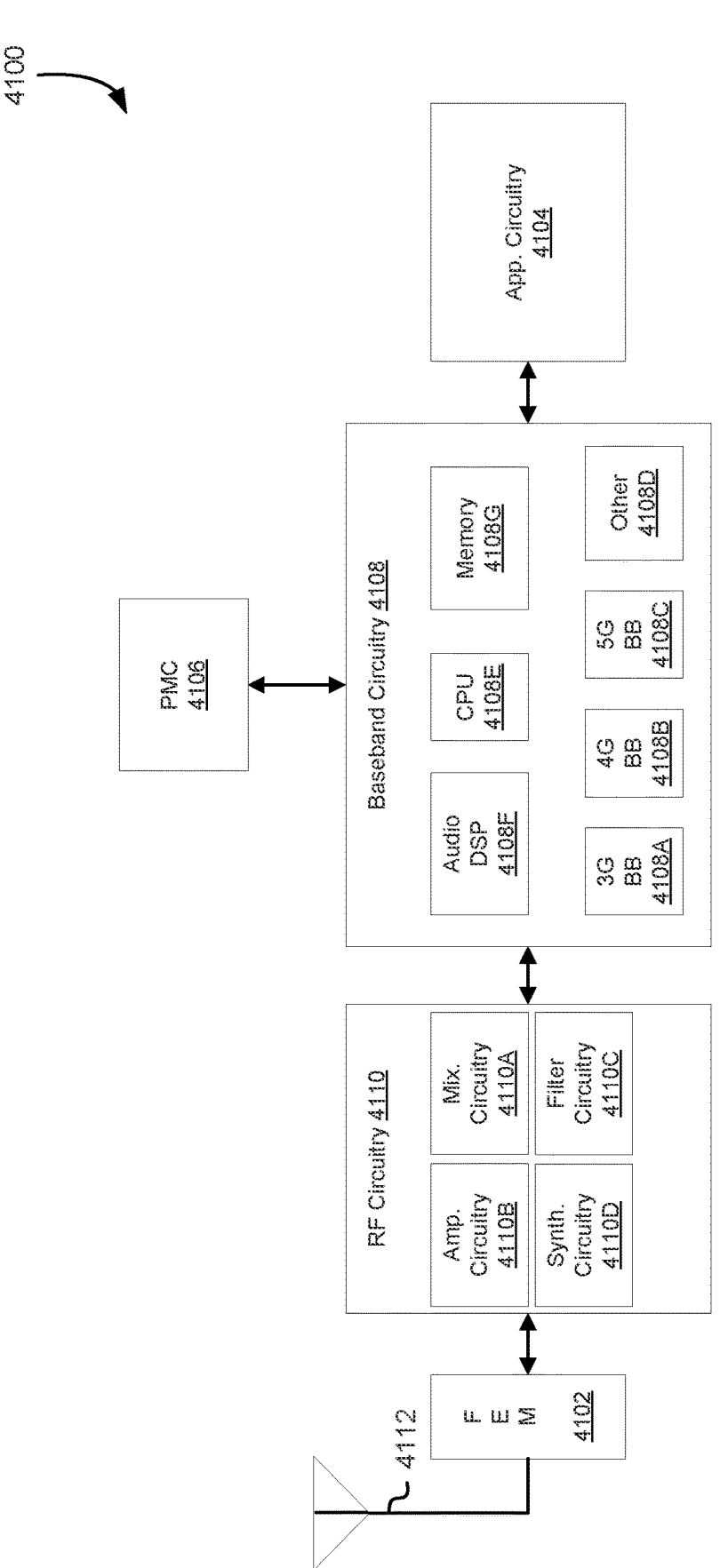
FIG. 41 illustrates example components of a device, according to at least one embodiment.

FIG. 41 illustrates example components of a device 4100 in accordance with at least one embodiment. In at least one embodiment, device 4100 may include application circuitry 4104, baseband circuitry 4108, Radio Frequency (RF) circuitry 4110, front-end module (FEM) circuitry 4102, one or more antennas 4112, and power management circuitry (PMC) 4106 coupled together at least as shown. In at least one embodiment, components of illustrated device 4100 may be included in a UE or a RAN node. In at least one embodiment, device 4100 may include less elements (e.g., a RAN node may not utilize application circuitry 4104, and instead include a processor/controller to process IP data received from an EPC). In at least one embodiment, device 4100 may include additional elements such as, for example, memory/storage, display, camera, sensor, or input/output (I/O) interface. In at least one embodiment, components described below may be included in more than one device (e.g., said circuitries may be separately included in more than one device for Cloud-RAN (C-RAN) implementations).

In at least one embodiment, application circuitry 4104 may include one or more application processors. In at least one embodiment, application circuitry 4104 may include circuitry such as, but not limited to, one or more single-core or multi-core processors. In at least one embodiment, processor(s) may include any combination of general purpose processors and dedicated processors (e.g., graphics processors, application processors, etc.). In at least one embodiment, processors may be coupled with or may include memory/storage and may be configured to execute instructions stored in memory/storage to enable various applications or operating systems to run on device 4100. In at least one embodiment, processors of application circuitry 4104 may process IP data packets received from an EPC.

In at least one embodiment, baseband circuitry 4108 may include circuitry such as, but not limited to, one or more single-core or multi-core processors. In at least one embodiment, baseband circuitry 4108 may include one or more baseband processors or control logic to process baseband signals received from a receive signal path of RF circuitry 4110 and to generate baseband signals for a transmit signal path of RF circuitry 4110. In at least one embodiment, baseband processing circuitry 4108 may interface with application circuitry 4104 for generation and processing of baseband signals and for controlling operations of RF circuitry 4110. In at least one embodiment, baseband circuitry 4108 may include a third generation (3G) baseband processor 4108A, a fourth generation (4G) baseband processor 4108B, a fifth generation (5G) baseband processor 4108C, or other baseband processor(s) 4108D for other existing generations, generations in development or to be developed (e.g., second generation (2G), sixth generation (6G), etc.). In at least one embodiment, baseband circuitry 4108 (e.g., one or more of base-band processors 4108A-D) may handle various radio control functions that enable communication with one or more radio networks via RF circuitry 4110. In at least one embodiment, some, or all of a functionality of baseband processors 4108A-D may be included in modules stored in memory 4108G and executed via a Central Processing Unit (CPU) 4108E. In at least one embodiment, radio control functions may include, but are not limited to, signal modulation/demodulation, encoding/decoding, radio frequency shifting, etc. In at least one embodiment, modulation/demodulation circuitry of baseband circuitry 4108 may include Fast-Fourier Transform (FFT), precoding, or constellation mapping/demapping functionality. In at least one embodiment, encoding/decoding circuitry of baseband circuitry 4108 may include convolution, tail biting convolution, turbo, Viterbi, or Low Density Parity Check (LDPC) encoder/decoder functionality.

In at least one embodiment, baseband circuitry 4108 may include one or more audio digital signal processor(s) (DSP) 4108F. In at least one embodiment, audio DSP(s) 4108F may be include elements for compression/decompression and echo cancellation and may include other suitable processing elements in other embodiments. In at least one embodiment, components of baseband circuitry may be suitably combined in a single chip, a single chipset, or disposed on a same circuit board in some embodiments. In at least one embodiment, some, or all of constituent components of baseband circuitry 4108 and application circuitry 4104 may be implemented together such as, for example, on a system on a chip (SOC).

In at least one embodiment, baseband circuitry 4108 may provide for communication compatible with one or more radio technologies. In at least one embodiment, baseband circuitry 4108 may support communication with an evolved universal terrestrial radio access network (EUTRAN) or other wireless metropolitan area networks (WMAN), a wireless local area network (WLAN), a wireless personal area network (WPAN). In at least one embodiment, baseband circuitry 4108 is configured to support radio communications of more than one wireless protocol and may be referred to as multimode baseband circuitry.

In at least one embodiment, RF circuitry 4110 may enable communication with wireless networks using modulated electromagnetic radiation through a non-solid medium. In at least one embodiment, RF circuitry 4110 may include switches, filters, amplifiers, etc. to facilitate communication with a wireless network. In at least one embodiment, RF circuitry 4110 may include a receive signal path which may include circuitry to down-convert RF signals received from FEM circuitry 4102 and provide baseband signals to baseband circuitry 4108. In at least one embodiment, RF circuitry 4110 may also include a transmit signal path which may include circuitry to up-convert baseband signals provided by baseband circuitry 4108 and provide RF output signals to FEM circuitry 4102 for transmission.

In at least one embodiment, receive signal path of RF circuitry 4110 may include mixer circuitry 4110a, amplifier circuitry 4110b and filter circuitry 4110c. In at least one embodiment, a transmit signal path of RF circuitry 4110 may include filter circuitry 4110c and mixer circuitry 4110a. In at least one embodiment, RF circuitry 4110 may also include synthesizer circuitry 4110d for synthesizing a frequency for use by mixer circuitry 4110a of a receive signal path and a transmit signal path. In at least one embodiment, mixer circuitry 4110a of a receive signal path may be configured to down-convert RF signals received from FEM circuitry 4102 based on a synthesized frequency provided by synthesizer circuitry 4110d. In at least one embodiment, amplifier circuitry 4110b may be configured to amplify down-converted signals and filter circuitry 4110c may be a low-pass filter (LPF) or band-pass filter (BPF) configured to remove unwanted signals from down-converted signals to generate output baseband signals. In at least one embodiment, output baseband signals may be provided to baseband circuitry 4108 for further processing. In at least one embodiment, output baseband signals may be zero-frequency baseband signals, although this is not a requirement. In at least one embodiment, mixer circuitry 4110a of a receive signal path may comprise passive mixers.

In at least one embodiment, mixer circuitry 4110a of a transmit signal path may be configured to up-convert input baseband signals based on a synthesized frequency provided by synthesizer circuitry 4110d to generate RF output signals for FEM circuitry 4102. In at least one embodiment, baseband signals may be provided by baseband circuitry 4108 and may be filtered by filter circuitry 4110c.

In at least one embodiment, mixer circuitry 4110a of a receive signal path and mixer circuitry 4110a of a transmit signal path may include two or more mixers and may be arranged for quadrature down conversion and up conversion, respectively. In at least one embodiment, mixer circuitry 4110a of a receive signal path and mixer circuitry 4110a of a transmit signal path may include two or more mixers and may be arranged for image rejection (e.g., Hartley image rejection). In at least one embodiment, mixer circuitry 4110a of a receive signal path and mixer circuitry 4110a may be arranged for direct down conversion and direct up conversion, respectively. In at least one embodiment, mixer circuitry 4110a of a receive signal path and mixer circuitry 4110a of a transmit signal path may be configured for super-heterodyne operation.

In at least one embodiment, output baseband signals and input baseband signals may be analog baseband signals. In at least one embodiment, output baseband signals and input baseband signals may be digital baseband signals. In at least one embodiment, RF circuitry 4110 may include analog-to-digital converter (ADC) and digital-to-analog converter (DAC) circuitry and baseband circuitry 4108 may include a digital baseband interface to communicate with RF circuitry 4110.

In at least one embodiment, a separate radio IC circuitry may be provided for processing signals for each spectrum In at least one embodiment, synthesizer circuitry 4110d may be a fractional-N synthesizer or a fractional N/N+1 synthesizer. In at least one embodiment, synthesizer circuitry 4110d may be a delta-sigma synthesizer, a frequency multiplier, or a synthesizer comprising a phase-locked loop with a frequency divider.

In at least one embodiment, synthesizer circuitry 4110d may be configured to synthesize an output frequency for use by mixer circuitry 4110a of RF circuitry 4110 based on a frequency input and a divider control input. In at least one embodiment, synthesizer circuitry 4110d may be a fractional N/N+1 synthesizer.

In at least one embodiment, frequency input may be provided by a voltage-controlled oscillator (VCO). In at least one embodiment, divider control input may be provided by either baseband circuitry 4108 or applications processor 4104 depending on a desired output frequency. In at least one embodiment, a divider control input (e.g., N) may be determined from a look-up table based on a channel indicated by applications processor 4104.

In at least one embodiment, synthesizer circuitry 4110d of RF circuitry 4110 may include a divider, a delay-locked loop (DLL), a multiplexer and a phase accumulator. In at least one embodiment, divider may be a dual modulus divider (DMD) and phase accumulator may be a digital phase accumulator (DPA). In at least one embodiment, DMD may be configured to divide an input signal by either N or N+1 (e.g., based on a carry out) to provide a fractional division ratio. In at least one embodiment, DLL may include a set of cascaded, tunable, delay elements, a phase detector, a charge pump, and a D-type flip-flop. In at least one embodiment, delay elements may be configured to break a VCO period up into Nd equal packets of phase, where Nd is a number of delay elements in a delay line. In at least one embodiment, in this way, DLL provides negative feedback to help ensure that total delay through a delay line is one VCO cycle.

In at least one embodiment, synthesizer circuitry 4110d may be configured to generate a carrier frequency as an output frequency, while in other embodiments, output frequency may be a multiple of a carrier frequency (e.g., twice a carrier frequency, four times a carrier frequency) and used in conjunction with quadrature generator and divider circuitry to generate multiple signals at a carrier frequency with multiple different phases with respect to each other. In at least one embodiment, output frequency may be a LO frequency (fLO). In at least one embodiment, RF circuitry 4110 may include an IQ/polar converter.

In at least one embodiment, FEM circuitry 4102 may include a receive signal path which may include circuitry configured to operate on RF signals received from one or more antennas 4112, amplify received signals and provide amplified versions of received signals to RF circuitry 4110 for further processing. In at least one embodiment, FEM circuitry 4102 may also include a transmit signal path which may include circuitry configured to amplify signals for transmission provided by RF circuitry 4110 for transmission by one or more of one or more antennas 4112. In at least one embodiment, amplification through a transmit or receive signal paths may be done solely in RF circuitry 4110, solely in FEM 4102, or in both RF circuitry 4110 and FEM 4102.

In at least one embodiment, FEM circuitry 4102 may include a TX/RX switch to switch between transmit mode and receive mode operation. In at least one embodiment, FEM circuitry may include a receive signal path and a transmit signal path. In at least one embodiment, a receive signal path of FEM circuitry may include an LNA to amplify received RF signals and provide amplified received RF signals as an output (e.g., to RF circuitry 4110). In at least one embodiment, a transmit signal path of FEM circuitry 4102 may include a power amplifier (PA) to amplify input RF signals (e.g., provided by RF circuitry 4110), and one or more filters to generate RF signals for subsequent transmission (e.g., by one or more of one or more antennas 4112).

In at least one embodiment, PMC 4106 may manage power provided to baseband circuitry 4108. In at least one embodiment, PMC 4106 may control power-source selection, voltage scaling, battery charging, or DC-to-DC conversion. In at least one embodiment, PMC 4106 may often be included when device 4100 is capable of being powered by a battery, for example, when device is included in a UE. In at least one embodiment, PMC 4106 may increase power conversion efficiency while providing desirable implementation size and heat dissipation characteristics.

In at least one embodiment, PMC 4106 may be additionally or alternatively coupled with, and perform similar power management operations for, other components such as, but not limited to, application circuitry 4104, RF circuitry 4110, or FEM 4102.

In at least one embodiment, PMC 4106 may control, or otherwise be part of, various power saving mechanisms of device 4100. In at least one embodiment, if device 4100 is in an RRC Connected state, where it is still connected to a RAN node as it expects to receive traffic shortly, then it may enter a state known as Discontinuous Reception Mode (DRX) after a period of inactivity. In at least one embodiment, during this state, device 4100 may power down for brief intervals of time and thus save power.

In at least one embodiment, if there is no data traffic activity for an extended period of time, then device 4100 may transition off to an RRC Idle state, where it disconnects from a network and does not perform operations such as channel quality feedback, handover, etc. In at least one embodiment, device 4100 goes into a very low power state and it performs paging where again it periodically wakes up to listen to a network and then powers down again. In at least one embodiment, device 4100 may not receive data in this state, in order to receive data, it must transition back to RRC Connected state.

In at least one embodiment, an additional power saving mode may allow a device to be unavailable to a network for periods longer than a paging interval (ranging from seconds to a few hours). In at least one embodiment, during this time, a device is totally unreachable to a network and may power down completely. In at least one embodiment, any data sent during this time incurs a large delay and it is assumed delay is acceptable.

In at least one embodiment, processors of application circuitry 4104 and processors of baseband circuitry 4108 may be used to execute elements of one or more instances of a protocol stack. In at least one embodiment, processors of baseband circuitry 4108, alone or in combination, may be used execute Layer 3, Layer 2, or Layer 1 functionality, while processors of application circuitry 4108 may utilize data (e.g., packet data) received from these layers and further execute Layer 4 functionality (e.g., transmission communication protocol (TCP) and user datagram protocol (UDP) layers). In at least one embodiment, layer 3 may comprise a radio resource control (RRC) layer. In at least one embodiment, Layer 2 may comprise a medium access control (MAC) layer, a radio link control (RLC) layer, and a packet data convergence protocol (PDCP) layer. In at least one embodiment, Layer 1 may comprise a physical (PHY) layer of a UE/RAN node.

Figure 42:
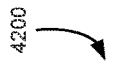
FIG. 42 illustrates example interfaces of baseband circuitry, according to at least one embodiment.
Figure 42:
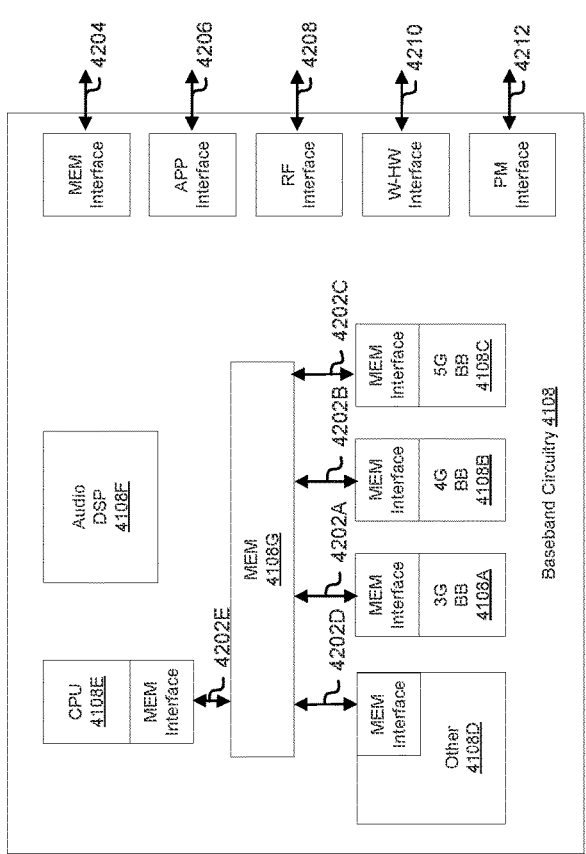

FIG. 42 illustrates example interfaces of baseband circuitry, in accordance with at least one embodiment. In at least one embodiment, as discussed above, baseband circuitry 4108 of FIG. 41 may comprise processors 4108A-4108E and a memory 4108G utilized by said processors. In at least one embodiment, each of processors 4108A-4108E may include a memory interface, 4202A-4202E, respectively, to send/receive data to/from memory 4108G.

In at least one embodiment, baseband circuitry 4108 may further include one or more interfaces to communicatively couple to other circuitries/devices, such as a memory interface 4204 (e.g., an interface to send/receive data to/from memory external to baseband circuitry 4108), an application circuitry interface 4206 (e.g., an interface to send/receive data to/from application circuitry 4104 of FIG. 41), an RF circuitry interface 4208 (e.g., an interface to send/receive data to/from RF circuitry 4110 of FIG. 41), a wireless hardware connectivity interface 4210 (e.g., an interface to send/receive data to/from Near Field Communication (NFC) components, Bluetooth® components (e.g., Bluetooth® Low Energy), Wi-Fi® components, and other communication components), and a power management interface 4212 (e.g., an interface to send/receive power or control signals to/from PMC 4106).

Figure 43:
FIG. 43 illustrates an example of an uplink channel, according to at least one embodiment.
Figure 43:
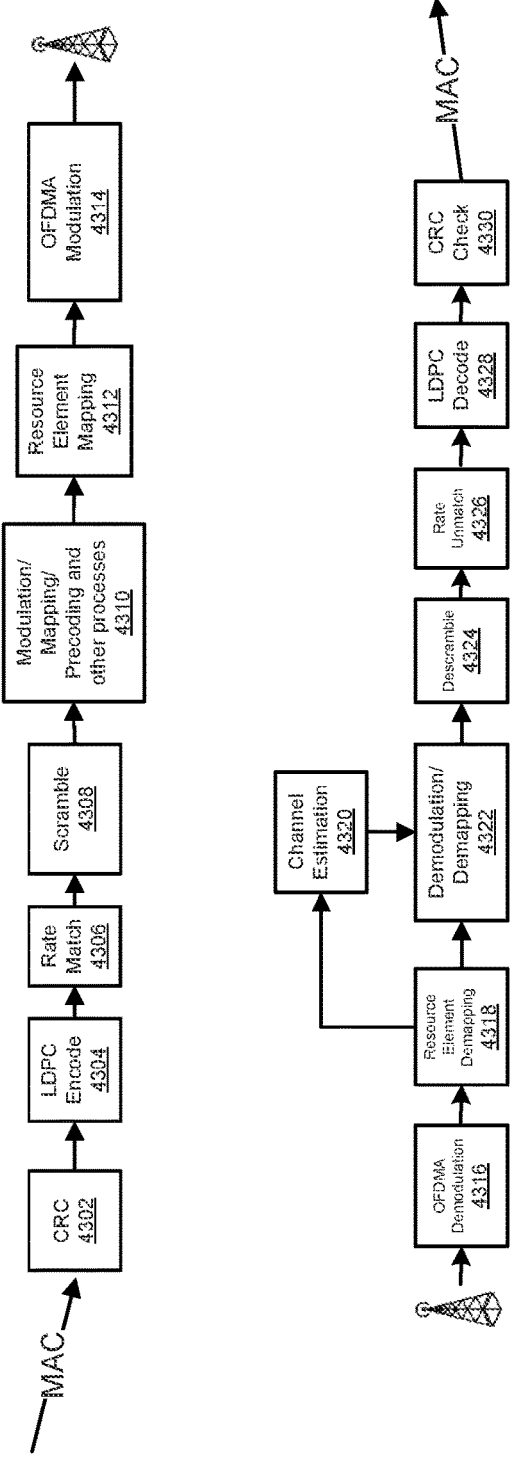

FIG. 43 illustrates an example of an uplink channel, in accordance with at least one embodiment. In at least one embodiment, FIG. 43 illustrates transmitting and receiving data within a physical uplink shared channel (PUSCH) in 5G NR, which may be part of a physical layer of a mobile device network.

In at least one embodiment, Physical Uplink Shared Channel (PUSCH) in 5G NR is designated to carry multiplexed control information and user application data. In at least one embodiment, 5G NR provides much more flexibility and reliability comparing to its predecessor, which in some examples may be referred to as 4G LTE, including more elastic pilot arrangements and support for both cyclic prefix (CP)-OFDM and Discrete Fourier Transform spread (DFT-s)-OFDM waveforms. In at least one embodiment, standard introduced filtered OFDM (f-OFDM) technique is utilized to add additional filtering to reduce Out-of-Band emission and improve performance at higher modulation orders. In at least one embodiment, modifications in Forward Error Correction (FEC) were imposed to replace Turbo Codes used in 4G LTE by Quasi-Cyclic Low Density Parity Check (QC-LDPC) codes, which were proven to achieve better transmission rates and provide opportunities for more efficient hardware implementations.

In at least one embodiment, transmission of 5G NR downlink and uplink data is organized into frames of 10 ms duration, each divided into 10 subframes of 1 ms each. In at least one embodiment, subframes are composed of a variable number of slots, depending on a selected subcarrier spacing which is parameterized in 5G NR. In at least one embodiment, a slot is built from 14 OFDMA symbols, each prepended with a cyclic prefix. In at least one embodiment, a subcarrier that is located within a passband and is designated for transmission is called a Resource Element (RE). In at least one embodiment, a group of 12 neighboring RE in a same symbol form a Physical Resource Block (PRB).

In at least one embodiment, 5G NR standard defined two types of reference signals associated with transmission within a PUSCH channel. In at least one embodiment, Demodulation Reference Signal (DMRS) is a user specific reference signal with high frequency density. In at least one embodiment, DMRS is transmitted within dedicated orthogonal frequency-division multiple access (OFDMA) symbols only and designated for frequency-selective channel estimation. In at least one embodiment, a number of DMRS symbols within a slot may vary between 1 and 4 depending on configuration, where a denser DMRS symbol spacing in time is designated for fast time-varying channels to obtain more accurate estimates within a coherence time of a channel. In at least one embodiment, in a frequency domain, DMRS PRB are mapped within a whole transmission allocation. In at least one embodiment, spacing between a DMRS resource element (RE) assigned for a same Antenna Port (AP) may be chosen between 2 and 3. In at least one embodiment, in a case of 2-2 multiple-input, multiple-output (MIMO), a standard allows for orthogonal assignment of RE between AP. In at least one embodiment, a receiver may perform partial single input, multiple output (SIMO) channel estimation based on a DMRS RE prior to MIMO equalization, neglecting spatial correlation.

In at least one embodiment, a second type of reference signal is a Phase Tracking Reference Signal (PTRS). In at least one embodiment, PTRS subcarriers are arranged in a comb structure having high density in a time domain. In at least one embodiment, it is used mainly in mmWave frequency bands to track and correct phase noise, which is a considerable source of performance losses. In at least one embodiment, usage of PTRS is optional, as it may lower a total spectral efficiency of a transmission when effects of phase noise are negligible.

In at least one embodiment, for transmission of data, a transport block may be generated from a MAC layer and given to a physical layer. In at least one embodiment, a transport block may be data that is intended to be transmitted. In at least one embodiment, a transmission in a physical layer starts with grouped resource data, which may be referred to as transport blocks. In at least one embodiment, a transport block is received by a cyclic redundancy check (CRC) 4302. In at least one embodiment, a cyclic redundancy check is appended to each transport block for error detection. In at least one embodiment, a cyclic redundancy check is used for error detection in transport blocks. In at least one embodiment, an entire transport block is used to calculate CRC parity bits and these parity bits are then attached to an end of a transport block. In at least one embodiment, minimum and maximum code block sizes are specified so blocks sizes are compatible with further processes. In at least one embodiment, an input block is segmented when an input block is greater than a maximum code block size.

In at least one embodiment, a transport block is received and encoded by a low-density parity-check (LDPC) encode 4304. In at least one embodiment, NR employs low-density parity-check (LDPC) codes for a data channel and polar codes for a control channel. In at least one embodiment, LDPC codes are defined by their parity-check matrices, with each column representing a coded bit, and each row representing a parity-check equation. In at least one embodiment, LDPC codes are decoded by exchanging messages between variables and parity checks in an iterative manner. In at least one embodiment, LDPC codes proposed for NR use a quasi-cyclic structure, where a parity-check matrix is defined by a smaller base matrix. In at least one embodiment, each entry of the base matrix represents either a Z×Z zero matrix or a shifted Z×Z identity matrix.

In at least one embodiment, an encoded transport block is received by rate match 4306. In at least one embodiment, an encoded block is used to create an output bit stream with a desired code rate. In at least one embodiment, rate match 4306 is utilized to create an output bit stream to be transmitted with a desired code rate. In at least one embodiment, bits are selected and pruned from a buffer to create an output bit stream with a desired code rate. In at least one embodiment, a Hybrid Automatic Repeat Request (HARQ) error correction scheme is incorporated.

In at least one embodiment, output bits are scrambled, which may aid in privacy, in scramble 4308. In at least one embodiment, codewords are bit-wise multiplied with an orthogonal sequence and a UE-specific scrambling sequence. In at least one embodiment, output of scramble 4308 may be input into modulation/mapping/precoding and other processes 4310. In at least one embodiment, various modulation, mapping, and precoding processes are performed.

In at least one embodiment, bits output from scramble 4308 are modulated with a modulation scheme, resulting in blocks of modulation symbols. In at least one embodiment, scrambled codewords undergo modulation using one of modulation schemes QPSK, 16 QAM, 64 QAM, resulting in a block of modulation symbols. In at least one embodiment, a channel interleaver process may be utilized that implements a first time mapping of modulation symbols onto a transmit waveform while ensuring that HARQ information is present on both slots. In at least one embodiment, modulation symbols are mapped to various layers based on transmit antennas. In at least one embodiment, symbols may be precoded, in which they are divided into sets, and an Inverse Fast Fourier Transform may be performed. In at least one embodiment, transport data and control multiplexing may be performed such that HARQ acknowledge (ACK) information is present in both slots and is mapped to resources around demodulation reference signals. In at least one embodiment, various precoding processes are performed.

In at least one embodiment, symbols are mapped to allocated physical resource elements in resource element mapping 4312. In at least one embodiment, allocation sizes may be limited to values whose prime factors are 2, 3 and 5. In at least one embodiment, symbols are mapped in increasing order beginning with subcarriers. In at least one embodiment, subcarrier mapped modulation symbols data are orthogonal frequency-division multiple access (OFDMA) modulated through IFFT operation in OFDMA modulation 4314. In at least one embodiment, time domain representations of each symbol are concatenated and filtered using transmit FIR filter to attenuate unwanted Out of Band emission to adjacent frequency bands caused by phase discontinuities and utilization of different numerologies. In at least one embodiment, an output of OFDMA modulation 4314 may be transmitted to be received and processed by another system.

In at least one embodiment, a transmission may be received by OFDMA demodulation 4316. In at least one embodiment, a transmission may originate from user mobile devices over a cellular network, although other contexts may be present. In at least one embodiment, a transmission may be demodulated through IFFT processing. In at least one embodiment, once OFDMA demodulation through IFFT processing has been accomplished, an estimation and correction of residual Sample Time Offset (STO) and Carrier Frequency Offset (CFO) may be performed. In at least one embodiment, both CFO and STO corrections have to be performed in frequency domain, because a received signal can be a superposition of transmissions coming from multiple UEs multiplexed in frequency, each suffering from a specific residual synchronization error. In at least one embodiment, residual CFO is estimated as a phase rotation between pilot subcarriers belonging to different OFDM symbols and corrected by a circular convolution operation in frequency domain.

In at least one embodiment, output of OFDMA demodulation 4316 may be received by resource element demapping 4318. In at least one embodiment, resource element demapping 4318 may determine symbols and demap symbols from allocated physical resource elements. In at least one embodiment, a channel estimation and equalization is performed in channel estimation 4320 in order to compensate for effects of multipath propagation. In at least one embodiment, channel estimation 4320 may be utilized to minimize effects of noise originating from various transmission layers and antennae. In at least one embodiment, channel estimation 4320 may generate equalized symbols from an output of resource element demapping 4318. In at least one embodiment, demodulation/demapping 4322 may receive equalized symbols from channel estimation 4320. In at least one embodiment, equalized symbols are demapped and permuted through a layer demapping operation. In at least one embodiment, a Maximum A Posteriori Probability (MAP) demodulation approach may be utilized to produce values representing beliefs regarding a received bit being 0 or 1, expressed in a form of Log-Likelihood Ratio (LLR).

In at least one embodiment, soft-demodulated bits are processed using various operations, including descrambling, deinterleaving and rate unmatching with LLR soft-combining using a circular buffer prior to LDPC decoding. In at least one embodiment, descramble 4324 may involve processes that reverse one or more processes of scramble 4308. In at least one embodiment, rate unmatch 4326 may involve processes that reverse one or more processes of rate match 4306. In at least one embodiment, descramble 4324 may receive output from demodulation/demapping 4322, and descramble received bits. In at least one embodiment, rate unmatch 4326 may receive descrambled bits, and utilize LLR soft-combining utilizing a circular buffer prior to LDPC decode 4328.

In at least one embodiment, decoding of LDPC codes in practical applications is done based on iterative belief propagation algorithms. In at least one embodiment, an LDPC code can be represented in a form of a bipartite graph with parity check matrix H of size M×N being a biadjacency matrix defining connections between graph nodes. In at least one embodiment, M rows of matrix H corresponds to parity check nodes, whereas N columns corresponds to variable nodes, i.e., received codeword bits. In at least one embodiment, a principle of belief propagation algorithms is based on iterative message exchange, in which A Posteriori probabilities between a variable and check nodes are updated, until a valid codeword is obtained. In at least one embodiment, LDPC decode 4328 may output a transport block comprising data.

In at least one embodiment, CRC check 4330 may determine errors and perform one or more actions based on parity bits attached to a received transport block. In at least one embodiment, CRC check 4330 may analyze and process parity bits attached to a received transport block, or otherwise any information associated with a CRC. In at least one embodiment, CRC check 4330 may transmit a processed transport block to a MAC layer for further processing.

It should be noted that, in various embodiments, transmitting and receiving data, which may be a transport block or other variation thereof, may include various processes not depicted in FIG. 43. In at least one embodiment, processes depicted in FIG. 43 are not intended to be exhaustive and further processes such as additional modulation, mapping, multiplexing, precoding, constellation mapping/demapping, MIMO detection, detection, decoding and variations thereof may be utilized in transmitting and receiving data as part of a network.

Figure 44:
FIG. 44 illustrates an architecture of a system of a network, according to at least one embodiment.
Figure 44:
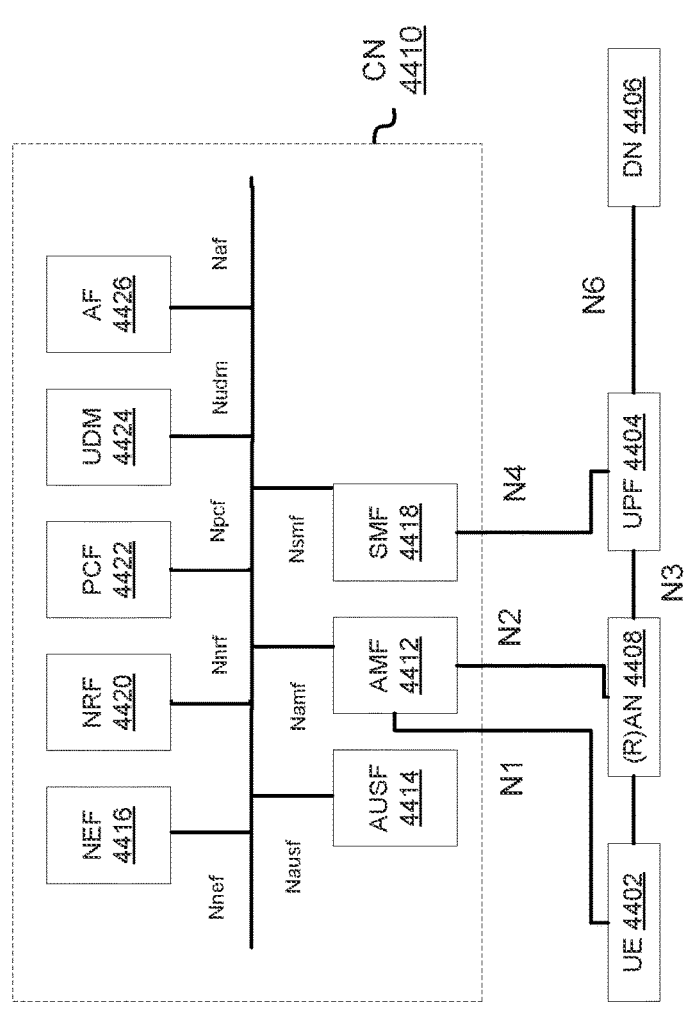

FIG. 44 illustrates an architecture of a system 4400 of a network in accordance with some embodiments. In at least one embodiment, system 4400 is shown to include a UE 4402, a 5G access node or RAN node (shown as (R)AN node 4408), a User Plane Function (shown as UPF 4404), a Data Network (DN 4406), which may be, for example, operator services, Internet access or 3rd party services, and a 5G Core Network (5GC) (shown as CN 4410).

In at least one embodiment, CN 4410 includes an Authentication Server Function (AUSF 4414); a Core Access and Mobility Management Function (AMF 4412); a Session Management Function (SMF 4418); a Network Exposure Function (NEF 4416); a Policy Control Function (PCF 4422); a Network Function (NF) Repository Function (NRF 4420); a Unified Data Management (UDM 4424); and an Application Function (AF 4426). In at least one embodiment, CN 4410 may also include other elements that are not shown, such as a Structured Data Storage network function (SDSF), an Unstructured Data Storage network function (UDSF), and variations thereof.

In at least one embodiment, UPF 4404 may act as an anchor point for intra-RAT and inter-RAT mobility, an external PDU session point of interconnect to DN 4406, and a branching point to support multi-homed PDU session. In at least one embodiment, UPF 4404 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 4404 may include an uplink classifier to support routing traffic flows to a data network. In at least one embodiment, DN 4406 may represent various network operator services, Internet access, or third party services.

In at least one embodiment, AUSF 4414 may store data for authentication of UE 4402 and handle authentication related functionality. In at least one embodiment, AUSF 4414 may facilitate a common authentication framework for various access types.

In at least one embodiment, AMF 4412 may be responsible for registration management (e.g., for registering UE 4402, etc.), connection management, reachability management, mobility management, and lawful interception of AMF-related events, and access authentication and authorization. In at least one embodiment, AMF 4412 may provide transport for SM messages for SMF 4418, and act as a transparent proxy for routing SM messages. In at least one embodiment, AMF 4412 may also provide transport for short message service (SMS) messages between UE 4402 and an SMS function (SMSF) (not shown by FIG. 44). In at least one embodiment, AMF 4412 may act as Security Anchor Function (SEA), which may include interaction with AUSF 4414 and UE 4402 and receipt of an intermediate key that was established as a result of UE 4402 authentication process. In at least one embodiment, where USIM based authentication is used, AMF 4412 may retrieve security material from AUSF 4414. In at least one embodiment, AMF 4412 may also include a Security Context Management (SCM) function, which receives a key from SEA that it uses to derive access-network specific keys. In at least one embodiment, furthermore, AMF 4412 may be a termination point of RAN CP interface (N2 reference point), a termination point of NAS (NI) signaling, and perform NAS ciphering and integrity protection.

In at least one embodiment, AMF 4412 may also support NAS signaling with a UE 4402 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 4402 and AMF 4412, and relay uplink and downlink user-plane packets between UE 4402 and UPF 4404. In at least one embodiment, N3IWF also provides mechanisms for IPsec tunnel establishment with UE 4402.

In at least one embodiment, SMF 4418 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 4418 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 4416 may provide means for securely exposing services and capabilities provided by 3GPP network functions for third party, internal exposure/re-exposure, Application Functions (e.g., AF 4426), edge computing or fog computing systems, etc. In at least one embodiment, NEF 4416 may authenticate, authorize, and/or throttle AFs. In at least one embodiment, NEF 4416 may also translate information exchanged with AF 4426 and information exchanged with internal network functions. In at least one embodiment, NEF 4416 may translate between an AF-Service-Identifier and an internal 5GC information. In at least one embodiment, NEF 4416 may also receive information from other network functions (NFs) based on exposed capabilities of other network functions. In at least one embodiment, this information may be stored at NEF 4416 as structured data, or at a data storage NF using a standardized interface. In at least one embodiment, stored information can then be re-exposed by NEF 4416 to other NFs and AFs, and/or used for other purposes such as analytics.

In at least one embodiment, NRF 4420 may support service discovery functions, receive NF Discovery Requests from NF instances, and provide information of discovered NF instances to NF instances. In at least one embodiment, NRF 4420 also maintains information of available NF instances and their supported services.

In at least one embodiment, PCF 4422 may provide policy rules to control plane function(s) to enforce them, and may also support unified policy framework to govern network behavior. In at least one embodiment, PCF 4422 may also implement a front end (FE) to access subscription information relevant for policy decisions in a UDR of UDM 4424.

In at least one embodiment, UDM 4424 may handle subscription-related information to support a network entities' handling of communication sessions, and may store subscription data of UE 4402. In at least one embodiment, UDM 4424 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 4422. In at least one embodiment, UDM 4424 may also support SMS management, wherein an SMS-FE implements a similar application logic as discussed previously.

In at least one embodiment, AF 4426 may provide application influence on traffic routing, access to a Network Capability Exposure (NCE), and interact with a policy framework for policy control. In at least one embodiment, NCE may be a mechanism that allows a 5GC and AF 4426 to provide information to each other via NEF 4416, which may be used for edge computing implementations. In at least one embodiment, network operator and third party services may be hosted close to UE 4402 access point of attachment to achieve an efficient service delivery through a reduced end-to-end latency and load on a transport network. In at least one embodiment, for edge computing implementations, 5GC may select a UPF 4404 close to UE 4402 and execute traffic steering from UPF 4404 to DN 4406 via N6 interface. In at least one embodiment, this may be based on UE subscription data, UE location, and information provided by AF 4426. In at least one embodiment, AF 4426 may influence UPF (re)selection and traffic routing. In at least one embodiment, based on operator deployment, when AF 4426 is considered to be a trusted entity, a network operator may permit AF 4426 to interact directly with relevant NFs.

In at least one embodiment, CN 4410 may include an SMSF, which may be responsible for SMS subscription checking and verification, and relaying SM messages to/from UE 4402 to/from other entities, such as an SMS-GMSC/IWMSC/SMS-router. In at least one embodiment, SMS may also interact with AMF 4412 and UDM 4424 for notification procedure that UE 4402 is available for SMS transfer (e.g., set a UE not reachable flag, and notifying UDM 4424 when UE 4402 is available for SMS).

In at least one embodiment, system 4400 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 4400 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 4410 may include an Nx interface, which is an inter-CN interface between MME and AMF 4412 in order to enable interworking between CN 4410 and CN 7244.

In at least one embodiment, system 4400 may include multiple RAN nodes (such as (R)AN node 4408) wherein an Xn interface is defined between two or more (R)AN node 4408 (e.g., gNBs) that connecting to 5GC 410, between a (R)AN node 4408 (e.g., gNB) connecting to CN 4410 and an eNB (e.g., a macro RAN node), and/or between two eNBs connecting to CN 4410.

In at least one embodiment, Xn interface may include an Xn user plane (Xn-U) interface and an Xn control plane (Xn-C) interface. In at least one embodiment, Xn-U may provide non-guar-anteed delivery of user plane PDUs and support/provide data forwarding and flow control functionality. In at least one embodiment, Xn-C may provide management and error handling functionality, functionality to manage a Xn-C interface; mobility support for UE 4402 in a connected mode (e.g., CM-CONNECTED) including functionality to manage UE mobility for connected mode between one or more (R)AN node 4408. In at least one embodiment, mobility support may include context transfer from an old (source) serving (R)AN node 4408 to new (target) serving (R)AN node 4408; and control of user plane tunnels between old (source) serving (R)AN node 4408 to new (target) serving (R)AN node 4408.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to a user plane and/or control plane protocol stack(s) shown and described herein.

Figure 45:
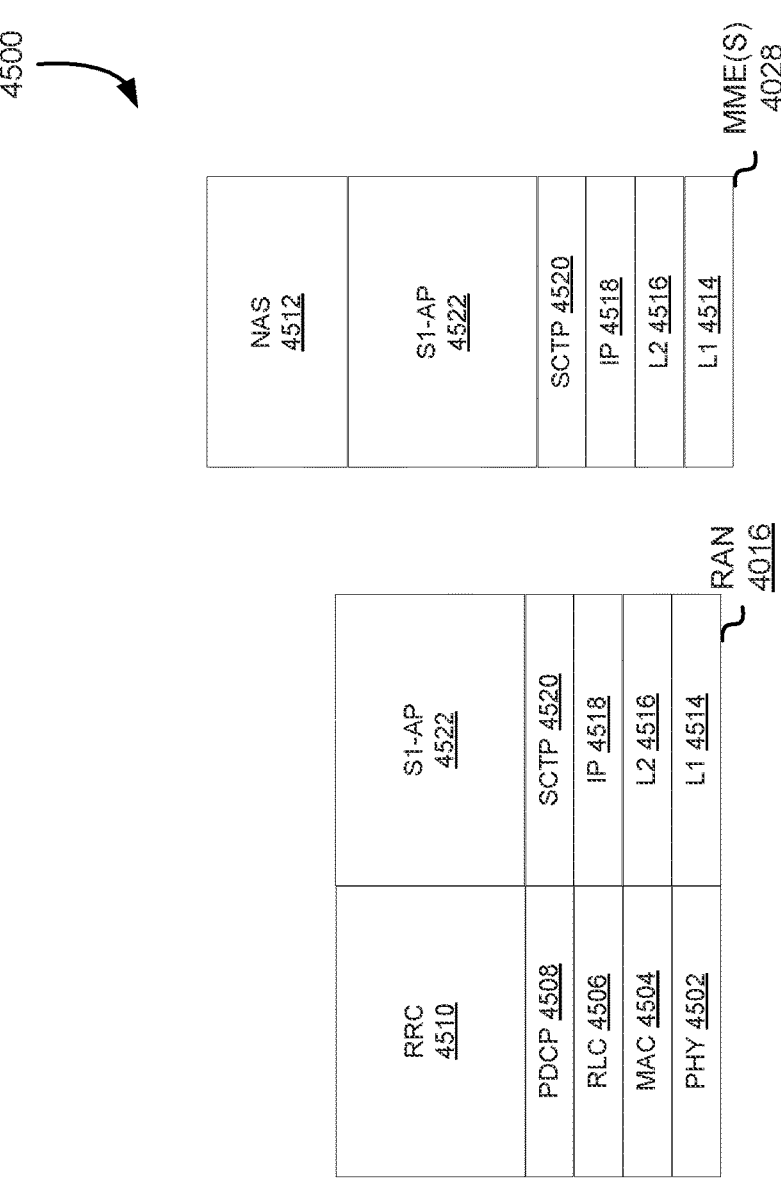
FIG. 45 illustrates a control plane protocol stack, according to at least one embodiment.
Figure 45:
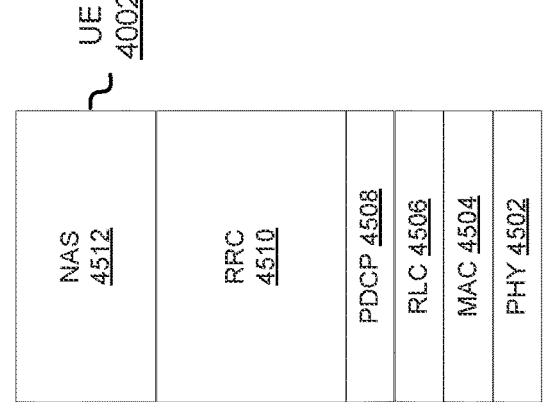

FIG. 45 is an illustration of a control plane protocol stack in accordance with some embodiments. In at least one embodiment, a control plane 4500 is shown as a communications protocol stack between UE 4002 (or alternatively, UE 4004), RAN 4016, and MME(s) 4028.

In at least one embodiment, PHY layer 4502 may transmit or receive information used by MAC layer 4504 over one or more air interfaces. In at least one embodiment, PHY layer 4502 may further perform link adaptation or adaptive modulation and coding (AMC), power control, cell search (e.g., for initial synchronization and handover purposes), and other measurements used by higher layers, such as an RRC layer 4510. In at least one embodiment, PHY layer 4502 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 4504 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 4506 may operate in a plurality of modes of operation, including: Transparent Mode (TM), Unacknowledged Mode (UM), and Acknowledged Mode (AM). In at least one embodiment, RLC layer 4506 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 4506 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 4508 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 4510 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 4002 and RAN 4016 may utilize a Uu interface (e.g., an LTE-Uu interface) to exchange control plane data via a protocol stack comprising PHY layer 4502, MAC layer 4504, RLC layer 4506, PDCP layer 4508, and RRC layer 4510.

In at least one embodiment, non-access stratum (NAS) protocols (NAS protocols 4512) form a highest stratum of a control plane between UE 4002 and MME(s) 4028. In at least one embodiment, NAS protocols 4512 support mobility of UE 4002 and session management procedures to establish and maintain IP connectivity between UE 4002 and P-GW 4034.

In at least one embodiment, Si Application Protocol (S1-AP) layer (Si-AP layer 4522) may support functions of a Si interface and comprise Elementary Procedures (EPs). In at least one embodiment, an EP is a unit of interaction between RAN 4016 and CN 4028. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 4520) may ensure reliable delivery of signaling messages between RAN 4016 and MME(s) 4028 based, in part, on an IP protocol, supported by an IP layer 4518. In at least one embodiment, L2 layer 4516 and an L1 layer 4514 may refer to communication links (e.g., wired or wireless) used by a RAN node and MME to exchange information.

In at least one embodiment, RAN 4016 and MME(s) 4028 may utilize an S1-MME interface to exchange control plane data via a protocol stack comprising a L1 layer 4514, L2 layer 4516, IP layer 4518, SCTP layer 4520, and Si-AP layer 4522.

Figure 46:
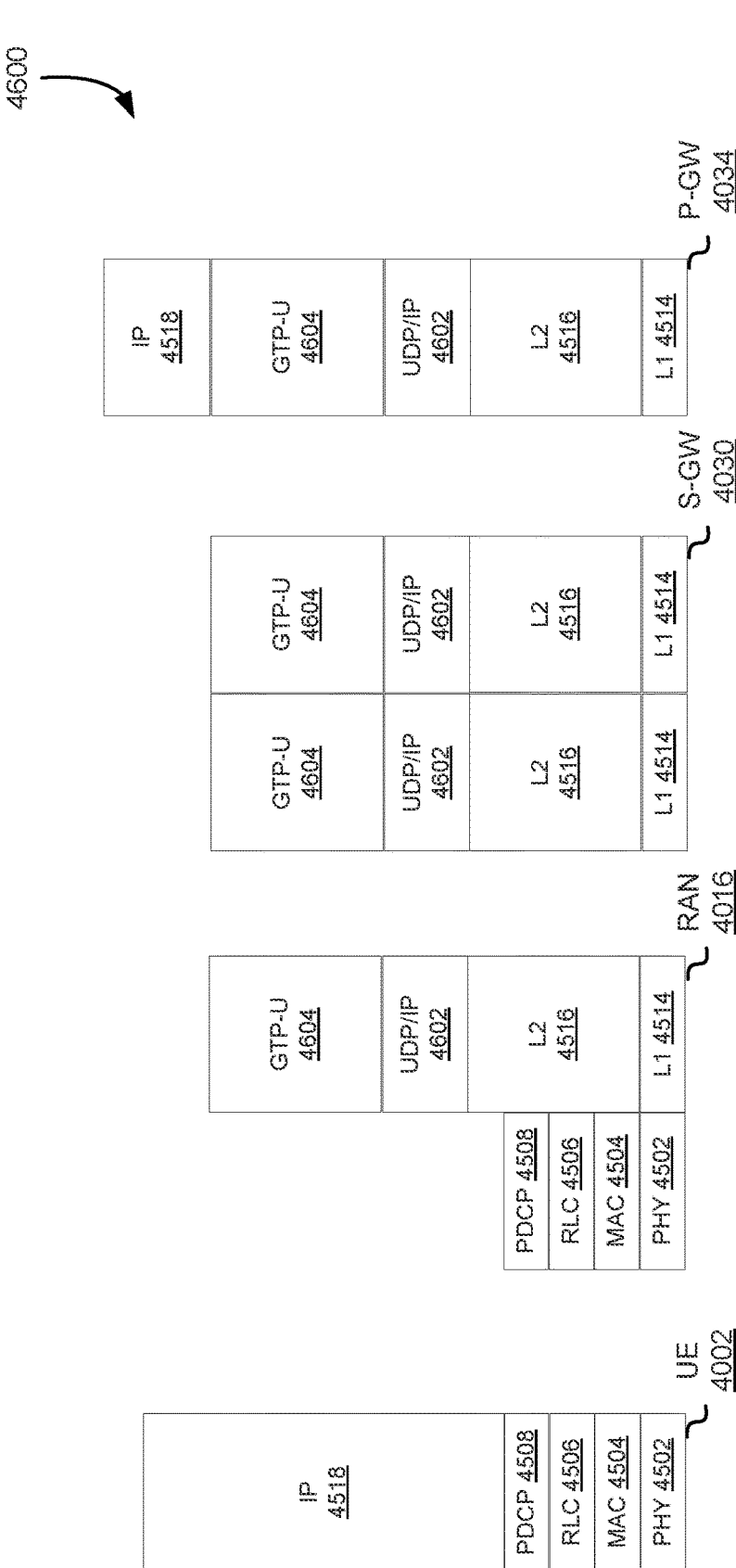
FIG. 46 illustrates a user plane protocol stack, according to at least one embodiment.

FIG. 46 is an illustration of a user plane protocol stack in accordance with at least one embodiment. In at least one embodiment, a user plane 4600 is shown as a communications protocol stack between a UE 4002, RAN 4016, S-GW 4030, and P-GW 4034. In at least one embodiment, user plane 4600 may utilize a same protocol layers as control plane 4500. In at least one embodiment, for example, UE 4002 and RAN 4016 may utilize a Uu interface (e.g., an LTE-Uu interface) to exchange user plane data via a protocol stack comprising PHY layer 4502, MAC layer 4504, RLC layer 4506, PDCP layer 4508.

In at least one embodiment, General Packet Radio Service (GPRS) Tunneling Protocol for a user plane (GTP-U) layer (GTP-U layer 4604) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 4602) may provide checksums for data integrity, port numbers for addressing different functions at a source and destination, and encryption and authentication on selected data flows. In at least one embodiment, RAN 4016 and S-GW 4030 may utilize an S1-U interface to exchange user plane data via a protocol stack comprising L1 layer 4514, L2 layer 4516, UDP/IP layer 4602, and GTP-U layer 4604. In at least one embodiment, S-GW 4030 and P-GW 4034 may utilize an S5/S8a interface to exchange user plane data via a protocol stack comprising L1 layer 4514, L2 layer 4516, UDP/IP layer 4602, and GTP-U layer 4604. In at least one embodiment, as discussed above with respect to FIG. 45, NAS protocols support a mobility of UE 4002 and session management procedures to establish and maintain IP connectivity between UE 4002 and P-GW 4034.

Figure 47:
FIG. 47 illustrates components of a core network, according to at least one embodiment.
Figure 47:
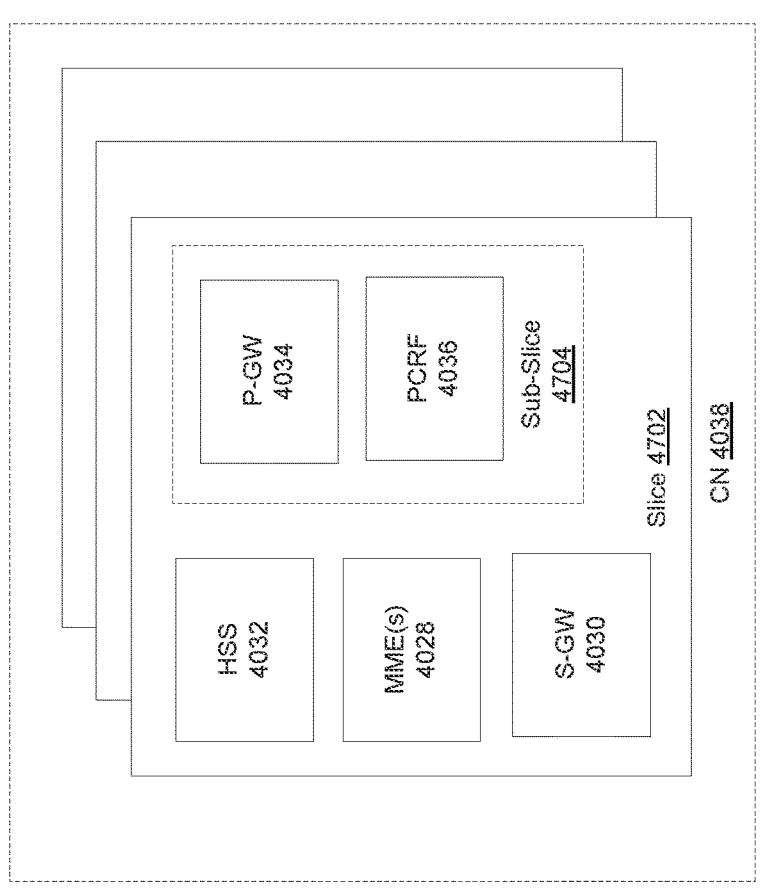

FIG. 47 illustrates components 4700 of a core network in accordance with at least one embodiment. In at least one embodiment, components of CN 4038 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 4038 may be referred to as a network slice 4702 (e.g., network slice 4702 is shown to include HSS 4032, MME(s) 4028, and S-GW 4030). In at least one embodiment, a logical instantiation of a portion of CN 4038 may be referred to as a network sub-slice 4704 (e.g., network sub-slice 4704 is shown to include P-GW 4034 and PCRF 4036).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

Figure 48:
FIG. 48 illustrates components of a system to support network function virtualization ("NFV"), according to at least one embodiment.
Figure 48:
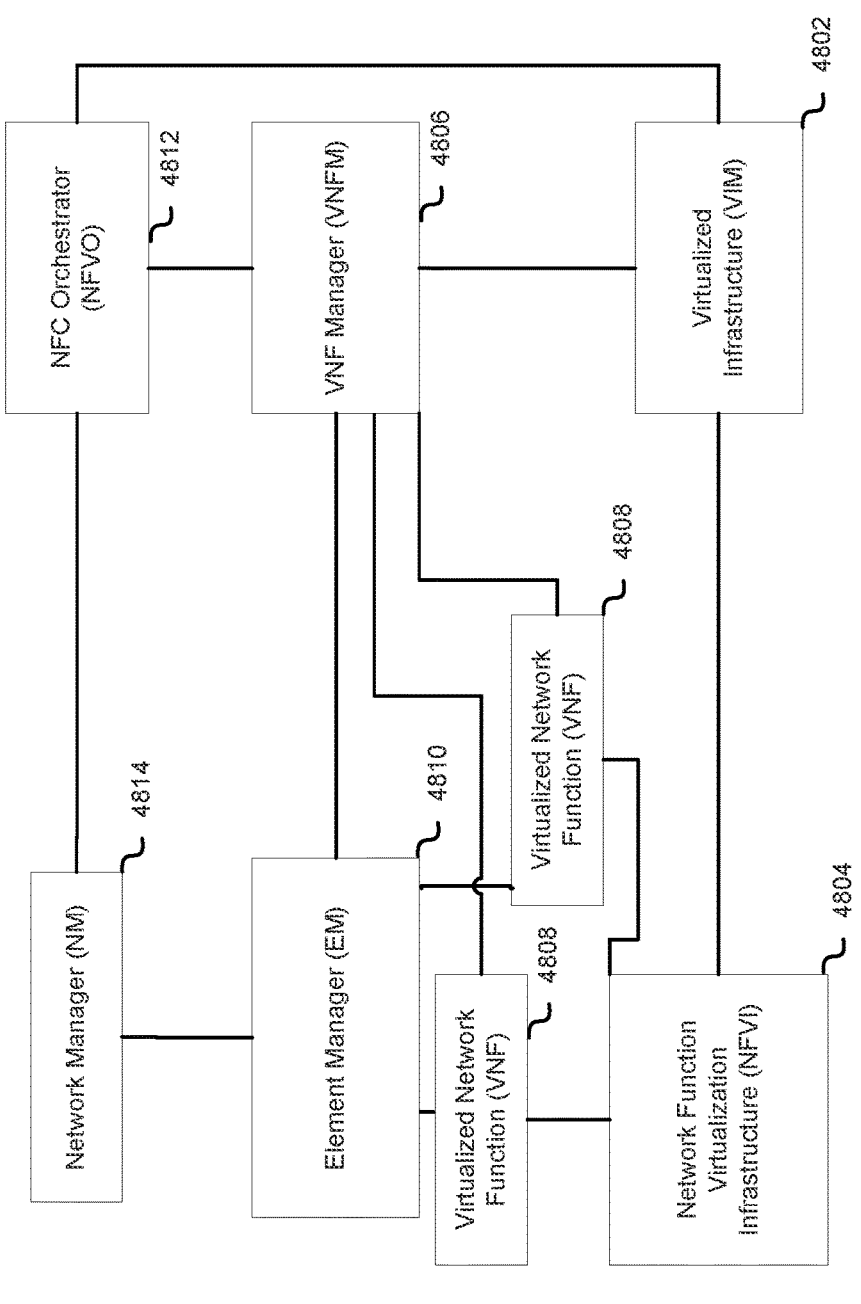

FIG. 48 is a block diagram illustrating components, according to at least one embodiment, of a system 4800 to support network function virtualization (NFV). In at least one embodiment, system 4800 is illustrated as including a virtualized infrastructure manager (shown as VIM 4802), a network function virtualization infrastructure (shown as NFVI 4804), a VNF manager (shown as VNFM 4806), virtualized network functions (shown as VNF 4808), an element manager (shown as EM 4810), an NFV Orchestrator (shown as NFVO 4812), and a network manager (shown as NM 4814).

In at least one embodiment, VIM 4802 manages resources of NFVI 4804. In at least one embodiment, NFVI 4804 can include physical or virtual resources and applications (including hypervisors) used to execute system 4800. In at least one embodiment, VIM 4802 may manage a life cycle of virtual resources with NFVI 4804 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 4806 may manage VNF 4808. In at least one embodiment, VNF 4808 may be used to execute EPC components/functions. In at least one embodiment, VNFM 4806 may manage a life cycle of VNF 4808 and track performance, fault and security of virtual aspects of VNF 4808. In at least one embodiment, EM 4810 may track performance, fault and security of functional aspects of VNF 4808. In at least one embodiment, tracking data from VNFM 4806 and EM 4810 may comprise, for example, performance measurement (PM) data used by VIM 4802 or NFVI 4804. In at least one embodiment, both VNFM 4806 and EM 4810 can scale up/down a quantity of VNFs of system 4800.

In at least one embodiment, NFVO 4812 may coordinate, authorize, release and engage resources of NFVI 4804 in order to provide a requested service (e.g., to execute an EPC function, component, or slice). In at least one embodiment, NM 4814 may provide a package of end-user functions with responsibility for a management of a network, which may include network elements with VNFs, non-virtualized network functions, or both (management of the VNFs may occur via the EM 4810).

At least one embodiment of the disclosure can be described in view of the following clauses:

1. A processor comprising:
   one or more circuits to perform an application programming interface (API) to indicate a number of fifth generation new radio (5G-NR) cells that are able to be performed concurrently by one or more processors.
2. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter.
3. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to the one or more processors performing one or more workloads of the 5G-NR cells and meeting a threshold quality of service, and wherein the one or more processors are resources that the first layer is able to use to perform the one or more workloads.
4. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the first layer is to provide through the API to the second layer a maximum number of 5G cells that it can perform concurrently based at least in part on the quality parameter.
5. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to latency, throughput, reliability, or connectivity of processing the one or more workloads corresponding to the 5G-NR cells.
6. The processor of Clause 1 or any proceeding Clause, wherein the one or more processors are one or more graphics processing units (GPUs).
7. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, and wherein to perform the API is to cause the first layer to deny processing one or more workloads based on the first layer determining that it cannot meet a quality parameter corresponding to any number of the 5G-NR cells.
8. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, and wherein the API has a response that corresponds to the first layer admitting or denying one or more workloads to be processed by the one or more processors to meet the quality parameter.
9. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to the one or more processors performing one or more workloads of the 5G-NR cells and meeting a threshold quality of service, and wherein the one or more workloads correspond to slices of a 5G-NR network.
10. The processor of Clause 1 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to the one or more processors performing one or more workloads of the 5G-NR cells and meeting a threshold quality of service, wherein the one or more workloads correspond to slices of a 5G-NR network, and wherein the slices provide services corresponding to enhanced mobile broadband (eMBB) operations, ultra-reliable low latency communications (URLLC) operations, massive machine-type communications (mMTC) operations, or vehicle to everything (V2X) operations.
11. A system, comprising memory to store instructions that, as a result of execution by one or more processors, cause the system to:
   perform an application programming interface (API) to indicate a number of fifth generation new radio (5G-NR) cells that are able to be performed concurrently by one or more processors.
12. The system of Clause 11 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter.
13. The system of Clause 11 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to the one or more processors performing one or more workloads of the 5G-NR cells and meeting a threshold quality of service, and wherein the one or more processors are resources that the first layer is able to use to perform the one or more workloads.

14. The system of Clause 11 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the first layer is to provide through the API to the second layer a maximum number of 5G cells that it can perform concurrently based at least in part on the quality parameter.

15. The system of Clause 11 or any proceeding Clause, wherein the one or more processors are one or more graphics processing units (GPUs).

16. The system of Clause 11 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to latency, throughput, reliability, or connectivity of processing the one or more workloads corresponding to the 5G-NR cells.

17. The system of Clause 15 or any proceeding Clause, wherein the API is to deny processing the one or more workloads based on a response from the first layer indicating that it cannot meet the quality parameter corresponding to any number of the 5G-NR cells.

18. The system of Clause 11 or any proceeding Clause, wherein the API has an input corresponding to a quality parameter and a response to the API corresponds to admitting or denying one or more workloads to be processed by the one or more processors to meet the quality parameter.

19. The system of Clause 11 or any proceeding Clause, wherein to perform the API is to cause a first layer and a second layer corresponding to a 5G-NR network protocol stack to exchange data to determine the number of 5G-NR cells the first layer is able to perform concurrently at least partially based on a quality parameter, wherein the quality parameter corresponds to the one or more processors performing one or more workloads of the 5G-NR cells and meeting a threshold quality of service, and wherein the one or more workloads correspond to slices of a 5G-NR network.

20. The system of Clause 19 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

21. A machine-readable medium having stored thereon one or more instructions, which if performed by one or more processors, cause one or more processors to at least:

perform an application programming interface (API) to indicate a number of fifth generation new radio (5G-NR) cells that are able to be performed concurrently by one or more processors.

22. The machine-readable medium of Clause 21 or any proceeding Clause, wherein to perform the API is to further cause the one or more processors to at least: communicate data between a first layer and a second layer corresponding to a 5G-NR network protocol stack, determine whether to offload one or more workloads from the second layer to the first layer to be processed by the one or more processors at least partially based on a quality parameter provided from the second layer to the first layer, and wherein the quality parameter corresponds to the one or more processors processing the one or more workloads, wherein the quality parameter corresponds to the one or more processors performing the one or more workloads of the 5G-NR cells and meeting a threshold quality of service; and schedule the one or more workloads to be processed by the one or more processors.

23. The machine-readable medium of Clause 22 or any proceeding Clause, wherein the quality parameter corresponds to latency, throughput, reliability, or connectivity of processing the one or more workloads.

24. The machine-readable medium of Clause 21 or any proceeding Clause, wherein the one or more processors are one or more graphics processing units (GPUs).

25. The machine-readable medium of Clause 22 or any proceeding Clause, wherein the quality parameter corresponds to performance indicators to process the one or more workloads to meet the quality parameter.

26. The machine-readable medium of Clause 22 or any proceeding Clause, wherein the one or more instructions further cause the one or more processors to at least:

deny processing the one or more workloads based on a response from the first layer indicating that it cannot meet the quality parameter corresponding to any number of the 5G-NR cells.

27. The machine-readable medium of Clause 21 or any proceeding Clause, wherein the API has an input corresponding to a quality parameter and a response to the API corresponds to admitting or denying one or more workloads to be processed by the one or more processors to meet the quality parameter.

28. A method comprising:

performing an application programming interface (API) to indicate a number of fifth generation new radio (5G-NR) cells that are able to be performed concurrently by one or more processors.

29. The method of Clause 28 or any proceeding Clause, the method further comprising: communicating, by the API, data between a first layer and a second layer corresponding to a 5G-NR network protocol stack, wherein the second layer is to offload one or more workloads from the second layer to the first layer to be processed by the one or more processors, determining, by the API, whether to offload the one or more workloads to the first layer to be processed at least partially based on an input quality parameter to process the one or more workloads corresponding to the API; and scheduling the one or more workloads to be processed at least based on rank or priority of the one or more workloads, wherein the rank or priority was provided by another API.

30. The method of Clause 28 or any proceeding Clause, wherein the quality parameter corresponds to performance indicators to process the one or more workloads to meet the quality parameter.

31. The method of Clause 28 or any proceeding Clause, the method further comprising: denying processing the one or more workloads based on a response from the first layer indicating that it cannot meet the quality parameter corresponding to any number of the 5G-NR cells.

32. The method of Clause 28 or any proceeding Clause, wherein the API has an input corresponding to a quality parameter and a response to the API corresponds to admitting or denying one or more workloads to be processed by the one or more processors to meet the quality parameter.

33. The method of Clause 28 or any proceeding Clause, wherein the one or more workloads correspond to slices of a 5G-NR network, wherein the slices provide services corresponding to enhanced mobile broadband (eMBB) operations, ultra-reliable low latency communications (URLLC) operations, massive machine-type communications (mMTC) operations, or vehicle to everything (V2X) operations.

34. The method of Clause 28 or any proceeding Clause, the method further comprising:

admitting or denying one or more workloads to be processed by the one or more processors at least partially based on a capability of the one or more processors to meet a quality parameter communicated by the API from a first layer to a second layer, wherein the API is to communicate data between the first layer and the second layer corresponding to a 5G-NR network protocol stack.

35. The method of Clause 28 or any proceeding Clause, wherein the quality parameter is a first quality parameter, the method further comprising:

receiving a notification that network traffic conditions have changed to correspond to a second quality parameter, admitting or denying one or more workloads to be processed by the one or more processors at least partially based on a capability of the one or more processors to meet the second quality parameter communicated by the API from the first layer to the second layer.

36. The method of Clause 28 or any proceeding Clause, wherein the quality parameter is different than a standard or predefined quality parameter.

1. A processor comprising: one or more circuits to perform an application programming interface (API) to indicate whether one or more processors are able to perform a first number of fifth generation new radio (5G-NR) cells concurrently.

2. The processor of Clause 1 or any proceeding Clause, wherein the API is to communicate data between a first layer and a second layer corresponding to a 5G-NR network protocol stack, wherein the second layer is to determine whether to offload one or more workloads corresponding to the 5G-NR cells to the first layer to be processed by the one or more processors at least partially based on a quality parameter provided from the second layer to the first layer by the API.

3. The processor of Clause 1 or any proceeding Clause, wherein the API is to communicate data between a first layer and a second layer corresponding to a 5G-NR network protocol stack, wherein the second layer is to determine whether to offload one or more workloads corresponding to the 5G-NR cells to the first layer to be processed by the one or more processors at least partially based on a quality parameter provided from the second layer to the first layer by the API, wherein the quality parameter corresponds to the one or more processors processing the one or more workloads to at least meet the quality parameter, and wherein the first number of 5G-NR cells corresponds to a maximum number of 5G-NR cells that the first layer can support concurrently based at least in part on the quality parameter.

4. The processor of Clause 1 or any proceeding Clause, wherein the API is to communicate data between a first layer and a second layer corresponding to a 5G-NR network protocol stack, wherein the second layer is to determine whether to offload one or more workloads corresponding to the 5G-NR cells to the first layer to be processed by the one or more processors at least partially based on a quality parameter provided from the second layer to the first layer by the API, and wherein the quality parameter corresponds to latency, throughput, reliability, or connectivity of processing the one or more workloads corresponding to the 5G-NR cells.

5. The processor of Clause 2 or any proceeding Clause, wherein the quality parameter is based on receiving a notification that 5G-NR network traffic conditions have changed and the second layer is to determine whether the first layer can handle the one or more workloads and meet the quality parameter at least partially based on the changed 5G-NR network traffic conditions.

6. The processor of Clause 2 or any proceeding Clause, wherein the first layer is to provide through the API to the second layer a maximum number of 5G cells that it can support based at least in part on the quality parameter.

7. The processor of Clause 2 or any proceeding Clause, wherein the quality parameter corresponds to performance indicators to process the one or more workloads to meet the quality parameter.

8. The processor of Clause 2 or any proceeding Clause, wherein the API is to deny processing the one or more workloads based on a response from the first layer indicating that it cannot meet the quality parameter corresponding to any number of the 5G-NR cells.

9. The processor of Clause 1 or any proceeding Clause, wherein the API has an input corresponding to a quality parameter and a response to the API corresponds to admitting or denying one or more workloads to be processed by the one or more processors to meet the quality parameter.

10. The processor of Clause 2 or any proceeding Clause, wherein the one or more workloads correspond to slices of a 5G-NR network.

11. The processor of Clause 10, wherein the slices provide services corresponding to enhanced mobile broadband (eMBB) operations, ultra-reliable low latency communications (URLLC) operations, massive machine-type communications (mMTC) operations, or vehicle to everything (V2X) operations.

12. A system, comprising memory to store instructions that, as a result of execution by one or more processors, cause the system to:

perform an application programming interface (API) to indicate whether one or more processors are able to perform a first number of fifth generation new radio (5G-NR) cells concurrently.

13. The system of Clause 12 or any proceeding Clause, wherein the API is to communicate data between a first layer and a second layer corresponding to a 5G-NR network protocol stack, wherein the second layer is to determine whether to offload one or more workloads corresponding to the 5G-NR cells to the first layer to be processed by the one or more processors at least partially based on a quality parameter provided from the second layer to the first layer by the API.

14. The system of Clause 13 or any proceeding Clause, wherein the quality parameter corresponds to the one or more processors processing the one or more workloads to at least meet the quality parameter, and wherein the first number of 5G-NR cells corresponds to a maximum number of 5G-NR cells that the first layer can support concurrently based at least in part on the quality parameter.

15. The system of Clause 13 or any proceeding Clause, wherein the quality parameter corresponds to latency, throughput, reliability, or connectivity of processing the one or more workloads corresponding to the 5G-NR cells.

16. The system of Clause 12 or any proceeding Clause, wherein the one or more processors are one or more graphics processing units (GPUs).

17. The system of Clause 13 or any proceeding Clause, wherein the quality parameter corresponds to performance indicators to process the one or more workloads to meet the quality parameter.

18. The system of Clause 12 or any proceeding Clause, wherein the first layer is to provide through the API to the second layer a maximum number of 5G cells that it can support based at least in part on the quality parameter.

19. The system of Clause 13 or any proceeding Clause, wherein the API is to deny processing the one or more workloads based on a response from the first layer indicating that it cannot meet the quality parameter corresponding to number of the 5G-NR cells.

20. The system of Clause 12 or any proceeding Clause, wherein the API has an input corresponding to a quality parameter and a response to the API corresponds to admitting or denying one or more workloads to be processed by the one or more processors to meet the quality parameter.

21. The system of Clause 13 or any proceeding Clause, wherein the one or more workloads correspond to slices of a 5G-NR network.

22. The system of Clause 21 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

23. A machine-readable medium having stored thereon one or more instructions, which if performed by one or more processors, cause one or more processors to at least:

perform an application programming interface (API) to indicate whether one or more processors are able to perform a first number of fifth generation new radio (5G-NR) cells concurrently.

24. The machine-readable medium of Clause 23 or any proceeding Clause, wherein the one or more instructions further cause the one or more processors to at least:

communicate data between a first layer and a second layer corresponding to a 5G-NR network protocol stack, wherein the second layer is to offload one or more workloads corresponding to the 5G-NR cells to the first layer to be processed by the one or more processors, determine whether to offload the one or more workloads at least partially based on a quality parameter provided from the second layer to the first layer by the API, and wherein the quality parameter corresponds to the one or more processors processing the one or more workloads to meet the quality parameter.

25. The machine-readable medium of Clause 24 or any proceeding Clause, wherein the quality parameter corresponds to latency, throughput, reliability, or connectivity of processing the one or more workloads.

26. The machine-readable medium of Clause 24 or any proceeding Clause, wherein the one or more processors are one or more graphics processing units (GPUs).

27. The machine-readable medium of Clause 23 or any proceeding Clause, wherein the quality parameter corresponds to performance indicators to process the one or more workloads to meet the quality parameter.

28. The machine-readable medium of Clause 24 or any proceeding Clause, wherein the one or more instructions further cause the one or more processors to at least:

provide, by the API, from the first layer to the second layer a maximum number of 5G cells that the first layer can support based at least in part on the quality parameter.

29. The machine-readable medium of Clause 24 or any proceeding Clause, wherein the one or more instructions further cause the one or more processors to at least:

deny processing the one or more workloads based on a response from the first layer indicating that it cannot meet the quality parameter corresponding to number of the 5G-NR cells.

30. The machine-readable medium of Clause 24 or any proceeding Clause, wherein the API has an input corresponding to a quality parameter and a response to the API corresponds to admitting or denying one or more workloads to be processed by the one or more processors to meet the quality parameter.

31. A method comprising:

performing an application programming interface (API) to indicate whether one or more processors are able to perform a first number of fifth generation new radio (5G-NR) cells concurrently.

32. The method of Clause 31 or any proceeding Clause, the method further comprising:

communicating, by the API, data between a first layer and a second layer corresponding to a 5G-NR network protocol stack, wherein the second layer is to offload one or more workloads from the second layer to the first layer to be processed by the one or more processors, determining, by the API, whether to offload the one or more workloads to the first layer to be processed at least partially based on an input quality parameter to process the one or more workloads corresponding to the API.

33. The method of Clause 32 or any proceeding Clause, wherein the quality parameter corresponds to performance indicators to process the one or more workloads to meet the quality parameter.

34. The method of Clause 32 or any proceeding Clause, the method further comprises:

providing, by the API, from the first layer to the second layer a maximum number of 5G cells that the first layer can support based at least in part on the quality parameter.

35. The method of Clause 32 or any proceeding Clause, the method further comprising:

denying processing the one or more workloads based on a response from the first layer indicating that it cannot meet the quality parameter corresponding to number of the 5G-NR cells.

36. The method of Clause 32 or any proceeding Clause, wherein the API has an input corresponding to a quality parameter and a response to the API corresponds to admitting or denying one or more workloads to be processed by the one or more processors to meet the quality parameter.

37. The method of Clause 32 or any proceeding Clause, wherein the one or more workloads correspond to slices of a 5G-NR network, wherein the slices provide services corresponding to enhanced mobile broadband (eMBB) operations, ultra-reliable low latency communications (URLLC) operations, massive machine-type communications (mMTC) operations, or vehicle to everything (V2X) operations.

38. The method of Clause 32 or any proceeding Clause, the method further comprising:

admitting or denying one or more workloads to be processed by the one or more processors at least partially based on a capability of the one or more processors to meet a quality parameter communicated by the API from a first layer to a second layer, wherein the API is to communicate data between the first layer and the second layer corresponding to a 5G-NR network protocol stack.

1. A processor comprising: one or more circuits to perform an application programming interface (API) to cause one or more resources of one or more processors to be allocated to perform fifth generation new radio (5G-NR) cells.

2. The processor of Clause 1 or any proceeding Clause, wherein the API is to communicate data between a first layer and a second layer corresponding to a 5G-NR network protocol stack, and wherein the data corresponds to a mapping of 5G-NR cells to resources in the first layer.

3. The processor of Clause 1 or any proceeding Clause, wherein the mapping is at least partially based on the first layer and second layer determining a maximum number of 5G-NR cells that can be supported by the resources in the first layer while meeting a quality parameter to process one or more workloads corresponding to the 5G-NR cells.

4. The processor of Clause 1 or any proceeding Clause, wherein the API is to communicate data between a first layer and a second layer corresponding to a 5G-NR network protocol stack, and wherein the data corresponds to a mapping of 5G-NR cells to resources in the first layer, wherein the quality parameter corresponds to latency, throughput, reliability, or connectivity of processing the one or more workloads corresponding to the 5G-NR cells.

5. The processor of Clause 1 or any proceeding Clause, wherein the one or more processors are one or more graphics processing units (GPUs).

6. The processor of Clause 2 or any proceeding Clause, wherein the quality parameter corresponds to performance indicators to process the one or more workloads to meet the quality parameter.

7. The processor of Clause 2 or any proceeding Clause, wherein the data corresponds to cell identification numbers and resources in the first layer.

8. The processor of Clause 2 or any proceeding Clause, wherein the data corresponds to cell identification numbers and threads available to process in the first layer resources.

9. The processor of Clause 2 or any proceeding Clause, wherein the one or more workloads correspond to slices of a 5G-NR network.

10. The processor of Clause 9 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

11. A system, comprising memory to store instructions that, as a result of execution by one or more processors, cause the system to:

perform an application programming interface (API) to cause one or more resources of one or more processors to be allocated to perform fifth generation new radio (5G-NR) cells.

12. The system of Clause 11 or any proceeding Clause, wherein the API is to communicate data between a first layer and a second layer corresponding to a 5G-NR network protocol stack, wherein the data corresponds to a mapping of 5G-NR cells to resources in L1.

13. The system of Clause 12 or any proceeding Clause, wherein the mapping is at least partially based on the first layer and second layer determining a maximum number of 5G-NR cells that can be supported by the resources in L1 while meeting a quality parameter to process one or more workloads corresponding to the 5G-NR cells.

14. The system of Clause 12 or any proceeding Clause, wherein the quality parameter corresponds to latency, throughput, reliability, or connectivity of processing the one or more workloads corresponding to the 5G-NR cells.

15. The system of Clause 11 or any proceeding Clause, wherein the one or more processors are one or more graphics processing units (GPUs).

16. The system of Clause 12 or any proceeding Clause, wherein the quality parameter corresponds to performance indicators to process the one or more workloads to meet the quality parameter.

17. The system of Clause 12 or any proceeding Clause, wherein the data corresponds to cell identification numbers and resources in L1.

18. The system of Clause 12 or any proceeding Clause, wherein the data corresponds to cell identification numbers and threads available to process in L1 resources.

19. The system of Clause 12 or any proceeding Clause, wherein the one or more workloads correspond to slices of a 5G-NR network.

20. The system of Clause 12 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

21. A machine-readable medium having stored thereon one or more instructions, which if performed by one or more processors, cause one or more processors to at least:

perform an application programming interface (API) to cause one or more resources of one or more processors to be allocated to perform fifth generation new radio (5G-NR) cells.

22. The machine-readable medium of Clause 21 or any proceeding Clause, wherein the one or more instructions further cause the one or more processors to at least:

communicate data between a first layer and a second layer corresponding to a 5G-NR network protocol stack to determine a mapping of 5G-NR cells and corresponding one or more workloads to hardware accelerator resources in the first layer.

23. The machine-readable medium of Clause 22 or any proceeding Clause, wherein the quality parameter corresponds to latency, throughput, reliability, or connectivity of processing the one or more workloads.

24. The machine-readable medium of Clause 21 or any proceeding Clause, wherein the one or more processors are one or more graphics processing units (GPUs).

25. The machine-readable medium of Clause 22 or any proceeding Clause, wherein the data corresponds to cell identification numbers and resources in the first layer.

26. The machine-readable medium of Clause 22 or any proceeding Clause, wherein the data corresponds to cell identification numbers and threads available to process in the first layer resources.

27. The machine-readable medium of Clause 22 or any proceeding Clause, wherein the one or more workloads correspond to slices of a 5G-NR network.

28. The machine-readable medium of Clause 22 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

29. A method comprising:

performing an application programming interface (API) to cause one or more resources of one or more processors to be allocated to perform fifth generation new radio (5G-NR) cells.

30. The method of Clause 29 or any proceeding Clause, the method further comprising:

communicating data between a first layer and a second layer corresponding to a 5G-NR network protocol stack to determine a mapping of 5G-NR cells and corresponding one or more workloads to hardware accelerator resources in the first layer.

31. The method of Clause 30 or any proceeding Clause, wherein the quality parameter corresponds to performance indicators to process the one or more workloads to meet the quality parameter.

32. The method of Clause 30 or any proceeding Clause, wherein the data corresponds to cell identification numbers and resources in the first layer.

33. The method of Clause 30 or any proceeding Clause, wherein the data corresponds to cell identification numbers and threads available to process in the first layer resources.

34. The method of Clause 30 or any proceeding Clause, wherein the one or more workloads correspond to slices of a 5G-NR network.

35. The method of Clause 34 or any proceeding Clause, wherein the slices provide services corresponding to enhanced mobile broadband (eMBB) operations, ultra-reliable low operations, or vehicle to everything (V2X) operations.

36. The method of Clause 35 or any proceeding Clause, wherein the one or more workloads correspond to slices of a 5G-NR network, wherein the slices provide services corresponding to enhanced mobile broadband (eMBB) operations, ultra-reliable low latency communications (URLLC) operations, massive machine-type communications (mMTC) operations, or vehicle to everything (V2X) operations.

1. A processor comprising:

one or more circuits to perform an application programming interface (API) to indicate whether one or more resources of one or more processors are allocated to perform fifth generation new radio (5G-NR) cells.

2. The processor of Clause 1 or any proceeding Clause, wherein the API is to communicate data between a first layer and a second layer corresponding to a 5G-NR network protocol stack, and wherein the second layer is to offload one or more workloads corresponding to the 5G-NR cells to the first layer to be processed by the one or more processors.

3. The processor of Clause 1 or any proceeding Clause, wherein the API is to communicate data between a first layer and a second layer corresponding to a 5G-NR network protocol stack, wherein the second layer is to offload one or more workloads corresponding to the 5G-NR cells to the first layer to be processed by the one or more processors, wherein the second layer is to determine whether to offload the one or more workloads at least partially based on a quality parameter provided from the second layer to the first layer by another API, wherein the one or more resources of the one or more processors correspond to the first layer, and wherein to allocate is to map the one or more workloads corresponding 5G-NR cell identifications to the one or more resources.

4. The processor of Clause 2 or any proceeding Clause, wherein the quality parameter corresponds to latency, throughput, reliability, or connectivity of processing the one or more workloads corresponding to the 5G-NR cells.

5. The processor of Clause 1 or any proceeding Clause, wherein the one or more processors are one or more graphics processing units (GPUs).

6. The processor of Clause 2 or any proceeding Clause, wherein the quality parameter corresponds to performance indicators to process the one or more workloads to meet the quality parameter.

7. The processor of Clause 2 or any proceeding Clause, wherein the API is performed in response to the other API determining to offload the one or more workloads to the first layer.

8. The processor of Clause 2 or any proceeding Clause, wherein the API is to provide from the first layer to the second layer a response that the mapping of the one or more workloads corresponding 5G-NR cell identifications to the one or more resources was successful.

9. The processor of Clause 2 or any proceeding Clause, wherein the workloads correspond to network slices of a 5G-NR network.

10. The processor of Clause 9 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

11. A system, comprising memory to store instructions that, as a result of execution by one or more processors, cause the system to:

perform an application programming interface (API) to indicate whether one or more resources of one or more processors are allocated to perform fifth generation new radio (5G-NR) cells.

12. The system of Clause 11 or any proceeding Clause, wherein the API is to communicate data between a first layer and a second layer corresponding to a 5G-NR network protocol stack, wherein the second layer is to offload one or more workloads corresponding to the 5G-NR cells to the first layer to be processed by the one or more processors.

13. The system of Clause 12 or any proceeding Clause, wherein the second layer is to determine whether to offload the one or more workloads at least partially based on a quality parameter provided from the second layer to the first layer by another API, wherein the one or more resources of the one or more processors correspond to the first layer, and wherein to allocate is to map the one or more workloads corresponding 5G-NR cell identifications to the one or more resources.

14. The system of Clause 12 or any proceeding Clause, wherein the quality parameter corresponds to latency, throughput, reliability, or connectivity of processing the one or more workloads corresponding to the 5G-NR cells.

15. The system of Clause 1 or any proceeding Clause 1, wherein the one or more processors are one or more graphics processing units (GPUs).

16. The system of Clause 12 or any proceeding Clause, wherein the API is performed in response to the other API determining to offload the one or more workloads to the first layer.

17. The system of Clause 12 or any proceeding Clause, wherein the API is to provide from the first layer to the second layer a response that the mapping of the one or more workloads corresponding 5G-NR cell identifications to the one or more resources was successful.

18. The system of Clause 12 or any proceeding Clause, wherein the one or more workloads correspond to network slices of a 5G-NR network.

19. The system of Clause 18 or any proceeding Clause, wherein the slices provide services corresponding to enhanced mobile broadband (eMBB) operations, ultra-reliable low latency communications (URLLC) operations, massive machine-type communications (mMTC) operations, or vehicle to everything (V2X) operations.

20. The system of Clause 19 or any proceeding Clause, wherein the one or more workloads correspond to slices of a 5G-NR network, wherein the slices provide services corresponding to enhanced mobile broadband (eMBB) operations, ultra-reliable low latency communications (URLLC) operations, massive machine-type communications (mMTC) operations, or vehicle to everything (V2X) operations.

21. A machine-readable medium having stored thereon one or more instructions, which if performed by one or more processors, cause one or more processors to at least:

perform an application programming interface (API) to indicate whether one or more resources of one or more processors are allocated to perform fifth generation new radio (5G-NR) cells.

22. The machine-readable medium of Clause 17 or any proceeding Clause, wherein the one or more instructions further cause the one or more processors to at least:

communicate data between a first layer and a second layer corresponding to a 5G-NR network protocol stack, wherein the second layer is to offload one or more workloads corresponding to the 5G-NR cells to the first layer to be processed by the one or more processors, determine whether to offload the one or more workloads at least partially based on a quality parameter provided from the second layer to the first layer by the API, and wherein the quality parameter corresponds to the one or more processors processing the one or more workloads to meet the quality parameter.

23. The machine-readable medium of Clause 18 or any proceeding Clause, wherein the quality parameter corresponds to latency, throughput, reliability, or connectivity of processing the one or more workloads.

24. The machine-readable medium of Clause 18 or any proceeding Clause, wherein the one or more processors are one or more graphics processing units (GPUs).

25. The machine-readable medium of Clause 18 or any proceeding Clause, wherein the quality parameter corresponds to performance indicators to process the one or more workloads to meet the quality parameter.

26. The machine-readable medium of Clause 18 or any proceeding Clause, wherein the one or more instructions further cause the one or more processors to at least:

deny processing the one or more workloads based on a response from the first layer indicating that it cannot meet the quality parameter to any number of the 5G-NR cells.

27. The machine-readable medium of Clause 17 or any proceeding Clause, wherein the API has an input corresponding to a quality parameter and a response to the API corresponds to admitting or denying one or more workloads to be processed by the one or more processors to meet the quality parameter.

28. A method comprising:

performing an application programming interface (API) to indicate whether one or more resources of one or more processors are allocated to perform fifth generation new radio (5G-NR) cells.

29. The method of Clause 28 or any proceeding Clause, the method further comprising:

communicating, by the API, data between a first layer and a second layer corresponding to a 5G-NR network protocol stack, wherein the second layer is to offload one or more workloads from the second layer to the first layer to be processed by the one or more processors, determining, by the API, whether to offload the one or more workloads to the first layer to be processed at least partially based on an input quality parameter of processing the one or more workloads corresponding to the API; and allocate the one or more workloads corresponding 5G-NR cell identifications to the one or more resources in the first layer.

30. The method of Clause 29 or any proceeding Clause, wherein the quality parameter corresponds to performance indicators to process the one or more workloads to meet the quality parameter.

31. The method of Clause 29 or any proceeding Clause, the method further comprising:

providing from the first layer to the second layer a response that the mapping of the one or more workloads corresponding 5G-NR cell identifications to the one or more resources was successful.

32. The method of Clause 29 or any proceeding Clause, wherein the workloads correspond to slices of a 5G-NR network.

33. The method of Clause 32 or any proceeding Clause, wherein the slices provide services corresponding to enhanced mobile broadband (eMBB) operations, ultra-reliable low operations, or vehicle to everything (V2X) operations.

1. A processor comprising or any proceeding Clause: one or more circuits to perform an application programming interface (API) to indicate one or more techniques to be used by one or more processors in performing one or more fifth generation new radio (5G-NR) cells.

2. The processor of Clause 1 or any proceeding Clause, wherein the API has an input quality parameter corresponding to the one or more processors performing one or more workloads of the 5G-NR cells to meet the quality parameter, and wherein to perform the API is to cause the one or more processors to select an algorithm from a library to process the one or one workloads to meet the quality parameter, and wherein the algorithm corresponds to the one or more techniques.

3. The processor of Clause 1 or any proceeding Clause, wherein the API has an input quality parameter corresponding to the one or more processors performing one or more workloads of the 5G-NR cells to meet the quality parameter, and wherein to perform the API is to cause the one or more processors to select an algorithm from a library to process the one or one workloads to meet the quality parameter, wherein the algorithm corresponds to the one or more techniques, wherein the quality parameter corresponds to latency, throughput, reliability, or connectivity of processing the one or more workloads corresponding to the 5G-NR cells.

4. The processor of Clause 1 or any proceeding Clause, wherein the one or more processors are one or more graphics processing units (GPUs).

5. The processor of Clause 2 or any proceeding Clause, wherein to perform the API is cause the one or more processors the one or more workloads of the 5G-NR cells to schedule the one or more workloads to be processed sequentially or in parallel.

6. The processor of Clause 2 or any proceeding Clause, wherein the algorithm is to enhance latency, throughput, reliability, or connectivity when processing the one or more workloads corresponding to the 5G-NR cells.

7. The processor of Clause 2 or any proceeding Clause, wherein the library has algorithms corresponding to processing operations of a 5G-NR network, wherein the operations correspond to enhanced mobile broadband (eMBB) operations, ultra-reliable low latency communications (URLLC) operations, massive machine-type communications (mMTC) operations, or vehicle to everything (V2X) operations.

8. The processor of Clause 2 or any proceeding Clause, wherein the one or more processors are hardware accelerators corresponding to a field programmable gate array (FPGA), a graphics processing unit (GPU), or a central processing unit (CPU).

9. A system, comprising memory to store instructions that, as a result of execution by one or more processors, cause the system to:

perform an application programming interface (API) to indicate one or more techniques to be used by one or more processors in performing one or more fifth generation new radio (5G-NR) cells.

10. The system of Clause 9 or any proceeding Clause, wherein the API has an input quality parameter corresponding to the one or more processors processing one or more workloads of the 5G-NR cells to meet the quality parameter, and wherein to perform the API is to cause the one or more processors to select an algorithm from a library to process the one or one workloads to meet the quality parameter, and wherein the algorithm corresponds to the one or more techniques.

11. The system of Clause 10 or any proceeding Clause, wherein the algorithm is to enhance latency, throughput, reliability, or connectivity when processing the one or more workloads corresponding to the 5G-NR cells.

12. The system of Clause 10 or any proceeding Clause, wherein to perform the API is cause the one or more processors the one or more workloads of the 5G-NR cells to schedule the one or more workloads to be processed sequentially or in parallel.

13. The system of Clause 10 or any proceeding Clause, wherein the quality parameter corresponds to performance indicators to process the one or more workloads to meet the quality parameter.

14. The system of Clause 10, wherein the library has algorithms corresponding to processing operations of a 5G-NR network, wherein the operations correspond to enhanced mobile broadband (eMBB) operations, ultra-reliable low latency communications (URLLC) operations, massive machine-type communications (mMTC) operations, or vehicle to everything (V2X) operations.

15. The system of Clause 10 or any proceeding Clause, wherein the algorithm is to enhance processing of workloads corresponding to at least one of the following parameters: latency, throughput, reliability, or connectivity.

16. The system of Clause 10 or any proceeding Clause, wherein the library has algorithms corresponding to processing operations of a 5G-NR network, wherein the operations correspond to enhanced mobile broadband (eMBB) operations, ultra-reliable low latency communications (URLLC) operations, massive machine-type communications (mMTC) operations, or vehicle to everything (V2X) operations.

17. A machine-readable medium having stored thereon one or more instructions, which if performed by one or more processors, cause one or more processors to at least:

perform an application programming interface (API) to indicate one or more techniques to be used by one or more processors in performing one or more fifth generation new radio (5G-NR) cells.

18. The machine-readable medium of Clause 17 or any proceeding Clause, wherein to perform the API further comprises:

receive a quality parameter corresponding to the one or more processors processing one or more workloads of the 5G-NR cells to meet the quality parameter;

select, by the one or more processors, an algorithm from a library to process the one or one workloads to meet the quality parameter, and wherein the algorithm corresponds to the one or more techniques; and schedule the one or more workloads to be processed sequentially or in parallel.

19. The machine-readable medium of Clause 18 or any proceeding Clause, wherein the quality parameter corresponds to latency, throughput, reliability, or connectivity of processing the one or more workloads.

20. The machine-readable medium of Clause 18 or any proceeding Clause, wherein to schedule is at least partially based on whether the one or more workloads are homogenous or heterogenous workloads.

21. The machine-readable medium of Clause 18 or any proceeding Clause, wherein the quality parameter corresponds to performance indicators to process the one or more workloads to meet the quality parameter.

22. The machine-readable medium of Clause 18 or any proceeding Clause, wherein the algorithm is to enhance latency, throughput, reliability, or connectivity when processing the one or more workloads corresponding to the 5G-NR cells.

23. The machine-readable medium of Clause 18 or any proceeding Clause, wherein the library has algorithms corresponding to processing operations of a 5G-NR network, wherein the operations correspond to enhanced mobile broadband (eMBB) operations, ultra-reliable low latency communications (URLLC) operations, massive machine-type communications (mMTC) operations, or vehicle to everything (V2X) operations.

24. A method comprising: performing an application programming interface (API) to indicate a number of fifth generation new radio (5G-NR) cells that are able to be performed concurrently by one or more processors.

25. The method of Clause 24 or any proceeding Clause, the method further comprising:

receiving a quality parameter corresponding to the one or more processors processing one or more workloads of the 5G-NR cells to meet the quality parameter; selecting an algorithm from a library to process the one or one workloads to meet the quality parameter, and wherein the algorithm corresponds to the one or more techniques; and scheduling the one or more workloads to be processed sequentially or in parallel.

26. The method of Clause 25 or any proceeding Clause, wherein the quality parameter corresponds to performance indicators to process the one or more workloads to meet the quality parameter.

27. The method of Clause 25 or any proceeding Clause, wherein the quality parameter corresponds to latency, throughput, reliability, or connectivity of processing the one or more workloads corresponding to the 5G-NR cells.

28. The method of Clause 25 or any proceeding Clause, wherein the one or more processors are one or more graphics processing units (GPUs).

29. The method of Clause 25 or any proceeding Clause, wherein the one or more workloads correspond to slices of a 5G-NR network, wherein the slices provide services corresponding to enhanced mobile broadband (eMBB) operations, ultra-reliable low latency communications (URLLC) operations, massive machine-type communications (mMTC) operations, or vehicle to everything (V2X) operations.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In present document, references may be made to obtaining, acquiring, receiving, or inputting analog or digital data into a subsystem, computer system, or computer-implemented machine. A process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:
circuitry to query, in response to an application programming interface (API) call, one or more hardware accelerators of layer one (L1) of a fifth-generation new radio (5G-NR) network protocol stack to determine a maximum number of 5G-NR cells that are able to be performed concurrently by the one or more hardware accelerators based, at least in part, on a quality parameter received as input to the API call, wherein the 5G-NR cells are sections of a 5G-NR network that are divided into geographical areas;
the circuitry to block, in response to determining the maximum number of 5G-NR cells, a request to process one or more additional 5G-NR workloads based on the one or more hardware accelerators being unable to process the one or more additional 5G-NR workloads in a manner of meeting the quality parameter.

2. The one or more processors of claim 1, wherein the circuitry, in response to the API call, is to cause the L1 and a second layer of the 5G-NR network protocol stack to exchange data to determine the maximum number of 5G-NR cells.

3. The one or more processors of claim 1, wherein the circuitry, in response to the API call, is to cause the L1 and a second layer of the 5G-NR network protocol stack to exchange data to determine the maximum number of 5G-NR cells, wherein the quality parameter corresponds to the one or more hardware accelerators performing one or more workloads of the 5G-NR cells and meeting a threshold quality of service, and wherein the one or more hardware accelerators are resources that the L1 is able to use to perform the one or more workloads.

4. The one or more processors of claim 1, wherein the circuitry, in response to the API call, is to cause the L1 and a second layer of the 5G-NR network protocol stack to exchange data to determine the maximum number of 5G-NR cells, wherein the L1 is to provide through the API to the second layer the maximum number of 5G cells.

5. The one or more processors of claim 1, wherein the circuitry, in response to the API call, is to cause the L1 and a second layer of the 5G-NR network protocol stack to exchange data to determine the maximum number of 5G-NR cells, wherein the quality parameter corresponds to latency, throughput, reliability, or connectivity of processing one or more workloads corresponding to the 5G-NR cells.

6. The one or more processors of claim 1, wherein the one or more hardware accelerators are one or more graphics processing units (GPUs).

7. The one or more processors of claim 1, wherein the circuitry, in response to the API call, is to cause the L1 and a second layer of the 5G-NR network protocol stack to exchange data to determine the maximum number of 5G-NR cells, and wherein the API has a response that corresponds to denying.

8. The one or more processors of claim 1, wherein the circuitry, in response to the API call, is to cause the L1 and a second layer of the 5G-NR network protocol stack to exchange data to determine the maximum number of 5G-NR cells, wherein the quality parameter corresponds to the one or more hardware accelerators performing one or more workloads of the 5G-NR cells and meeting a threshold quality of service, and wherein the one or more workloads correspond to slices of the 5G-NR network.

9. The one or more processors of claim 1, wherein the circuitry, in response to the API call, is to cause the L1 and a second layer of the 5G-NR network protocol stack to exchange data to determine the maximum number of 5G-NR cells the first layer is able to perform concurrently at least partially based on a quality parameter, wherein the quality parameter corresponds to the one or more hardware accelerators performing one or more workloads of the 5G-NR cells and meeting a threshold quality of service, wherein the one or more workloads correspond to slices of the 5G-NR network, and wherein the slices provide services corresponding to enhanced mobile broadband (eMBB) operations, ultra-reliable low latency communications (URLLC) operations, massive machine-type communications (nMTC) operations, or vehicle to everything (V2X) operations.

10. A system, comprising memory to store instructions that, as a result of execution by one or more processors of the system, cause the system to:
in response to an application programming interface (API) call, query one or more hardware accelerators of layer one (L1) of a fifth generation new radio (5G-NR) network protocol stack to determine a maximum number of 5G-NR cells that are able to be performed concurrently by the one or more hardware accelerators based, at least in part, on a quality parameter received as input to the API call, wherein the 5G-NR cells are sections of a 5G-NR network that are divided into geographical areas; and
in response to determining the maximum number of 5G-NR cells, deny a request to process one or more additional 5G-NR workloads based on the one or more hardware accelerators being unable to process the one or more additional 5G-NR workloads in a manner of meeting the quality parameter.

11. The system of claim 10, wherein the system is further to cause the L1 and a second layer of the 5G-NR network protocol stack to exchange data to determine the maximum number of 5G-NR cells.

12. The system of claim 10, wherein the system is further to cause the L1 and a second layer of the 5G-NR network protocol stack to exchange data to determine the maximum number of 5G-NR cells, wherein the quality parameter corresponds to the one or more first processers hardware accelerators performing one or more workloads of the 5G-NR cells and meeting a threshold quality of service, and wherein the one or more hardware accelerators are resources that the L1 is able to use to perform the one or more workloads.

13. The system of claim 10, wherein the system is further to perform the API is to cause the L1 and a second layer of the 5G-NR network protocol stack to exchange data to determine the maximum number of 5G-NR cells, wherein the L1 is to provide through the API to the second layer the maximum number of 5G cells.

14. The system of claim 10, wherein the one or more hardware accelerators are one or more graphics processing units (GPUs).

15. The system of claim 10, wherein the system is further to cause the L1 and a second layer of the 5G-NR network protocol stack to exchange data to determine the maximum number of 5G-NR cells, wherein the quality parameter corresponds to latency, throughput, reliability, or connectivity of processing one or more workloads corresponding to the 5G-NR cells.

16. The system of claim 10, wherein the API call has a response to the API call corresponds to denying.

17. The system of claim 10, wherein the system is further to cause the L1 and a second layer of the 5G-NR network protocol stack to exchange data to determine the maximum number of 5G-NR cells, wherein the quality parameter corresponds to the one or more hardware accelerators performing one or more workloads of the 5G-NR cells and meeting a threshold quality of service, and wherein the one or more workloads correspond to slices of the 5G-NR network.

18. The system of claim 17, wherein the slices provide services corresponding to enhanced mobile broadband (eMBB) operations, ultra-reliable low latency communications (URLLC) operations, massive machine-type communications (mMTC) operations, or vehicle to everything (V2X) operations.

19. A non-transitory machine-readable medium having stored thereon one or more instructions, which if performed by one or more processors, cause the one or more processors to at least:

in response to an application programming interface (API) call, query one or more hardware accelerators of layer one (L1) of a fifth generation new radio (5G-NR) network protocol stack to determine a maximum number of 5G-NR cells that are able to be performed concurrently by the one or more hardware accelerators based, at least in part, on a quality parameter received as input to the API call, wherein the 5G-NR cells are sections of a 5G-NR network that are divided into geographical areas;

in response to determining the maximum number of 5G-NR cells, deny a request to process one or more additional 5G-NR workloads based on the one or more hardware accelerators being unable to process the one or more additional 5G-NR workloads in a manner of meeting the quality parameter.

20. The non-transitory machine-readable medium of claim 19, wherein the one or more processors are further to at least:

communicate data between the L1 and a second layer of the 5G-NR network protocol stack, determine whether to offload one or more workloads of the 5G-NR cells from the second layer to the L1 to be processed by one or more second processors at least partially based on the quality parameter provided from the second layer to the L1, and wherein the quality parameter corresponds to the one or more hardware accelerators processing the one or more workloads, wherein the quality parameter corresponds to the one or more hardware accelerators performing the one or more workloads of the 5G-NR cells and meeting a threshold quality of service; and schedule the one or more workloads to be processed by the one or more hardware accelerators.

21. The non-transitory machine-readable medium of claim 20, wherein the quality parameter corresponds to latency, throughput, reliability, or connectivity of processing the one or more workloads.

22. The non-transitory machine-readable medium of claim 19, wherein the one or more hardware accelerators are one or more graphics processing units (GPUs).

23. The non-transitory machine-readable medium of claim 20, wherein the quality parameter corresponds to performance indicators to process the one or more workloads to meet the quality parameter.

24. A method comprising:

in response to an application programming interface (API) call, querying one or more hardware accelerators of layer one (L1) of a fifth-generation new radio (5G-NR) network protocol stack to determine a maximum number of 5G-NR cells that are able to be performed concurrently by the one or more hardware accelerators based, at least in part, on a quality parameter received as input to the API call, wherein the 5G-NR cells are sections of a 5G-NR network that are divided into geographical areas; and in response to determining the maximum number of 5G-NR cells, blocking a request to process one or more additional 5G-NR workloads based on the one or more hardware accelerators being unable to process the one or more additional 5G-NR workloads in a manner of meeting the quality parameter.

25. The method of claim 24, the method further comprising:

communicating, by the API call, data between a first layer and a second layer of the 5G-NR network protocol stack, wherein the second layer is to offload one or more workloads of the 5G-NR cells from the second layer to the L1, determining, by the API call, whether to offload the one or more workloads to the L1 to be processed at least partially based on the quality parameter; and scheduling the one or more workloads to be processed at least based on rank or priority of the one or more workloads, wherein the rank or priority was provided by another API call.

26. The method of claim 24, wherein the quality parameter corresponds to performance indicators to process one or more workloads of the 5G-NR cells to meet the quality parameter.

27. The method of claim 24, wherein one or more workloads correspond to slices of the 5G-NR network, wherein the slices provide services corresponding to enhanced mobile broadband (eMBB) operations, ultra-reliable low latency communications (URLLC) operations, massive machine-type communications (mMTC) operations, or vehicle to everything (V2X) operations.

28. The method of claim 25, wherein the quality parameter is a first quality parameter, the method further comprising:

receiving a notification that network traffic conditions have changed to correspond to a second quality parameter, and admitting or denying another one or more 5G-NR workloads to be processed by the one or more hardware accelerators at least partially based on a capability of the one or more hardware accelerators to meet the second quality parameter communicated by the API call from the L1 to the second layer.

29. The method of claim 24, wherein the quality parameter is different than a standard or predefined quality parameter.

* * * * *